United States Patent [19]
Dwyer, III

[11] Patent Number: 5,983,335
[45] Date of Patent: Nov. 9, 1999

[54] COMPUTER SYSTEM HAVING ORGANIZATION FOR MULTIPLE CONDITION CODE SETTING AND FOR TESTING INSTRUCTION OUT-OF-ORDER

[75] Inventor: Harry Dwyer, III, Annandale, N.J.

[73] Assignee: International Business Machines Corporation, Armonk, N.Y.

[21] Appl. No.: 08/841,550

[22] Filed: Apr. 30, 1997

Related U.S. Application Data

[62] Division of application No. 08/328,933, Oct. 25, 1994, Pat. No. 5,630,157, which is a continuation of application No. 07/721,853, Jun. 13, 1991, abandoned.

[51] Int. Cl.$^6$ ................................................. G06F 15/00
[52] U.S. Cl. ........................ 712/23; 712/217; 712/216; 712/215
[58] Field of Search ............... 395/800.23, 800.24, 395/390, 391, 392, 393, 566; 711/125, 149, 217; 712/23, 24, 225, 214, 215, 216

[56] References Cited

U.S. PATENT DOCUMENTS

| | | |
|---|---|---|
| 4,293,910 | 10/1981 | Flusche et al. . |
| 4,498,136 | 2/1985 | Sproul, III . |
| 4,654,785 | 3/1987 | Nishiyama et al. . |
| 4,722,049 | 1/1988 | Lahti . |
| 4,760,520 | 7/1988 | Shintani et al. . |
| 4,807,115 | 2/1989 | Horng . |
| 4,833,599 | 5/1989 | Colwell et al. . |
| 4,853,840 | 8/1989 | Shibuya . |
| 4,858,105 | 8/1989 | Kuriyama et al. ............... 395/800.23 |
| 4,901,233 | 2/1990 | Liptay . |
| 4,903,196 | 2/1990 | Pomerene et al. . |
| 4,942,525 | 7/1990 | Shintani et al. . |
| 4,972,342 | 11/1990 | Davis et al. . |
| 4,991,080 | 2/1991 | Emma et al. . |
| 4,991,090 | 2/1991 | Emma et al. . |
| 4,991,133 | 2/1991 | Davis et al. . |
| 5,003,462 | 3/1991 | Blaner et al. . |
| 5,072,364 | 12/1991 | Jardine et al. . |
| 5,075,844 | 12/1991 | Jardine et al. . |
| 5,142,634 | 8/1992 | Fite et al. . |
| 5,185,868 | 2/1993 | Tran . |
| 5,185,871 | 2/1993 | Frey et al. . |
| 5,186,697 | 2/1993 | Johnson . |
| 5,197,132 | 3/1993 | Steely, Jr. et al. . |
| 5,226,126 | 7/1993 | McFarland et al. . |

(List continued on next page.)

FOREIGN PATENT DOCUMENTS

| | | |
|---|---|---|
| 0301220 | 2/1989 | European Pat. Off. . |
| 0340453 | 11/1989 | European Pat. Off. . |
| 0378830 | 7/1990 | European Pat. Off. . |
| 0381471 | 8/1990 | European Pat. Off. . |

OTHER PUBLICATIONS

"Design of a Computer: The Control Data 6600"; J.E. Thornton; Scott, Foreman & Company; Glenview, IL; 1970; pp. 12–140.

(List continued on next page.)

*Primary Examiner*—Larry D. Donaghue
*Attorney, Agent, or Firm*—Whitham, Curtis & Whitham; Arthur J. Samodovitz

[57] ABSTRACT

Computer system with multiple, out-of-order, instruction issuing system suitable for superscalar processors with a RISC organization, also has a Fast Dispatch Stack (FDS), a dynamic instruction scheduling system that may issue multiple, out-of-order, instructions each cycle to functional units as dependencies allow. The basic issuing mechanism supports a short cycle time and its capabilities are augmented. Condition code dependent instructions issue in multiples and out-of-order. A fast register renaming scheme is presented. An instruction squashing technique enables fast precise interrupts and branch prediction. Instructions preceding and following one or more predicted conditional branch instructions may issue out-of-order and concurrently. The effects of executed instructions following an incorrectly predicted branch instruction or an instruction that causes a precise interrupt are undone in one machine cycle.

17 Claims, 72 Drawing Sheets

U.S. PATENT DOCUMENTS

| | | |
|---|---|---|
| 5,226,130 | 7/1993 | Favor et al. . |
| 5,228,131 | 7/1993 | Ueda et al. . |
| 5,257,354 | 10/1993 | Comfort et al. . |
| 5,265,213 | 11/1993 | Weiser et al. . |
| 5,283,873 | 2/1994 | Steely, Jr. et al. . |
| 5,287,467 | 2/1994 | Blaner et al. . |
| 5,428,811 | 6/1995 | Hinton et al. ................... 395/800.23 |
| 5,471,593 | 11/1995 | Brangin . |
| 5,488,729 | 1/1996 | Vegesna et al. ................ 395/800.23 |

OTHER PUBLICATIONS

"Detection and Parallel Execution of Independent Instructions"; Garold S. Tjaden et al.; IEEE Transactions on Computers, vol. C–19, No. 10, Oct. 1970; pp. 889–895.

"The IBM System/360 Model 91: Storage System"; L.J. Boland et al.; IBM Journal, Jan. 1967; pp. 54–68.

"A Fast Instruction Dispatch Unit for Multiple and Out–of–Sequence Issuances"; H.C. Torng; Professor of Elec. Engineering; Stanford University; Nov. 1987.

"Limits on Multiple Instruction Issue"; Michael D. Smith et al.; Stanford University; ASPLOS–III Proceedings; Apr. 1989.

"Design Coices for the HPSm Microprocessor Chip"; Wen–mei Hwu et al.; Proceedings of the 20th Annual Hawaii International Conference on System Sciences; 1987; pp. 330–336.

"Reducing the Cost of Branches"; Scott McFarling et al.; Computer Systems Laboratory; Stanford University; 1986 IEEE; pp. 396–403.

"The ZS–1 Central Processor"; J.E. Smith et al.; Astronautics Corporation os America; Madison, Wisconsin; 1987 ACM; pp. 199–204.

"Designing a VAX for High Performance"; Tryggve Fossum et al.; 1990 IEEE; pp. 36–43.

"Pre–Decoding Mechanism for Superscalar Architecture"; Kenji Minagawa et al.; Toshiba Research and Development Center; Japan; 1991 IEEE; pp. 21–24.

"Fast Reset of Logical Facilities"; IBM Technical Disclosure Bulletin, vol. 31, No. 6, Nov. 1988; p. 275.

"Pipelined Register–Storage Architectures"; Steven R. Kunkel et al.; University of Wisconsin–Madison; 1986 IEEE; pp. 515–517.

"An Instruction Issuing Approach to Enhancing Performance in Multiple Functional Unit Processors"; Ramon D. Acosta et al.; 1986 IEEE; pp. 815–828.

Instruction Issue Logic for High–Performance, Interruptable Pipelined Processor; Gurindar S. Sohi et al.; University of Wisconsin–Madison; 1987 ACM.

"Implementing Precise Interrupts in Pipelined Processors"; James E. Smith; IEEE, vol. 37, No. 5, May 1988; pp. 562–573.

"The Metaflow Architecture"; Val Popescu et al.; IEEE Micro; 1991 IEEE; Jun. 1991; vol. 11, No. 3; pp. 10–73.

"The Performance Potential of Multiple Functional Unit Processors"; A.R. Pleszkun et al.; University of Wisconsin––Madison; 1988 IEEE; Computer Architecture News; vol. 16, No. 2; pp. 37–44.

"Cache Memories"; Alan Jay Smith; Computing Surveys; vol. 14, No. 3, Sep. 1982; pp. 473–530.

"Dhrystone: A Synthetic Systems Programming Benchmark"; Reinhold P. Weicker; Computing Practices; Oct. 1984, vol. 27, No. 10; pp. 1013–1030.

"VSLI Processor Architecture"; John L. Hennessy; IEEE Transactions on Computers; vol. C–33, No. 12, Dec. 1984; pp. 1221–1246.

"Concurrent VLSI Architectures"; Charles L. Seitz; IEEE Transactions on Computers;, vol. C–33, No. 12, Dec. 1984; pp. 1246–1265.

"Critical Issues Regarding HPS, A High Performance Microarchitecture"; Yale N. Patt et al.; University of California, Berkley; 1985 ACM; pp. 109–116.

"HPSm, a High Performance Restricted Data Flow Architecture Having Minimal Functionality"; Wen–mei Hwu et al.; University of California, Berkley; IEE 1986.

"New Computers for Artificial Intelligence Processing"; Benjamin W. Wah; University of Illinois at Urbana–Champaign; 1987 IEEE; pp. 10–15.

"Reducing the Branch Penalty in Pipelined Processors"; David J. Lilja; University of Illinois at Urbana–Champaign; 1988 IEEE; pp. 47–55.

"A VLIW Architecture for a Trace Scheduling Compiler"; Robert P. Colwell et al.; IEEE Transactions on Computers, vol. 37, No. 8, Aug. 1988; pp. 967–979.

"HPSm2; A Refined Single–Chip Microengine"; Wen–mei W. Hwu et al.; University of Illiniois, Urbana; 1988 IEEE; pp. 30–40.

"The Nonuniform Distribution of Instruction–Level and Machine Parallelism and Its Effect on Performance"; Norman P. Jouppi; 1989 IEEE; pp. 1645–1658.

"Building Parallelism Into the Insruction Pipeline"; Scott Chan et al.; Tandem Computers, Inc., Cupertino, California; High Performance Systems; pp. 52–58.

"SIMP: A Novel High–Speed Single–Processor Architecture"; Kazuaki Murakami et al.; Dept. of Information Systems; Kyushu University, Fukuoka, Japan; 1989 ACM; pp. 78–85.

"Available Instruction–Level Parallelism for Superscalar and Superpiplined Machines"; Norman P. Jouppi et al. Digital Equipment Corp.; Western Research Lab; 1989 ACM; pp. 272–282.

"Instruction Schuduling for the IBM RISC System/6000 Processor"; H.S. Warren, Jr.; IBM J. Res. Develop., vol. 34, No. 1, Jan. 1990.

"Machine Organization of the IBM RISC System/6000 Processor"; G.F. Grohoski; IBM J. Res. Develop., vol. 34, No. 1, Jan. 1990; pp. 37–58.

"Interrupt Handling for Out–of–Order Execution Processors"; H.C. Torng et al.; School of Elec. Engineering; Phillips Hall, Cornell University, Ithaca, NY; pp. 1–16 (with figures 1–9 included in addition to text pages).

"Limits on Multiple Instruction Issue"; Michael D. Smith et al.; Stanford University; Center for Integrated Systems; 1989 ACM; pp. 290–302.

"Boosting Beyond Static Scheduling in a Superscalar Processor"; Michael D. Smith et al.; Stanford University; Computer Systems Lab; 1990 IEEE; pp. 344–354.

"Dynamic Instruction Scheduling and the Astronautics ZS–1"; James E. Smith; Astronautics Corp. of America; Jul. 1989 IEEE; pp. 21–35.

"Look–Ahead Processors"; Robert M. Keller; Dept. of Elec. Engineering, Princeton University; Computing Surveys, vol. 7, No. 4, Dec. 1975; pp. 177–195.

"Instruction Issue Logic in Pipelined Supercomputers"; Shlomo Weiss et al.; IEEE Transactions on Computers, vol. C–33, No. 11, Nov. 1984; pp. 1013–0122.

"An Instruction Issuing Mechanism for Performance Enhancements"; H.C. Torng; Technical Report; Feb. 1984.

"Branch Prediction Strategies and Branch Target Buffer Design"; Johnny K.F. Lee; Hewlett–Packard; Alan Jay Smith, University of California, Berkeley; Computer, vol. 17, No. 1; Jan. 1984.

"The 801 Minicomputer"; George Radin; IBM J. Res. Develop., vol. 27, No. 3, May 1983; pp. 237–246.

"An Efficient Algorithm for Exploiting Multiple Arithmetic Units"; R.M. Tomasulo; IBM; pp. 293–305 1982.

"A VLSI RISC"; David A. Patterson et al., University of California, Berkeley; 1982 IEEE.

"Checkpoint Repair for High–Performance Out–of–Order Execution Machines"; Wen–Mei W. Hwu et al.; IEEE Transations on Computers, vol. C–36, No. 12; Dec. 1987; pp. 1497–1514.

Acosta, "Evaluation, Implementation, and Enhancement of Dispatch Stack Instruction Issuing Mechanism", Aug. 1995.

|        | Cycle 1 | Cycle 2   | Cycle 3   |
|--------|---------|-----------|-----------|
| F.U. 1 | $q_i$   | $q_{i+1}$ | $q_{i+3}$ |
| F.U. 2 |         | $q_{i+2}$ |           |

FIG.2

Stack Before Compression

| Slot | Tag | I-Group Completion Status |
| --- | --- | --- |
| 0 | 0 | Completed |
| 1 | 1 | Completed |
| 2 | 2 | Uncompleted |
| 3 | 3 | Completed |
| 4 | 4 | Uncompleted |
| 5 | 5 | Uncompleted |
| 6 | 6 | Completed |
| 7 | 7 | Uncompleted |

After Top Compression

| Slot | Tag | I-Group Completion Status |
| --- | --- | --- |
| 0 | 2 | Uncompleted |
| 1 | 3 | Completed |
| 2 | 4 | Uncompleted |
| 3 | 5 | Uncompleted |
| 4 | 6 | Completed |
| 5 | 7 | Uncompleted |
| 6 | 8 | Uncompleted |
| 7 | 9 | Uncompleted |

After Total Compression

| Slot | Tag | I-Group Completion Status |
| --- | --- | --- |
| 0 | 2 | Uncompleted |
| 1 | 4 | Uncompleted |
| 2 | 5 | Uncompleted |
| 3 | 7 | Uncompleted |
| 4 | 8 | Uncompleted |
| 5 | 9 | Uncompleted |
| 6 | 10 | Uncompleted |
| 7 | 11 | Uncompleted |

FIG. 20

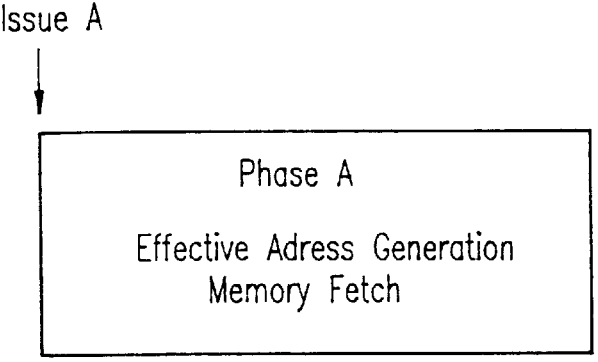
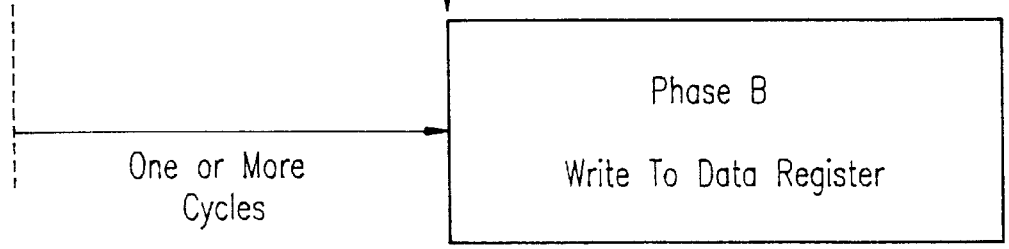
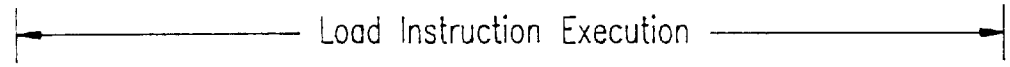
FIG.33

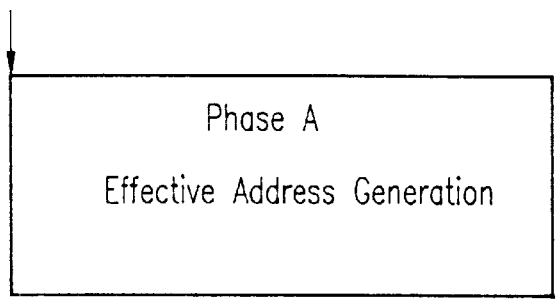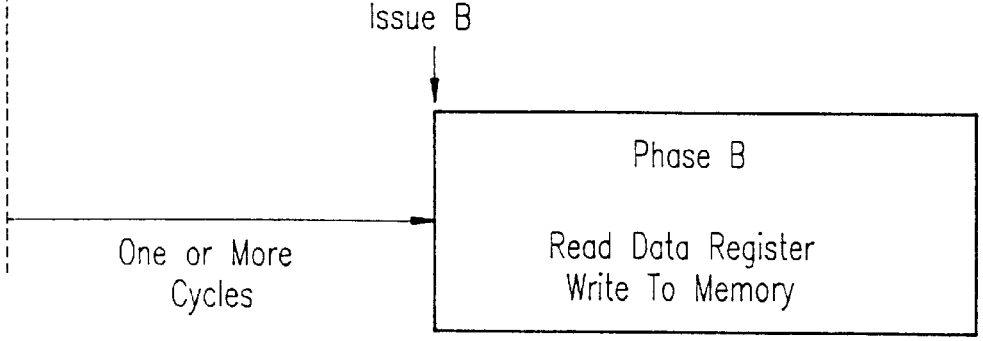
FIG.34

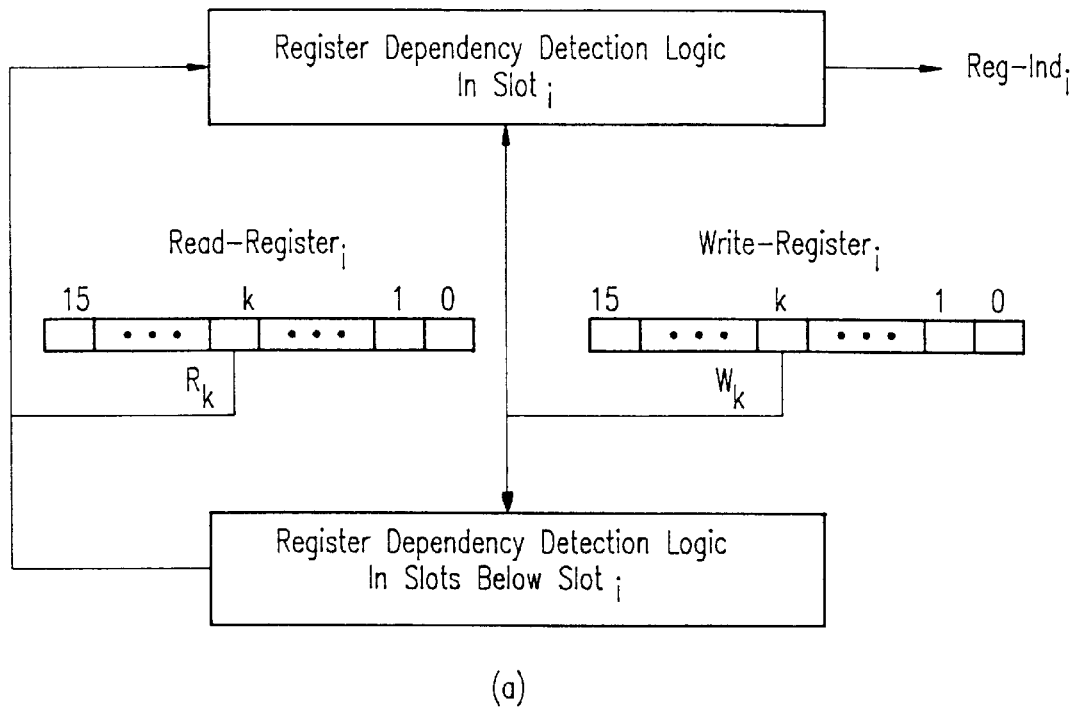
(a)
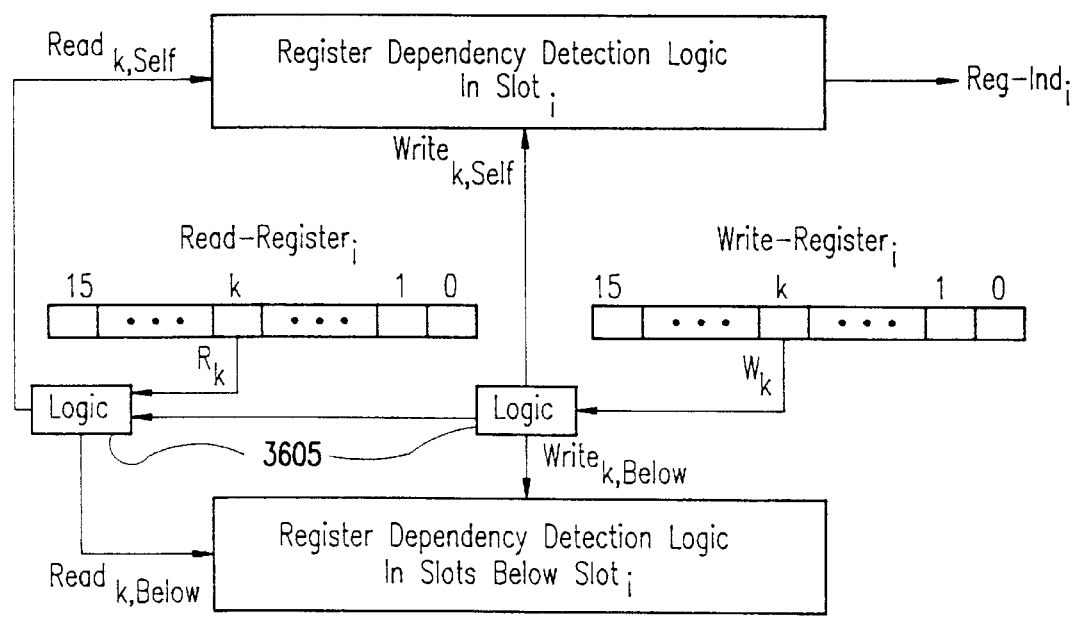
(b)
FIG.36

S 1, (2,3) | L (2,3), 1

| | Read-Register | Write-Register | Read-Register | Write-Register |
|---|---|---|---|---|
| Seen by Conflict Detection Logic in Slot | 2,3 | | 2,3 | |
| Actually in Slot | 2,3 | 1 | 2,3 | 1 |
| Seen by Conflict Detection Logic in Following Slots | 1,2,3 | | 2,3 | 1 |

Before Issue-A

| | Read-Register | Write-Register | Read-Register | Write-Register |
|---|---|---|---|---|
| Seen by Conflict Detection Logic in Slot | 1 | | | 1 |
| Actually in Slot | | 1 | | 1 |
| Seen by Conflict Detection Logic in Following Slots | 1 | | | 1 |

After Issue-A and Before Issue-B

| | Read-Register | Write-Register | Read-Register | Write-Register |
|---|---|---|---|---|
| Seen by Conflict Detection Logic in Slot | | | | 1 |
| Actually in Slot | | | | 1 |
| Seen by Conflict Detection Logic in Following Slots | | | | 1 |

After Issue-B

FIG.37

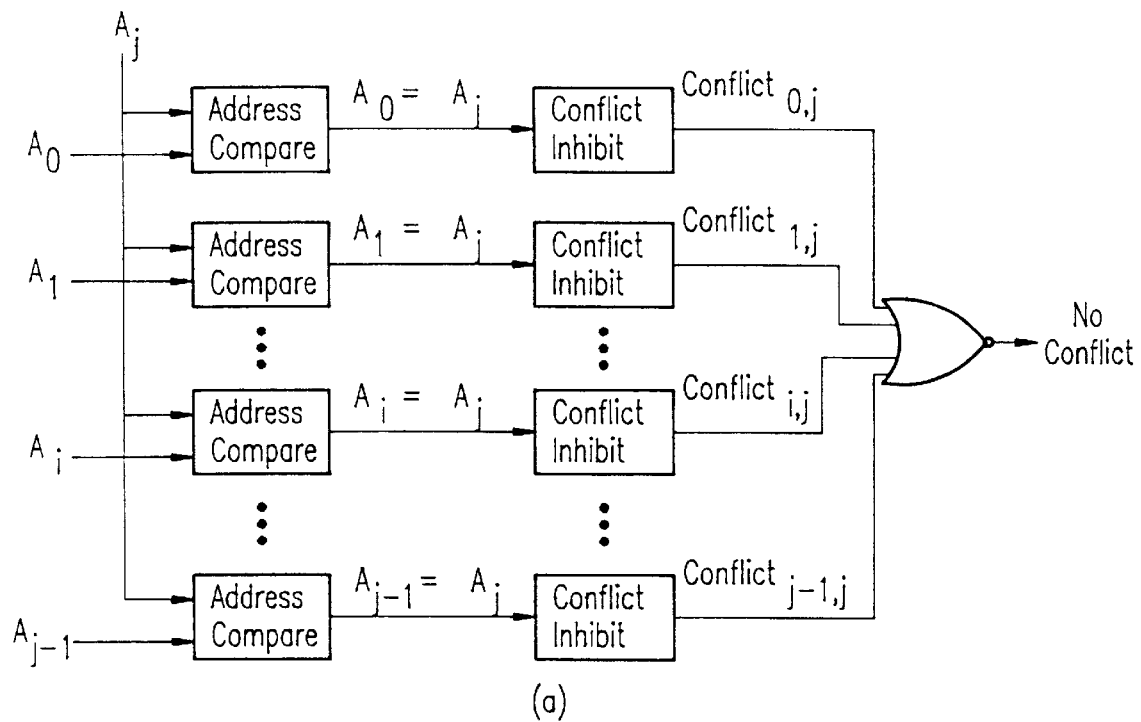
(a)
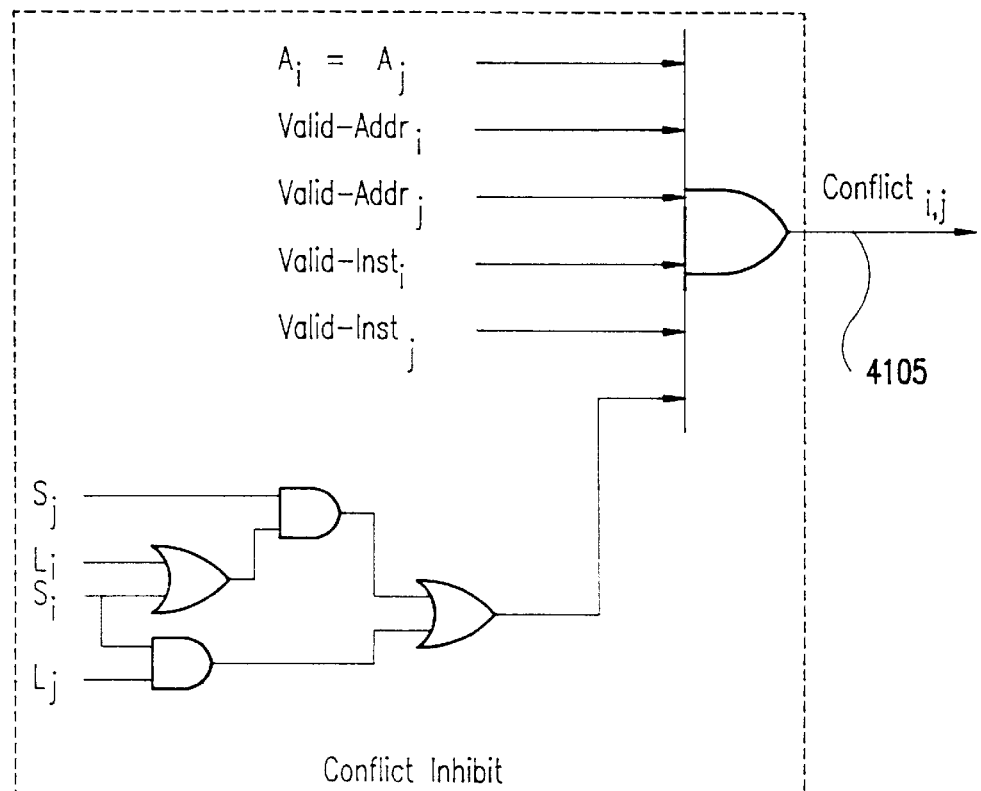
(b)
FIG.41

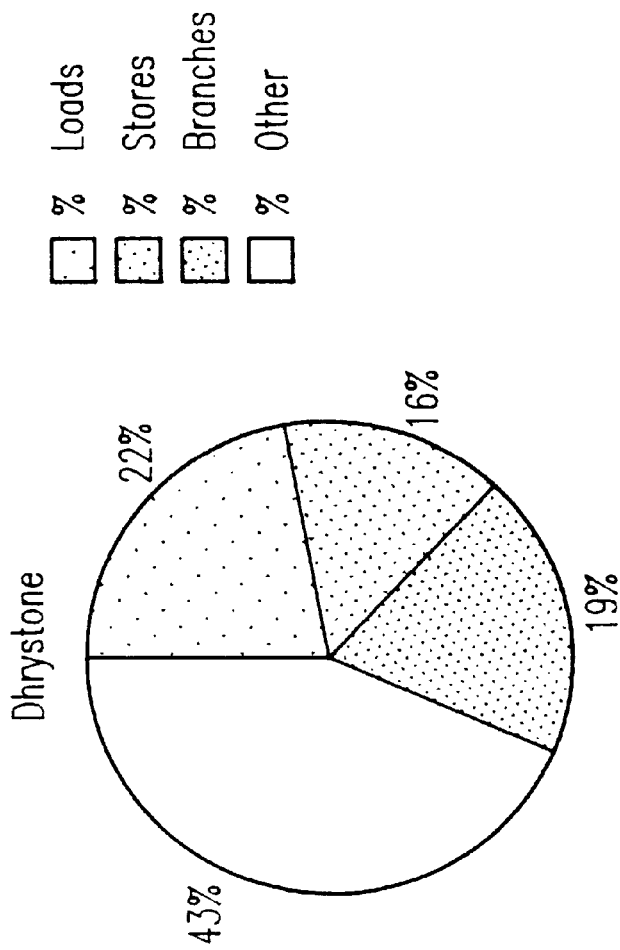
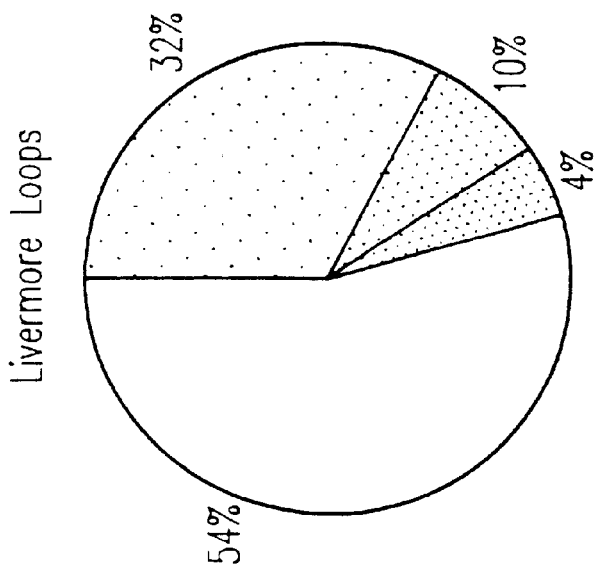
FIG. 44

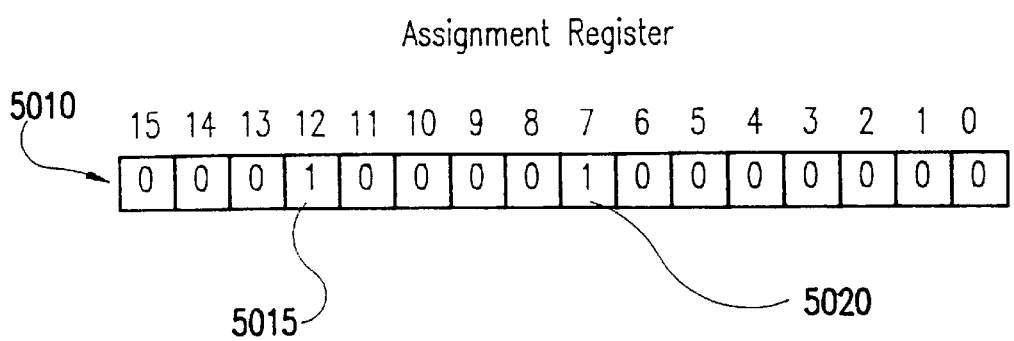
FIG.50

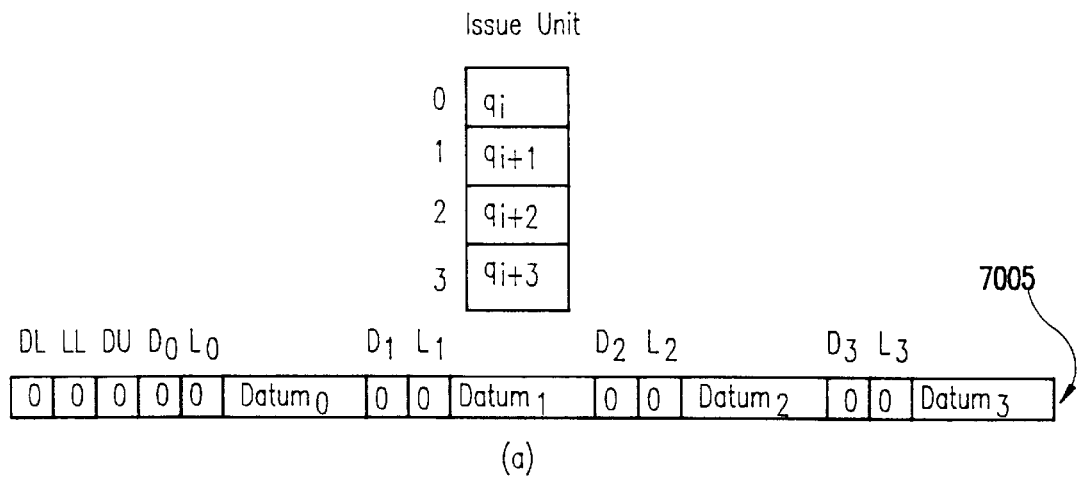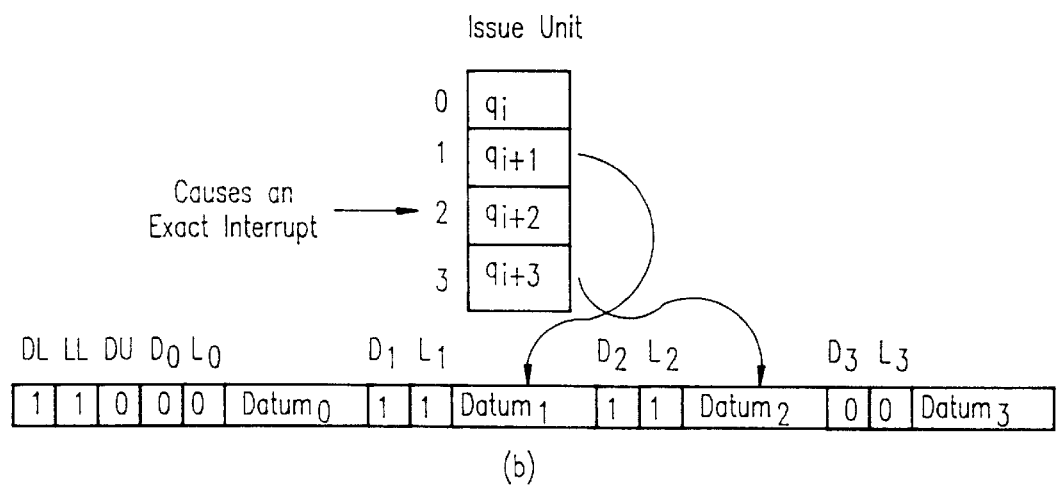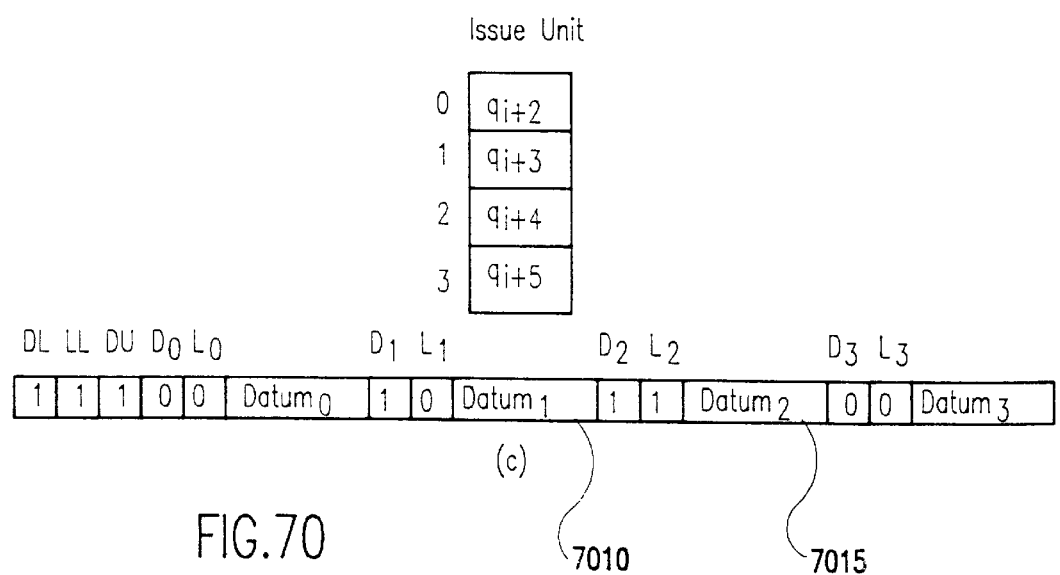
FIG.70

COMPUTER SYSTEM HAVING ORGANIZATION FOR MULTIPLE CONDITION CODE SETTING AND FOR TESTING INSTRUCTION OUT-OF-ORDER

This application is a division of U.S. patent application Ser. No. 08/328,933 filed Oct. 25, 1994, now U.S. Pat. No. 5,630,157 which is a continuation of Ser. No. 07/721,853 filed Jun. 13, 1991 and now abandoned.

FIELD OF THE INVENTION

These inventions relate to computers and computer systems and particularly to computer systems which process multiple instructions and to computer systems which have multiple duplicate functional units where concurrent and parallel processing of multiple, possibly out-of-order, instructions occurs.

CROSS REFERENCE TO RELATED APPLICATIONS

This application is related to the following concurrently filed applications.

Computer System for Concurrent Processing of Multiple Out-of-order Instructions, U.S. Ser. No. 07/718,305, Filed Jun. 13, 1991, inventor Harry Dwyer III (IBM Docket EN9-91-070)

Computer System Having Multiple Out-of-order Storage Instructions, U.S. Ser. No. 07/716,021, Filed Jun. 13, 1991, inventor Harry Dwyer III (IBM Docket EN9-91-071)

Computer System Having Register Instruction Renaming for Multiple Out-of-Order Instruction Processing, U.S. Ser. No. 07/721,852, Filed Jun. 13, 1991, inventor Harry Dwyer III (IBM Docket EN9-91-073)

Computer System Having Precision Interrupt Organization for Multiple Out-of-Order Instructions, U.S. Ser. No. 07/721,850, Filed Jun. 13, 1991, inventor Harry Dwyer III (IBM Docket EN9-91-074)

Computer System Having Branch Prediction for Out-of-Order Multiple Instructions, U.S. Ser. No. 07/721,851, Filed Jun. 13, 1991, inventor Harry Dwyer III (IBM Docket EN9-91-075)

These co-pending applications and the present application are owned by one and the same assignee, namely, International Business Machines Corporation of Armonk, N.Y.

The descriptions set forth in these co-pending applications are hereby incorporated into the present application by this reference.

REFERENCES USED IN THE DISCUSSION OF THE INVENTIONS

During the detailed discussion of the inventions other works will be referenced, which references may include references to my work and works which will aid the reader in following the discussion.

REFERENCES

[Acos 85] R. D. Acosta, "Evaluation, Implementation, and Enhancement of the Dispatch Stack Instruction Issuing Mechanism," Ph.D. Thesis, School of Electrical Engineering, Cornell University, 1985.

[AcKj 86] R. D. Acosta, J. Kjelstrup, and H. C. Torng,"An Instruction Issuing Approach to Enhancing Performance in Multiple Functional Unit Processors". IEEE Transactions on Computers, Vol. C-35, No. 9, September 1986, pp. 815–828.

[AhHo 83] A. V. Aho, J. E. Hopcroft, and J. D. Ullman, Data Structures and Algorithms, Addison-Wesley Publishing Co., Reading, Mass., 1983.

[AhKe 88] A. V. Aho, B. W. Kernighan, and P. J. Weinberger, The AWK Programming Language, Addison-Wesley Publinshing Co., Reading, Mass., 1988.

[BaFe 82] A. Barr and E. A. Feigenbaum, The Handbook of Artificial Intelligence, William Kaufmann, Inc., Vol. 2, p. 58.

[Borl 67] L. J. Borland, G. D. Graniro, A. U. Marcotte, B. U. Messina, and J. W. Smith, "IBM System/360 Model 91 Storage System," IBM Journal of Research and Development, Vol. 11, 1967, pp. 54–68.

[ChHo 89] S. Chan and R. Horst, "Building Parallelism into the Instruction Pipeline", High Performance Systems, December 1989, pp. 53–60.

[CoNi 88] R. P. Colwell, R. P. Nix, J. J. O'Donnell, D. B. Papworth, and P. K. Rodman, "A VLIW Architecture for a Trace Scheduling Compiler", IEEE Transactions on Computers, Vol. 37, No. 8, August 1988, pp. 967–979.

[CrGe 87] J. H. Crawford, P. P. Gelsinger, Programming the 80386. Sybex Inc., Alameda, Calif., 1987, pp. 85–86.

[DwTo 87] H. Dwyer and H. C. Torng, "A Fast Instruction Dispatch Unit for Multiple and Out-of-Sequence Issuances". Technical Report EE-CEG-87- 15, School of Electrical Engineering, Cornell University, November 1987.

[Groh 90] G. F. Grohoski, "Machine Organization of the IBM RISC System/6000 Processor", IBM Journal of Research and Development, Vol. 34, No. 1, January 1990, pp. 47–52.

[Henn 84] J. L. Hennessy, "VLSI Architecture", IEEE Transactions on Computers, Vol. C-33, No. 12, December 1984, pp. 1221–1246.

[HePa 90] J. L. Hennessy and D. A. Patterson, Computer Architecture, A Quantitative Approach, Morgan Kaufmann Publishers, San Mateo, Calif., 1990, p. 318.

[HwPa 86] W. W. Hwu and Y. N. Patt, "HPSm, A High Performance Restricted Data Flow Architecture Having Minimal Functionality". Proceedings, 13th Annual Symposium on Computer Architecture, June 1986, pp. 297–307.

[HwPa 87] W. W. Hwu and Y. N. Patt, "Design Choices for the HPSm Microprocessor Chip". Proceedings 20th Annual Hawaii International Conference on System Science, Kona, Hawaii, January 1987.

[HwPa 87] W. W. Hwu and Y. N. Patt, "Checkpoint Repair for Out-of-Order Execution Machines". Proceedings, 14th Annual International Symposium on Computer Architecture, June 1987, pp. 18–26.

[HwPa 87] W. W. Hwu and Y. N. Patt, "Checkpoint Repair for High-Performance Out-of-Order Execution Machines". IEEE Transactions on Computers, Vol. C-36, No. 12, December 1987, pp. 1496–1514.

[IBM 88] IBM System/370 Principles of Operation, GA22-7000-10, IBM Corp., White Plains, N.Y., p. 4–7.

[Joup 89] N. P. Jouppi, "The Nonuniform Distribution of Instruction-Level and Machine Parallelism and Its Effect on Performance". IEEE Transactions on Computers, Vol. 38, No. 12, December 1989.

[JoWa 89] N. P. Jouppi and D. W. Wall, "Available Instruction-Level Parallelism for Superscalar and Super-pipelined Machines". Proceedings, 3rd International Conference on Architectural Support for Programming Languages and Operating Systems, April 1989, pp. 272–282.

[Kell 75] R. M. Keller, "Look-Ahead Processors". Computing Surveys, Vol. 7, No. 4, December 1975, pp. 177–195.

[KeRi 78] B. W. Kernighan and D. M. Ritchie, The C Programming Language, Prentice-Hall, Inc., Englewood Cliffs, N.J., 1978.

[LeSm 84] J. K. F. Lee and A. J. Smith, "Branch Prediction Strategies and Branch Target Buffer Design". IEEE Computer, January 1984, pp. 6–22.

[Lilj 88] D. J. Lilja, "Reducing the Branch Penalty in Pipelined Processors". IEEE Computer, July 1988, pp. 47–55.

[McHe 86] S. McFarling and J. Hennessy, "Reducing the Cost of Branches". Proceedings, 13th Annual Symposium on Computer Architecture, June 1986, pp. 396–404.

[McMa 72] F. H. McMahon, "Fortran CPU Performance Analysis". Lawrence Livermore Laboratories, 1972.

[MeCo 80] C. Mead and L. Conway, Introduction to VLSI Systems, Addison Wesley, Reading, Mass., 1980.

[Moto 90] MC88100 - RISC Microprocessor User's Manual, 2nd Edition. Prentice Hall, Englewood Cliffs, N.J. 07632, 1990, p. 1–13.

[MuIr 89] K. Murakami, N. Irie, M. Kuga, and S. Tomita, "SIMP (Single Instruction Stream/Multiple Instruction Pipelining): A Novel High-Speed Single-Processor Architecture". Proceedings, 16th Annual International Symposium on Computer Architecture, June 1989, pp. 78–85.

[PaSe 82] D. A. Patterson and C. H. Sequin, "A VLSI RISC". IEEE Computer, September 1982, pp. 8–22.

[PlSo 88] A. R. Pleszkun and G. S. Sohi, "The Performance Potential of Multiple Functional Unit Processors". Proceedings, 15th Annual International Symposium on Computer Architecture, June 1988, pp.37–44.

[PMHS 85] Y. N. Patt, S. W. Melvin, W. Hwu, and M. C. Shebanow, "Critical Issues Regarding HPS, a High Performance Microarchitecture," Proceedings of the 18th International Microprogramming Workshop, Asilomar, Calif., December 1985, pp. 109–116.

[Radi 83] G. Radin, "The 801 Minicomputer". IBM Journal of Research and Development, Vol. 27, Number 3, May 1983, pp. 237–246.

[Stee 84] G. L. Steel, Common Lisp: The Language, Digital Press, 1984.

[Seit 84] C. L. Seitz, "Concurrent VLSI Architectures". IEEE Transactions on Computers, Vol. C-33, No. 12, December 1984, pp.1247–1265.

[Smit 82] A. J. Smith, "Cache Memories". Computing Surveys, Vol. 14, No.3, September 1982, pp. 473–530.

[Smit 87] J. E. Smith, et al, "The ZS-1 Central Processor". Proceedings, Second International Conference on Architectural Support for Programming Languages and Operating Systems, October 1987, pp. 199–204.

[Smit 89] J. E. Smith, "Dynamic Instruction Scheduling and the Astronautics ZS-1". IEEE Computer, July 1989, pp. 21–35

[SmLa 90] M. D. Smith, M. S. Lam, and M. A. Horowitz, "Boosting Beyond Static Scheduling in a Superscalar Processor". Proceedings, 17th International Symposium on Computer Architecture, May 1990, pp. 344–354.

[SmMj 89] M. D. Smith, M. Johnson, and M. A. Horowitz, "Limits on Multiple Instruction Issue". Proceedings, 3rd International Conference on Architectural Support for Programming Languages and Operating Systems, April 1989, pp. 290–302.

[SmPl 88] J. E. Smith and Pleszkun, "Implementation of Precise Interrupts in Pipelined Processors". IEEE Transactions on Computers, Vol. 37, No. 5, May 1988, pp. 562–573.

[Sohi 87] G. S. Sohi and S. Vajapeyam, "Instruction Issue Logic for High- Performance, Interruptable Pipelined Processors". Proceedings, 14th Annual International Symposium on Computer Architecture, June 1987, pp. 27–34.

[Sohi 90] G. S. Sohi, "Instruction Issue Logic for High-Performance, Interruptible, Multiple Functional Unit, Pipelined Computers". IEEE Transactions on Computers, Vol. 39, No. 3, Mar. 1990, pp. 349–359.

[SoVa 89] G. S. Sohi and S. Vajapeyam, "Tradeoffs in Instruction Format Design for Horizontal Architectures". Proceedings, 3rd International Conference on Architectural Support for Programming Languages and Operating Systems, April 1989, pp. 15–25.

[Thor 70] J. E. Thornton, Design of a Computer, the Control Data 6600, Scott, Foresman, Glenview, Ill., 1970.

[Tjad 70] G. S. Tjaden and M. J. Flynn, "Detection and Parallel Execution of Independent Instructions". IEEE Transactions on Computers, Vol. C-19, October 1970, pp. 889–895.

[ToDa 90] H. C. Torng and M. Day, "Interrupt Handling for Out-of-Order Execution Processors". Technical Report EE-CEG-90-5, School of Electrical Engineering, Cornell University, June 1990.

[Toma 67] R. M. Tomasulo, "An Efficient Algorithm for Exploiting Multiple Arithmetic Units". IBM Journal of Research and Development, Vol. 11, Jan. 1967, pp. 25–33.

[Torn 83] H. C. Torng, "Arithmetic Engines in the VLSI Environment". Technical Report EE-CEG-83-3, School of Electrical Engineering, Cornell University, Ithaca, N.Y., July 1983.

[Wah 87] B. W. Wah, "New Computers for Artificial Intelligence Processing". IEEE Computer, January 1987, pp.10–15.

[Warr 90] H. S. Warren, Jr., "Instruction Scheduling for the IBM RISC System/6000 Processor". IBM Journal of Research and Development, Vol. 34, No. 1, January 1990, pp. 86–87.

[Weic 84] R. P. Weicker, "Dhrystone: A Synthetic Systems Programming Benchmark". Communications of the ACM, Vol. 27, No. 10, October 1984, pp. 1013–1030.

[WeSm 84] S. Weiss and J. E. Smith, "Instruction Issue Logic in Supercomputers". IEEE Transactions on Computers, Vol. C-33, No. 11, November 1984, pp. 1013–1022.

[WiHo 84] P. H. Winston and B. K. P. Horn, LISP, Addison-Wesley Publishing Co., Reading, Mass., 1984, p. 133.

These additional references are incorporated by reference.

BACKGROUND OF THE INVENTION

Out-of-order or out-of-sequence instruction processors is the area where my inventions are most useful. My early work has been published, as noted above [DwTo 87]. It related to a Fast Instruction Dispatch Unit for Multiple and Out-of-Sequence Issuances. Portions of this work is relevant to my preferred embodiments of my inventions which includes features and aspects amounting to inventions which make not only my prior work better but are also applicable to different classes of computer systems in general.

A recurring problem in computer system is throughput. Machine cycle time is wasted when a machine part sits idle. I have felt that the cycle time could be decreased by handling better multiple, possibly out-of-order instructions. The machines described herein may be employed in RISC type processors. In addition many elements of my inventions can be employed in superscalar machines as illustrated by the more advanced IBM systems.

Generally two operations take a lot of machine time in processing. These operations are branching and the moving of data between storage (memory) and the instruction processing unit (cpu). The second generation of RISC processors (which typically separate data processing and instruction processing) examined and developed solutions to improve performance by emphasizing a machine organization and architecture which allowed parallel execution and pipelining of instructions. As illustrated by the manual "IBM RISC System/6000 Technology", published by International Business Machines Corporation, 1990 (SA23-2619-00) the RISC RS/6000 architecture resulted in an implementation that could execute more than one instruction per cycle. It accomplished this by separating the processor into functional units, allowing each functional unit to act as a machine to process instructions in parallel. The three functional units were the branch unit, the fixed point (integer) unit, and the floating point unit. The organization of these units (see FIG. 1 called Logical View of RS/6000 Architecture, page 17 of the referenced manual) was something like placing these processors each at the corners of a processing triangle. At one apex was the branch processor through which instructions passed through the connections to the other functional units at the other apex of the triangle. The branch processor functional units obtained its instructions from an instruction cache located between the branch processor functional unit and the main memory of the system. The other two apexes of the system shared a cache, but the shared cache here is a data cache which is located between these processor functional units (fixed and floating point) and the main memory. This machine organization, like certain earlier machines of a more mature architecture, such as certain System/370s, increased throughput by allowing multiple operations to be performed at the same time.

Like the RS/6000, my preferred computer system would be provided with an instruction issue unit. This unit would do scheduling of processing similar to the function performed by the branch processor of the RS/6000. There would be multiple execution units. The RS/6000 provides multiple execution units, a fixed point function unit and a floating point functional unit. Each computer system has a register file and a main memory. A cache is provided between main memory and the functional units. In a RISC architecture the cache may be provided as separate units for cache processing, one being a data cache, and another being an instruction cache.

Machines like the RS/6000 provide an interconnection unit or interconnect network between the functional units, the register file(s) and the instruction unit. Machines like the RS/6000 use multiple functional units in parallel, but there is only one functional unit for each functional process (fixed point, floating point). Each of the functional units processes instructions sequentially in order. The branch processor of the RS/6000 issues instructions for processing to the other functional units in the order they are to be processed.

Some time ago I developed a machine organization that provided elements not common to systems like the RS/6000. I prefer that there be several copies of the same function provided as functional units. In order to improve throughput, I prefer that there be provided some means whereby the issue unit can detect register dependencies. The machine which I describe has been provided with means for scheduling register to register instructions for multiple out of order execution.

Generally such a machine would be similar to that provided by the report I made on early work several years ago regarding the Dispatch Stack. See References. The suggestions included in my report would improve throughput, but they do not satisfy all of the needs or incorporate the further new elements, units, features and improvements which I will describe herein.

SUMMARY OF MY INVENTIONS

My preferred computer systems which employ my inventions described herein have many new features. My preferred system will have an organization enabling concurrent and parallel processing of multiple, possibly out-of-order, instructions.

My architecture may be considered an expanded superscalar architecture applicable to RISC machines and others as the implementation of my preferred embodiments allows multiple, out-of-order, processing of instructions to be issued to multiple functional units per system cycle, while maintaining a "short" cycle time.

The machines which implement my design will have dense deposition technology in order to take full advantage of the high degree of concurrent instruction issue that I provide. Such state of the art deposition technology which may be used would be micron level or sub micron level CMOS for the preferred implementation of my developments.

My machine will make faster uniprocessor applications, especially when my register-to-register operations are employed.

My machine extends register-to-register operations and provides for the issuance of multiple storage instructions.

My machine further extends the performance characteristics by including operations including condition code generation and testing sequences for the purpose of performing conditional branching. However, all instructions preceding a conditional branch could be allowed to complete in order, in an embodiment which would take advantage of only part of my perferred embodiments. In this instance, the correct condition code is left in the condition code register for the conditional branch instruction.

My architecture encompasses register renaming techniques for each instruction, where entire register sets are duplicated.

My improvements include an extension which includes the processing of precise/exact interrupts as though the system were executing instructions one-at-a-time.

My architecture extends the organization of the computer system to include the handling of branch prediction techniques, and provides a way of fast "squashing" of executed instructions which followed incorrectly predicted branches using my top compression techniques which are otherwise useful.

My architecture results in an implementation that can execute more than one instruction per cycle. Indeed, the system has a sequencing and issuing unit which issues instructions to a plurality of functional units. These functional units can process unlike the RS/6000, multiple instructions which are possibly out-of-order or sequence with multiple copies of functional units. This allows each functional unit to act as a machine to process instructions in parallel of the type assigned to it. The type is provided along with an instruction as part of the sequencing and issuing process. The system includes an instruction cache, an instruction buffer, and an issue generator for allocating additional bits to instructions in an instruction stream to tag and assign vector bits to each instruction. I call these additional bits an I-Group.

My preferred system will also have my new port architecture, and I have described two alternative preferred embodiments of the port architecture. I have described a new instruction buffer unit able to assist in the scheduling and issue of instructions. I have described a new top compression paradigm. The system provides multiple copies of the same kind of functional unit, so that throughput is increased. This kind of system increases complexity as compared to a RS/6000 and my preferred system has means for detecting register dependency as well as handles multiple storage instructions. While other systems have fetches of instructions in multiple copies into a buffer unit, as the S/370 system fetches instructions in multiple copies into a buffer unit, my system employs an I-Group for efficient processing.

In each case a tag is inserted on each instruction. The tag uniquely identifies an instruction in the system. The tag is a linear array of bits (the tag does not tell type). I also provide associated with the instruction as generated by an issue generator, vectors, a read, a write, and a type vector. The tag accompanies the the instruction sent and the tag is returned. The tag identifies a particular instruction fetched from a stack so that it can be removed from the related cache.

My system is organized so that it can concurrently and in parallel look at multiple instructions fetched. Fetched instructions are buffered. A scheduler detects register dependencies and flags those that can be issued from a stack, first checking those above it to determine any conflicts. The port architecture determines how instructions are issued. Ports are given a type vector which permits functional units of the same type to be handled, and this type is matched with a match of an instruction type, port type and function unit type. If all match an instruction is issued. I have also provided alternatively a dynamic port assignment architecture where ports are assigned as part of a machine cycle.

Two kinds of compression may be employed in such machines where an issue unit eliminates instructions that were completed by compression of a stack. One new top compression which I developed is not only useful generally but very fast, and needed for instructions in precise interrupts of my preferred machine.

I have provided a totally new scheduling storage of multiple and out-of-order instructions. Unlike my prior register-to-register system, my new system now provides an address stack that allows provision for one or more data units that execute a storage instruction wherein the issue unit provides a storage instruction to the data unit which is to execute the storage instruction.

The issue unit and data unit together schedule the storage. A load instruction and storage is treated differently. Each storage instruction gets issued twice. First there is a detection of conflicts with the registers used by the storage instruction to generate an effective address. The data unit gets the address and puts it into an address stack.

The address stack has room for all tags. Since an instruction tag has only one of its elements set to "1", if that bit is on, then in the same field, multiple tags can be on, but each one indicates a particular instruction. This enables multiple instructions to execute, and the address stack maintains instructions so that the information stream is conflict free.

In a load multiple data, units can look to a bit match to determine machine operations. During a storage access for load when a data unit has performed access it gets data back along with a tag and holds data until the issue unit issues the load instruction a second time, and when this is con- flict free, it then issues the tag of the load instruction and writes to the destination register.

Using a store access, the instruction remains in the issuing unit and its address remains in an address stack, while a copy of the instruction is in the data unit. The issue unit makes sure that there are no register conflicts which would inhibit or delay execution before it issues. The address stack concurrently detects address conflicts which delay the processing. After this occurs, the store is made. This allows multiple out-of-order storage.

I provide for execution of concurrent multiple condition code setting and testing instructions. Testing cannot issue out-of-order. Register renaming (old per se) is different in my system organization. Every time a register is written to it is renamed. In addition multiple instructions written concurrently are renamed because of look ahead logic.

I have provided a set of working registers used by the functional units, as a bank of registers that all functional units can access.

Using top compression as illustrated, with working and architectural registers, a machine state can be returned to after a period of time. This system handles the information in one cycle, and an interrupt that never completes gets to the top of stack and is discarded. The result is the system state is returned as if the machine had executed in sequence. Basically, a storage instruction writes data to cancel the tag accompanying the data and input in the cache table. Additional data is locked in the cache until it is unlocked. When an instruction compresses out of the issue unit, the tag is sent to data cache and it is unlocked and can be acted upon. When an interrupt occurs all unlocked dirty data is returned to main memory and all locked data is discarded.

The system stack is useful for scheduling multiple out-of-order instructions following multiple predicted conditional branches. When a predicted conditional branch finally executes (and incorrectly so that it does not complete) it bubbles to top of stack. The swap occurs, and a return of the machine to the correct state occurs. The issue unit will not issue a data store instruction before an uncompleted conditional branch.

In order to further highlight various features and aspects disclosed here and amplified in the detailed description, I will set forth below some arrangements of machine organization which may be used alone or in combination with other features and aspects claimed elsewhere.

My computer organization concurrently generate information (an I-Group), attached to each of one or more instructions, that enables hardware to quickly schedule multiple, out-of-order instruction issuances to multiple functional units for execution and to transfer I-Groups to a buffer or a hardware scheduling mechanism (Issue Unit). An I-Group is an information representation that facilitates the concurrent scheduling of multiple, possibly out-of-order, instructions by hardware. The following steps are performed:

a. Multiple instructions are fetched from memory at once and an I-Group is generated for each by hardware units (I- Units, etc.), one for each instruction.

b. Multiple fields of information in an instruction are concurrently decoded by an I-Unit.

c. The resulting I-Groups are transferred, and if the Issue Unit is full, they go to a buffer.

My computer system quickly and concurrently assigns and transfers independent multiple, out-of-order instructions contained in an instruction scheduling mechanism (Issue Unit) to multiple functional units for execution. Independent instructions eligible for transfer may outnumber available functional units or paths (ports) through which instructions may be transferred, therefore eligible instructions are prioritized in hardware. This technique comprises of the following:

a. The assignment to each port of a port-type through which an instruction of a matching instruction type (as specified in its I-Group) may be issued to a functional unit that is able to execute it. Two techniques for assigning a port-type to a port are presented—permanent port-types and dynamic port-types.

b. The transfer of independent instructions to OPEN ports of matching types. An OPEN port is connected to an available functional unit of the correct type.

My computer has hardware for eliminating completed instructions from an instruction scheduling and issuing mechanism (Issue Unit) in instruction stream order and to reposition remaining instructions in the mechanism to maintain their order of precedence in the dynamic instruction stream using minimal hardware. (called Top Compression in the accompanying text) The following actions are performed concurrently:

a. Consecutive, completed instructions are eliminated from the Issue Unit starting with the instruction at the top of the Issue Unit, if completed, and ending with the instruction preceding the first uncompleted instruction encountered.

b. Uncompleted instructions in the Issue Unit are concurrently transferred into the newly vacated positions of eliminated instructions while maintaining their order of precedence.

c. Newly fetched instructions and I-Groups are transferred into the Issue Unit.

My computer hardware quickly and concurrently schedules and issues multiple, perhaps out-of-order, storage instructions to hardware units (Data Units) which may initiate multiple, out-of-order requests to memory. The scheduling technique decreases the dependencies of following instructions on storage instructions, increasing the number of instructions that can execute concurrently.

a. A hardware mechanism quickly and concurrently detects the address dependencies of multiple storage instructions, the Address Stack.

b. A storage instruction's register usage dependencies on preceding instructions are quickly detected within the Issue Unit enabling efficient scheduling.

c. A storage instruction is issued in two phases, as dependencies allow, to hardware units (Data Units) responsible for initiating a memory request.

My computer system with a short cycle will concurrently schedule and issue multiple condition code setting and testing instructions out-of-order.

a. Multiple condition code registers are provided.

b. A tag (CC_tag) is attached to a condition code setting instruction which is used to address a specific condition code register when the instruction executes.

c. A CC_tag is attached to a condition code testing instruction that matches the CC_tag given to the condition code setting instruction whose code it must test.

d. A condition code testing or setting instruction is not issued if an uncompleted preceding instruction in the Issue Unit has a matching CC_tag.

e. When a condition code testing instruction executes, it tests the code in the condition code register addressed by its CC_tag.

My computer system organization employs a fast register renaming that operates on multiple instructions concurrently and is suitable for fast, multiple, out-of-order instruction issuing mechanisms. A register written to by an instruction is renamed. Following instructions in the instruction stream that source a renamed register are given its name.

a. Multiple register sets are provided.

b. A look-ahead mechanism enables registers in multiple instructions that write to the same register to be renamed concurrently.

My computer system handles fast precise interrupts in a mechanism that schedules, issues and executes multiple, possibly out-of-order, register-to-register instructions concurrently. The effects of executed register-to-register instructions that follow an instruction that causes an interrupt or exception are undone in one machine cycle.

a. A set of working registers, in addition to the architectural registers, are provided. Executing instructions access the set of working registers.

b. Architected registers are concurrently updated with multiple data from multiple working registers each cycle as multiple instructions are removed from the Issue Unit in instruction stream order.

c. An interrupting instruction causes a concurrent transfer of the contents of the architected registers to the working registers. Both register sets then reflect the state that the architected registers would have in a machine that executed instructions sequentially and one-at-a-time up to the interrupting instruction.

My computer system enables storage instructions to issue and execute in multiples and possibly out-of-order while supporting precise interrupts is presented. The effects of executed storage instructions that follow an instruction that causes an interrupt are undone. Main memory is placed in a state reflecting that of a machine that executes instructions in sequence and one at a time up to the instruction causing the interrupt.

a. A tag is associated with each instruction in the Issue Unit. A copy of the tag accompanies the instruction when it is issued for execution.

b. When a storage instruction writes data to a data cache, its tag accompanies the data and is associated with the data while the data is in the data cache.

c. Data written to the data cache may not be transferred back to the main memory until the instruction that wrote it is removed from the scheduling mechanism in instruction stream order.

d. The tags of storage instructions that are removed from the Issue Unit are sent to the data cache and used to unlock their associated data.

My computer system enables condition code setting and testing instructions to issue and execute in multiples and out-of-order while precise interrupts are supported.

a. Multiple condition code registers are provided. These are the architected condition code registers and enable out-of-order executions of condition code setting and testing instructions.

b. In addition, a set of working condition code registers are provided. Executing instructions read and write these registers.

c. The architected condition code registers are updated in the manner discussed above in 1.

d. The working condition code registers are restored to the correct state following an interrupt in the manner discussed above.

My computer system has an organization to quickly undo the effects of multiple, out-of-order instructions executed preceding or following one or more incorrectly predicted conditional branch instructions. This system enables multiple levels of branch prediction to be incorporated into a multiple, out-of-order instruction issuing mechanism, enhancing its instruction throughput. Instructions preceding and following multiple predicted conditional branches may be issued and executed in multiples and out-of-order. The effects of instructions executed following an incorrectly predicted conditional branch (i.e. executions on an incorrect instruction stream) are undone in one machine cycle.

a. Precise interrupts are supported.
 b. A store instruction following an unexecuted conditional branch instruction is not issued.
 c. A conditional branch instruction that is executed and found to have been predicted incorrectly causes an interrupt. The system which is described undoes the effects of executed instructions that follow the incorrectly predicted conditional branch instruction.

These and other improvements, illustrating the architectural approaches, are set forth in the following detailed description. For a better understanding of the inventions, together with advantages and features I have made in the field. However, specifically as to the improvements, advantages and features described herein, reference will be made in the description and claims which follow the below-described drawings.

BRIEF DESCRIPTION OF THE DRAWINGS

FIG. 2 shows an issue sequence with multiple consecutive instruction issue.

FIG. 20 shows top compression and total compression.

FIG. 33 shows the phases of a load instruction's execution.

FIG. 34 shows the phases of a store instruction's execution.

FIG. 36 shows additional logic in slot(i).

FIG. 37 shows the detection of R(Addr) and R(Data) representations in a load and a store instruction's I-group by dependency detection logic during each phase of execution.

FIG. 41 shows address conflict detection logic in A-slot (j).

FIG. 44 shows the composition of the benchmark traces.

FIG. 50 shows illustrative assignment vector and the assignment register.

FIG. 70 shows a cache line with locked and unlocked data

Figure 1:
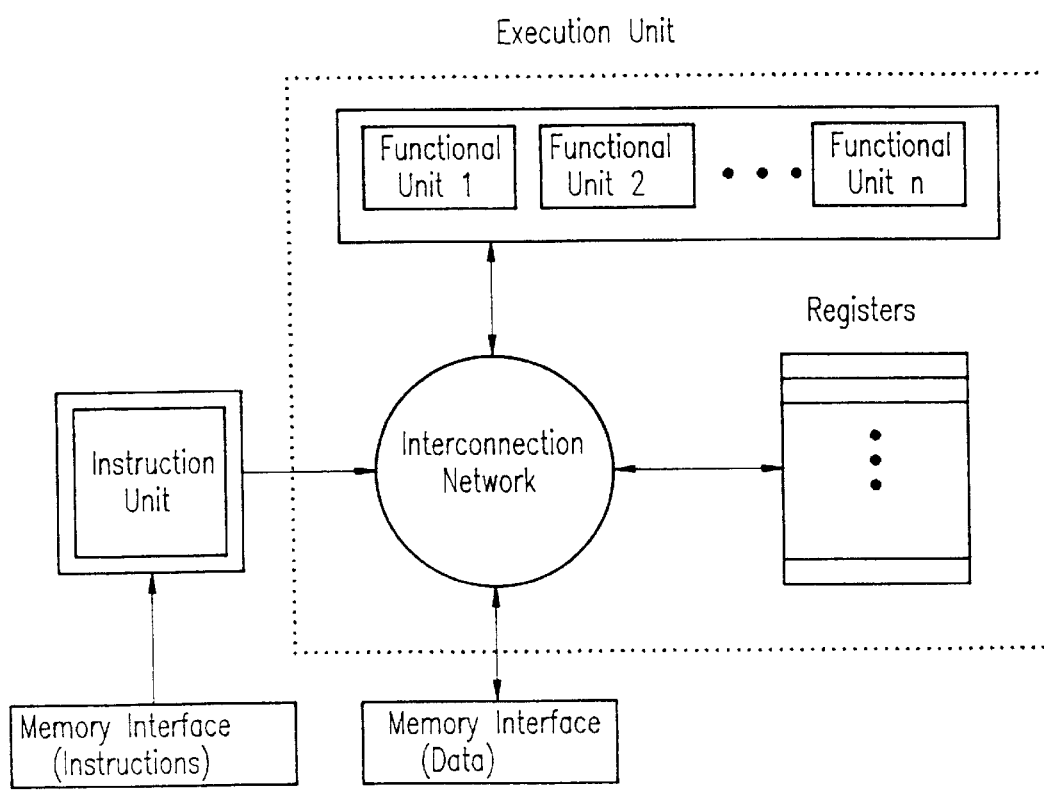
FIG. 1 shows a CPU including multiple functional units and reflecting a general purpose register (GPR) architecture.
Figure 3:
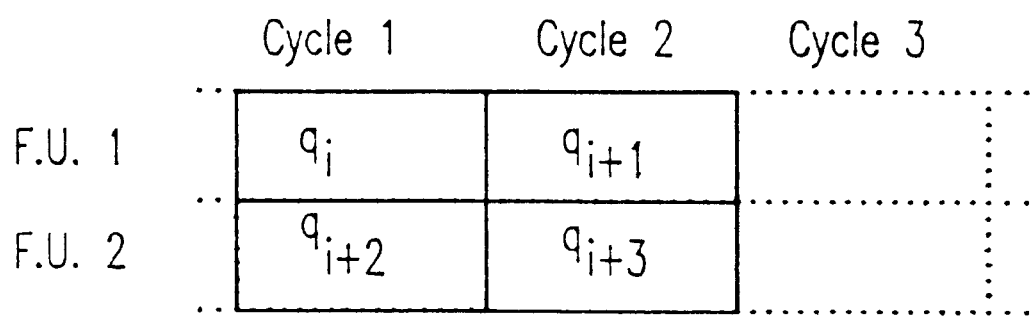
FIG. 3 shows an issue sequence with multiple out-of-order issue.

(Note: For convenience of illustration, in the formal drawings FIGURES may be separated in parts and as a convention we place the top of the FIGURE as the first sheet, with subsequent sheets proceeding down and across when viewing the FIGURE, in the event that multiple sheets are used. Note also that certain reference numerals are applicable to the FIGURE in which they are presented.)

The detailed description follows as parts explaining the preferred embodiments of the inventions provided by way of example.

APPENDIX OF TABLES

Appended hereto are the tables referred to in the detailed description which follows. These tables are:

Table 2.1 A comparison of dynamic scheduling approaches.

Table 4.1 Data Unit actions in Phase A and Phase B.

Table 5.1 Statistics gathers by the Simulator.

Table 5.2 Simulator input parameters.

Table 5.3 Benchmark trace characteristics.

Table 5.4 Average basic block sizes.

Table 5.5 Instruction completion times.

Table 5.6 Benchmark throughputs.

Table 5.7 Benchmark throughput speedups on FDS system.

Table 6.1 Benchmark throughputs on FDS systems with multiple register sets.

Table 6.2 Throughput speedups on FDS systems using Total Compression with 2 register sets relative to the Base Machine. Table 6.3 Percent increases in throughput on a FDS with 2 register sets relative to that on a FDS with 1 register set. Table 7.1 Benchmark throughputs on FDS systems with precise interrupts.

Table 7.2 Speedups relative to the Base Machine.

Table 8.1 Benchmark throughputs on a FDS with 1 register set, precise interrupts, and branch prediction with an accuracy of 85%.

Table 8.2 Speedups of benchmark throughputs on FDS systems with 2 register sets relative to the Base Machine and the Base+BP Machine.

DETAILED DESCRIPTION OF THE INVENTIONS

Before considering the preferred embodiments in detail I will provide a further discussion so that those of ordinary skill in the art will be provided with sufficient additional background to follow the more detailed discussions which may be too advanced for those with an ordinary background. Thus I will amplify the general statement so that some may understand out of order processing needs so as to be able to follow the discussion of my preferred embodiments which continues with Section 3 and 4 onwards. For this purpose and also, for ease following the detailed discussions below, I have used sections to detail the discussion.

Throughout the description of my inventions I have capitalized nouns to highlight the elements employed. Common English usage would not capitalize these nouns, and the description should be understood as encompasing common English usage.

SECTION 1

INTRODUCTION

Recent advances in the design and integration of instruction sets, compilers and execution units have resulted in new, high performance architectures and improved the performance of older ones. A few examples of RISC machines are the Sun SPARC (Sun Microsystems), Motorola's 88000, Intel's 80860 and IBM's RS/6000. The Intel 80486 is an example of an established CISC with RISC principles incorporated. VLSI and compiler technologies have supported the development of RISC (Reduced Instruction Set Computer) architectures [PaSe 82][Radi 83] that can execute most instructions in one clock cycle. Steady advances in circuit technology has decreased cycle times but has not improved performance at the rate demanded by advanced applications. Further improvements in performance will be obtained through advances in technology and computer organization.

A Central Processing Unit (CPU) may comprise an Execution Unit (EU) and an Instruction Unit (IU). The IU accesses instructions and prepares them for transfer (issue) to the EU for execution in one or more Functional Units (FU's). An FU accesses operands from, and returns a result to, the register file. The following instruction format is used:

$$\text{OP S1, S2, D,} \tag{1.1}$$

where destination register D receives the result of operation OP on the contents of source registers S1 and S2.

Multiple FU's may be incorporated in the EU to increase the number of instructions executed per cycle or throughput. Such a CPU is shown in FIG. 1 and reflects a General Purpose Register (GPR) or Load/Store architecture.

Issue is not used consistently in the literatures, so it will be understood here that Issue will refer to the direct transfer of instructions to the functional units of a CPU unless otherwise noted that it refers to an indirect transfer to a holding mechanism which in turn transfers the instruction to the FU.

Computers that issue multiple independent instructions (to multiple functional units) per clock cycle are called Superscalar computers [HePa 90]. Superscalar computers exploit fine grain or instruction level parallelism in an instruction stream. Instruction scheduling is performed during compilation (static scheduling) or during execution with hardware (dynamic scheduling ), or both. The scheduling function must detect dependencies between instructions and control execution to maximize throughput.

Static scheduling is a mature technique in common use with modern computers, especially RISC architectures; however, not all dependencies can be predicted at compile time because the dynamic instruction stream is not known [Smit 89].

Dynamic scheduling detects all instruction dependencies in a segment of the dynamic instruction stream. Hardware design establishes the number of instructions in this segment or window. The window may contain unissued instructions and instructions in various stages of completion. As instructions leave the window, new instructions enter. Within the window, instructions are examined for dependencies with each other and on hardware resources required for their execution. Instructions with no dependencies and meeting the constraints of the issuing algorithm are issued to one or more functional units. An issuing algorithm is a set of rules that ensures that an instruction is issued in accordance with the computational model of the machine. Dependencies and issue algorithms are examined below.

1.1 REGISTER DEPENDENCIES

Let Q be the set of instructions in the dynamic instruction stream indexed by their position:

$$Q=\{q_1, q_2, \ldots, q_n\} \quad (1.2)$$

where $q_i$ is the $i^{th}$ instruction in the dynamic instruction stream. We say that instruction $q_i$ precedes instruction $q_j$ when $q_i$ occurs before $q_j$ in the dynamic instruction stream. With each member of Q associate two sets, $$R_i\{\text{registers read by } q_i\}, \quad (1.3)$$

$$W_i=\{\text{register written to by } q_i\}. \quad (1.4)$$

If $q_i$ precedes $q_j$, RAW (read after write), WAR (write after read), and WAW (write after write) register dependencies of $q_j$ on $q_i$ are defined as follows:

$$R_j \cap W_i \phi(\text{RAW}) \quad (1.5)$$

$$W_j \cap R_i \phi(\text{WAR}) \quad (1.6)$$

$$W_j \cap W_i \phi(\text{WAW}) \quad (1.7)$$

Instructions are said to be register independent if none of the above register dependencies exist between them. Register independence is a necessary (but not sufficient) condition for the out-of-order execution of instructions. Other dependencies related to storage operations and hardware resources will be examined in later chapters.

1.2 THE ISSUING OF INSTRUCTIONS

1.2.1 SINGLE IN-ORDER ISSUE

Many computers issue instructions sequentially and one-at-a-time. Instruction $q_i$ issues immediately before $q_i+1$ and immediately after $q_i-1$.

Processors issuing this way often have pipelined execution units. Instruction processing is partitioned into a series of stages that an instruction completes in sequence (a pipeline), often at the rate of one stage per cycle. An instruction may skip a stage under certain conditions in complex pipelines. Hardware is dedicated to each stage, enabling the instructions in the separate stages to be processed concurrently. Instructions maintain their order in the pipeline. If $q_i+1$ reads its operands before $q_i$ writes its result (as is often the case), RAW conflict detection is needed but WAR conflict detection is not needed. WAW conflict detection is not needed if instructions complete in order. Most pipeline implementations require only RAW conflict detection.

The maximum throughput of this issue scheme is one instruction per cycle. RAW conflicts, cache misses, and other delays can decrease this rate considerably.

1.2.2 THE ISSUING OF MULTIPLE CONSECUTIVE INSTRUCTIONS

Some processors issue contiguous independent instructions to multiple functional units at once. RAW and WAW conflict detection is now necessary. WAR conflict detection is not necessary due to the sequential nature of the instructions across issued blocks and the fact that instructions within a block read their operands before any results can be written.

Most modern superscalar computers issue this way, a significant improvement over single, sequential issue. However, as described above, the first stalled instruction prevents further issue. Examine the execution of the following sequence in an execution unit with two general purpose functional units that execute instructions in one cycle (i.e., read the operands, perform the operation and write the results in one cycle):

$$q_i:\text{MULT R2, R3, R1}$$

$$q_i+1:\text{MULT R1, R3, R4}$$

$$q_i+2:\text{ADD R5, R3, R6}$$

$$q_i+3:\text{ADD R6, R2, R7} \quad (1.8)$$

Figure 2:
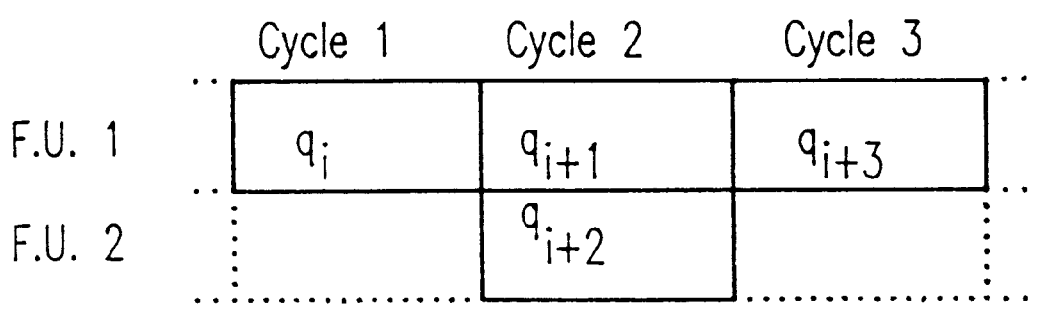

Issue proceeds as in FIG. 2. Only $q_j$ will be issued during the first cycle because $q_i+1$ has a RAW dependency with it. Instruction $q_i+2$ is blocked even though it has no dependencies on unexecuted instructions.

1:2.3 MULTIPLE OUT-OF-ORDER ISSUE

Further improvement in throughput is obtained by issuing independent instructions, without regard to order, to multiple functional units each cycle. Register independent instructions, those with no RAW, WAR, and WAW conflicts with preceding uncompleted instructions, are assigned hardware resources (e.g. functional units) according to an algorithm. Assignment is often in order of instruction precedence but other schemes may be desirable.

A multiple, out-of-order, issue processor (with the functional units described in section 1.2.2) would issue the instructions of Equation 1.8 as shown in FIG. 1.3.

Instruction $q_i+2$ is no longer blocked by $q_i+1$. This method improves instruction throughput over previous methods.

1.3 ISSUES AND PROBLEMS

This most general form of dynamic scheduling, the issue and execution of multiple and out-of-order instructions, can significantly enhance system performance [Tjad 70][ Kell 75][AcKj 86]. However, there are several apparent shortcomings with this scheme that undermine its usefulness.

1.3.1 FAST OPERATION

Historically, the most serious problem with dynamic, multiple, out-of-order scheduling and execution has been its resultant hardware complexity and subsequent "slow" operation. The instruction issue rate, also necessarily the execution rate, is the following product:

$$\frac{\text{Number of Instructions Issued}}{\text{Second}} = \frac{\text{Number of Instructions}}{\text{Issue}} * \frac{\text{Issues}}{\text{Cycle}} * \frac{\text{Cycles}}{\text{Second}} \qquad (1.9)$$

where Issue is the transfer of a group of instructions to the functional units. Issues per Cycle is assumed to be one.

If Number of Instructions Issued per Cycle is increased at the expense of a longer cycle time, net performance improvement may not occur. To enhance performance, the dynamic scheduling mechanism must be capable of issuing instructions each cycle with cycle time determined by the functional units. A cycle time comparable to that of a functional unit (possibly pipelined) is considered here to be short. It is not known if multiple, out-of-order dynamic scheduling can operate with short cycle times [WeSm 84] [SmLa 90].

1.3.2 FAST PRECISE INTERRUPTS

Interrupts are precise in an out-of-order instruction issue processor if processor state (registers and memory) visible to the operating system and application can be reconstructed to the state the processor would have, had all instructions executed in sequence up to the point of the interrupt. This is difficult, particularly if out-of-order stores to memory are allowed to occur.

Precise interrupts are helpful during code development and are necessary in processors with demand paged virtual memory systems. These systems efficiently share memory among multiple tasks while protecting them from each other. Precision is required to correctly resume execution after servicing a page fault.

A processor is considered here to have fast precise interrupts if its interrupt response time, in machine cycles, is about that of a sequential, single instruction issue processor. Fast precise interrupts are required for real time control applications.

The accomplishment of fast precise interrupts in a short cycle time, multiple, out-of-order instruction issue processor with branch prediction and out-of-order store to memory capability is a topic of study in this investigation.

1.3.3 BRANCH PREDICTION

Branches, about 15% to 30% of executed instructions [McHe 86], decrease the effectiveness of multiple issue to functional units if instructions beyond an undecided branch can not be issued. Branch prediction may improve performance by enabling execution on a predicted path of instructions. If the gains on correctly predicted paths outbalance the losses from nullifying the effects of execution on incorrectly predicted paths, a net performance gain occurs. In a multiple, out-of-order issue processor, the capability to quickly nullify the effects of execution on incorrect paths is key.

SECTION 2

HISTORICAL PERSPECTIVE

Dynamic scheduling has recently received renewed interest since its concept was introduced in two ground breaking machines in the 1960's. There are several reasons for this resurgence.

1. The tools for designing, simulating and testing complex hardware have improved, partially the result of rapid increases in microprocessor complexity. Placing complex functions like scheduling in hardware has become easier.
2. The integrated design of instruction sets, compilers and hardware has resulted in efficient RISC and post-RISC computers. The register to register architecture and instruction set regularity exhibited by many of these machines have facilitated the design of dynamic scheduling hardware.
3. Performance gains from compiler scheduling may be tapering off [Smit 89]. Consequently, commercial machines are appearing that employ limited forms of dynamic scheduling. Examples might be the Astronautics ZS-1 and Tandem's Cyclone. The problems described in chapter 1 prevent the implementation of more general forms of dynamic scheduling.

2.1 THORNTON'S SCOREBOARD

Figure 4:
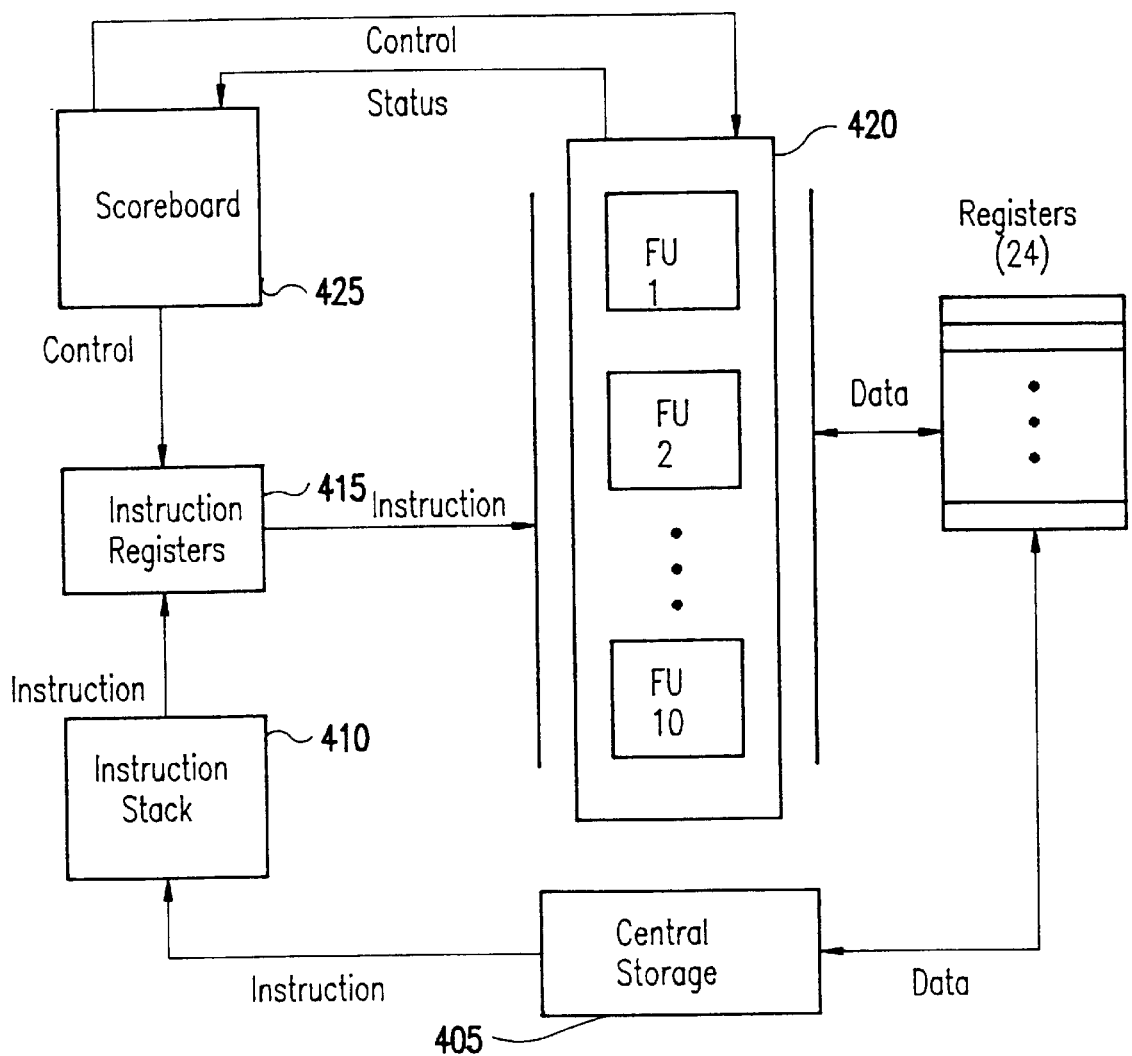
FIG. 4 shows Thornton's scoreboard system.

The CDC 6600, delivered in 1964 was the first machine to employ dynamic scheduling [Thor 70]. The CDC 6600 attempted to issue one instruction per cycle to 10 functional units. Instructions are issued in-order but can execute out-of-order. The designers measured performance improvements of from 1.7 for FORTRAN programs to 2.5 for hand-coded assembly language. FIG. 4 is a block diagram of the system.

An instruction is fetched from memory 405 into the instruction stack 410, a set of registers that also holds some previously issued instructions. When a loop is encountered in the instruction stream, a recently executed instruction may often be accessed from the instruction stack instead of memory. The instruction is transferred to a series of instruction registers $U^0$, $U^1$, and $\cap U^2$) 415 that decode and analyze it. It is issued from the last of these registers to a functional unit 420. The Unit and Register Reservation Control or scoreboard 425 reserves system resources when the instruction is issued and subsequently controls read operand and store result operations of the functional unit it is issued to. An instruction that cannot issue blocks those behind it. An instruction is issued to a functional unit if the following conditions are met:

1. It has no WAW conflicts with issued instructions.
2. A functional unit is available. The issuing system handles WAW conflicts before issue and RAW and WAR conflicts after issue. It controls the functional units in the following way:
1. Functional units are directed to access the register stack when source operands are available (RAW dependency control).
2. Functional units inform the scoreboard when results are ready. When WAR hazards have cleared, the scoreboard tells the units to store the results (WAR dependency control). The limitations of this approach are that:
1. A maximum of one instruction is issued per cycle.
2. A stalled instruction blocks instructions behind it even if they have no dependency hazards.(WAW hazards were rare when this machine was introduced because compilers did not perform loop unraveling.

This general technique is known as scoreboarding. It should not be confused with register scoreboarding, a less general variation often used by RISC microprocessors (e.g., Intergraph's Clipper, Motorola's 88000, Intel's i960 and i860) to issue and execute multiple sequential instructions in parallel. Registers are marked busy if they are destinations for issued instructions. Subsequent instructions are allowed to issue and execute in parallel if they do not use these registers. Any instruction that cannot issue delays instructions behind it.

2.2 TOMASULO'S ALGORITHM

Figure 5:
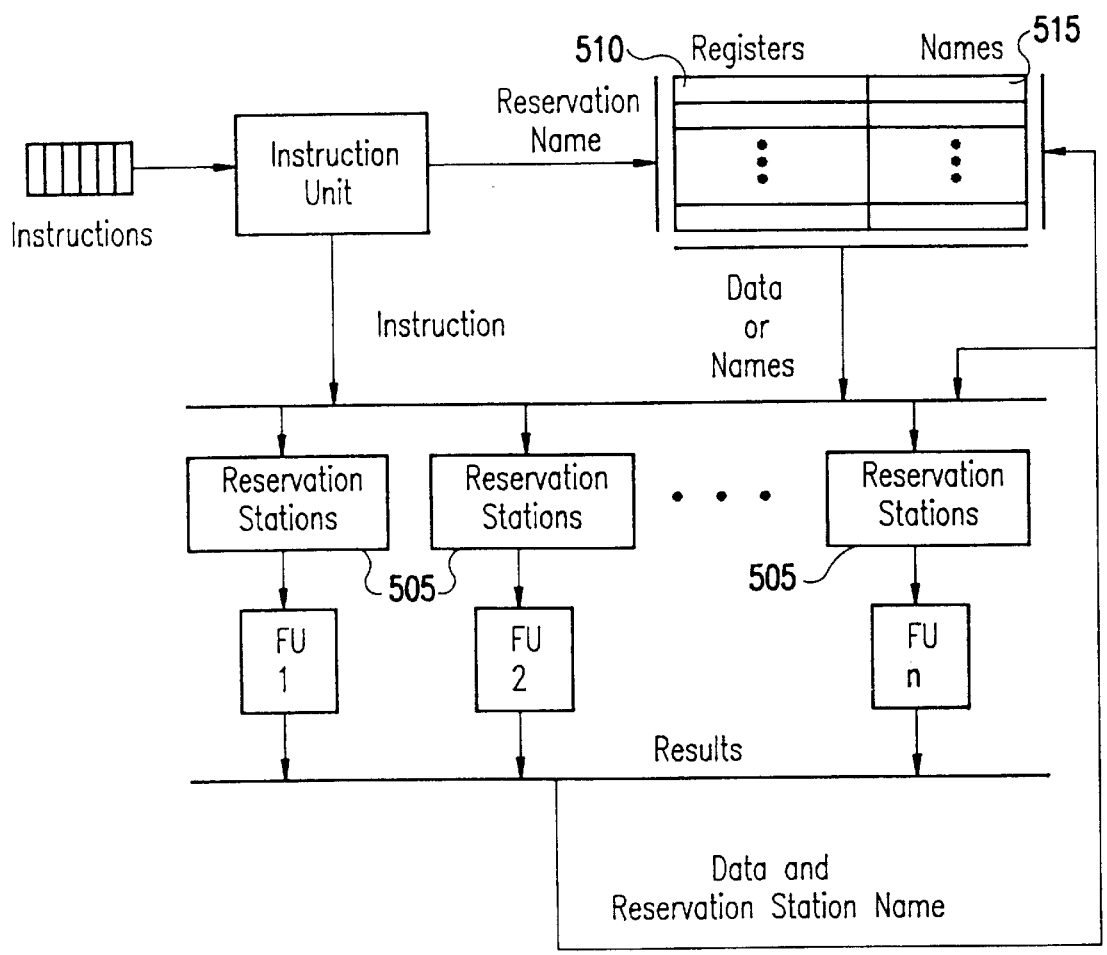
FIG. 5 shows Tomasulo's system.

Tomasulo's approach was different from Thornton's in the design of the IBM 360/91 [Toma 67], available about 3 years after the CDC 6600. Using data forwarding and register renaming techniques, Tomasulo's algorithm eliminates the need to stall the instruction stream on data dependencies. Instructions are issued (to buffers) at most one at a time and in-order but may be executed out-of-order and in parallel. A block diagram of Tomasulo's system is shown in FIG. 5. The technique works as follows:

1. Instructions are issued to sets of reservation stations (holding buffers) 505, one set for each functional unit, where they wait until their operands become available. They are then issued to the attached functional unit for execution. If a reservation station is not available for an instruction, it stalls and blocks instructions behind it.
2. A register 510 may contain valid data or the name of a reservation station that will supply it with data in the future.
3. When an instruction is issued, the name of its reservation station is placed into the name field 515 of its destination register. Subsequent issues of instructions using that register as a source will take the name in the name field with them. They now know the name of the reservation station that will generate the data they need.
4. When an instruction completes, its result and reservation station name are broadcast. All instructions and registers waiting for that result can now identify and copy it.

The sequential issue of single instructions is an integral and necessary part of the algorithm. WAW and WAR hazards are eliminated because all instructions that read a register are issued before a subsequent instruction that writes the register.

When an instruction writes to a register, all previously issued instructions that read it have copies of either the data or the reservation station's name that will produce the data. RAW hazards are also eliminated by the sequential nature of instruction issue.

It is interesting that Tomasulo's algorithm can also handle issues of multiple, in-order instructions containing no hazards (although this is not supported in the IBM 360/91). If enough reservation stations are available, the sequence could be issued. The (all different) result registers would not be sourced by other instructions within the sequence. Therefore, the reading of registers and the placing of reservation station names into them would occur correctly. All dependencies between instructions in different blocks would then be handled correctly by the algorithm. Some consider that Tomasulo's algorithm was used in the IBM System/360 model 195 and the IBM System/390.

2.3 VARIATIONS OF TOMASULO'S APPROACH

2.3.1 THE HPSm MACHINE

Figure 6:
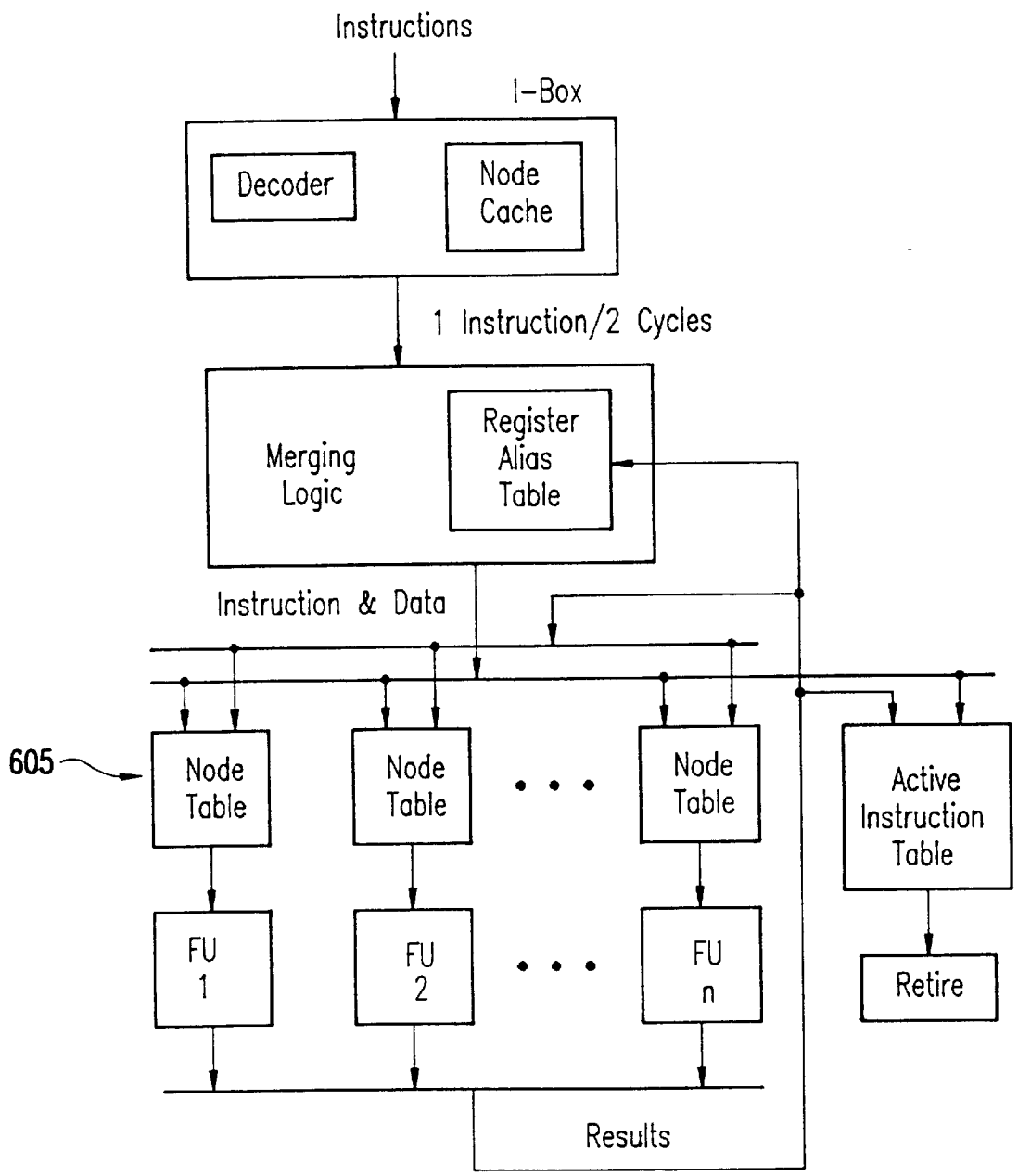
FIG. 6 shows the HPSm system.

HPSm is a minimum functionality implementation of High Performance Substrate (HPS) [HwPa 86, 87]. An HPSm instruction contains two operations that may have data dependencies on each other. If they do, the instruction causes the hardware to forward the results of the first operation directly to the second. The execution mechanism examines sequential instructions and decomposes them into two operations, which, after register renaming, are integrated into data structures attached to functional units called node tables. Node tables operate much like Tomasulo's reservation stations. Instructions wait here for operands to be generated by the functional units and are then issued to functional units for execution. FIG. 6 is a block diagram of the HPSm machine.

Branch prediction is integrated into the mechanism by saving machine state when a conditional branch is encountered. One state is saved at a time. If a second conditional branch is encountered while one is outstanding instruction issue stops.

Precise interrupts are supported with a checkpoint repair mechanism [HwPa 87]. Machine state is saved at selected checkpoints or instruction boundaries in the instruction stream. When an interrupt occurs, the machine state is quickly returned to that of the immediately preceding checkpoint. Instructions are then re-executed in sequence to the point of the interrupt.

This sequential re-execution of instructions precludes a short interrupt latency. This execution model is similar to Tomasulo's approach, enhanced by the ability to issue, to node tables 605, essentially two instructions (the two operations contained in one instruction) at once that may have dependencies on each other. The architecture of the instruction set supports the execution model and branch prediction, thus helping the scheduling process. Speedups of about 1 to 3.4 compared to the Berkeley RISC II processor are reported over a variety of benchmarks.

2.3.2 SOHI'S REGISTER UPDATE UNIT

Figure 7:
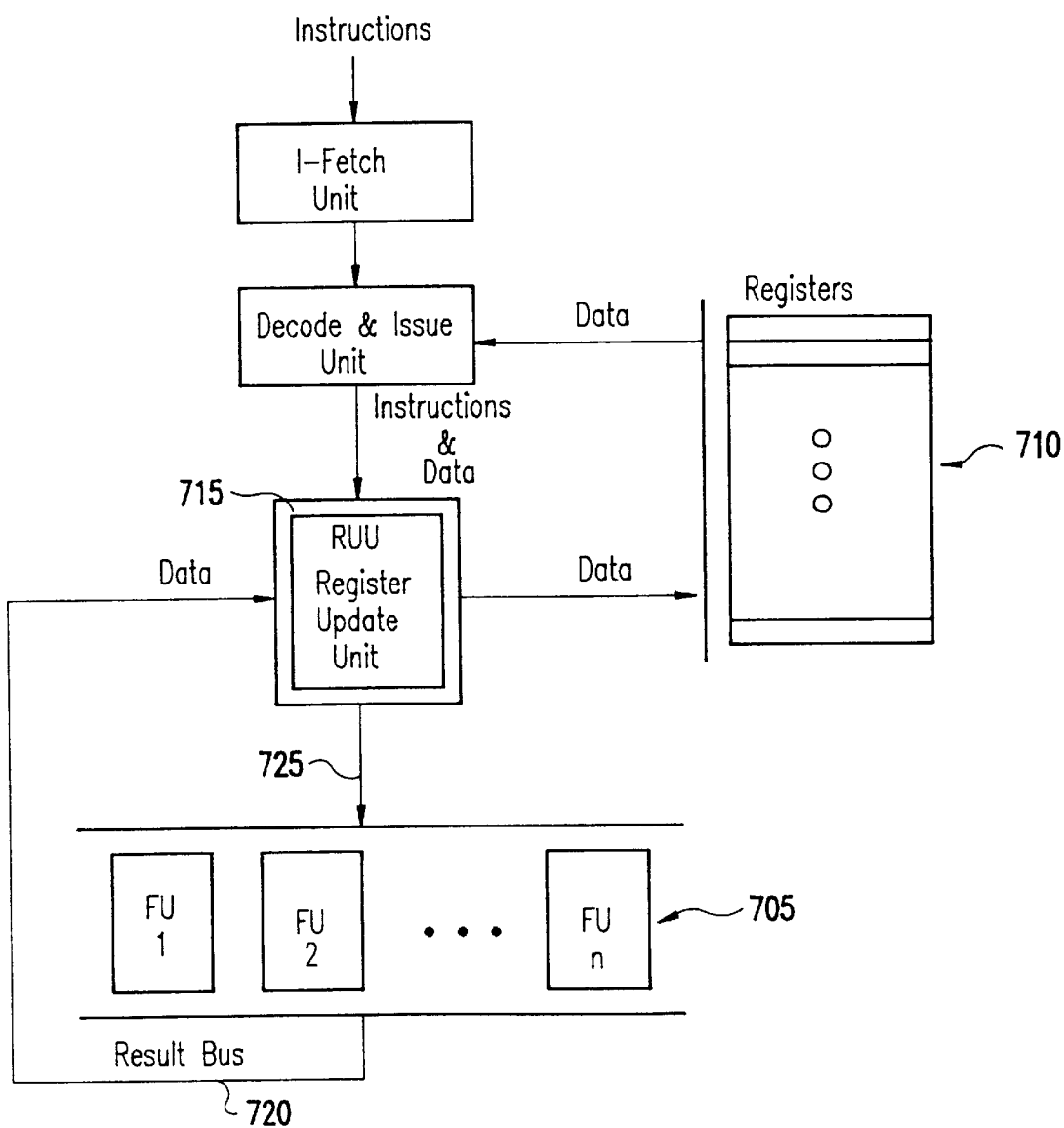
FIG. 7 shows Sohi's RUU system.

Sohi improves the efficiency of Tomasulo's algorithm by concentrating all the instruction issuing logic and reservation stations into one mechanism called the Register Update Unit (RUU) [Sohi 90]. A reservation station is no longer permanently coupled to a particular functional unit and may be assigned as needed. As previously noted, Tomasulo's approach will stall if a reservation station is not available on the required functional unit. FIG. 7 shows a diagram of the RUU.

The functional units do not have access to the registers. All data to and from the functional units 705 and the register file 710 flow through the RUU 715. It issues one instruction at a time which can be out-of-order. During each machine cycle, the RUU:

1. Loads tags and values from the register file into the RUU.
2. Receives values from the functional units on the result bus 720.
3. Updates the register file with values.
4. Monitors the bus from the RUU to the register file and captures values.
5. Issues instructions with operand values 725 to the functional units.

The fourth activity is required because the RUU returns results to the register file in program order (supporting precise interrupts). An instruction may enter the RUU requiring the result of an instruction in the RUU that has completed execution but not yet transferred its results back to the register file. The instruction requiring the operand must wait for the value to be returned to the register file by the RUU and capture it off the bus. Bypass schemes are proposed by Sohi to eliminate this situation and its performance impact.

By centralizing data and control, the RUU enhances Tomasulo's approach with improved reservation station utilization and support for precise interrupts. Speedups are reported over serial issue of about 1.5 to 1.7, with one issue unit and bypass logic. Sohi claims that the RUU concept may be expanded to issue multiple instructions. With four issue units and bypass logic, speedups of 1.7 to 1.9 over serial issue are reported [PlSo 88].

Integrating a branch prediction mechanism into the RUU appears to be difficult. Functional units may not begin execution on a predicted branch path so that each conditional branch encountered results in under-utilization of the RUU's multiple issue capabilities. Furthermore, since the RUU concentrates data (all data to and from registers and functional units pass through it), a bottleneck may be encountered in an actual implementation. Finally, although RUU supports precise interrupts by reordering results, it is not clear that they are fast enough to support demand paged virtual memory.

2.3.3 SIMP

Figure 8:
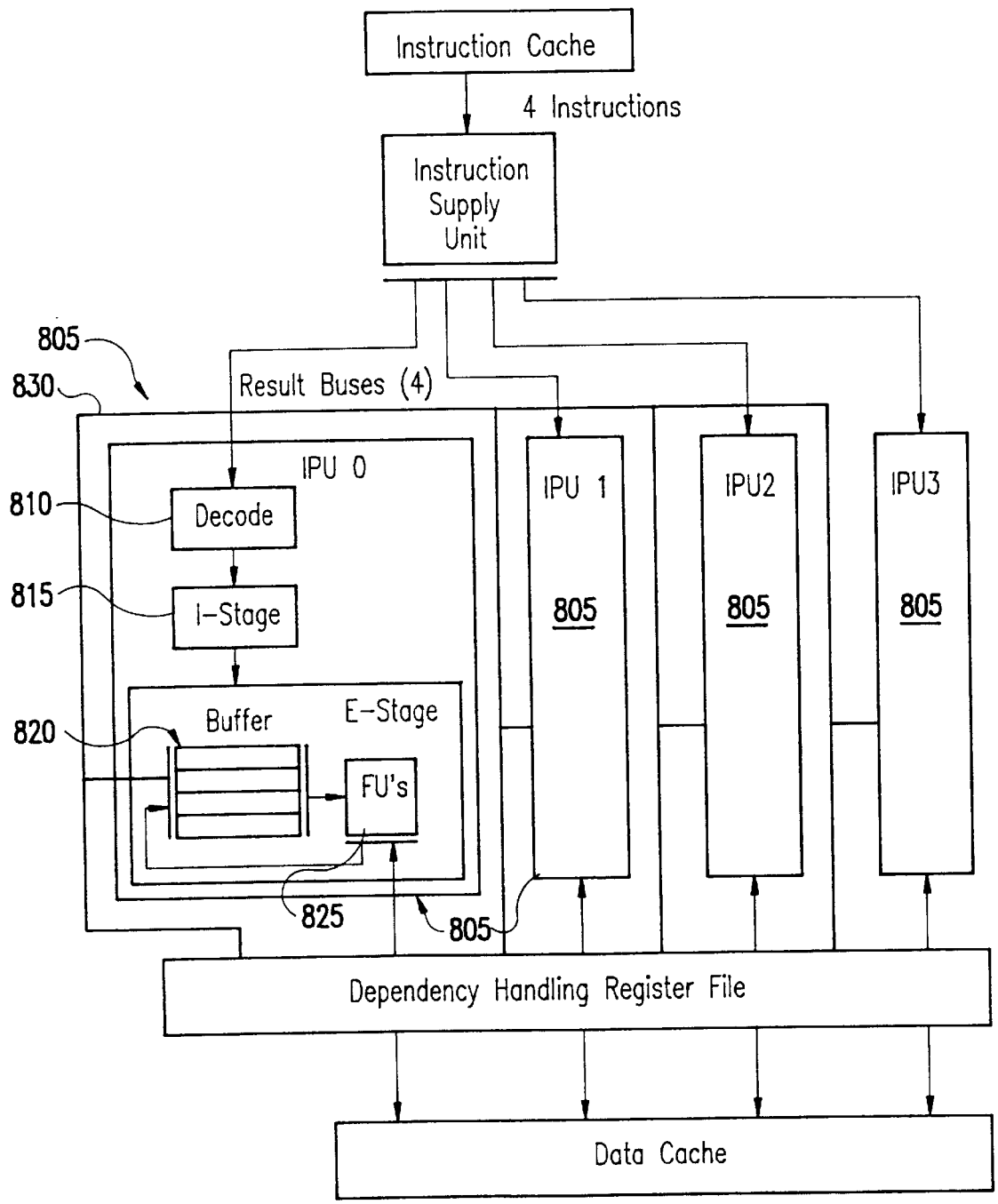
FIG. 8 shows the SIMP system.

SIMP (Single Instruction Stream/Multiple Instruction Pipelining) [MuIr 89], an enhancement of Tomasulo's algorithm with some of the features of Sohi's RUU, is a complex multipipelined approach. FIG. 8 shows a diagram of the SIMP system. The SIMP issues blocks of sequential instructions (currently four) per cycle, one instruction to a pipeline 805. The instructions are decoded and assigned register identifiers in the first two stages of the pipeline 810, 815. They then enter a holding buffer 820 to wait for their operands (if necessary) after which they are issued (singly) to one of a number of functional units 825 attached to that pipeline. Instructions may execute out-of-order. The results in a pipeline are made available via buses 830 to instructions in other pipelines waiting for operands. A central mechanism maintains register and control dependency information.

This fairly complex mechanism may lengthen cycle time. The authors recognize this by recommending a BISC architecture (Balanced Instruction Set Architecture) whose instructions have similar execution times. Precise interrupts are supported by a scheme similar to Sohi's RUU. Speedups, compared to a single instruction pipeline, are reported to range from 2.2 to 2.7. The nature of the trace used in the simulation is not known.

2.4 TORNG'S DISPATCH STACK

Figure 9:
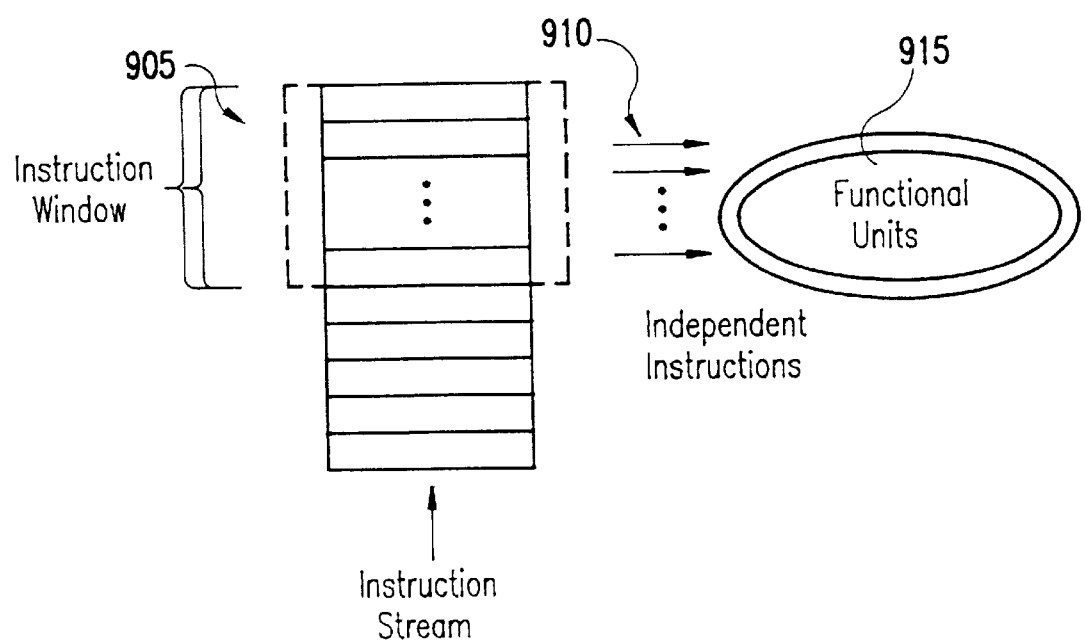
FIG. 9 shows a diagram of an instruction window.

The Dispatch Stack (DS), first proposed by Torng [Torn 83] and developed by Torng and Acosta [Acos 85][AcKj 86], is a mechanism that checks all instructions within an instruction window 905 (see FIG. 9) for dependencies and issues all possible instructions 910 to multiple functional units 915 each cycle.

Figure 10:
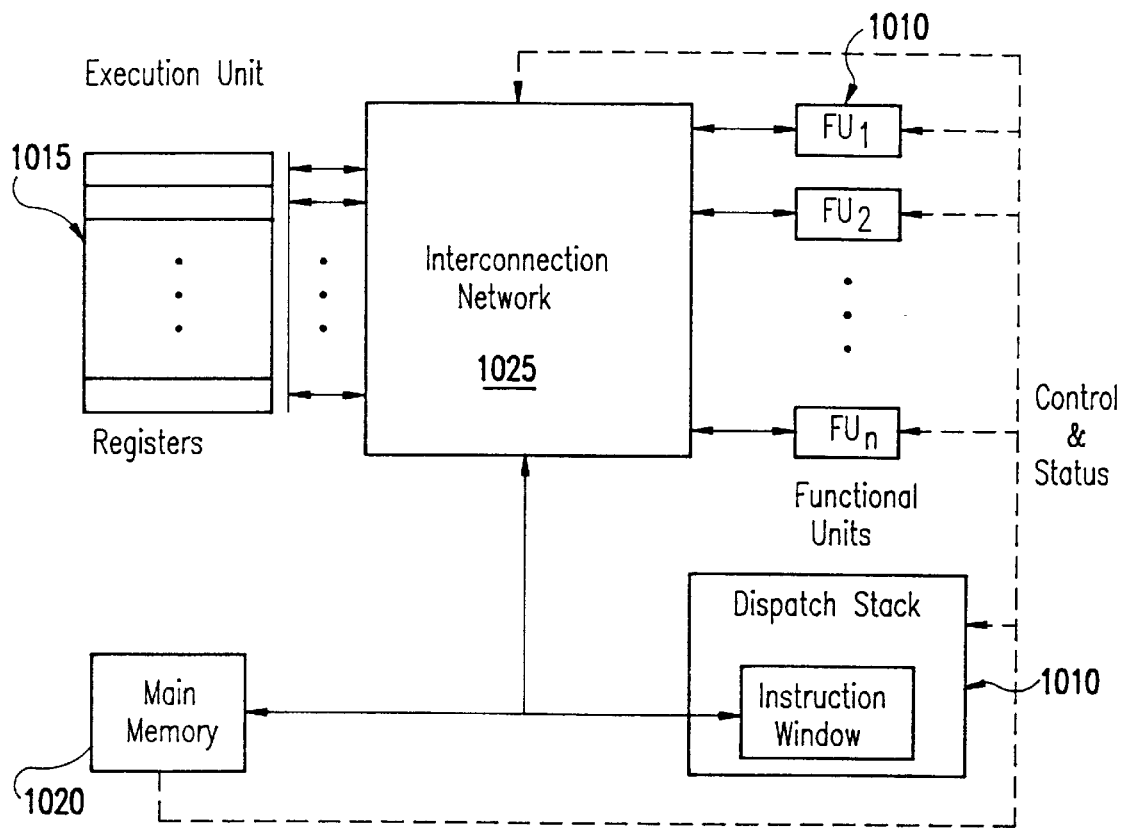
FIG. 10 shows a multiple functional unit processor with a dispatch stack.

Dependency resolution occurs before issue. Only independent instructions are issued concurrently. Instructions may be issued out-of-order and in multiples by the DS 1005 to multiple functional units 1010 (FIG. 10). The register file 1015 participates in all data transfers, to and from the functional units and memory 1020, constituting a register-to-register architecture. The functional units may be optimized for specific operations. The Dispatch Stack, registers, functional units, and the memory interface are attached to an interconnection network 1025. Speedups over serial issuing have been found to range from about 1.7 to 2.8 (without branch prediction) on the 14 Livermore Loops using various DS issuing modes.

Contrary to appearances, the DS approach is not more restrictive than approaches that allow instructions with dependencies to be issued. These approaches "issue" instructions to mechanisms other than the functional units.

A primary difference between the DS and schemes based on Tomasulo's algorithm is the method of passing data from functional units to waiting instructions. The DS passes data through the register file; others forward data to an instruction holding buffer. It may seem that forwarding saves time by eliminating a register access. This is not necessarily true. In data forwarding schemes, the instruction is issued to a functional unit after receiving the data from a functional unit (two transfer times). In the DS case, both operand access and instruction issue may occur concurrently after the data is written to the register file by a functional unit (two transfer times).

2.5 COMPARISON OF THE DS AND SOHI'S RUU APPROACH

The DS is similar to Sohi's RUU but without its data concentrating effects. Both the DS and the RUU issue data independent instructions to the functional units. In fact, data dependent instructions never execute concurrently—where instructions wait and how data gets to them are the key differences. Sohi's approach uses the RUU to actually pass data between dependent instructions RUU while the DS controls the passage of data through the register file. Therein lies the advantage of the DS approach.

For equivalent function, the bandwidth requirements of Sohi's RUU approach are greater than Torng's DS approach. In both approaches, the functional units receive data from and pass results to another unit—the RUU in Sohi's approach and the register file in Torng's approach. Instructions are issued to the functional units from the RUU and the DS. These two transfers require equivalent bandwidth. However, since the RUU also passes data back to the register file and an "issue" unit accesses these registers, the required system bandwidth is greater in Sohi's approach. If a box is drawn around the issue unit and the RUU, the logic within this box performs nearly the same function as the DS but requires more bandwidth. Sohi's approach does however, provide for precise interrupts whereas the DS does not.

2.6 SUMMARY OF APPROACHES OF OTHERS

Table 2.1 summarizes important aspects of the dynamic scheduling approaches reviewed above. Some of the Dispatch Stack entries are changed by the improvements described in the sections about my preferred embodiments. Several columns in this table require explanation. These scheduling approaches transfer instructions either directly to the functional units or to intermediate units which subsequently transfer them to the functional units. The First Issue and Second Issue columns describe the first instruction transfer and, if applicable, the second instruction transfer respectively. The Fine Grain Parallelism Exploited column contains an estimation of the relative throughput potential of an approach given that a large amount of instruction parallelism is available in the instruction stream. The Cycle Time column contains an estimation of the relative cycle time an approach can support.

There is a practical aspect to some of these approaches. Program compatibility, the ability to execute the instruction set of a processor on another, possibly newer and faster, processor, is an important consideration when enhancing the performance of established architectures (e.g., DEC VAX 780, IBM System 370 and Intel's 80x86 series). Source code compatibility across processors provides a measure of program compatibility and is obtained by recompiling the source code of programs written in high level languages for the target processor. However, often assembly language code is written by users to support special applications. It is advantageous for these users to run old assembly language code on a new processor. This is possible when the new processor has instruction set compatibility with the processor the code was originally written for. Sometimes a new processor's instruction set subsumes the older processor's instruction set. In this case, there is upward instruction set compatibility from the old processor to the new processor. The HPSm and the SIMP approaches use new instruction set architectures, precluding instruction set compatibility with existing processors, while the others do not.

The improved preferred embodiments.

SECTION 3

THE FAST DISPATCH STACK

My preferred embodiment does utilize the Fast Dispatch Stack which I earlier reported upon. To the basic Fast Dispatch Stack I have made various enhancements dealing with store facility, etc. which are discussed in later in the detailed discussions. My inventions in its various aspects could sometimes be used without all my enhancements. Some elements and processes which are performed by the system can be employed without the Fast Dispatch Stack. However, for my own preferred mode of practicing my inventions uses the Fast Dispatch Stack, and for that reason, I will describe it first now in detail.

Figure 11:
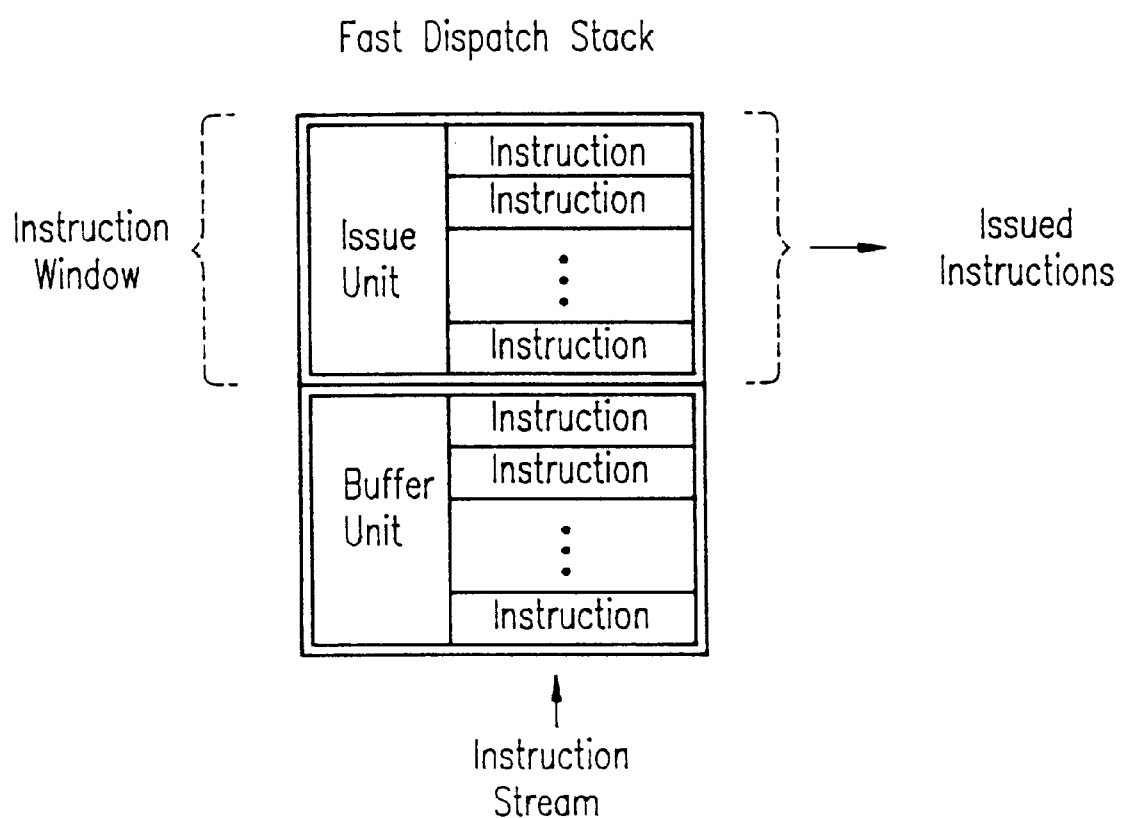
FIG. 11 shows the instruction window of the fast dispatch stack.

The Fast Dispatch Stack (FDS) is a multiple, out-of-order instruction issue mechanism based on Torng's Dispatch Stack. It issues instructions with no dependencies from a window of instructions (see FIG. 11) to functional units each cycle and operates with a short cycle time.

The detailed structure of FDS is developed to determine its cycle time measured in gate delays. Absolute cycle time depends on circuit technology. Circuit area is traded for speed. Less area consuming approaches are discussed later. The FDS schedules the issue of register-to-register instructions only, similar to my own prior work and report. However, while such an FDS can desirably be used alone, in my preferred embodiment, it can be enhanced. It is enhanced in Section 4 to handle branch and storage operations. The branch and storage operations that I have provided is one of the features of my inventions.

3.1 FAST DISPATCH STACK ORGANIZATION

Figure 12:
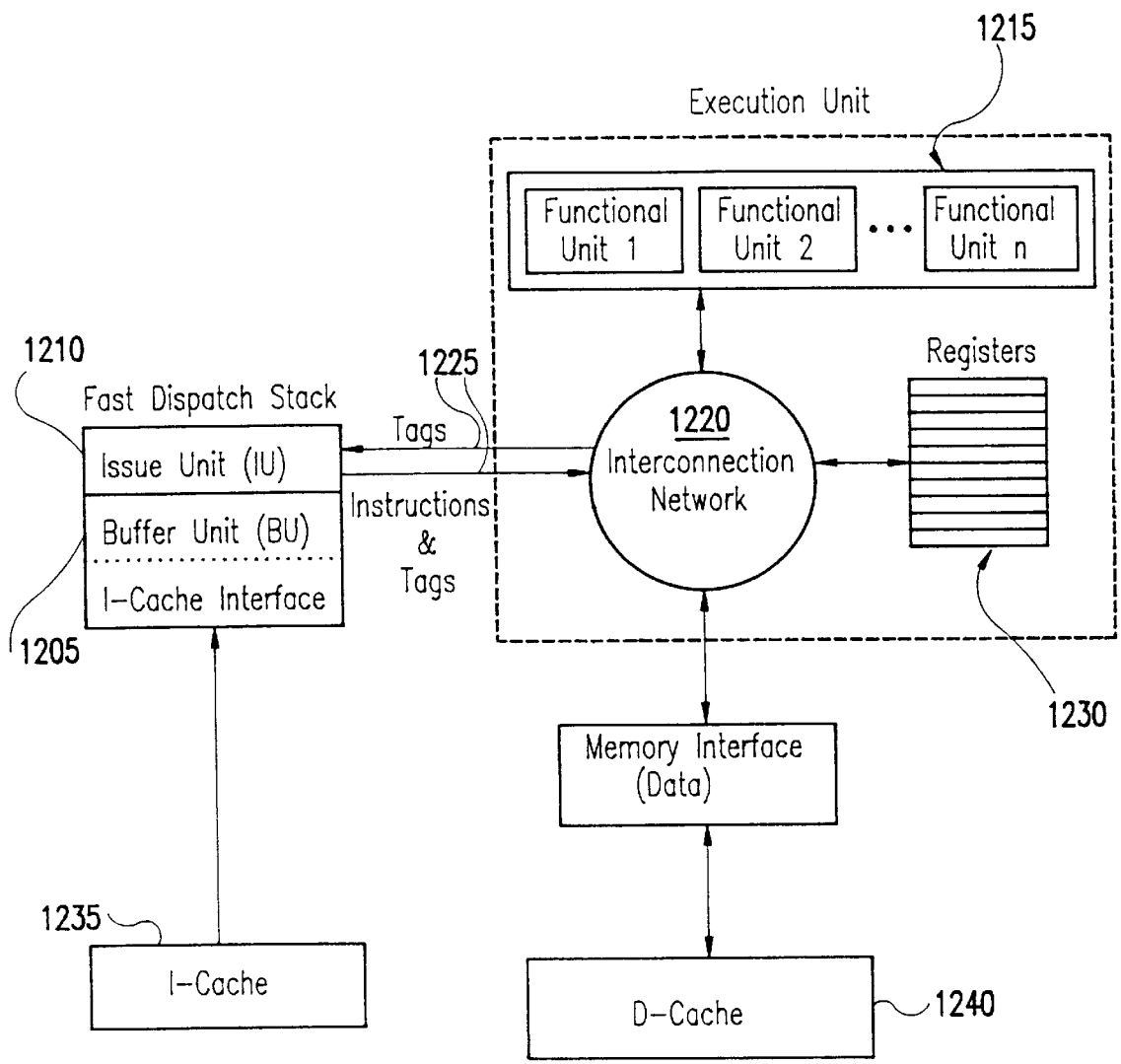
FIG. 12 shows a CPU structure with the fast dispatch stack.

A block diagram of a CPU with the FDS is shown in FIG. 12. The FDS consists of the Buffer Unit (BU) 1205 and the Issue Unit (IU) 1210. The BU supplies the IU with instructions in a form that facilitates fast dependency detection. The IU detects instruction dependencies and issues instructions with no dependencies to the Functional Units 1215 via an interconnection network 1220 each cycle. The FU's indicate instruction completion by returning Tags 1225 that are issued with instructions. The Tags are used to remove instructions from the IU. The FU's read operands from and return results to the Register File 1230. The system includes an Instruction Cache (I-Cache) 1235 and a Data Cache (D-Cache) 1240. The I-Cache and the BU meet the instruction bandwidth requirements of the IU. The D-Cache provides fast data access.

For the purpose of illustrating the principal features of the FDS, a processor with 16 architectural registers and an FDS with a capacity of 8 instructions is assumed. Deviations from this assumption are noted.

3.2 THE BUFFER UNIT

Figure 13:
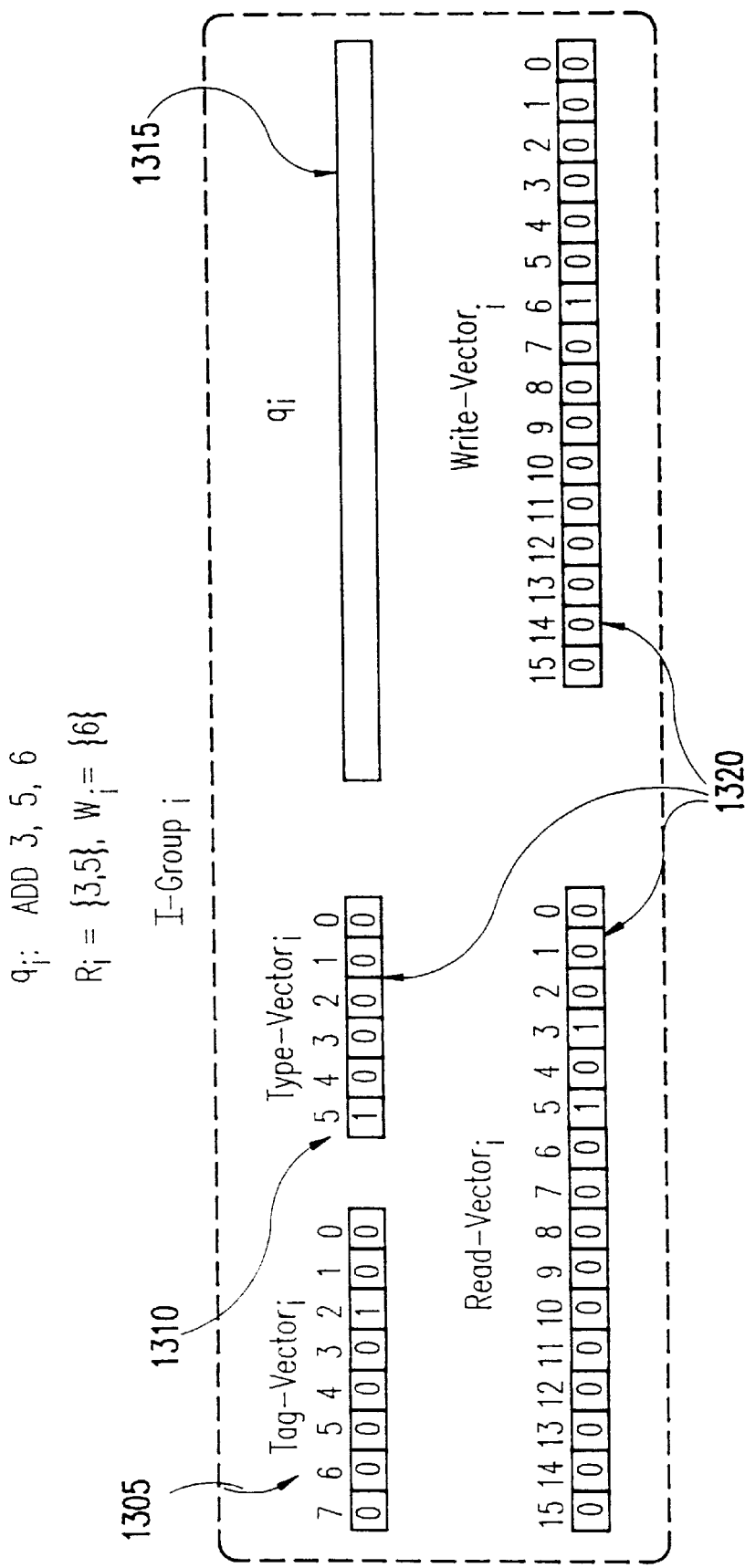
FIG. 13 shows an example I-group.

The BU fetches multiple instructions per I-Cache access and generates four Vectors for each instruction: a Tag, a READ-VECTOR, a WRITE-VECTOR and a TYPE-VECTOR. READ-VECTOR$_i$ and WRITE-VECTOR$_I$ are generated from $q_j$ and are representations of $R_i$ and $W_i$ (Section 1.1) respectively as vectors of binary elements, one element for each register. Element positions are indexed from the right starting at 0 as shown in FIG. 13. Position j is 1 if register j is accessed, and 0 if it is not. A TYPE-VECTOR is a vector of binary elements with a length equal to the number of instruction types. Element positions represent instruction types, one position for each type. Only one element in the array will be 1. Five instruction types must be indicated: an unconditional branch (a Jump), a conditional branch, a Load, a Store, and a register-to-register instruction. Further sub-typing of instructions is required if the Execution Unit contains specialized FU's. A register-to-register instruction is typed according to the FU that can execute it. FU's specialized for Integer and Floating point instructions are assumed in this discussion. The TYPE-VECTOR is therefore six elements long.

A Tag is a vector of binary elements with a length equal to the number of available Tags. One unique element in each Tag is set to 1 and the remainder to 0. The Tag assigned to $q_i$ is designated Tag$_i$. FIG. 13 shows the I-Group of an ADD instruction. Tag$_i$ 1305 and TYPE-VECTOR$_i$ 1310 have representative positions set to 1.

An instruction 1315 together with its Vectors 1320 and Tag 1305 constitute an I-Group. I-Group$_i$ is derived from $q_i$. I-Groups are either transferred directly to the IU, or are temporarily buffered in the I-Group Buffer to be forwarded to the IU later.

Figure 14:
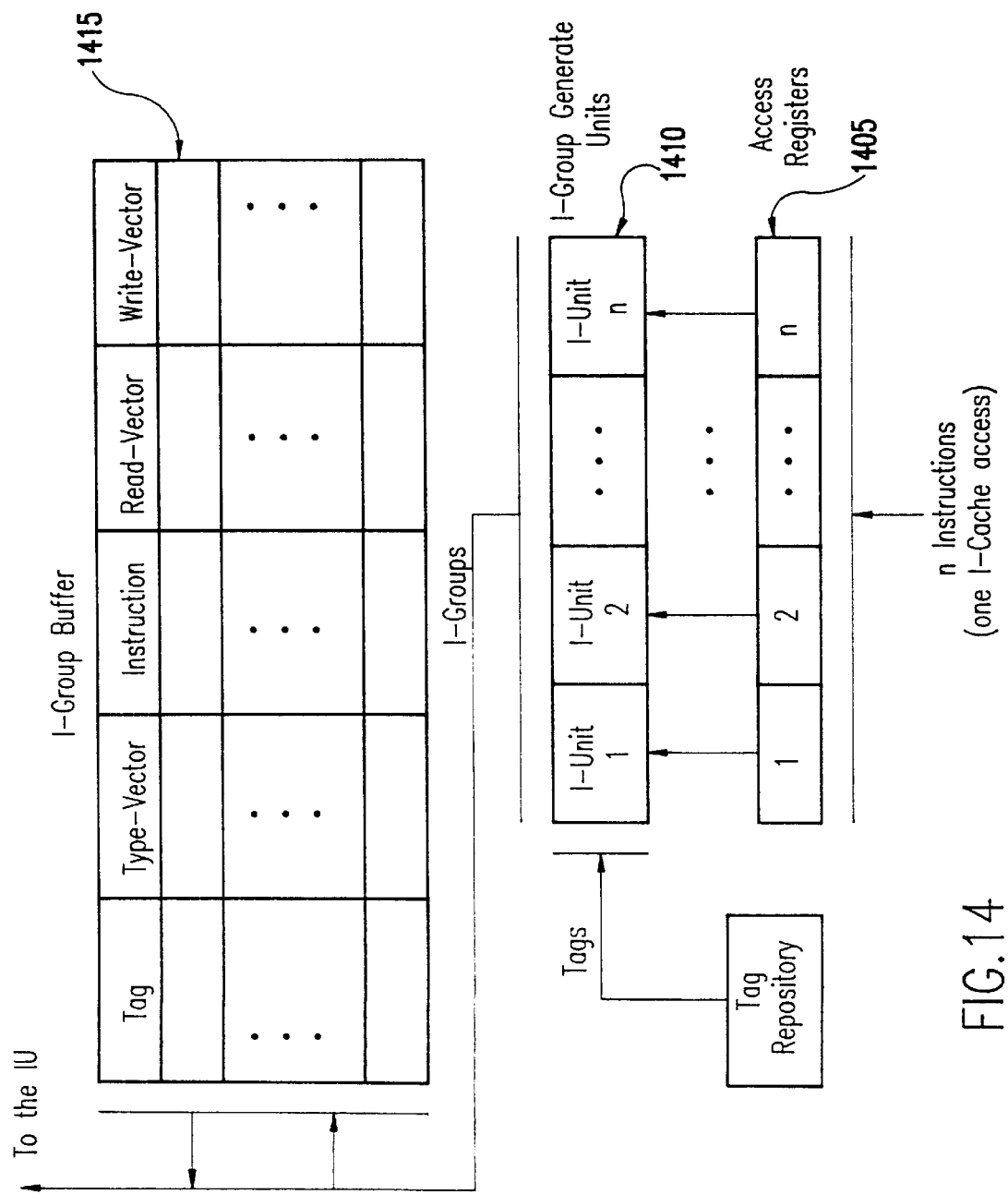
FIG. 14 shows a block diagram of the buffer unit.

The block diagram of the Buffer Unit is shown in FIG. 14. Access Registers 1405 latch the instructions in one I-Cache access. The instructions are transferred via the I-Group Generate Units (I-Units), 1410 to the IU or the BU Buffer 1415 (the Generate Operation). During this transfer, Vectors are generated by multiple I-Units, one per instruction, forming I-Groups. An I-Cache access and a Generate Operation proceed concurrently.

Figure 15:
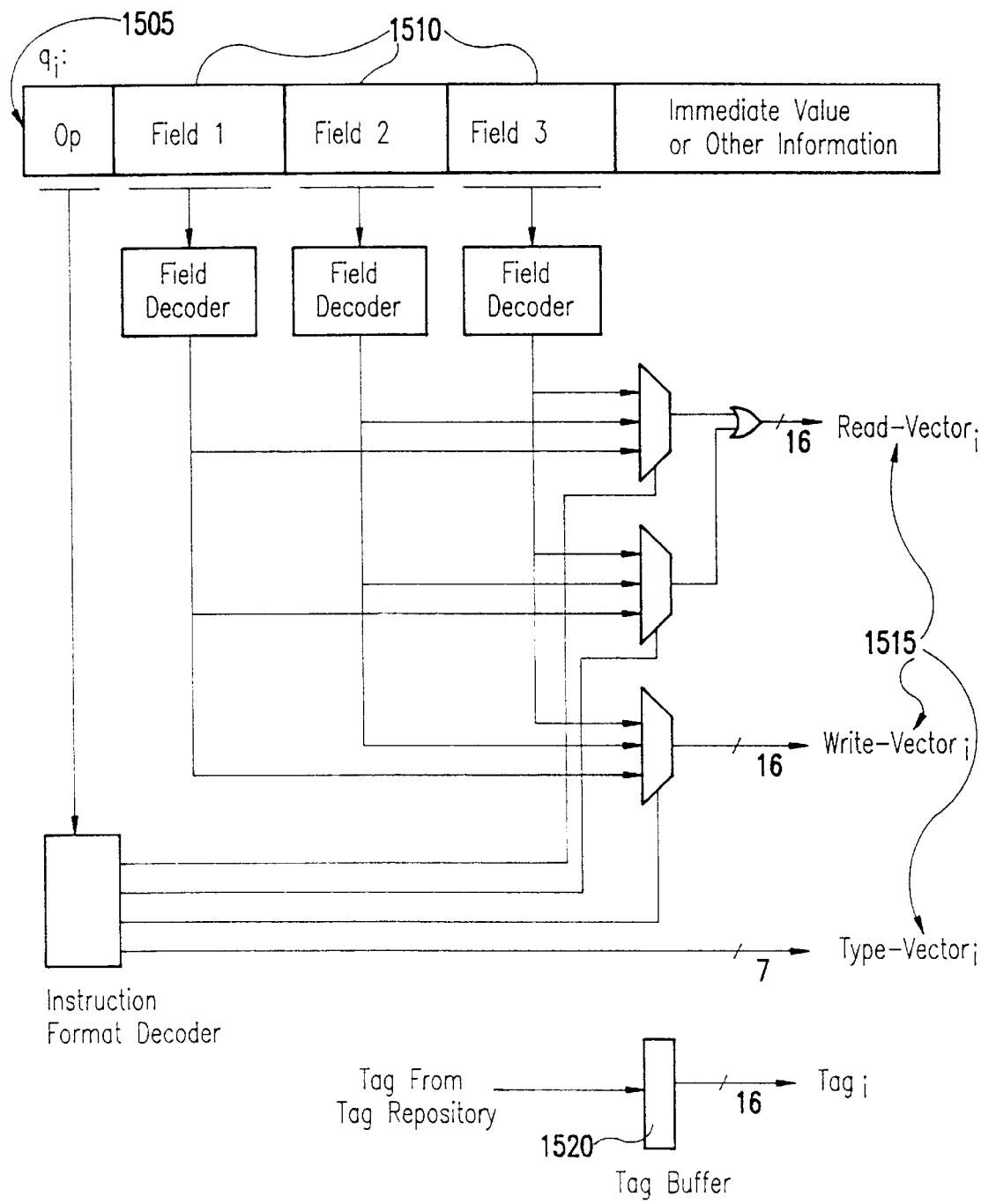
FIG. 15 shows a block diagram of a vector-generate unit.

All Vectors for all I-Groups are generated concurrently. FIG. 15 shows the block diagram of an I-Unit. Interpretation of bit-fields in the instruction 1505 indicating register use (register fields) 1510 usually varies among instruction types. Vectors 1515 are generated for all types concurrently. The instruction type is decoded concurrently with Vector generation and used to select the correct Vectors from those generated. I-Group Vectors not used by an instruction type (i.e., the WRITE-VECTOR of a Branch instruction) are set to Q.

A newly generated I-Group is transferred from an I-Group Generate Unit to the IU or to the I-Group Buffer.

If the I-Group Buffer is empty, available IU positions are filled with newly generated I-Groups. Those I-Groups for which there is no room in the IU are placed in the I-Group Buffer. If the I-Group Buffer is not empty, I-Group positions in the IU are first filled with I-Groups from the I-Group Buffer and then with newly generated I-Groups. Newly generated I-Groups for which there is no room in the IU are placed in the I-Group Buffer. In this way I-Groups are delivered to the IU in instruction stream order. The BU initiates an I-Cache access when there is room in the I-Group Buffer for the instructions in one I-Cache access.

A Tag distribution system assigns Tags to I-Groups and reassigns Tags no longer in circulation in the CPU. The Tag Repository in the BU permanently contains all available Tags. Tags are given a status of issued or unissued. Issued Tags have been made available for assignment to I-Groups while unissued Tags exist only in the Tag Repository. Tags marked unissued are transferred to individual I-Unit Tag-Buffers as needed and marked issued. Each I-Unit has one Tag-Buffer 1520 which holds one Tag (see FIG. 15). They are removed from the Tag-Buffer when assigned to an I-Group by an I-Unit. A Tag Buffer is then given another Tag by the Tag Repository. The Tags of I-Groups removed from the IU are returned to the Tag Repository which marks them unissued. The Tag Repository contains more Tags than the maximum number of I-Groups in the system. This a consequence of delay between the time a Tag is freed in the IU and its availability for reassignment.

3.3 THE ISSUE UNIT

Figure 16:
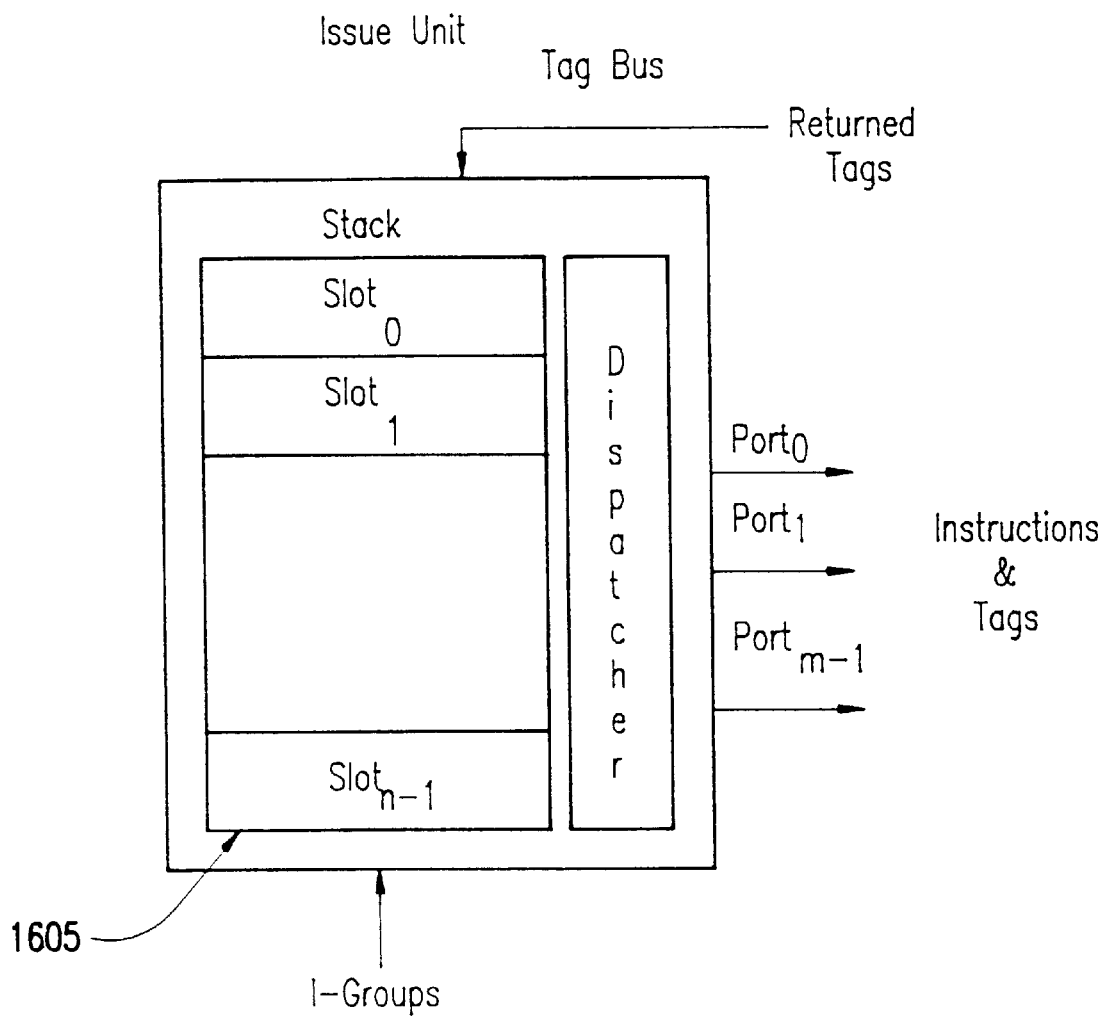
FIG. 16 shows a block diagram of the issue unit.

The Issue Unit comprises the Stack and the Dispatcher. The Stack stores I-Groups received from the BU in individual buffers (Slots), detects register dependencies between instructions, eliminates un-needed I-Groups, and repositions I-Groups, filling empty slots. The Stack determines which Slots contain register independent instructions each cycle. In accordance with an additional aspect of my inventions the Dispatcher transfers a subset of instructions from these slots to output Ports. A Port is an entry point into the interconnection network for one instruction and its tag. The number of available Ports may be less than the number of instructions eligible for issue. The Dispatcher assigns selected instructions to Ports. FIG. 16 is a block diagram of an Issue Unit with n Slots 1605 and m Ports 1610.

3.3.1 THE STACK

A Stack of size n is an array of n Slots with $Slot_0$ at the top. A slot contains conflict detection logic, tag comparison logic, registers to hold an I-Group, a register to hold status information, and logic for transferring an I-Group into the slot. The Stack therefore holds n instructions in n I-Groups. I-Groups and status are periodically moved toward the top of the Stack into empty slots. Empty slots are created when completed instructions and their I-Groups are removed from the stack.

When I-$Group_i$ enters the Stack, status information associated with it is expressed in a vector of binary elements called $Status_i$. $Status_i$ accompanies I-$Group_i$ in the IU. $Status_i$ has three element positions: $Valid_i$, $Issued_i$, and $Complete_i$. $Valid_i$ is 0 when all other information is invalid. A Slot containing a Status vector with Valid set to 0 is empty. Other Status information is discussed later.

$Slot_i$ contains the registers Tag-$Register_i$, Inst-$Register_i$, Read-$Register_i$, Write-$Register_i$, Type-$Register_i$, and Status-$Register_i$. The notations, Register-Name<Contents-Name> and Slot-Name<Contents-Name> denote a register or slot, as appropriate, and its contents. If $Slot_i$ holds I-$Group_j$, the following is true:

1. $SLOT_i$<I-$GROUP_j$>
2. INST-$REGISTER_i$<$Q_j$>
3. TAG-$REGISTER_i$<$TAG_j$>
4. READ-$REGISTER_i$<READ-$VECTOR_j$>
5. WRITE-$REGISTER_i$<WRITE-$VECTOR_j$>
6. TYPE-$REGISTER_i$<TYPE-$VECTOR_j$>
7. STATUS-$REGISTER_i$<$STATUS_j$>

Figure 17:
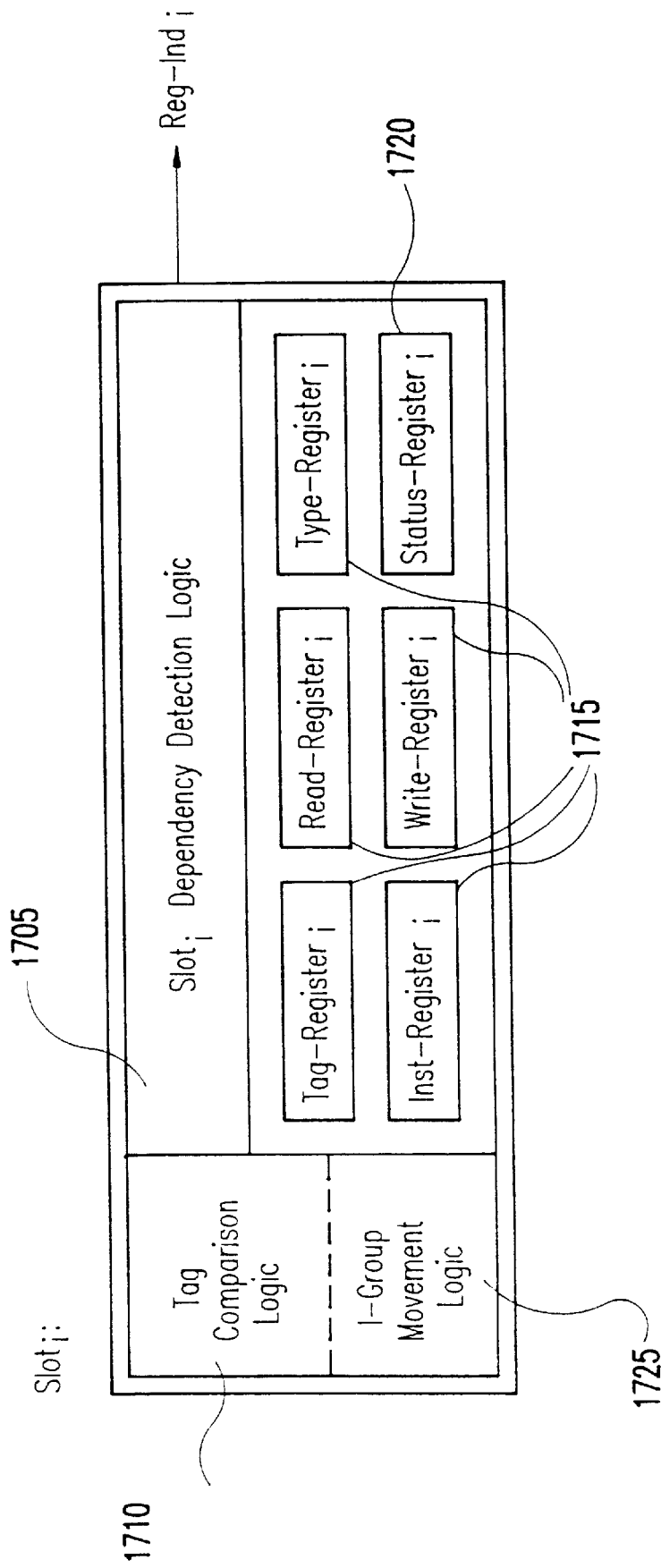
FIG. 17 shows a block diagram of slot(i).

FIG. 17 is a block diagram of a slot.

During a machine cycle, two operations occur concurrently, the Dependency Detection Operation and the Compression Operation.

3.3.2 DEPENDENCY DETECTION

Instructions are examined for register dependencies during Dependency Detection. I-Groups occupy slot positions in the Stack based on precedence, with the instruction of highest precedence in $slot_0$. Therefore of two valid Slots, the Slot with the lower index (nearer the top) contains the instruction of higher precedence. The maintenance of this order is discussed under the Compression Operation.

Figure 18:
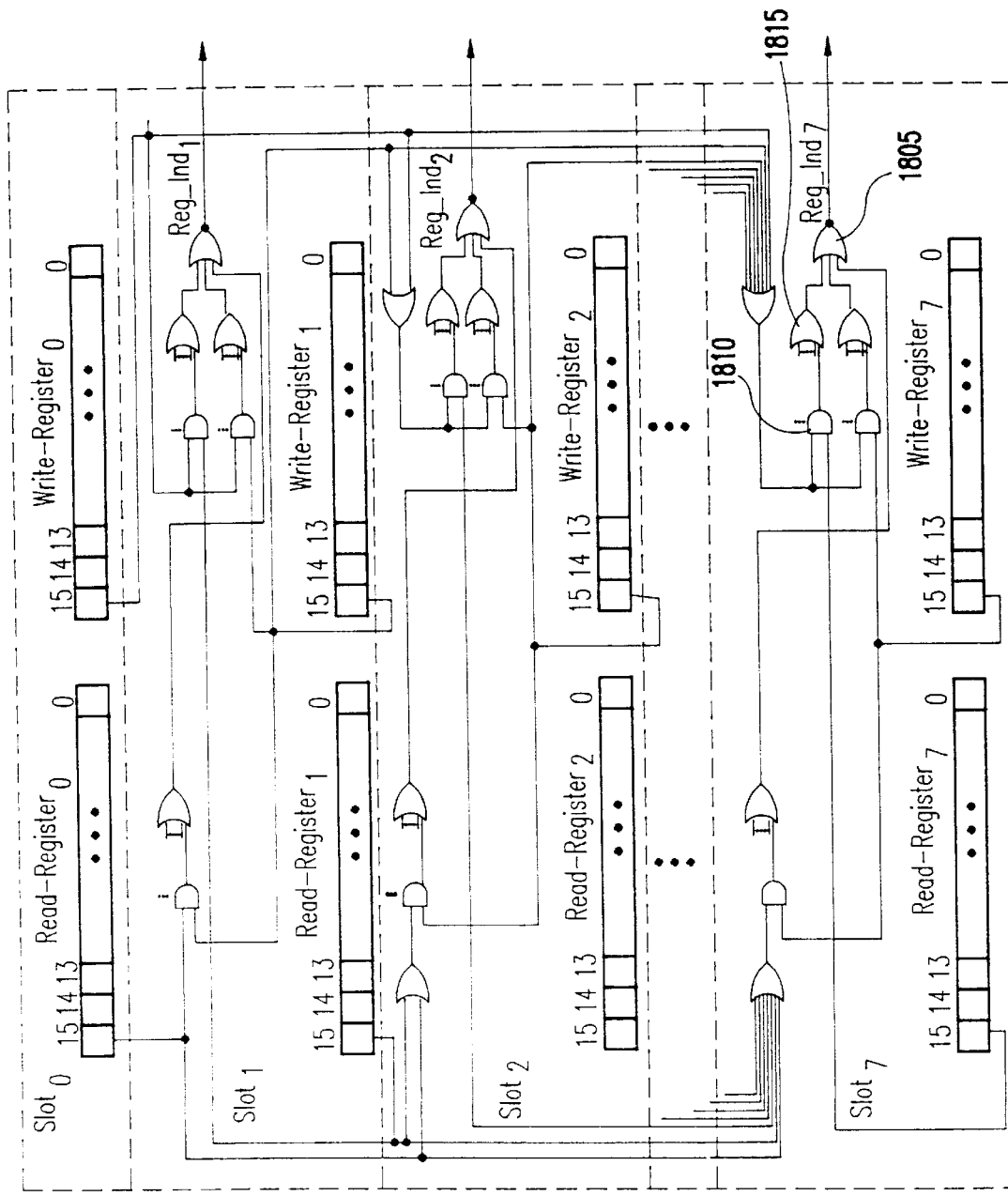
FIG. 18 shows conflict detection logic for a stack of size 8.

FIG. 18 shows a Stack's register dependency detection logic. This structure was developed by Dwyer and Torng [DwTo 87]. It helps the discussion to assume that I-$Group_i$ is in $Slot_i$. The Stack therefore contains the first 8 instructions in the dynamic instruction stream.

Since instructions occupy slots in order of precedence, an instruction need only detect conflicts with instructions in higher slots (i.e., with instructions of higher precedence). The logic for Register conflict detection in $Slot_7$ is described with logic Signals (indicated with white numerals on black) and Gates (indicated with black numerals on white) indicated in FIG. 18. Conflicts are detected between $q_7$ and each of the other 7 instructions of higher precedence. Three inputs to Gate 9, Signals 7, 8, and 9 1805, indicate respectively WAR, RAW, or WAW conflicts with an instruction in a higher Slot. If they are all FALSE, Gate 9 outputs TRUE on Reg_$Ind_7$, signaling the register independence of $q_7$ to the Dispatcher.

Recall that the Buffer Unit generates vectors, READ-$VECTOR_i$ and WRITE-$VECTOR_i$, representing respectively sets $R_i$ and $W_i$ for instruction $q_i$. These vectors, now in Read-$Register_i$ and Write-$Register_i$, are used to detect register conflicts.

A RAW conflict of $q_7$ with any instruction of higher precedence is represented by TRUE on signal 8. Gate 5 1810 generates the AND of bit 15 in Read-$Register_7$ with the OR of bit 15 of all the Write-Registers above it. The output of Gate 5 is therefore TRUE if $q_7$ reads from register 15 and any instruction of higher precedence writes to register 15. Three dots above Gate 5 indicate that 15 more AND Gates perform 15 more bit-to-bit comparisons between the remaining bits in Read-$Register_7$ and the remaining bits in the Write-Registers of higher slots. The OR of these 16 bit-for-bit comparisons is generated by Gate 7 1815. Gate 7 will therefore output TRUE on line 8 if $q_7$ reads any register that is written to by an instruction of higher precedence. This is the definition of a RAW dependency. WAR and WAW conflicts are detected in similar fashion and are represented by TRUE on Signals 7 and 9 respectively.

The conflict detection logic in other slots is similar. A given Slot must detect conflicts only with I-Groups in higher Slots, each slot requiring logic with less fan-in as the top of the Stack is approached.

Given that $q_i$ is in $Slot_i$, Expression 3.1 shows each selected logic signal in FIG. 18 (indicated by a white numeral on black in that figure) followed by the expression specifying its Truth:

1: $R_0 \cap W_1 \phi$

2: $W_0 \cap R_1 \phi$ $$3: W_0 \cap W_1 \, \phi$$

$$4: R_{0,1} \cap W_2 \, \phi$$

$$5: W_{0,1} \cap R_2 \, \phi$$

$$6: W_{0,1} \cap W_2 \, \phi$$

$$7: R_{0,6} \cap W_7 \, \phi$$

$$8: W_{0,6} \cap R_7 \, \phi$$

$$9: W_{0,6} \cap W_7 \, \phi \qquad (3.1)$$

where $$R_{s,t} = \bigcup_{r=s}^{t} R_s \qquad (3.2)$$

and $$W_{s,t} = \bigcup_{r=s}^{t} W_r$$

Gate 9 (a NOR gate) has two inputs not shown in FIG. 18. They are Issued$_7$ and NOT Valid$_7$. Issued$_i$ is set to TRUE by the Dispatcher when $q_7$ is issued. Logically, $$\text{Reg\_Ind} = (R_{0,6} \cap W_7 = 0) \wedge (W_{0,6} \cap R_7 = 0) \wedge (W_{0,6} \cap W_7 = 0) \wedge \overline{\text{Issued}_7} \vee \text{Valid}_7 \qquad (3.3)$$

preventing the issue of an invalid instruction or one previously issued. Reg_Ind from other Slots are generated the same way except for Reg_Ind$_0$. This output is generated as follows:

$$\text{Reg\_Ind}_0 = \overline{\text{Issued}_0} \wedge \text{Valid}_0. \qquad (3.4)$$

Slot$_0$ contains the instruction of highest precedence. It may be issued without checking for conflicts.

3.3.3 THE COMPRESSION OPERATION

The Compression Operation removes I-Groups representing completed instructions from the Stack, moves remaining I-Groups upward in the Stack into empty Slots, and fetches I-Groups into empty Slots from the BU. These operations will be examined in detail.

Figure 19:
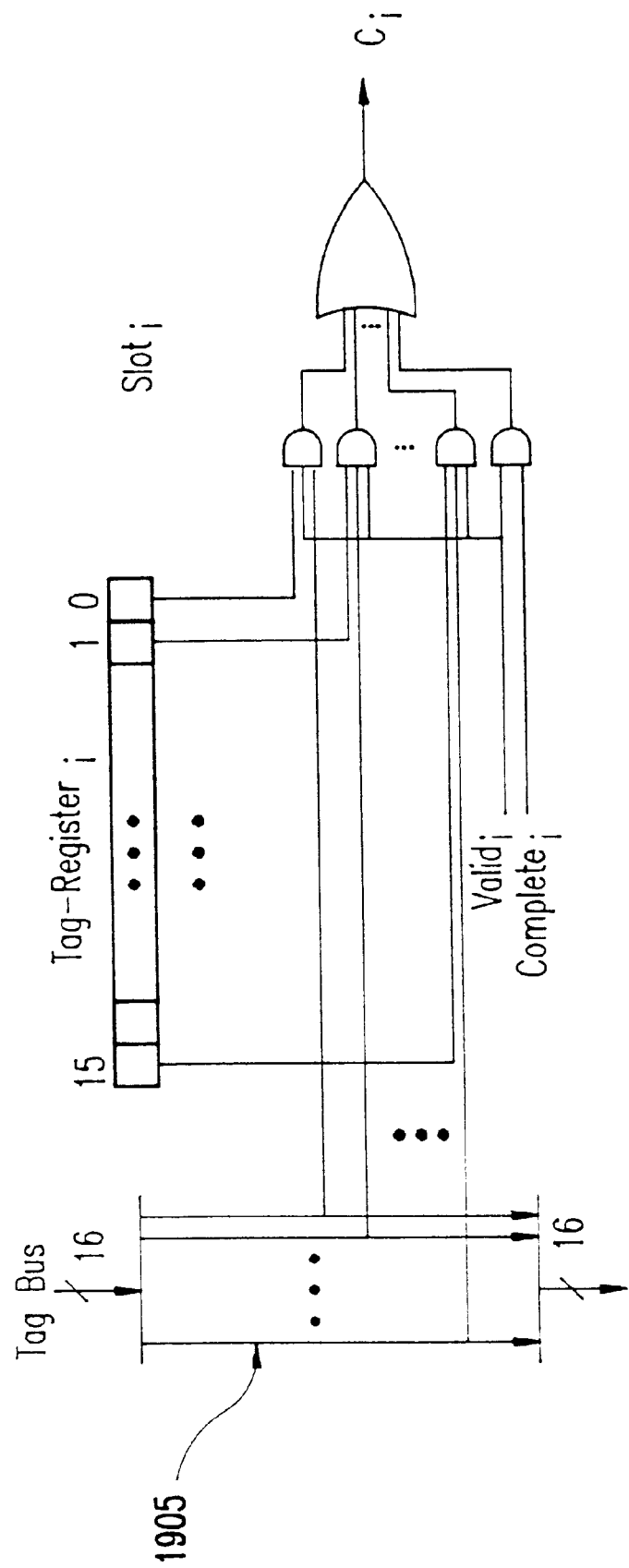
FIG. 19 shows tag-vector comparison logic for one slot.

Only completed instructions are removed from the Stack. Zero or more instructions may complete execution in the FU's each cycle. One cycle before instruction's completion, the FU places its Tag-Vector on the Tag Bus. Since a Tag-Vector has one and only one element set to 1, the Tag Bus can have multiple Tag-Vectors on it simultaneously, signaling the completion of multiple instructions. Instructions may move to other Slots in the Stack after issue. The Tag Bus enables all Slots to compare their Tag-Vector with those on the Tag Bus simultaneously. FIG. 19 shows the Tag-Vector comparison logic for one slot. TRUE in identical positions in TAG-VECTOR$_i$ and on the Tag Bus 1905 make $C_i$ TRUE, setting Complete$_i$, an element in Status$_i$, to TRUE. $C_i$ is an input to the Stack compression logic.

Stack compression logic selects I-Groups for removal and transfer. Two selection methods are discussed. Total Compression removes completed I-Groups from any Slot while Top Compression removes only a contiguous sequence of completed I-Groups from the top of the Stack. FIG. 20 illustrates the two methods.

Figure 21:
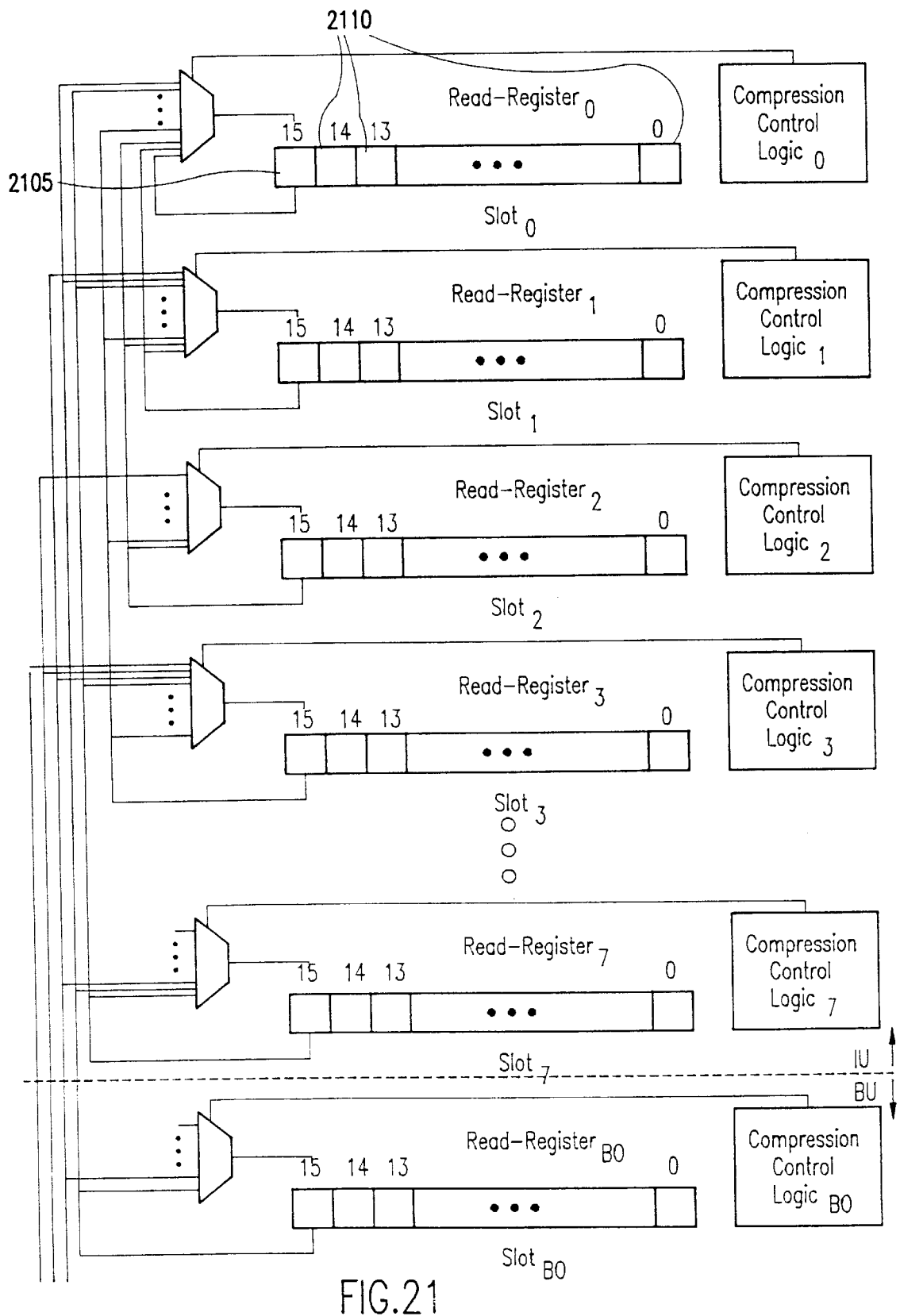
FIG. 21 shows read-vector compression logic.

I-Group$_i$ is removed by setting Valid$_i$ to 0 or transferring a new I-Group into Slot$_i$. Remaining instructions maintain their relative order as they are moved up (shifted) into empty Slots. Transfer logic for Read-Register bit 15 at 2105 is shown in FIG. 21 for a Stack size of 8. All bit positions in the Slot Registers 2110 are connected the same way. A Slot is connected to w consecutive Slots below it with w the number of instructions that can complete execution simultaneously. An I-Group must move w Slots if w I-Groups are removed simultaneously from Slots above it. I-Group transfer logic is shown in FIG. 21 with w equal to 8.

Compressed-Out and Compressed-In refer to the disposition of I-Groups during a Compression Operation. An I-Group is Compressed-Out when it is removed from the Stack. An I-Group is Compressed-In when it is transferred to a position within the Stack. Uncompleted I-Groups are Compressed-In. Criterion for compressing a completed I-Group out is discussed below.

Compression Control Logic in each Slot selects an I-Group for input during the Compression Operation. This logic is unique to each Slot, as shown in FIG. 21, and selects 1 of w+1 multiplexer inputs. A Slot is an input to itself. An I-Group is "transferred" into its present Slot if no I-Groups above it are Compressed-Out.

3.3.4 TOTAL COMPRESSION

Total Compression is discussed first. Total Compression removes all completed I-Groups from the Stack. Remaining I-Groups maintain their order as they are moved upward, filling contiguous Slots from the top of the Stack downward. I-Groups from the Buffer Unit are brought into the Stack. All transfers during the compression operation are simultaneous.

Assume w is 8. Each Slot asserts TRUE on its Compress-Out line if its I-Group should be compressed out. The generation of Compress-Out for Slot$_i$, called $C_i$, is shown in FIG. 19. $C_0$ through $C_7$ are examined by the Compression Control Logic of each Slot. Let (i→j) represent a Boolean variable that is TRUE when an I-Group in Slot$_i$ is transferred to Slot$_j$. The equations for (i→0) are:

$$(0 \to 0) = \overline{C_0}$$

$$(1 \to 0) = C_0 \wedge \overline{C_1}$$

$$(2 \to 0) = C_0 \wedge C_1 \wedge \overline{C_2}$$

$$(3 \to 0) = C_0 \wedge C_1 \wedge C_2 \wedge \overline{C_3}$$

$$(4 \to 0) = C_0 \wedge C_1 \wedge C_2 \wedge C_3 \wedge \overline{C_4}$$

$$(5 \to 0) = C_0 \wedge C_1 \wedge C_2 \wedge C_3 \wedge C_4 \wedge \overline{C_5}$$

$$(6 \to 0) = C_0 \wedge C_1 \wedge C_2 \wedge C_3 \wedge C_4 \wedge C_5 \wedge \overline{C_6}$$

$$(7 \to 0) = C_0 \wedge C_1 \wedge C_2 \wedge C_3 \wedge C_4 \wedge C_5 \wedge C_6 \wedge \overline{C_7}$$

$$(8 \to 0) = C_0 \wedge C_1 \wedge C_2 \wedge C_3 \wedge C_4 \wedge C_5 \wedge C_6 \wedge \overline{C_7}$$

Figure 22:
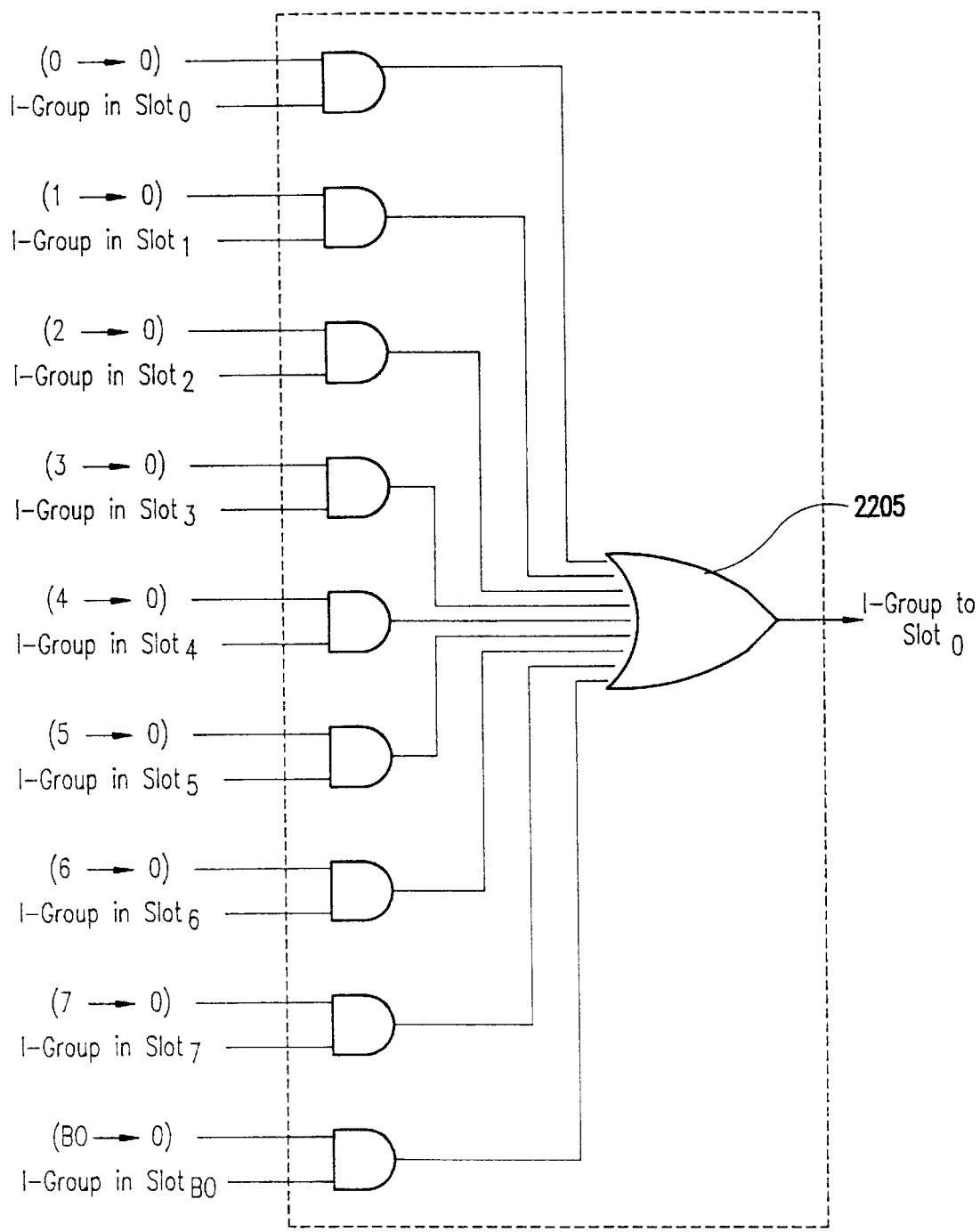
FIG. 22 shows a compression multiplexer for slot(i).

FIG. 22 shows how the transfer of I-Groups into Slot$_0$ is controlled. In general, (i→j) is TRUE if i-j I-Groups are compressed out of the i Slots above Slot$_j$. Each of the i $C_{i-j}$ combinations of Compress-Out values that produce this situation is detected in logic. The logic to detect one combination of values is the AND of i Boolean variables. Each variable is Compress-Out or its inverse from a Slot above Slot$_j$. The OR 2205 of the i $C_i$–j combinations is (i→j). Slot$_j$ generates (i→j) for all values of i less than j such that i–j is less than or equal to w, the number of Slots connected to from below.

A worst case example of the amount of logic required is the generation of (8→4) when w is 8. This requires the OR of 70 terms, $({}_8C_4)$, each term the AND of 8 Boolean variables. The OR is generated by 2 levels of 9-way OR gates and the terms by 70, 8-way AND gates for a total of 3 levels of logic. The generation of the Slot compression controls for this configuration requires about 15,000 gates.

3.3.5 TOP COMPRESSION

Top Compression removes a contiguous sequence of completed I-Groups from the top of the Stack. An I-Group is Compressed-In if an uncompleted I-Group is above it. Therefore (i→j), for i j, if I-Groups in first i–j Slots ($Slot_0$ through $Slot_{i-j-1}$) are Compressed-Out AND the I-Group in $Slot_{i-j-1}$ is Compressed-In. The special case of (i→j) is simply the NOT of $C_0$. No I-Groups move if $C_0$ is FALSE. In general, for i j, $$(i \to j) = \overline{C}_{i-j} \bigwedge_{k=0}^{i-j-1} (\wedge C_k)$$

This is one level of logic. The generation of the Slot compression controls of a Stack of size 8 with a w of 8 requires 8 AND gates. Slots share logic because all I-Groups move the same number of Slots. Top Compression uses considerably less logic than Total Compression and is faster (1 gate delay vs. 3).

3.3.6 THE DISPATCHER

The Dispatcher interfaces the FDS to the interconnection network. A Port Architecture is presented as a preferred embodiment of another aspect of my inventions. It is one way the FDS can issue instructions to Functional Units through an interconnection network.

The Dispatcher transfers instructions and Tags from the Stack to Ports that are gateways to the interconnection network. Each Port accommodates one instruction and its Tag. $Port_i$ is permanently assigned a type, Port-$Type_i$. An instruction, $q_k$, may be issued through $Port_j$ if Port-$Type_j$ equals TYPE-$VECTOR_k$. The instruction is routed by the network to a FU whose type matches that of Port-$Type_j$. Only FU's of type Port-$Type_j$ are accessible through $Port_j$.

A Port may be OPEN or CLOSED. This status is controlled by the FU's reachable from it. $Port_i$ is CLOSED if FU's accessible from it are busy. The $Port_i$ is OPEN if at least one FU accessible from it is not busy. The Dispatcher issues through OPEN Ports.

Instructions are assigned Ports based on precedence. If issuable instructions outnumber OPEN Ports of the right types, instructions are temporarily denied issue.

Figure 23:
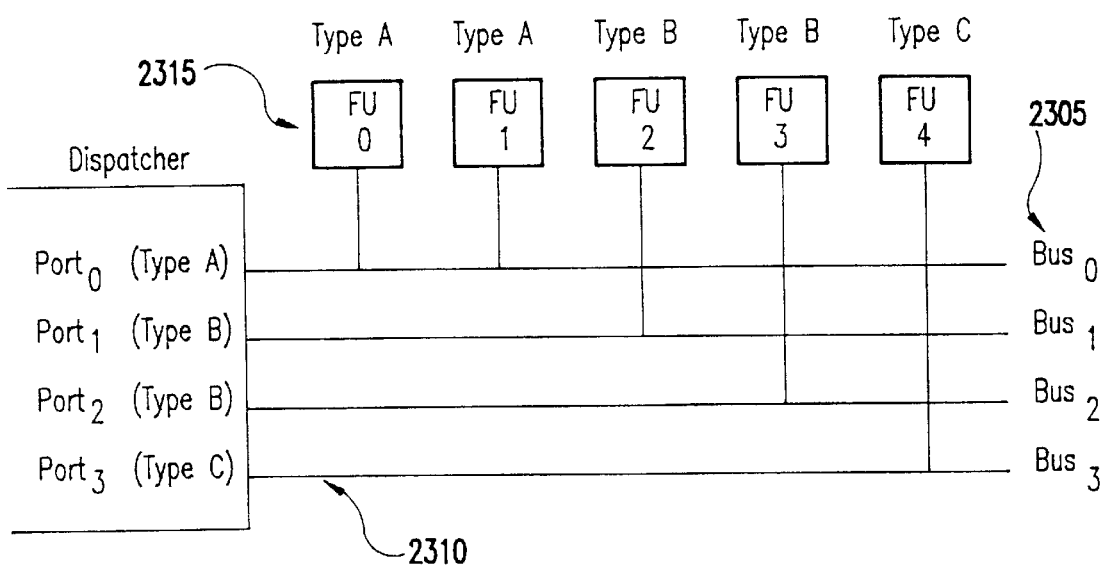
FIG. 23 shows an example port architecture with permanent port-types.

An example interconnection network that supports the above Port Architecture is shown in FIG. 23. A bus 2305 is attached to each Port 2310. A bus transfers one instruction and its Tag to an attached Functional Unit 2315. A Functional Unit may be attached to more than one bus. An FU arbitrates (if more than one FU is attached) for a bus before it completes execution. A Port is OPEN if one or more FU's are arbitrating for the attached bus. Arbitration may proceed while the IU is selecting and transferring an instruction to a Port attached to the bus.

Figure 24:
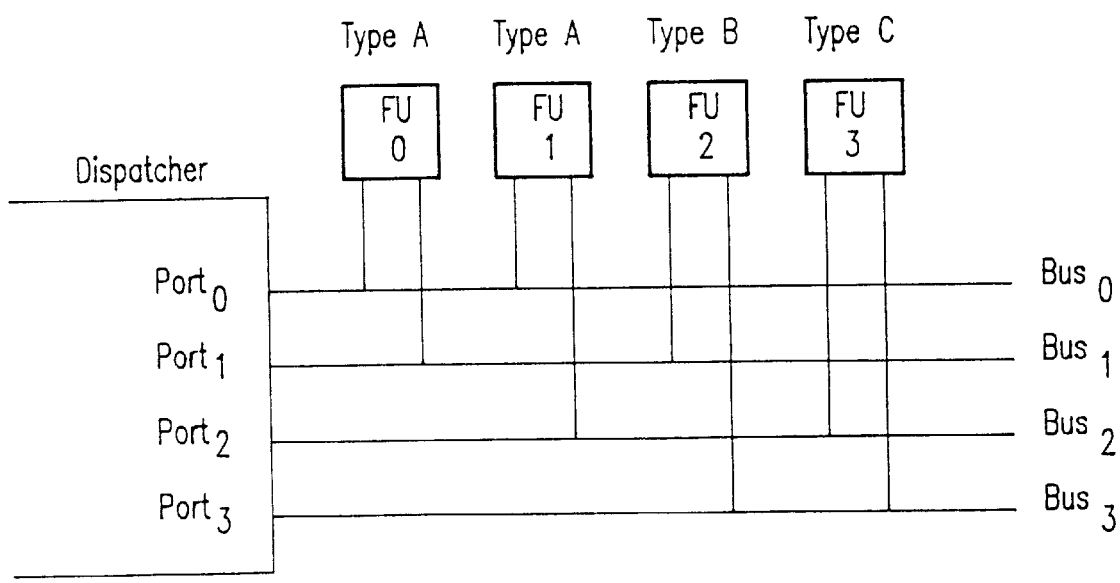
FIG. 24 shows an example port architecture with dynamic port-types.

An extension to the Port Architecture in accordance with my invention to improve bus utilization is the dynamic assignment of Port-Types to Ports on a cycle-by-cycle basis. $Port_i$ receives a status (OPEN or CLOSED) and Port-Type $_i$ (if OPEN) from the network one cycle in advance of its potential use. Dissimilar FU's share Ports and network paths. A FU is prevented by arbitration from being accessible through multiple OPEN Ports simultaneously. FIG. 24 shows an example network with dynamic Port-Types.

Figure 25:
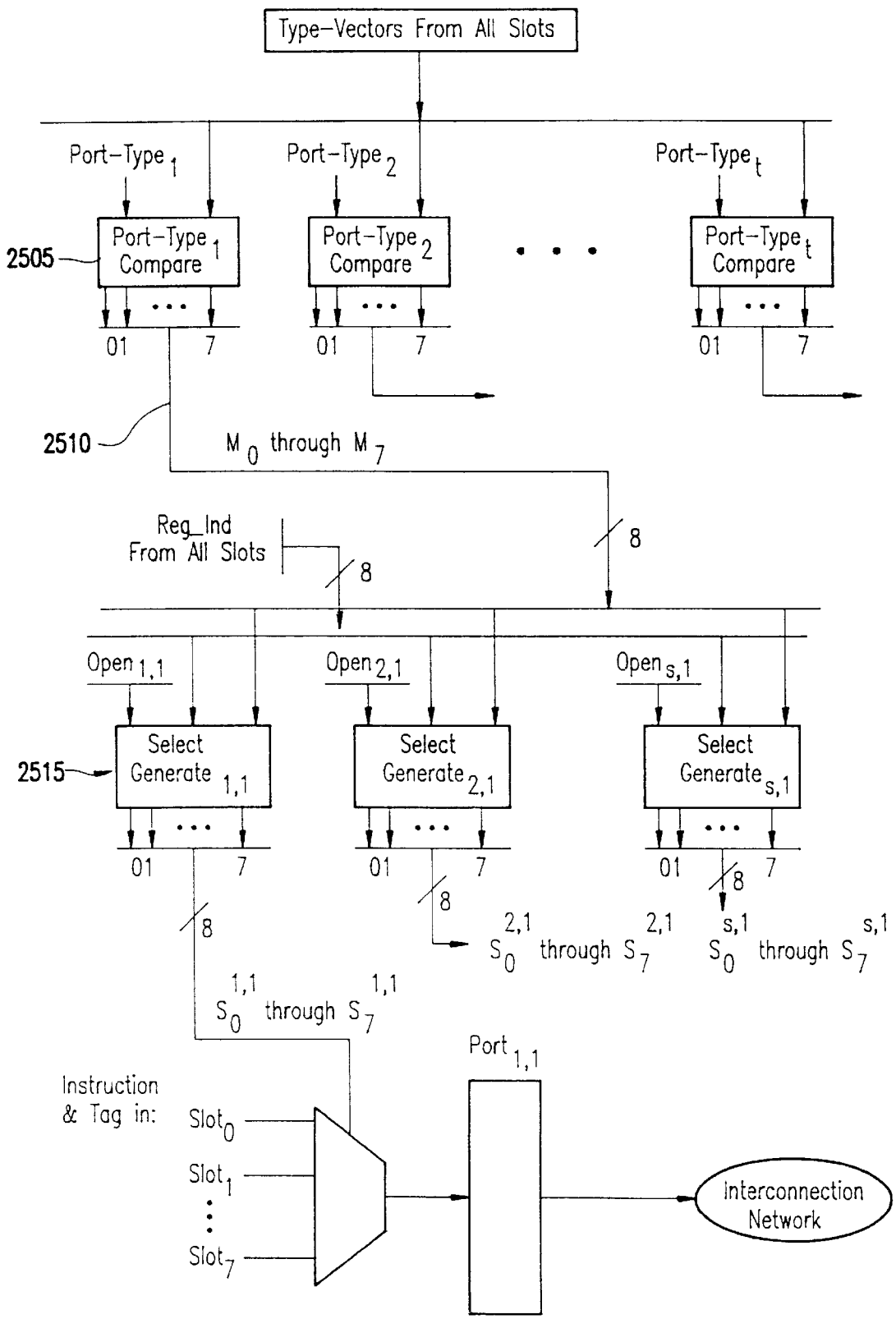
FIG. 25 shows the structure of the dispatcher.

Assume a Port Architecture with permanent Port-Types and multiple Ports of the same type. Let m be the number of Ports ($Port_1$ through $Port_M$) and the number of Port-Types (Port-$Type_1$ through Port-$Type_t$). $Port_{i,j}$ specifies $Port_i$ with Port-$Type_j$. For the purpose of discussion, assume there are s Ports of Port-$Type_1$ ($Port_{1,1}$ through $Port_{s,1}$). Therefore Port-$Type_1$ has a multiplicity of s. FIG. 25 is a block diagram of the logic controlling issuances through $Port_{1,1}$.

Port-$Type_1$ Compare logic locates Slots containing I-Group TYPE-VECTORs matching Port-$Type_1$, without regard to instruction independence. The comparison logic is similar to the Tag comparison logic in FIG. 19 and is not repeated here. The outputs of Port-$Type_1$ Compare ($M_0$ through $M_7$) 2505 are felt as inputs to the Select-Generate logic for all Ports with Port-$Type_1$ ($Port_{1,1}$ through $Ports_{s,1}$). Port-$Type_1$ Compare output $M_i$ is TRUE if the TYPE-VECTOR in $Slot_i$ matches Port-$Type_1$.

Figure 26:
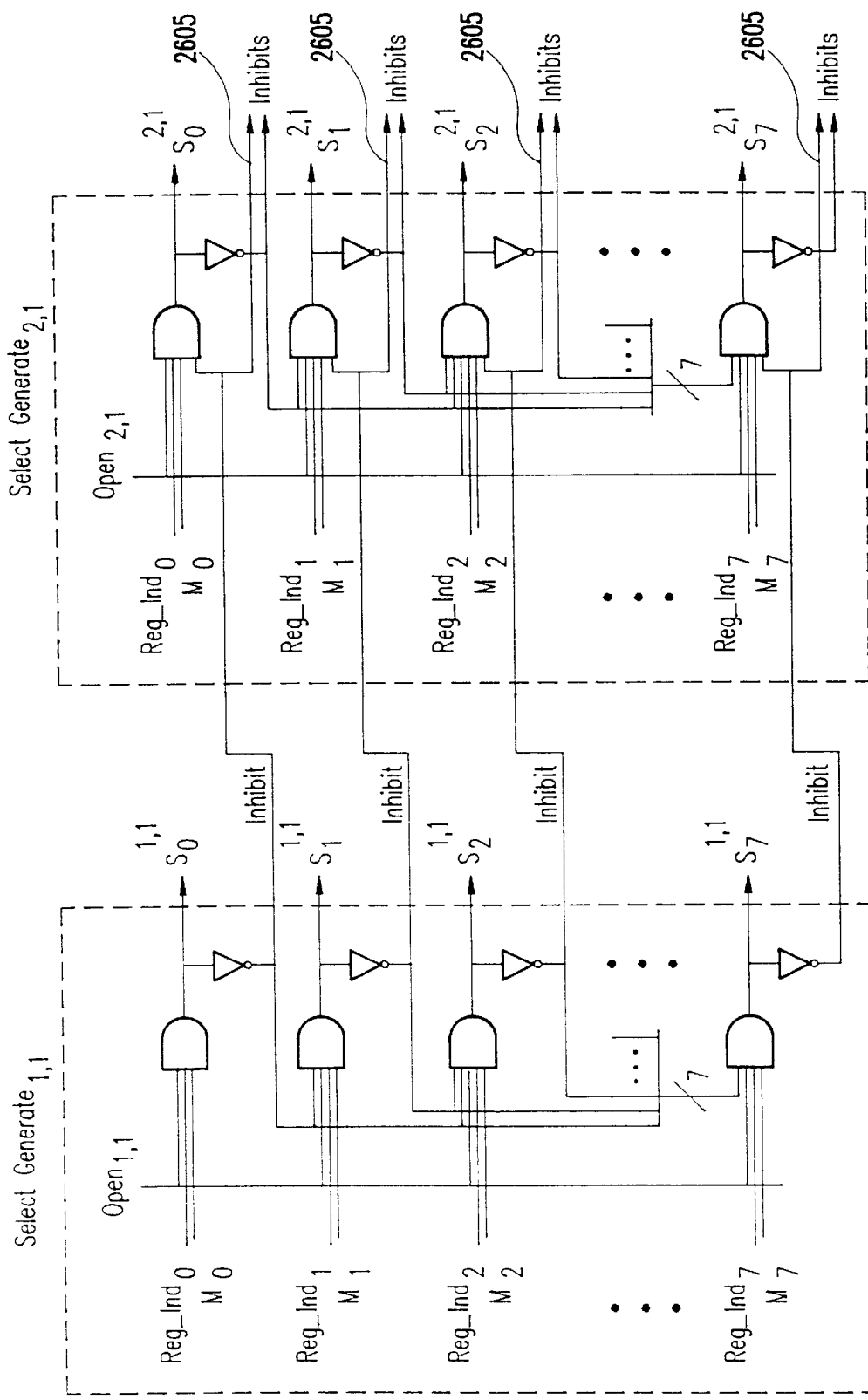
FIG. 26 shows select-generate logic.

The Select-Generate logic assigns independent instructions to OPEN Ports. Select-$Generate_{i,j}$ selects the instruction and Tag to be output through $Port_{i,j}$ if any. FIG. 26 shows the logic of Select-Generate and Select-$Generate_{2,1}$. $Open_{i,j}$ is TRUE when $Port_{i,j}$ is OPEN. Recall that Reg_$Ind_i$ (generated in FIG. 18) specifies the independence of the instruction in $Slot_i$. Select-$Generate_{1,1}$ outputs, $SO_{1,1}$ through $S7_{1,1}$ select an instruction and Tag from $Slot_0$ through $Slot_7$, respectively, for issue through $Port_{1,1}$ (shown in FIG. 25).

The independent instruction of highest precedence with a TYPE-VECTOR matching Port-$Type_1$ is issued through $Port_{1,1}$, the instruction of next highest precedence is issued through $Port_{2,1}$, and so on. Inhibit lines 2605 (FIG. 26) cascade through the Select-Generate logic blocks controlling Ports of the same Port-Type, preventing the issuance of an instruction through multiple OPEN Ports simultaneously.

When $q_i$ is issued, $Issued_i$ is set to TRUE. In addition, Read-$_i$ is reset to all 0's, immediately nullifying any register dependencies with it. It is assumed that an operand register is accessed before an instruction issued during the same cycle can write to it.

If the FU's are all one type, (instructions can be executed by any FU), the Dispatcher structure is faster and less complex. The assumption here is that the Execution Unit is composed of specialized Functional Units, such as the specialized Functional Units described herein. Such units may include the Fixed and Floating Point Functional Units like those of the RS/6000.

3.4 FDS TIMING

The FDS latches I-Groups into Stack Slots at the beginning of each machine cycle. FDS logic determines which instructions are to be issued and presents them to Ports before the end of the cycle. Concurrently, logic determines how to compress the Stack. At the end of a cycle (the beginning of the next), Ports latch issued instructions and Slots latch I-Groups selected by the compression logic. Since both must complete before the end of the cycle, the delay path limiting minimum cycle time is the longer of the compression calculation and the issue function.

Figure 27:
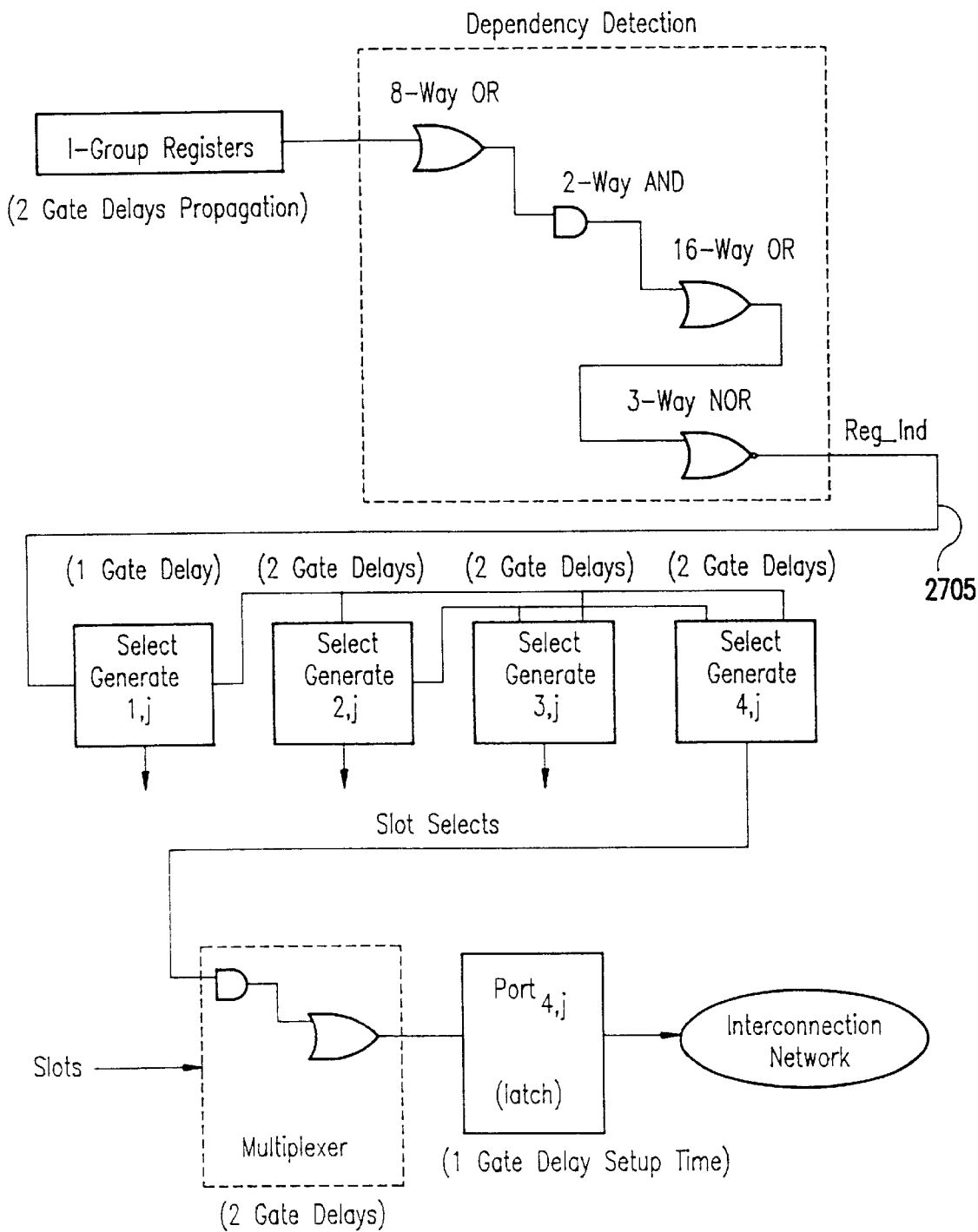
FIG. 27 shows the issue critical path.

Assume a Port-Type multiplicity of 4. FIG. 27 shows that the Issue critical path is 16 gate delays long. Register Dependency Detection is complete 6 gate delays into the cycle at 2705. The assignment of instructions to Ports takes 7 gate delays.

Figure 28:
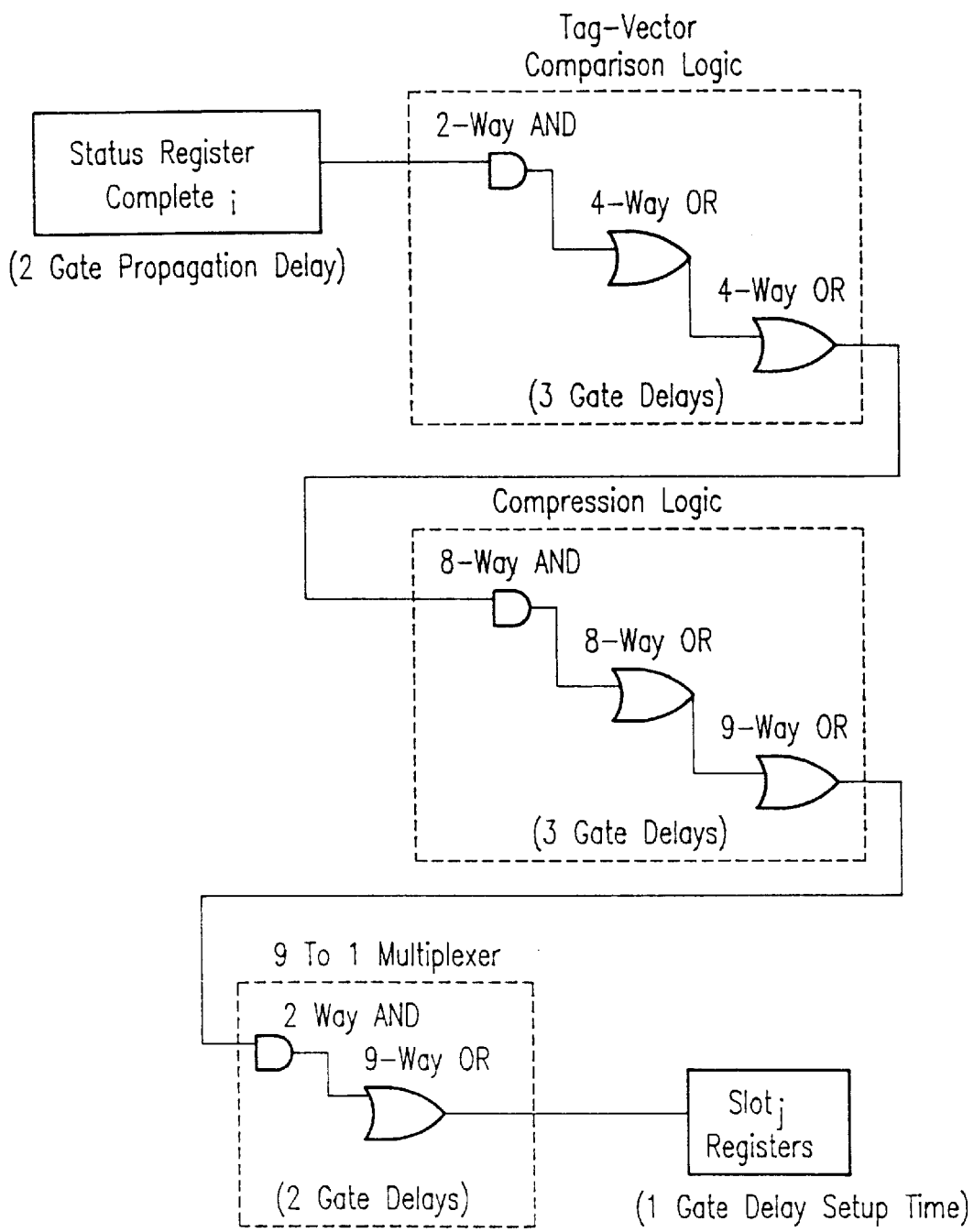
FIG. 28 shows the compression critical path.

The Compress critical path is shown in FIG. 28 to be 12 gate delays for Total Compression. Top Compression requires 10 gate delays.

Therefore the Issue critical path limits the cycle time to not less than 16 gate delays for the configuration assumed. If Port-Type multiplicity is limited to 2, the Issue critical path is 12 gate delays.

Issue Units with dynamic Port-Types experience the same minimum delays. The above Port-Type multiplicity values become the maximum number of instructions of a particular type that can be issued simultaneously.

For many machines, these cycle times are acceptable. For machines requiring shorter cycle times, a Dual Issue Unit configuration is introduced.

3.5 DUAL ISSUE UNIT

Figure 29:
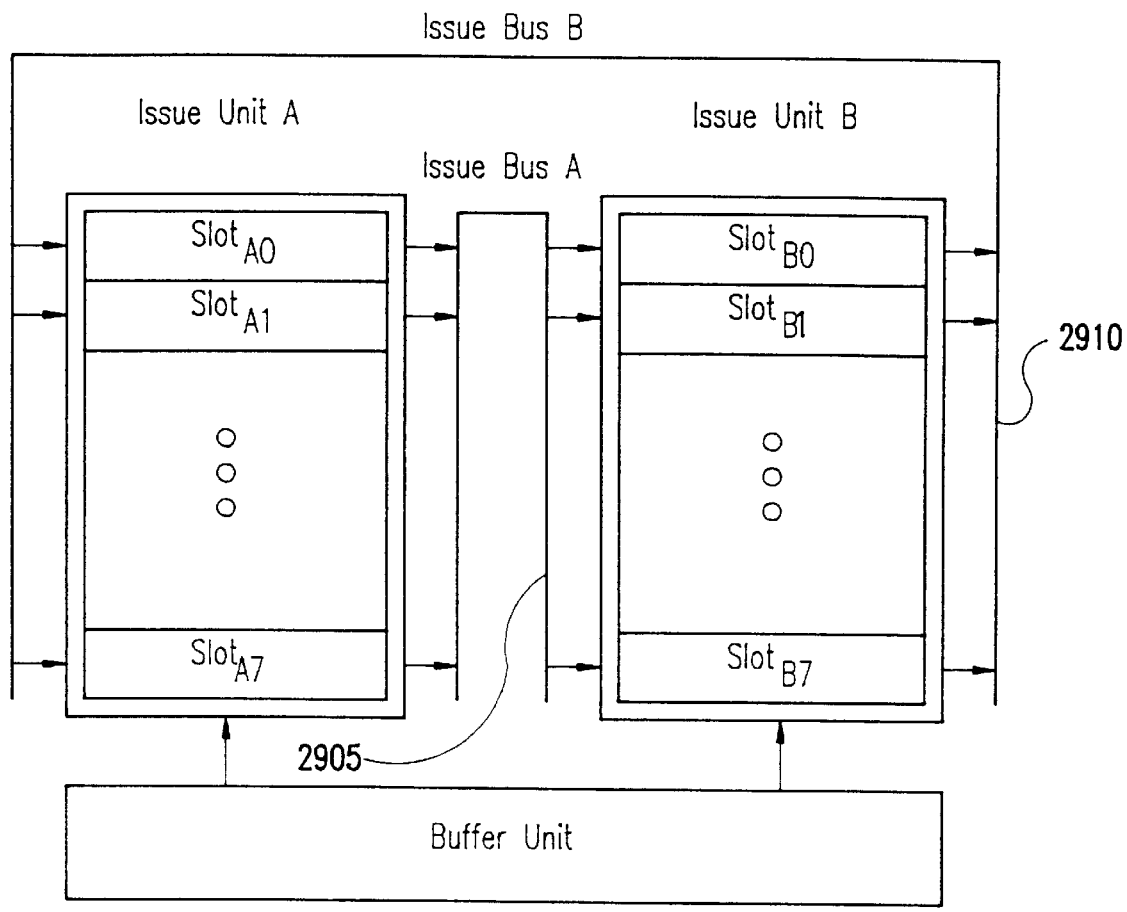
FIG. 29 shows the dual issue unit configuration.
Figure 30:
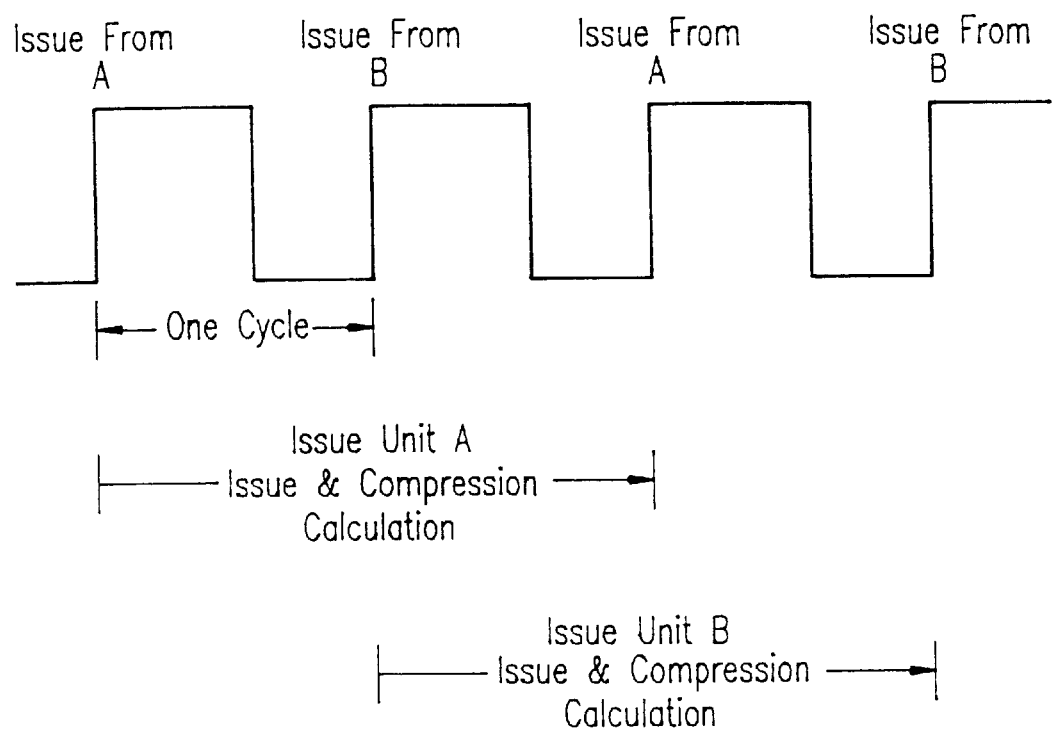
FIG. 30 shows issuances from the dual issue unit.

The Dual Issue Unit contains two Issue Units, IU-A and IU-B, as shown in FIG. 29. Instructions are issued from alternate Issue Units each machine cycle (FIG. 30). The Dispatcher of each IU has separate Ports into the network. Both IU's receive the same sequence of instructions from the Buffer Unit and monitor the same Tag Bus for completed instruction Tags. The IU's are connected by Issue Bus A 2905 and Issue Bus B 2910 to prevent the double issuance of an instruction. The Tag of an instruction issued by IU-A is placed on Issue Bus A. IU-B compares its Tags with those on Issue Bus A. The comparison logic is similar to that in FIG. 19. A match prevents the reissue of the instruction by IU-B. The Tag of an instruction issued by IU-A remains on Issue Bus A 2905 until it is returned by an FU. The instruction is then marked complete in both IU's. Similarly, Issue Bus B 2910 prevents IU-A from issuing instructions issued by IU-B. An issued but uncompleted instruction is kept in both Issue Units until completed. This ensures correct dependency detection for unissued instructions.

The critical path of the Dual Issue Unit configuration is 13 gate delays for a maximum Port-Type multiplicity of 4 and 9 gate delays for a Port-Type multiplicity of 2. The critical path of the Dual Issue Unit is in logic that prevents an Issue Unit from issuing an instruction that has been issued by the other Issue Unit at the end of the previous cycle.

3.6 REMARKS

The speed of the FDS is established. Register dependency information is represented in a manner facilitating short cycle time operation. To the extent that additional delay can be tolerated in a given system, I-Group Vectors may be encoded to save circuit area.

Pipelined and non-pipelined Functional Units are supported by the FDS. FDS operation is the same in both cases. A pipelined FU can be in various stages of the execution of multiple instructions when it returns the Tag-Vector of a completed instruction. To receive a new instruction, it declares a Port OPEN, if the Port is not shared, or arbitrates for a shared Port.

Extremely complex instructions, involving the use of multiple Write Registers or more than two Read Registers are supported by the FDS. The READ-VECTOR and WRITE-VECTOR of such an instruction contains multiple positions representing register usage set to 1 by the Buffer Unit. The Issue Unit manages the issuance of the instruction with no modifications.

SECTION 4

BRANCH AND STORAGE INSTRUCTIONS

The scheduling of Branch and Storage instructions in the FDS is the topic of this section. I/O instruction scheduling is briefly discussed. Problems that these instructions present to a multiple, possibly out-of-order, instruction execution unit are discussed and detailed solutions are presented.

4.1 ISSUES AND PROBLEMS

4.1.1 THE EXECUTION OF CONDITIONAL BRANCH INSTRUCTIONS

Most instruction sets include instructions that cause instruction execution to stop when they are encountered in the instruction stream and to begin with an instruction (target instruction) that may not be the next instruction. This action is called a control transfer and the type of instruction that causes this action is called a control-flow instruction.

Control-flow instructions include Jump and Conditional Branch instructions. These are unconditional and conditional control transfers, respectively. Jump instruction execution is described in Section 4.2.1. It is the Conditional Branch instruction that may cause a problem.

The action of a Conditional Branch instruction, $q_{CB}$, is predicated on a situation (condition) caused by the execution of one or more preceding instructions. Examples of conditions are an overflow out of a register and a result that is greater than zero. Conditional Branch instructions in different architectures test conditions using a variety of methods.

A Conditional Branch instruction may examine (test) general purpose registers (GPR) for a condition (i.e., the Motorola 88100 [Moto 90]). It may compare the contents of two registers and branch if they are equal, for example. The Conditional Branch instructions of such an architecture are termed GPR-Based. These instructions execute correctly when issued out-of-order by the FDS. The FDS detects and enforces their register dependencies as it issues instructions. Their processing in the FDS is described in more detail in Section 4.2.2.

4.1.2 DATA BANDWIDTH OF THE EXECUTION UNIT

The data bandwidth of an execution unit is the maximum rate at which storage instructions can transfer data to and from memory. It may be limited to the maximum rate at which storage instructions can be executed (storage instruction throughput) or the maximum rate at which the memory system can store and fetch data (memory bandwidth). The data bandwidth of an execution unit with multiple FUs has to meet its data requirements; otherwise its throughput will have to be constrained. FUs may idle because the issuance and the execution of instructions dependent on the data are delayed. Previous proposals supporting out-of-order memory accesses schedule at most one memory request per cycle. Thornton's Scoreboard, Tomasulo's Reservation Station system, Sohi's RUU and Hwu and Pratt's HPSm issue at most one memory request per cycle (possibly out-of-order). The scheduling of storage instructions with Torng's Dispatch Stack has not been explored. This is one of the advances that I have made, and my improvements in this regard form part of my preferred embodiment. The SIMP mechanism initiates up to 4 read and 4 write requests per cycle to a Data Cache, but the scheduling algorithm of the storage instructions is not described.

Storage instructions may have register dependencies on instructions in general and address dependencies on each other. Address dependencies are similar to register dependencies (RAW, WAR, and WAW), with memory locations rather than registers involved. The question which has now been answered is whether, the address dependencies of multiple storage instruction can be determined concurrently, and can this capability be incorporated into the FDS by a natural extension to its structure? The answer is affirmative. With my improvements even prior development may be naturally extended. But to reach this result requires detailed explanation and proof which follows.

A further preferred embodiment enhancement.

4.1.3 DEPENDENCIES ON STORAGE INSTRUCTIONS

Let the following format be used for load and store instructions using Based Addressing:

L D(R2),R1

S R1,D(R2).                                (4.1)

The address of a memory location is generated by the addition of displacement D to the contents of R2. The displacement is a literal. A Load (L) transfers the contents of the memory location to R1 and a Store (S) transfers the contents of R1 to the memory location.

The following instruction sequence illustrates some issues associated with storage instruction scheduling:

$q_i$: MULT R2, R4, R1

$q_i$+1:S R1,2(R5)

$q_i$+2:L 4(R5),R1

$q_i$+3:ADD R6,R7,R5

$q_i$+4:ADD R1,R3,R3.                      (4.2)

Assume that $q_i$ is in IU Slot 0 and is not complete. Following instructions are in contiguous Stack slots below it. Other Stack Slots are empty. Instruction $q_i$+1 has a RAW dependency on $q_i$ (R1). Instruction $q_i$+2 has a WAW dependency on $q_i$ (R1) and a WAR dependency on $q_{i+1}$ (R1). Instruction $q_{i+3}$ has WAR dependencies on $q_{i+1}$ (R5) and $q_{i+2}$ (R5). Instruction $q_{i+4}$ has RAW dependencies on $q_{i+2}$ (R1) and $q_i$ (R1). Assume the FDS can only issue a storage instruction when it is completely free of dependencies. The instructions following $q_i$ cannot issue until $q_i$ completes. Inspection of the sequence in (4.2) reveals that register dependencies do not prevent the following actions to occur. Assume the storage instructions have no address dependencies.

Action 1: Instructions $q_{i+1}$, and $q_{1+2}$ concurrently generate addresses.

Action 2: Instruction $q_{i+2}$ fetches data from memory and buffers it (prefetching). Concurrently, $q_{i+3}$ issues and executes.

Assume that Actions 1 and 2 occur before $q_i$ completes and that $q_i$ now completes. The instruction sequence completes execution with the following actions.

Action 3: Instruction $q_{i+1}$ reads R1 and writes its contents to the memory location generated in Action 1.

Action 4: Instruction $q_{i+2}$ writes prefetched data to R1, completing execution.

Action 5: Instruction $q_{i+4}$ issues and executes.

The throughput of the sequence is improved being able to perform address generation when dependencies allow and to prefetch and buffer data. The question is, can the FDS schedule storage instructions so they can generate their address and prefetch data as dependencies allow, while supporting multiple, out-of-order memory accesses. This question is investigated in this chapter.

4.1.4 SCHEDULING RESTRICTIONS ON STORAGE INSTRUCTIONS

Some architecture proposals discussed in Chapter 2 impose restrictions on the scheduling of single out-of-order memory accesses in addition to those imposed by address and register dependencies. The HPSm requires Store instructions to access memory in-order. Sohi's RUU does not execute a Load instruction following one with an unknown address. Restrictions on the ordering of memory accesses in addition to those imposed by address and register dependencies decrease throughput further. The question is, can the FDS support multiple, out-of-order, memory accesses ordered only by address and register dependencies.

4.2 BRANCH INSTRUCTIONS

The execution of Branch instructions in the FDS is described and a solution to the CC-Register problem (section 4.1.1) is developed.

4.2.1 JUMP INSTRUCTIONS

Let a Jump instruction contain a value to be added (Jump displacement) to the PC to generate the address (Jump target) of the next instruction to be executed. This is called a PC-relative Jump.

A high instruction flow rate to the Issue Unit is facilitated by executing Jump instructions immediately (in most cases) after they are fetched by the Buffer Unit. When the Buffer Unit encounters a Jump, all instructions following it are marked invalid. They are placed in the I-Group Buffer and not forwarded to the Issue Unit. Since the Buffer Unit attempts to fetch instructions every cycle, a fetch may be in progress when the Jump is detected. Instruction fetching ceases after the fetch completes. Further instruction fetching may interfere with the fetch of the Jump target by causing a cache miss or, in a virtual memory system, a page fault. As the BU computes the address of the Jump target, it examines the Jump displacement to determine if the Jump target is in the I-Group Buffer. If the target is not in the buffer, instruction fetch commences at the Jump target address. If it is, the Buffer Unit forwards the target instruction and any following instructions to the Issue Unit.

4.2.2 GPR-BASED CONDITIONAL BRANCH INSTRUCTIONS

When a GPR-Based CB instruction, $q_{cb}$, enters the Buffer Unit, instruction fetch halts and instructions following $q_{cb}$ are marked invalid. Instruction $q_{cb}$ is forwarded to the IU. Instructions following $q_{cb}$ are not forwarded. The IU issues $q_{cb}$ to the Buffer Unit for execution when register dependencies allow (possibly out-of-order). It is executed by the logic that executes a Jump instruction. If the branch is not taken, instructions following $q_{cb}$ in the I-Group Buffer are then forwarded to the IU. If the branch is taken, instruction fetch commences at the branch target address.

4.3 STORAGE INSTRUCTION EXECUTION

The throughput of a multiple and out-of-order instruction execution unit is highly dependent on data and instruction availability. Memory intensive applications are especially sensitive to the efficiency of storage access and scheduling schemes adopted. The scheduling of storage instructions is more complex than the scheduling of register-to-register instructions.

Storage instructions have the same RAW, WAR, and WAW register dependencies that register-to-register instructions have. In addition, they may have RAW, WAR, and WAW storage address dependencies with each other. Address dependencies are difficult to detect as different combinations of register contents and instruction immediate values can produce the same address.

A register-to-register architecture does not contain instructions that move data from one memory location to another. Assume that a storage instruction accesses one memory location, i.e., no instruction can read or write multiple memory locations. This assumption simplifies the detection of address dependencies among storage instructions. (If an instruction that violates this assumption must be executed in the FDS, we can require that it be executed after preceding storage instructions and before following storage instructions execute.)

An approach requiring compiler involvement is briefly discussed. Since this approach increases dependencies between instructions, it is not pursued in depth. Additionally, a hardware approach is presented that includes solutions to the storage instruction scheduling problems described above (sections 4.1.2, 4.1.3, and 4.1.4) and does not increase dependencies between instructions.

4.3.1 AN APPROACH INVOLVING THE COMPILER

Let $q_M$ be a storage instruction and all addressing modes use at least one register for address calculation. If the compiler always uses register j in the address calculation for addressing memory location k, there is an easy solution to scheduling storage references. Storage address conflicts are detected in the IU if the Buffer Unit sets position j in READ-VECTOR$_M$ and in WRITE-VECTOR$_M$ to True. Call this a pseudo-write to register j because it does not really occur. All Storage instructions accessing location k now have a pseudo-write to register j.

If $q_M$ is a Store to location k, its pseudo-write to register j causes $q_M$ to wait for previous Reads and Writes to this location to occur before its issuance. If $q_M$ is a Read of location k, the pseudo-write to register j causes $q_M$ to wait for all previous Writes to location k to occur before its issuance. An obvious drawback of this approach is that it increases register dependencies. A following instruction is prevented from issuing even if it only reads register j.

However, accesses involving arrays can use indexes that change at runtime, making it impossible for the Compiler to know in advance if two accesses are to the same memory location [Smit 89]. The compiler can insert a Conditional Branch that is not taken between these accesses which isolates ambiguous Storage references from each other. The first code sequence is forced to complete before the second begins execution. This decreases throughput.

Another drawback is that this scheme will not work if a storage instruction contains an absolute address.

4.3.2 A HARDWARE APPROACH

Figure 31:
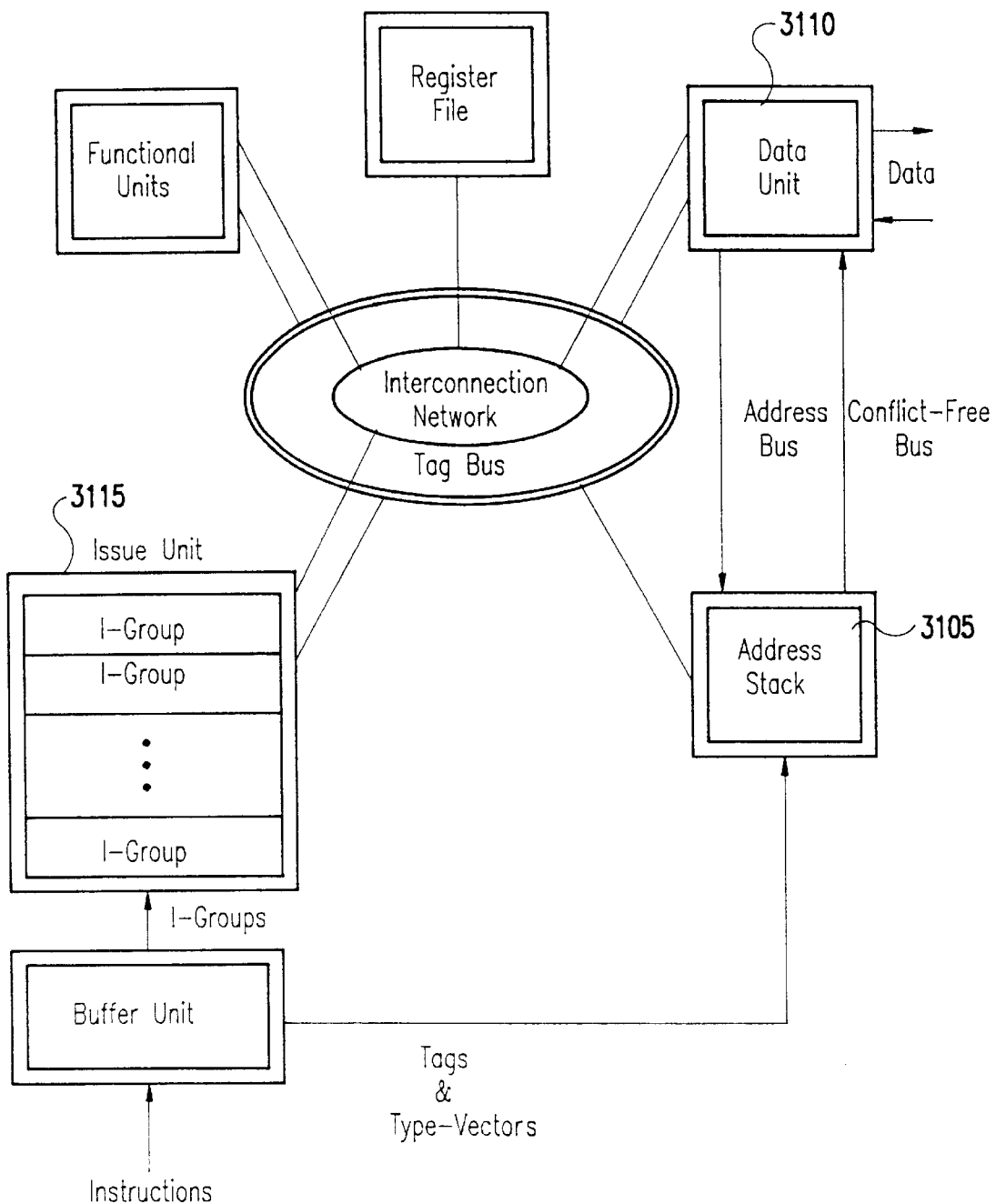
FIG. 31 shows a fast dispatch stack with the address stack and a data unit.

While the compiler approach presented in 4.3.1 produces a logically correct scheduling of storage references, it increases dependencies between instructions. We present an approach that detects dependencies with hardware at runtime and does not suffer this drawback. FIG. 31 shows the essential parts of a system that schedules storage instruction execution with hardware. The FDS architecture is augmented with out-of-order storage instruction scheduling capabilities similar to that found in the IBM 360/91 computer [Borl 67]. In addition, however, in accordance with the preferred aspects of my invention and unlike the IBM 360/91 it supports multiple, simultaneous, out-of-order requests to the storage system.

The execution of a load or store instruction is partitioned into stages that the FDS schedules as their dependencies allow.

4.3.2.1 FUNCTIONS FOR STORAGE INSTRUCTION EXECUTION

A storage instruction, $q_M$, must obtain or generate an address, the effective address, before initiating a memory access. A register containing the effective address or participating in the generation of the effective address for $q_M$ is an Address Register of $q_M$. Instruction $q_M$ uses none, one, or two Address Registers depending on its addressing mode. In Immediate Addressing Mode, $q_M$ carries the effective address and does not use an Address Register. Based addressing mode, previously described in section 4.1.3, uses one Address Register. Two Address Registers are used in indexed addressing mode. Let the following format be used for load and store instructions using indexed addressing mode:

L (R2,R3)R1

S R1, (R2,R3)                                                                              (4.3)

The effective address is the sum of the contents of registers R2 and R3. A Load (L) transfers the contents of the memory location to register R1 and a Store (S) transfers the contents of register R1 to the memory location specified by the effective address.

A register whose contents are fetched or stored by $q_M$ is a Data Register of $q_M$. Register R1 in (4.3) is the Data Register.

The Issue Unit detects register conflicts for $q_M$ as it does for non-storage instructions. In addition, the effective address of $q_M$ must be generated and checked for possible address conflicts before $q_M$ may access memory. The address generation and conflict detection functions can be provided within the IU or by external units. Incorporating them within an IU is not desirable. First, the IU often must read the register file to generate the effective addresses of multiple storage instructions. This increases the bandwidth requirement of the IU and may become a bottleneck as the IU tries to issue multiple instructions each cycle when dependencies allow. Second, incorporating address generation logic into every slot results in poor logic utilization and a large IU. On the other hand, centralizing this function increases its utilization but results in a complex IU whose cycle time may have to be increased. Data is transferred to the logic providing this function and addresses are returned to I-Groups as they move upward in the Stack. These transfers require data paths and routing logic. Third, address comparison logic is needed in every Slot, also increasing the IU's size and complexity. Finally, the addresses must be issued with the storage instructions. Addresses are relatively large and further increase the bandwidth requirements of the IU. For these reasons address generation and conflict detection functions are not located in the IU. This, however, should be reconsidered for systems containing an IU with a small number of Slots.

4.3.2.2 STORAGE INSTRUCTION EXECUTION IN THE FDS

In the proposed scheme, the address conflict detection and address generation functions are provided by two units that augment the FDS system; the Address Stack 3105 and the Data Unit 3110. The IU 3115 is responsible for detecting register dependencies, the Address Stack address dependencies. And one or more Data Units generate addresses and access memory and registers.

4.3.2.2.1 GENERAL OPERATION OF THE ADDRESS STACK

The Address Stack detects effective address conflicts among multiple storage instructions. This capability is necessary for concurrent memory accesses.

The Address Stack is a linear array of n Slots with A-Slot$_0$ at the top. There is a one-to-one correspondence between IU Stack Slots and Address Stack Slots based on slot position. A-Slot$_i$ contains the effective address, address conflict, and memory access status information on the instruction in IU Slot$_i$. When the BU transfers I-Group$_k$ to IU Stack Slot$_j$, a copy of Tag$_k$ and TYPE-VECTOR$_k$ is transferred to A-Slot$_j$. Information on the same instruction is stored in identical slot positions in the IU Stack and the Address Stack. This correspondence is maintained with simultaneous compression operations in both stacks.

A Data Unit generates and inserts the effective address of storage instruction, $q_M$, into the slot containing a copy of its Tag, Tag$_M$. Data Unit operation is discussed below. The effective address of $q_M$ is compared with that of preceding storage instructions whose memory accesses are not complete. The effective address of a preceding storage instruction may not have been generated yet. Such an unknown address may cause a conflict. The tag of an address conflict free storage instruction is asserted and maintained on the Conflict-Free Bus until its memory access is complete.

A store instruction is address conflict free if the effective addresses of preceding uncompleted load and store instructions are known and different from its effective address. A load instruction is address conflict free if the effective addresses of preceding uncompleted store instructions are known and different from its effective address. The Conflict-Free Bus is identical to the Tag Bus, simultaneously accommodating multiple tags. One or more Data Units monitor this bus to obtain simultaneous address conflict information on multiple storage instructions. Details of the Address Stack architecture are presented in Section 4.3.2.5.

4.3.2.2.2 GENERAL OPERATION OF THE DATA UNIT

A Data Unit generates effective addresses, accesses the register file, and performs memory accesses requested by the IU and approved by the Address Stack. It may temporarily buffer the transfer of data between Memory and the Register File to release dependencies of following instructions on storage instructions and to prefetch data. The FDS system contains one or more Data Units. A system with one Data Unit can initiate at most one, possibly out-of-order, memory access each cycle.

Figure 32:
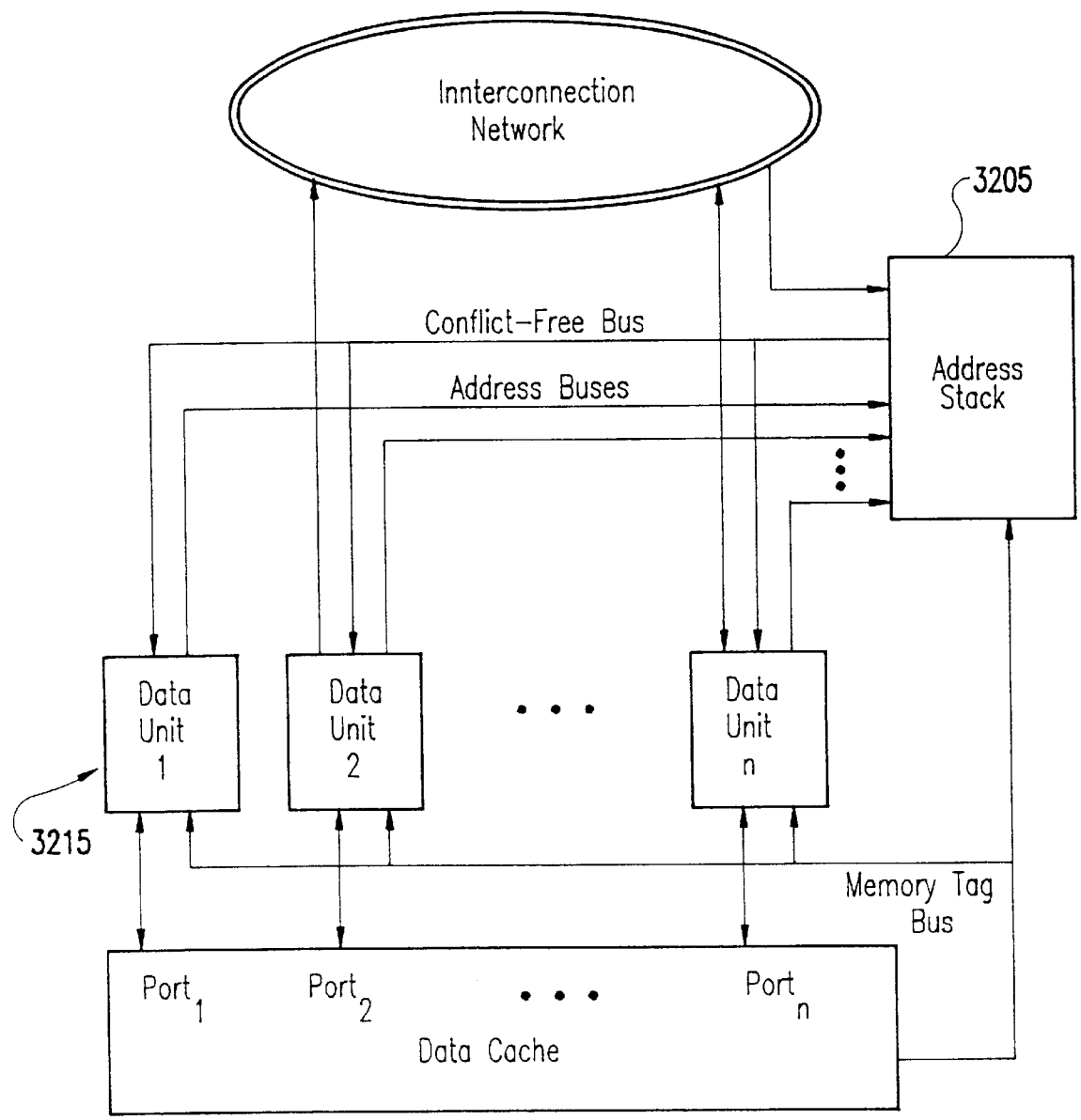
FIG. 32 shows the address stack and data cache with n data units.

Each Data Unit inserts addresses into the Address Stack and monitors the Conflict-Free Bus for the tags of instructions that are address conflict free. Each Data Unit has a dedicated connection (Port) to the Data Cache. The status of each Data Cache Port is controlled by the Data Cache and may be OPEN or CLOSED. A Data Unit may initiate one memory access via its Port (if OPEN) each cycle. The Data Cache receives memory access requests from the Data Units. A request contains the following: an operation (load or store), an address, data, if the operation is a store, and the tag of the storage instruction that the access is for. This tag identifies a memory access request in the memory system. The tags of completed memory access requests are placed on the Memory Tag Bus by the Data Cache. The Address Stack and Data Units detect memory access completions by monitoring this bus. FIG. 32 shows the Address Stack 3205 and the Data Cache 3210 with multiple Data Units 3215.

4.3.2.3 DETAILED OPERATION OF THE DATA UNIT

The IU issues a storage instruction to a Data Unit and then provides the Data Unit with register conflict information on the instruction. Based on this information and address conflict information from the Address Stack, the Data Unit executes the storage instruction in phases, informing the IU when to release dependencies on the instruction by eliminating register use representations in its I-Group. Modifications to the Issue Unit, that are necessary to support the issuance and execution of storage instructions in phases, are presented in Section 4.3.2.4. These modifications enable the IU to identify a register conflict of a storage instruction as an Address Register conflict or a Data Register conflict. This capability is-the basis for the processing of a storage instruction in phases. The processing of a storage instruction by a Data Unit is now described in more detail.

4.3.2.3.1 THE EXECUTION OF STORAGE INSTRUCTIONS IN PHASES

Figure 35:
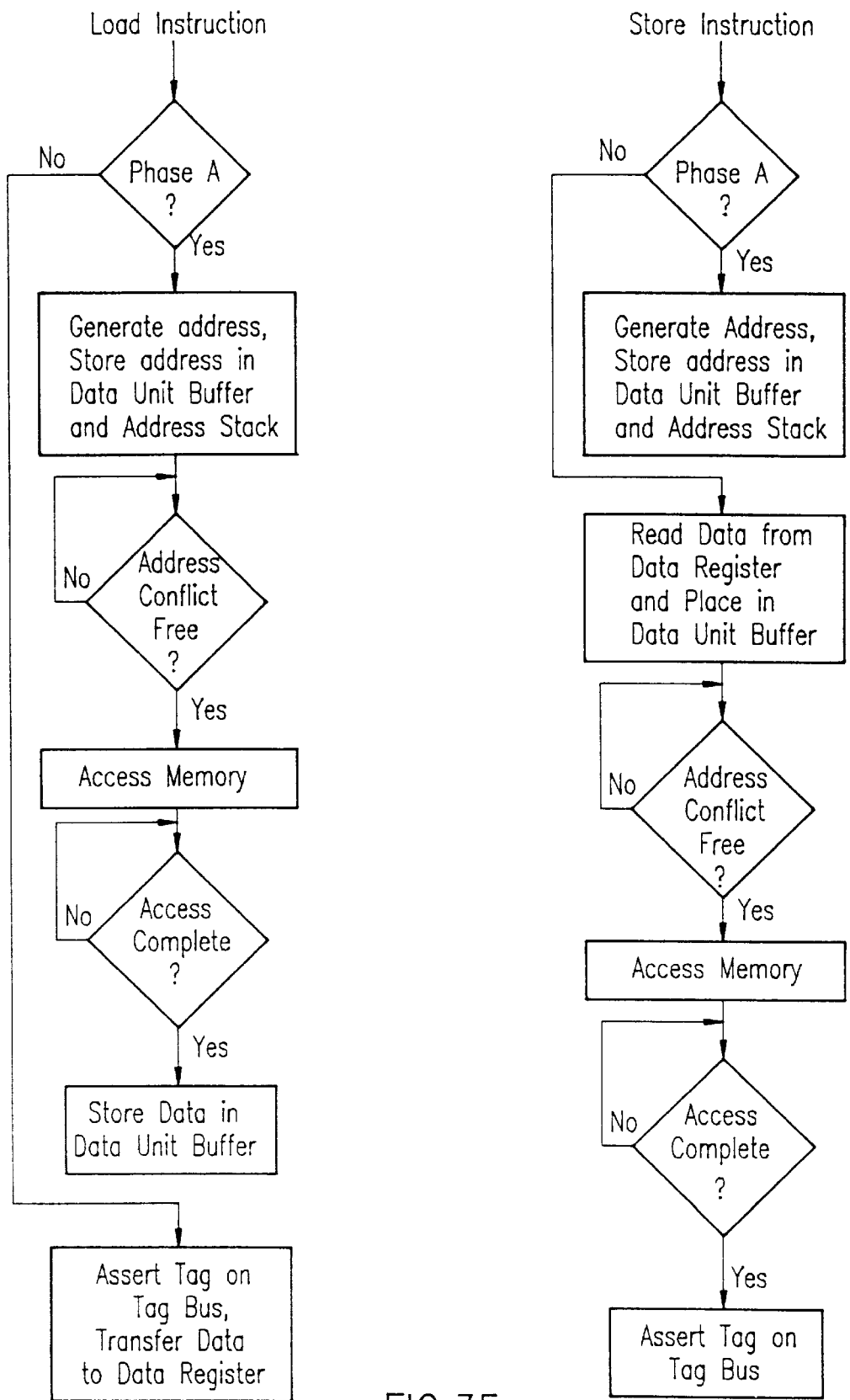
FIG. 35 shows the flowcharts of data unit operations.

Storage instruction $q_M$ is issued by the Issue Unit to and executed in an available Data Unit. Execution proceeds in the Data Unit in two sequential phases (Phase-A and Phase-B) that are initiated by the IU. These phases are shown in FIGS. 33 and 34 for a load and a store instruction respectively. Phase-A is initiated by the issuance of $q_M$ to an available Data Unit when the IU determines that its Address Registers have no conflicts (Issue-A). A Data Unit receiving $q_M$ knows that its Address Registers may be accessed. Phase-B is initiated by the issuance of $q_M$'s tag, Tag$_M$, when its Data Register has no conflicts (Issue-B) and Issue-A has occurred. The instruction $q_M$ is not issued by the IU in Phase B; Tag$_M$ is issued. The Data Unit was given $q_M$ when $q_M$ entered Phase A and does not need it again. In addition, the IU does not know which Data Unit has $q_M$. Data Units monitor the Tag Bus during a specified part of a machine cycle for the tags of instructions entering Phase-B. When a Tag in the Data Unit matches one on the Tag Bus at this time, the Data Unit knows that it may access the data register of the corresponding instruction. The actions of a Data Unit executing an instruction in Phase A and then in Phase B are now described in more detail. A summary is shown in Table 4.1 and flow charts for load and store instructions are given in FIG. 35.

4.3.2.3.2 PHASE A

Data Units receive storage instructions through Dispatcher Ports in the Issue Unit. A Data Unit that is not busy causes a Port of the Port-Type Data Unit to be declared OPEN. The IU issues an instruction entering Phase-A through the Port. The IU does not know which Data Unit accepted a storage instruction for execution.

In Phase-A, the Data Unit accesses $q_M$'s address registers and generates its effective address. The Data Unit inserts the effective address into the Address Stack. One cycle later, the Conflict-Free Bus contains Tag$_M$ if $q_M$ is address conflict free. These operations are identical for load and store instructions.

If $q_M$ is a load instruction with no address conflicts, the Data Unit initiates a fetch. An address conflict delays the fetch until it is resolved. Therefore a fetch may initiate before $q_M$'s Data Register is conflict free (i.e., before $q_M$ enters Phase-B).

4.3.2.3.3 PHASE B

When $q_M$ enters Phase-B, the Data Unit may access its Data Register. Phase-A actions (i.e., the fetch for a load instruction) may not be complete when $q_M$ enters Phase-B. The memory access of a load instruction may have been delayed due to an address conflict or a busy memory.

If $q_M$ is a load in Phase-B, its Data Register is written when data is available. $Tag_M$ is returned to the IU when the Data Register access is eminent (i.e., it will complete before another instruction can access it).

If $q_M$ is a store in Phase-B, its Data Register is read and a memory write is initiated when $q_M$ has no address conflicts. $Tag_M$ is returned to the IU when the write is complete.

4.3.2.3.4 DATA BUFFERING BY THE DATA UNIT

The Data Unit buffers data from memory that cannot be written to a Data Register due to a register conflict. This happens when a load instruction's memory access is complete but the load instruction has not yet entered Phase-B. Recall that a load enters Phase-B when its data registers are conflict free. The data buffering capability enables the access to complete while waiting for a data register conflict to be resolved.

Data that can not be written to memory due to an address conflict is also buffered. This may occur in Phase-B of a store. It enables dependencies on the data register of the store to be released before the write to memory can be initiated.

4.3.2.3.5 SPECIAL CASES INVOLVING ADDRESS CONFLICT DETECTION

As stated above, the Address Stack requires one cycle to determine if an address is conflict free. A storage instruction with no register dependencies is therefore delayed one cycle while its address is checked. This one cycle delay is eliminated under some conditions. The Address Stack may indicate that an instruction is address conflict free before it knows its address. A load instruction with only load instructions preceding it in the Address Stack can have no address conflicts. A store instruction with no preceding incomplete storage instructions in the Address Stack can have no conflicts. In these cases, the memory access of a storage instruction may initiate immediately after address generation because a copy of its tag is already on the Conflict-Free Bus. Recall that the Address Stack continuously places the tags of address conflict free storage instructions on the Conflict-Free Bus without a request being required.

4.3.2.3.6 MEMORY SYSTEM ARCHITECTURE IMPLICATIONS

A storage instruction remains in the IU until its memory access has successfully completed. A store instruction, $q_{M1}$, completes when its Tag is returned from memory on the Memory Tag Bus signifying a successful access. (A load instruction completes when its data register is written.)

Assume for a moment that $q_{M1}$ is removed from the IU and Address Stack when the memory request is made. A second storage instruction, $q_{M2}$, that has an address conflict with $q_{M1}$ (unknown to the Address Stack with $q_{M1}$ removed) generates a memory request. Assume the write to the memory array by $q_{M1}$ is not complete (a cache miss perhaps). There are two requests in the memory system with address conflicts. The memory system must process accesses in request order to maintain the logic of the program. This is inefficient in a large storage system.

Instruction completion based on access completion ensures that accesses processed by the memory system are address independent. The memory system may perform memory accesses out of request order. Interleaved memory utilization is improved and other efficiencies are realized.

4.3.2.4 MODIFICATIONS TO THE ISSUE UNIT STRUCTURE

The Issue Unit must discern between Address Register and Data Register representations and to detect conflicts separately with each to know when to issue a store instruction into Phase A and Phase B. A store instruction with register 2 as an address register and register 4 as a data register will have both elements set True in its READ-VECTOR. There is no way for the IU to discern how a register represented by a True element is used. The question is, can the IU be modified to detect the address and data register representations and conflicts of a store instruction. This is answered in the affirmative in this section. Two alternatives are presented.

A modification common to both alternatives is first presented. The IU must detect the phase a storage instruction is in. This prevents re-issue into a phase and enables Phase-B to be entered only after Phase-A has started. The $Issued_i$ element in $Status_i$ of $I-Group_i$ is replaced by two elements, $Issued-A_i$ and $Issued-B_i$. The appropriate Issue bits are set when a storage instruction enters Phase A and Phase B. Non-storage instructions use the $Issued-B_i$ element only.

The IU must discriminate between an address register, $R_{Addr}$, and a data register, $R_{Data}$ of a store instruction, $q_s$. This is necessary in order to delete the representation for $R_{Addr}$ from $I-Group_s$ upon Issue-A of $q_s$, relieving following instructions from possible dependencies on $R_{Addr}$. The IU cannot discriminate between representations of $R_{Addr}$ and $R_{Data}$ when both are in $READ-VECTOR_s$. The IU does not have this problem with a load instruction, $q_1$, since $R_{Addr}$ is represented in $READ-VECTOR_1$ and $R_{Data}$ in $WRITE-VECTOR_1$. We now present two schemes that provide the IU with the ability to discriminate between $R_{Addr}$ and $R_{Data}$ representations in a store instruction's I-Group. In addition, the logic that processes conflicts with these registers is presented.

4.3.2.4.1 ALTERNATIVE 1

When $q_s$ enters the Buffer Unit, $R_{Data}$ is represented in WRITE-VECTOR, and $R_{Addr}$ is represented in $READ-VECTOR_s$. When $q_L$ enters the Buffer Unit, $R_{Data}$ is represented in $WRITE-VECTOR_L$ and $R_{Addr}$ is represented in $READ-VECTOR_L$. Given these representations, the logic in a slot, slots, must ensure proper dependency detection during all phases of a storage instruction's execution. Consider the following.

Case 1: Store instruction $q_s$ is in $slot_i$. $R_{Data}$ (because it is read by $q_s$) can not have WAR or WAW conflicts with preceding instructions but can have a RAW conflict with a preceding instruction. Registers represented in slots below $Slot_i$ can have a WAR conflict with $R_{Data}$ but cannot have RAW or WAW conflicts with it. Instruction $q_s$ may enter Phase-A with $R_{Data}$ in conflict because only $R_{Addr}$ is read in Phase-A.

Case 2: Load instruction $q_L$ is in $slot_i$. Instruction $q_L$ may enter Phase-A with a conflict on $R_{Data}$ (only $R_{Addr}$ is read in Phase-A).

The logic performing these functions increases the minimum cycle time of the FDS by 2-gate delays compared to that of the system presented in Section 3. FIG. 36(a) shows an IU slot before the addition of this logic and FIG. 36(b) after. The details of the functions performed by the blocks of logic 3605 shown in FIG. 36(b) are now presented.

The logic in slot$_i$ controls the detection of vector elements in Read-Register$_i$ and Write-Register$_i$ by the dependency detection logic in slot$_i$ and in slots below slot$_i$. The detection of register representations in READ-VECTOR$_i$ and WRITE-VECTOR$_i$ of storage instruction, $q_i$, is dependent on $q_i$'s phase, whether $q_i$ is a load or a store instruction, and where the detection is taking place: in slot$_i$ or in a slot below slot$_i$. The detection of register representations are shown in FIG. 37 for a load and a store instruction during each phase of its execution. The actual contents of the Read-Register and the Write-Register are shown as well as what is seen by conflict detection logic in the slot occupied by the instruction and in slots below it. The detection of register representations is now discussed in detail.

Before Issue-A, an element representing $R_{Data}$ is not detected by the conflict detection logic in slot$_i$, enabling the instruction to enter Phase-A with a data register conflict. The element representing $R_{Data}$ is detected by conflict logic in slots below slot$_i$ however. To conflict detection logic below slot$_i$ $R_{Data}$ appears to be read if $q_i$ is a store instruction and written if $q_i$ is a load instruction.

After Issue-A, representations of $R_{Addr}$ are deleted from Read-Register$_i$. An element representing $R_{DATA}$ is now detected by the conflict detection in Slot$_i$. Phase-B is not entered by a load or store instruction if $R_{Data}$ is in conflict. The logic that performs these functions is now presented in detail.

Figure 38:
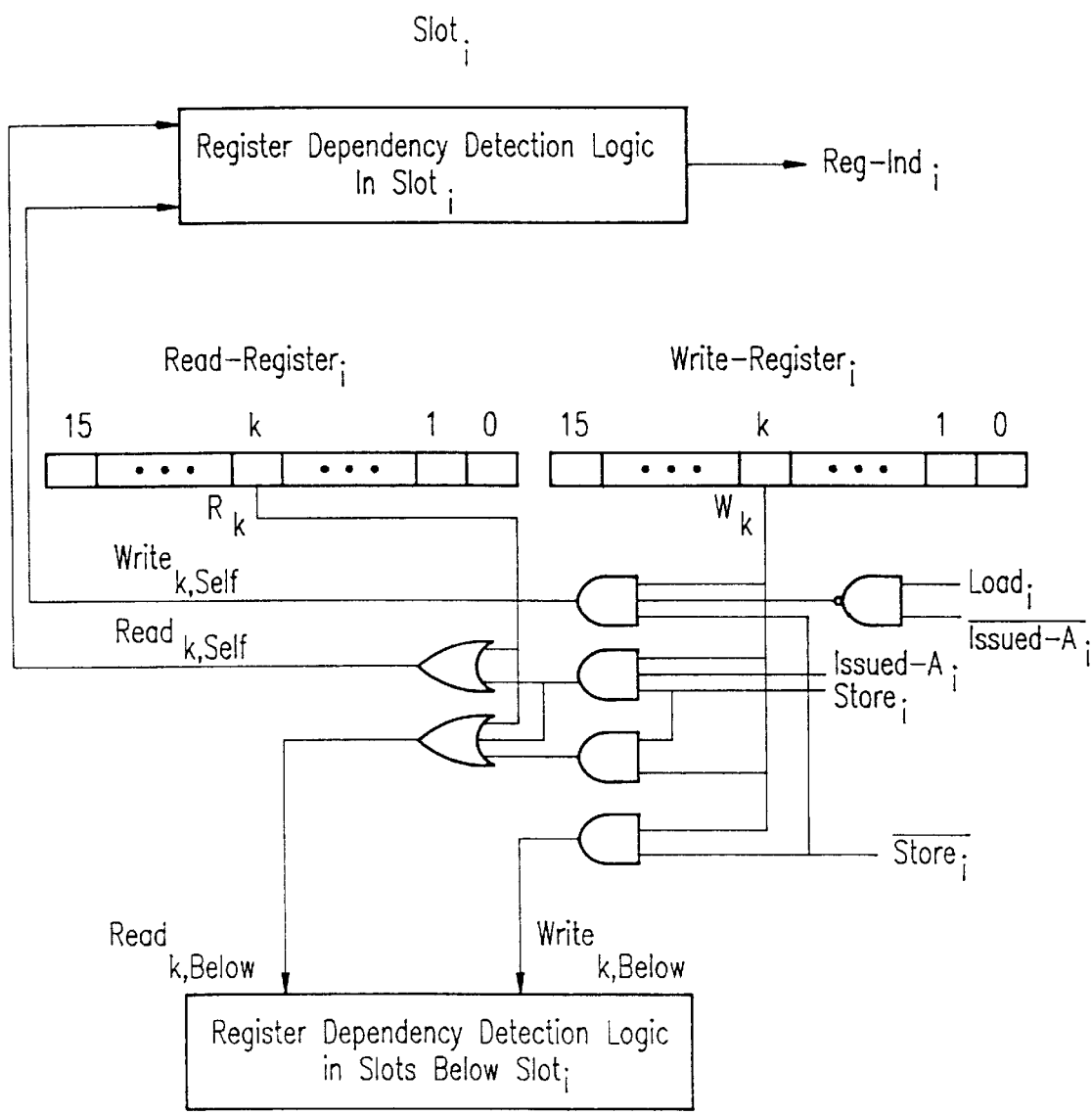
FIG. 38 shows slot logic for alternative 1.

FIG. 38 shows the logic that are represented as boxes in FIG. 36(b). This logic develops the value of an element, k, in Read-Register$_i$ into two signals, one for use by the dependency detection logic in slot$_i$, Read$_k$,Self, and one for use in the slots below Slot$_i$, Read$_k$, Below. Read$_k$, SELF and Read$_k$, BELOW are True if the $k_{th}$ element of Read-Register$_i$, $R_k$, is True. When slot$_i$ contains $q_s$, Read$_k$, BELOW is the OR of the k$^{th}$ element of Write-Register$_i$, W$_k$, and R$_k$. Slots below slot$_i$, see R$_{Data}$ (actually represented in Write-Register$_i$) represented in Read-Register$_i$.

Write$_k$, SELF and Write$_k$, BELOW are connected to the conflict detection logic in Slot$_i$ and slots below slot$_i$ respectively. When the instruction in slot$_i$ is not a store, Write$_k$, SELF and Write$_k$, BELOW assume the value of element W$_k$. The operation of the logic in FIG. 38 is now described for two cases: when a store instruction is in slot$_i$ and when a load instruction is in slot$_i$.

Case 1: Store instruction $q_s$ is in slot$_i$. Assume Phase A has not been entered. Since $q_s$ does not write to any registers, Write$_k$, SELF and Write$_k$, BELOW are False regardless of the value of W$_k$. If $q_s$ has not entered Phase A, Issued-A$_i$ is False; preventing the value of W$_k$ from being felt on Read$_k$, SELF. Therefore, a conflict with a data register (represented in Write-Register$_i$) does not prevent Issue-A. W$_k$ is felt on Read$_k$, BELOW, ensuring that instructions in slots below do not write to R$_{Data}$.

Assume $q_s$ enters Phase-A. The register representations in Read-Register$_i$ (address registers) are now deleted. Issue-A$_i$ becomes True. W$_k$ is now felt on Read$_k$, Self. Read$_k$, Self is used by slot$_i$ to detect possible conflicts with R$_{Data}$ represented in Write-Register$_i$. Phase-B is entered if R$_{Data}$ has no conflicts. The representation of R$_{Data}$ in Write-Register$_i$ is deleted when Phase B is entered.

Case 2: Load instruction $q_L$ is in slot$_i$. Assume Phase A has not been entered. Load$_i$ is True. Issued-A$_i$ is False, preventing R$_{Data}$ represented in Write-Register$_i$ from causing a conflict. Phase A is entered when $q_L$ has no address register conflicts. Assume Phase A is now entered. Issued-A$_i$ becomes True. Conflicts with R$_{Data}$ now inhibit Issue-B.

4.3.2.4.1 Alternative 2

Complications arise in Alternative 1 because a store instruction's data register, which is read, is represented in its WRITE-VECTOR. An approach is now presented that is logically less complex but requires more circuits.

In this approach, an additional READ-REGISTER is incorporated into every slot and an additional Read-Vector into every I-Group. The address registers of a store instruction are represented in one READ-VECTOR while the Data Register is represented in the other.

Figure 39:
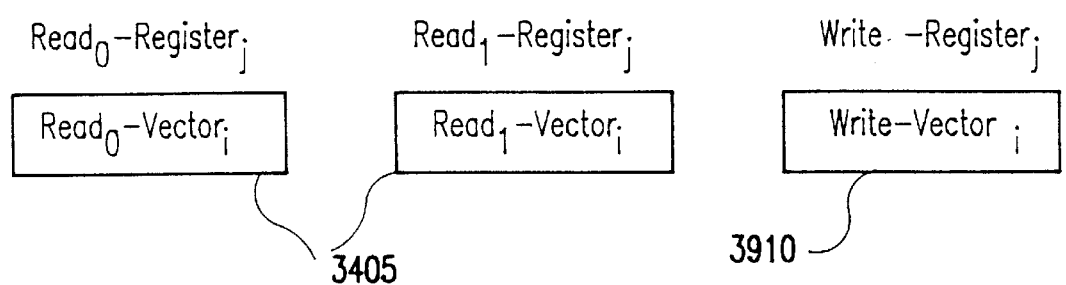
FIG. 39 shows slot(j) read and write registers with SLOTj I-GROUP I-.

The Read-Register is replaced by two registers, the Read$_0$-Register and the Read$_1$-Register. The Buffer Unit generates a READ-VECTOR for each of the two registers read by a register-to-register instruction, Read$_0$-Vector and Read$_1$-Vector. FIG. 39 shows the Read 3905 and Write 3910 Registers of Slot$_j$ when occupied by I-Group$_i$. When the Buffer Unit encounters a store instruction, the address registers are represented in Read$_0$-Vector and the data register in Read$_1$-Vector. The IU deletes Read$_0$-Vector from Read$_0$-Register when a Store instruction enters Phase A.

Logic prevents a data register conflict from being detected before Issue-A of store and load instructions. This logic is not complex (not shown) and adds one gate delay to the critical path. While consuming more circuits than Alternative 1, Alternative 2 is one gate delay faster.

4.3.2.5 The Architecture of the Address Stack

Figure 40:
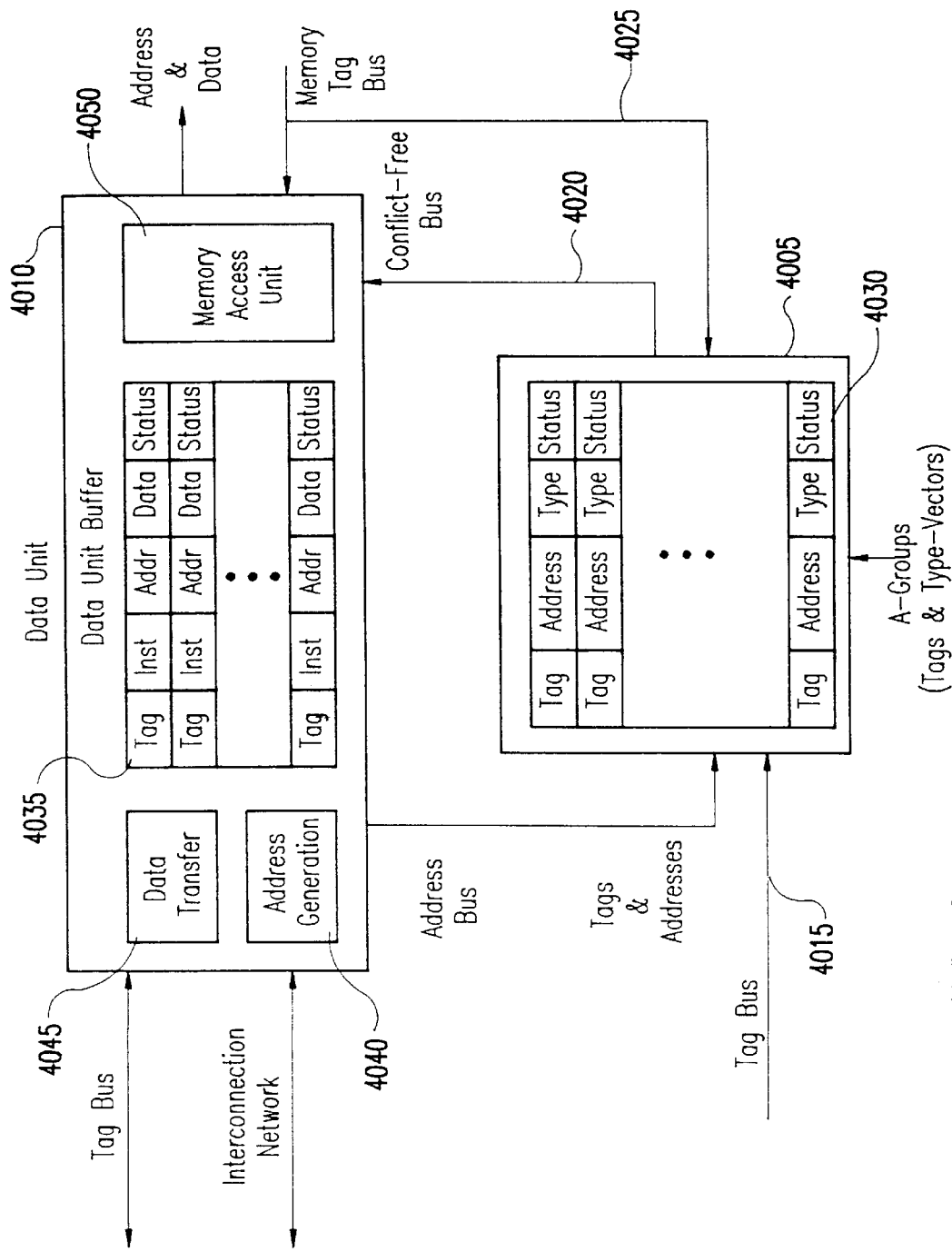
FIG. 40 shows a data unit and the address stack.

The high-level architecture of the Address Stack is described. The Address Stack 4005 together with a Data Unit 4010 is shown in FIG. 40. In addition, an alternative Address Stack architecture is briefly presented that uses fewer slots.

The Address Stack is a linear array of n Slots with A-Slot$_0$ at the top. There is a one-to-one correspondence between Address Stack slots and IU stack slots based on position. An A-Slot consists of registers that hold an A-Group. Address Stack Slots store A-Groups as IU Stack Slots store I-Groups. I-Group$_j$ and A-Group$_j$ contain information generated in the Buffer Unit from $q_j$. A-Group$_j$ consists of Tag$_j$, TYPE-VECTOR$_j$, Address$_j$, and A-Status$_j$. Tag$_j$ in A-Group$_j$ is identical to Tag$_j$ in I-Group$_j$ and TYPE-VECTOR$_j$ in A-Group$_j$ is identical to TYPE-VECTOR$_j$ in I-Group$_j$. In addition, A-Group$_j$ contains Address$_j$, and A-Status$_j$. Address$_j$ is the effective address of $q_j$ (if $q_j$ is a storage instruction).

A-Slot$_i$ consists of the registers to hold an A-Group: A-Tag-Register$_i$, A-Type-Register$_i$, Address-Register$_i$ and A-Status-Register$_i$. A-Status-Register$_i$ contains Valid-Inst$_i$, Valid-Addr$_i$, and Mem-Comp$_i$. Valid-Inst$_i$ is True when $q_j$ (any type) is valid. Valid-Addr$_i$ is True when Address$_j$ has been loaded into Address-Register$_i$ by a Data Unit. Mem-Comp$_i$ is True when the memory access is complete (if $q_j$ is a storage instruction).

The Address Stack monitors the Tag Bus 4015 for tags of completed instructions and compresses slot entries synchronously with the IU Stack.

The tag of an address conflict-free instruction whose memory access is not complete is asserted on the Conflict- Free Bus 4020. A portion of the address conflict detection logic in A-Slot$_j$ is shown in FIG. 41(*a*). A$_k$ is the address in A-Slot$_k$. S$_k$ and L$_k$ indicate that the tag of a store or load instruction respectively is in A-Slot$_k$. For i<j, Conflict$_{i,j}$ 4105 is True when an address conflict exists between the instruction whose tag is in A-Slot$_j$ and the instruction whose tag is in A-Slot$_i$. Logic that detects the requisite conditions for an address conflict is shown in FIG. 41(*b*).

The Address Stack monitors tags on the Memory Tag Bus 4025. These are the tags of storage instructions whose accesses have completed successfully. When an access is complete, the Mem-Comp status element 4030 of an A-Group with a matching tag is made True. The address in this A-Group is now prevented from causing conflicts with following instructions.

The address in every A-Group is simultaneously compared with the addresses in preceding A-Groups. The address comparison logic is not complex and is not shown. Tag comparison logic and compressing logic is similar to that of the Issue Unit.

4.3.2.6 An Alternative Address Stack Architecture

As presented above, the Address Stack contains an A-Group for each I-Group in the IU Stack. Therefore, the A-Groups of both storage and non-storage instructions are in the Address Stack. This is inefficient because a non-storage instruction can not cause an address conflict and their A-Groups take up room in the Address Stack.

There is a problem that must be solved if the Address Stack is to contain fewer slots than the IU Stack. Let the Address Stack contain fewer slots than the IU Stack. Assume the Address Stack is full when a storage instruction, q$_M$, is fetched by the Buffer Unit. All transfers to the IU and Address Stack must now halt, even with empty slots in the IU, decreasing throughput. For if q$_M$ is transferred to the IU, the IU contains a storage instruction that is not in the Address Stack. The instruction may enter Phase-A and generate an address for which there is no room in the Address Stack.

This problem is alleviated if Issue A of q$_M$ is conditional on the presence of A-Group$_M$ in the Address Stack. In this scheme, an I-Group$_M$ may enter the IU before A-Group$_M$ enters the Address Stack. The Address Stack asserts the tags of the A-Groups it contains simultaneously on a bus called the S-Tag Bus (for storage instruction tags). The S-Tag Bus is connected to the IU Stack. An IU slot compares the tag of its I-Group with those on the S-Tag Bus. A storage instruction may be issued if its tag matches one on the S-Tag Bus. The Buffer Unit transfers only the A-Groups of storage instructions to the Address Stack. The Address Stack may now have fewer slots than the Issue Unit.

Disadvantages of this approach are an additional bus to be monitored by the IU Stack (S-Bus) and a more complex Buffer Unit. An A-Group for which there is no room in the Address Stack must be temporarily stored in the BU and forwarded as room becomes available. This approach is not evaluated here.

4.3.2.7 Data Unit Architecture

The high-level architecture and functional partitioning of a Data Unit is described. A Data Unit 4010 is a Functional Unit consisting of several subunits (FIG. 40) that concurrently process multiple storage instructions; a Data Unit Buffer (DUB) 4035, an Address Generation Sub-Unit 4040, a Data Transfer Sub-Unit 4045, and a Memory Access Sub-Unit 4050. During a machine cycle, the sub-units may perform the following concurrent operations:

1. Generate one effective address and insert it in the Address Stack.
2. Initiate one memory access and receive data from one load access.
3. Receive the tags of multiple completed store operations from memory.
4. Transfer data between the Register File and the DUB.

4.3.2.7.1 The Data Unit Buffer

The DUB 4035 consists of one or more slots. Each slot may contain one storage instruction assigned to the Data Unit, its effective address, its status, and data in transit between memory and the register file. Status information includes the current phase of the instruction (Phase A, Phase B) and its memory assess status (not initiated, initiated, complete). An instruction remains in its assigned DUB slot until it completes execution. It is not necessary for the Data Unit to know the precedence of the storage instructions it contains.

4.3.2.7.2 The Address Generation Sub-Unit

This sub-unit 4040 may use immediate data in a storage instruction and data in the register file to calculate an effective address. It inserts an address into the Address Stack (for conflict detection) and in the Data Unit Buffer (for memory access).

4.3.2.7.3 Data Transfer Sub-Unit

This sub-unit 4045 transfers information between the Data Unit and the register file. It reads the register file for data used by Address Generation Sub-Unit 4040 or to be stored into the Data Cache. The later is forwarded to the Memory Access Unit (for store instruction with no address conflicts) or to the DUB (for a store instruction with an address conflict). A data register is accessed when an instruction is in Phase B (to free possible register dependencies of following instructions). A store to memory may be delayed after a data register access due to an address conflict, contention for the Data Cache Port, or a busy Data Cache. The data is then placed in the DUB.

The Data Transfer Sub-Unit transfers Data from the Memory Access Unit 4050 or the DUB 4035 to the register file during execution of a Load instruction.

4.3.2.7.4 The Memory Access Sub-Unit

This sub-unit 4050 is connected to a dedicated Data Cache Port. The Port is controlled by the Data Cache and may be OPEN or CLOSED. The Memory Access Sub-Unit may initiate a memory access when the Port is OPEN. Not more than one access may be initiated each cycle. At the beginning of a load instruction's access, an effective address and a copy of the instruction's tag is given to the Data Cache. Data and the tag are returned when the access is complete. At the beginning of a store instruction's access, an effective address, the data, and a copy of the instruction's tag is sent to the Data Cache. The tag is returned when the Store is complete.

The Tags of completed accesses are returned on the Memory Tag Bus 4025. Multiple tags may be returned on this bus concurrently. The Memory Tag Bus is monitored by the Address Stack 4020 and the Data Units. The Address Stack and the DUB mark accesses complete as the tags are returned preventing a storage instruction with a completed access from causing an address conflict. A load instruction completes when data is written into its data register. This register access may be delayed by a data register conflict. Following instructions are prevented from experiencing address conflicts with an instruction whose access is complete.

4.3.2.8 Storage Instruction Access Times

The access time of a storage instruction is measured from Issue A to its completion. A storage instruction is complete when following instructions can not experience register conflicts with it.

4.3.2.8.1 Worst Case Memory Access

Figure 42:
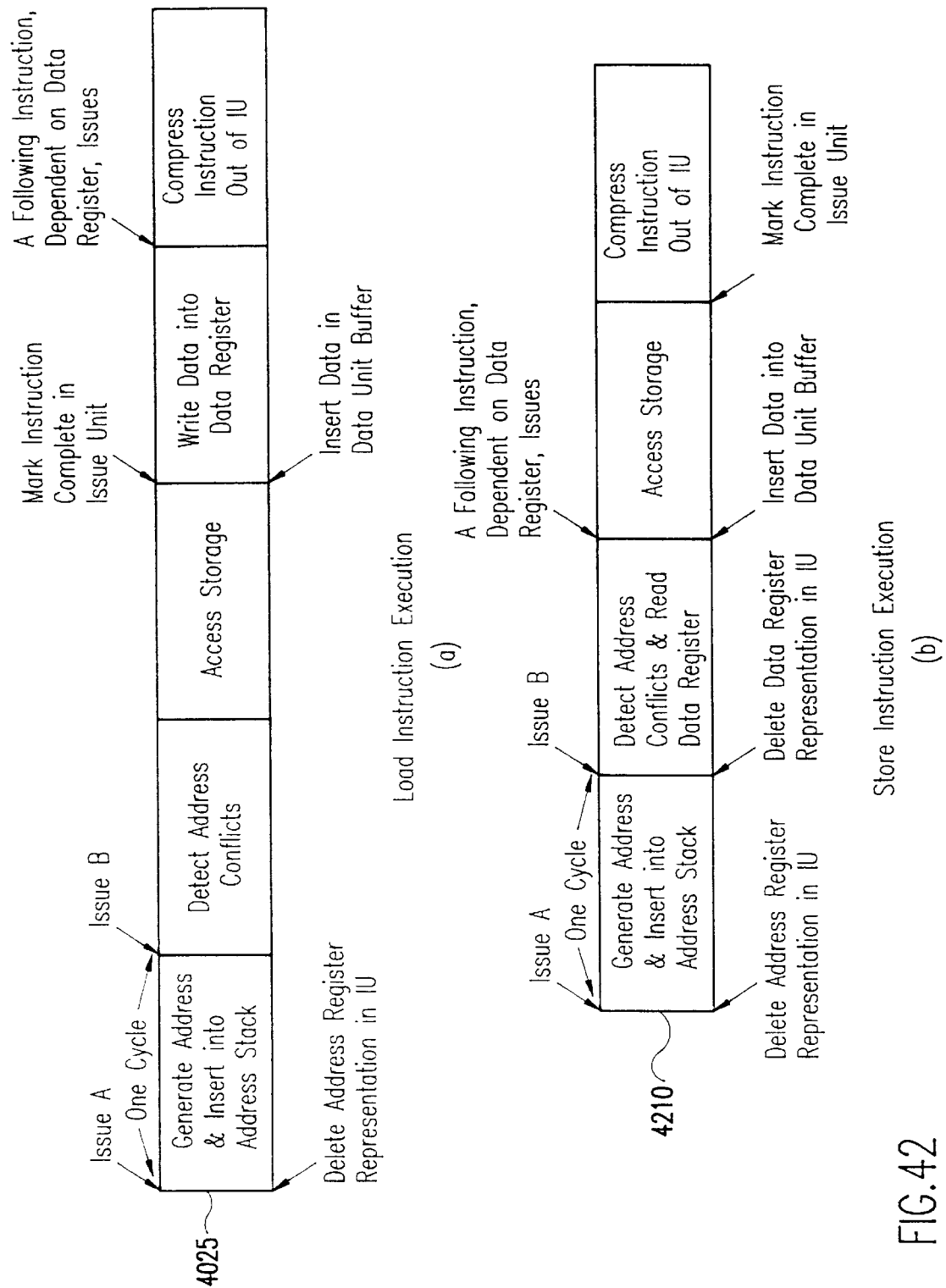
FIG. 42 shows illustrative load and store instruction timings.

FIG. 42 shows worst case timing for a load 4205 and a store 4210 instruction assuming a one cycle Data Cache access and no address or register conflicts. In this case, Phase A is not yet complete when the data register of the load and store becomes conflict free in the IU.

A load instruction. A load instruction, $q_L$, accesses memory data during Phase A, as soon as its address registers are conflict free. Phase B is entered when its data register is conflict free and at least one cycle after Phase A is entered. Phase B may be entered before memory data has been read, as shown in FIG. 42(a). The Data Unit immediately forwards data to $q_L$'s data register upon its receipt from memory. Four cycles after $q_L$ enters Phase A, a following instruction may issue that reads $q_L$'s data register. Instruction $q_L$ is marked complete in the IU one cycle after its tag is asserted on the Tag Bus. Instruction $q_L$ executes in 3 cycles under some circumstances. A cycle is saved when address conflict detection is complete before $q_L$'s effective address is known. This occurs when no preceding uncompleted store instructions are in the Address Stack. In this case, $q_L$'s tag is on the Conflict-Free Bus before $q_L$ enters Phase A.

A store instruction. Two cycles after a store instruction, $q_S$, enters Phase A, a following instruction that has a dependency on its data register may issue (FIG. 42(b)). When $q_S$ enters Phase B, its data register is read. The data is placed in the Data Unit Buffer if $q_S$ has address conflict that delays its store to memory. Data buffering enables the early issue of following instructions that have dependencies on $q_S$'s data register. The data register representation is deleted from $q_S$'s I-Group when it enters Phase B. The data register is read by the Data Unit early in the next cycle, before an instruction issued during the same cycle can write to it.

4.3.2.8.2 Best Case Memory Access

Best case storage instruction accesses occur when Phase A has completed before a data register becomes dependency free, that is, before Issue B. This not an unlikely situation. Issue A occurs when the address register is dependency free.

A load instruction. Consider a load instruction, $q_L$, that completes Phase A before it enters Phase B. The Data Unit Buffer contains $q_L$'s data that has been read from memory. When $q_L$ enters Phase B, data is transferred to $q_L$'s data register. A following instruction dependent on the $q_L$'s data register issues 2 cycles after $q_L$ enters Phase B.

A store instruction. Consider a store instruction, $q_S$, that completes Phase A before it enters Phase B. Instruction $q_S$ completes in one cycle, the time it takes for the elimination of its data register representation to be felt by following instructions.

I/O Instructions

I/O instructions may initiate and control data transfers between memory and I/O devices like printers and magnetic disks. Processors in the computer system other than the central processor are often involved in the execution of these instructions. The movement of large blocks of data may be involved. Issues concerning the execution of I/O instructions out-of-order have been discussed by others [PMHS 85].

Concurrent and out-of-order executions of I/O instructions in many instruction set architectures may not be possible. The ordering imposed on the execution of I/O instructions and preceding and following storage instructions by an architecture may be complex. The scheduling of I/O instructions in an existing architecture and the design I/O architectures that support the multiple, out-of-order execution of I/O and storage instructions are not investigated here. We present a scheme that provides the FDS with a capability to issue I/O instructions in-order and one-at-a-time.

Assume that I/O instructions are identified by their OP code. An I/O instruction is issued to a Functional Unit for execution if preceding I/O and storage instructions have completed and it has no other dependencies. Following I/O and storage instructions are not issued before it completes.

The IU can force this I/O instruction scheduling with its register dependency detection logic. The representation of a pseudo-register is incorporated into I-Groups. The pseudo-register is not a physical register. It is represented in the Read and Write Vectors of I-Groups to force the sequential issue of I/O instructions. All storage instructions read the pseudo-register and all I/O instructions write the pseudo-register. An additional element (P-element) is included in the Read and Write Vectors of I-Groups to represent its use. A corresponding bit position is added to Read-Registers and Write-Registers in the IU. The Buffer Unit detects I/O instructions via their OP code and sets the P-element in their WRITE-VECTOR to True. The P-element in the READ-VECTOR of a storage instruction's I-Group is set to True. The sequencing of I/O instructions described above is now forced by the register dependency detection logic in the IU.

SECTION 5

The Simulator, Benchmarks and Results

The FDS system presented so far comprises the Base FDS (BFDS). A simulator is used to measure the throughput of the BFDS on benchmarks representing numerically intensive and non-numeric computation throughout the investigation. Throughput results are compared with that of a Base Machine that issues in-order and at most one per cycle.

Major features of BFDS storage instruction issuance and execution are evaluated. The throughput of the BFDS with Multiple Memory Request and Multiple Phase Issue capabilities is compared to that of BFDS systems without these features.

5.1 The Simulator

Figure 43:
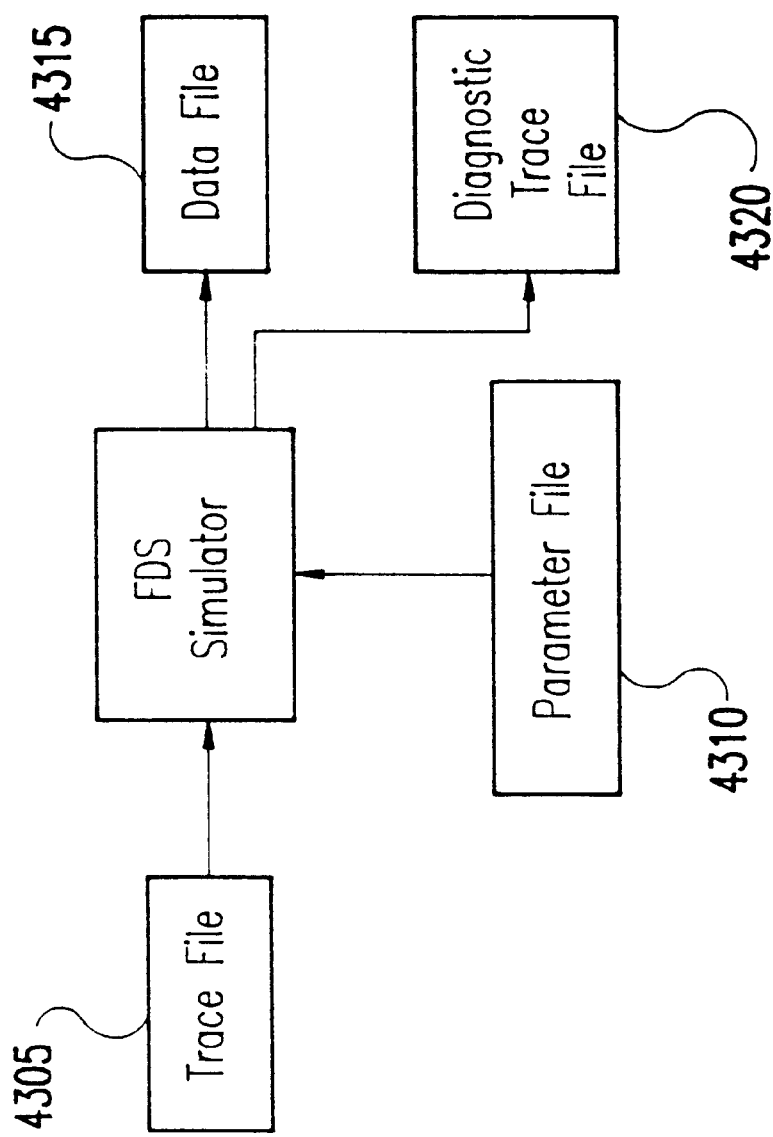
FIG. 43 shows the FDS simulator.

The FDS Simulator (FIG. 43) is written in the C programming language [KeRi 78] and is trace driven. A dynamic instruction stream (trace) is developed for each benchmark. A Trace File 4305 and a Parameter File 4310 are the simulator inputs. The Parameter File describes the FDS configuration to be simulated. Statistics gathered during simulation are written to the Data File 4315 at its conclusion.

5.1.1 Simulator Verification

The accuracy of a simulator must be verified. The FDS Simulator is verified via its diagnostic capability. The state of instructions in the FDS system is inspected and retained on a cycle-by-cycle basis when the simulator is in Diagnostic Mode. A table is generated (Diagnostic Trace) and output to the Diagnostic Trace File 4320. The Diagnoistic Mode is controlled by parameters in the Parameter File which can turn it on and off at predetermined machine cycles during simulation. It also turns on if an unusual condition is detected during simulation. Diagnostic Traces are examined by hand to verify that the simulator is operating correctly.

5.1.2 Simulator Control and Output

Table 5.1 lists the statistics gathered by the FDS Simulator. A FDS configuration and operational mode is defined by setting the parameters listed in Table 5.2. Their significance will become clear as the presentation of the FDS System progresses. Statistics gathered during the simulation of FDS configurations are used to study its behavior.

5.2 The Benchmarks

Benchmarks are used to study Fast Dispatch Stack behavior in two computational environments; the 14 Livermore Loops [McMa 72] represent array-oriented scientific computation and the Dhrystone Benchmark [Weic 84] represents code often found in C language programs. Two traces of the 14 Livermore Loop Benchmarks are used, LL_16 and LL_32, for 16 and 32 register CPUs respectively. The Dhrystone Benchmark trace is for a 32 register CPU.

Table 5.3 and FIG. 44 show some characteristics of the instruction traces. $LL_n$ represents Livermore Loop n in Table 5.3. Storage instructions comprise about 40% of both Benchmarks with the Livermore Loops containing more Load instructions and the Dhrystone Benchmark more Store instructions. Conditional Branch instructions comprise 19% of the Dhrystone benchmark and 4% of the Livermore Loops.

The high Branch content of the Dhrystone Benchmark restricts the instruction level parallelism available to the FDS and reflects its small average Basic Block size. A Basic Block is a sequence of instructions containing no branches bounded by two branch instructions. The number of instructions in the sequence is its size. Table 5.4 gives the average Basic Block sizes of the Benchmarks. Since the Basic FDS has no branch prediction system, it cannot execute an instruction following an unexecuted Branch. The small average Basic Block size of the Dhrystone Benchmark (4.2 instructions) is partly responsible for a small improvement in throughput on the BFDS relative to the Base Machine. Also, since Conditional Branches take longer to complete in the FDS than in the Base Machine (next section), their numbers further inhibit Dhrystone Benchmark throughput enhancement on the Basic FDS.

5.3 Measurements

The throughputs of selected FDS configurations are compared with that of a pipelined Base Machine to evaluate the FDS architecture. The Base Machine issues at most one instruction per cycle, in instruction stream order, to one functional unit. It is representative of single in-order instruction issue machines discussed in section 1.2.1.

5.3.1 Instruction Completion Time

The completion time of instruction $q_i$ includes its execution time and associated system latencies. It is the time in cycles from the issuance of $q_i$ to the issuance of a following instruction whose only dependence is on $q_i$'s completion. If $q_i$ is a storage instruction, completion time is measured from its first issuance, i.e. issue A to the issuance of an instruction whose only dependence is on $q_i$'s Data Register. Recall that the Data Register of a storage instruction receives data from memory in the case of a Load instruction or is the source of data written to memory in the case of a Store instruction. The completion time of a Conditional Branch instruction is defined differently. Let $q_T$ be the target instruction of Conditional Branch instruction $q_{CB}$. The completion time of $q_{CB}$ is the time in cycles from the issuance of $q_{cb}$ to the issuance of $q_T$. The completion times of instructions are given in Table 5.5 for the FDS and the Base Machine.

5.3.1.1 Load Instruction Completion Time

The completion time of a Load instruction is 4 cycles in the FDS compared to 2 cycles in the Base Machine. The 2 additional cycles in the FDS are caused by address generation after issue in the FDS (1 cycle) and address conflict detection (1 cycle). Address generation is required when an effective address is not contained in the instruction as an immediate value. Conflict detection is required when a storage instruction follows incomplete storage instructions in the Address Stack. Since each operation requires 1 cycle in the FDS, a Load's completion time is 3 cycles if one of these operations is unnecessary and 2 cycles if both operations are unnecessary.

The Base Machine performs address generation in its pipeline before issue and does not require address conflict detection because its instructions are issued sequentially.

5.3.1.2 Conditional Branch Instruction Completion Time

The Conditional Branch instruction completion time is 3 cycles in the FDS compared to 2 cycles in the Base Machine. The additional cycle is due to Issue Unit latency. An instruction inserted at the beginning of a cycle into the IU Stack issues at the end of that cycle at the earliest. The Conditional Branch requires 1 cycle to generate the target instruction's address and 1 cycle to fetch it. The target instruction then experiences a 1 cycle issue latency before it may be issued.

5.3.2 Throughput

Figure 45:
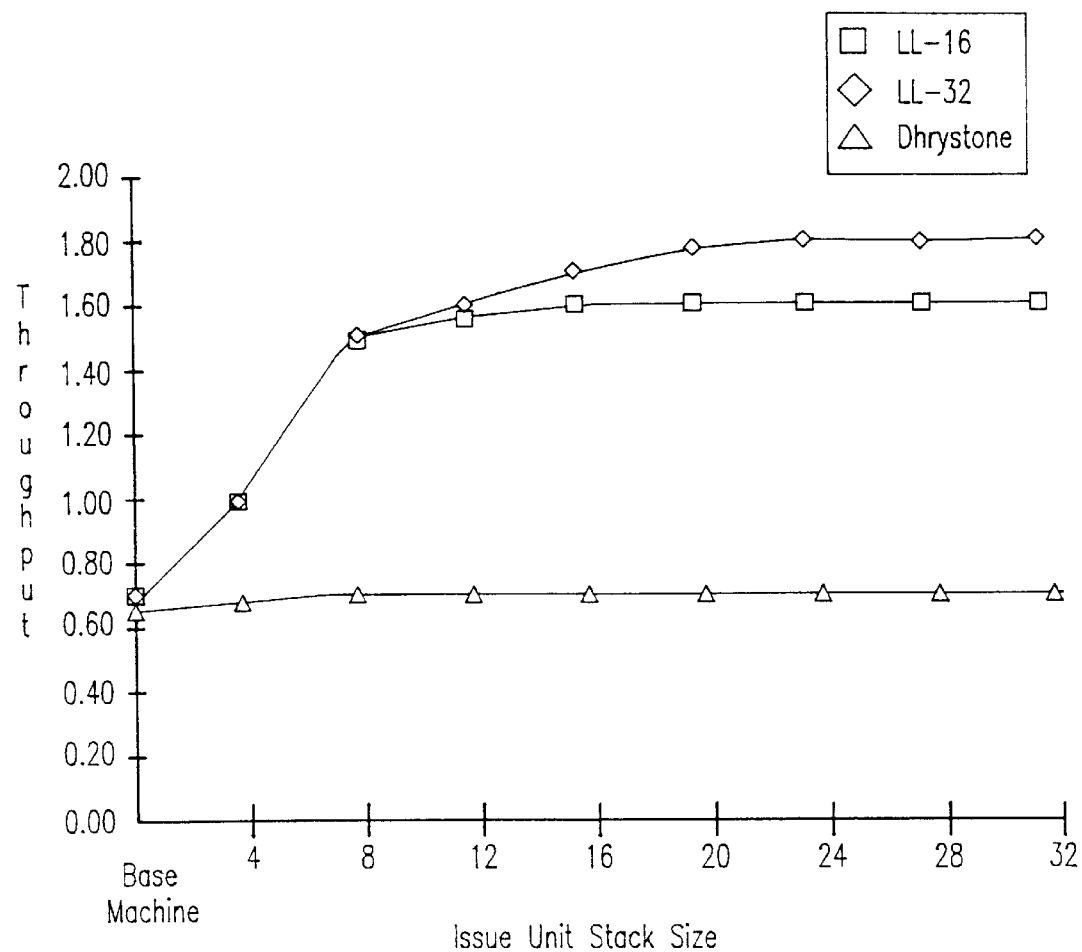
FIG. 45 shows throughout as a function of stack size.

Table 5.6 gives the measured throughput (instructions issued per cycle) of a BFDS on the benchmarks with selected IU Stack Sizes and unlimited numbers of Functional Units, Data Units and Ports, as graphically depicted in FIG. 45. An unlimited number of instructions may be fetched concurrently by the BU. Results with both Stack compression methods are given. The measured throughput of the Base Machine is given. The throughput of the 14 Livermore Loops Benchmark is the harmonic mean $$\frac{n}{\sum_{i=1}^{n} \frac{1}{\text{Throughput}}} \quad (5.1)$$

where $\text{Throughput}_i$ is the throughput of the $i^{th}$ benchmark in a suite of n benchmarks.

5.3.3 Speedup

Speedups of the throughputs in Table 5.6 relative to the Base Machine are given in Table 5.7 where $$\text{SPEEDUP OF CONFIGURATION} = \frac{\text{THROUGHPUT OF CONFIGURATION}}{\text{THROUGHPUT OF BASE MACHINE}}$$

Figure 46:
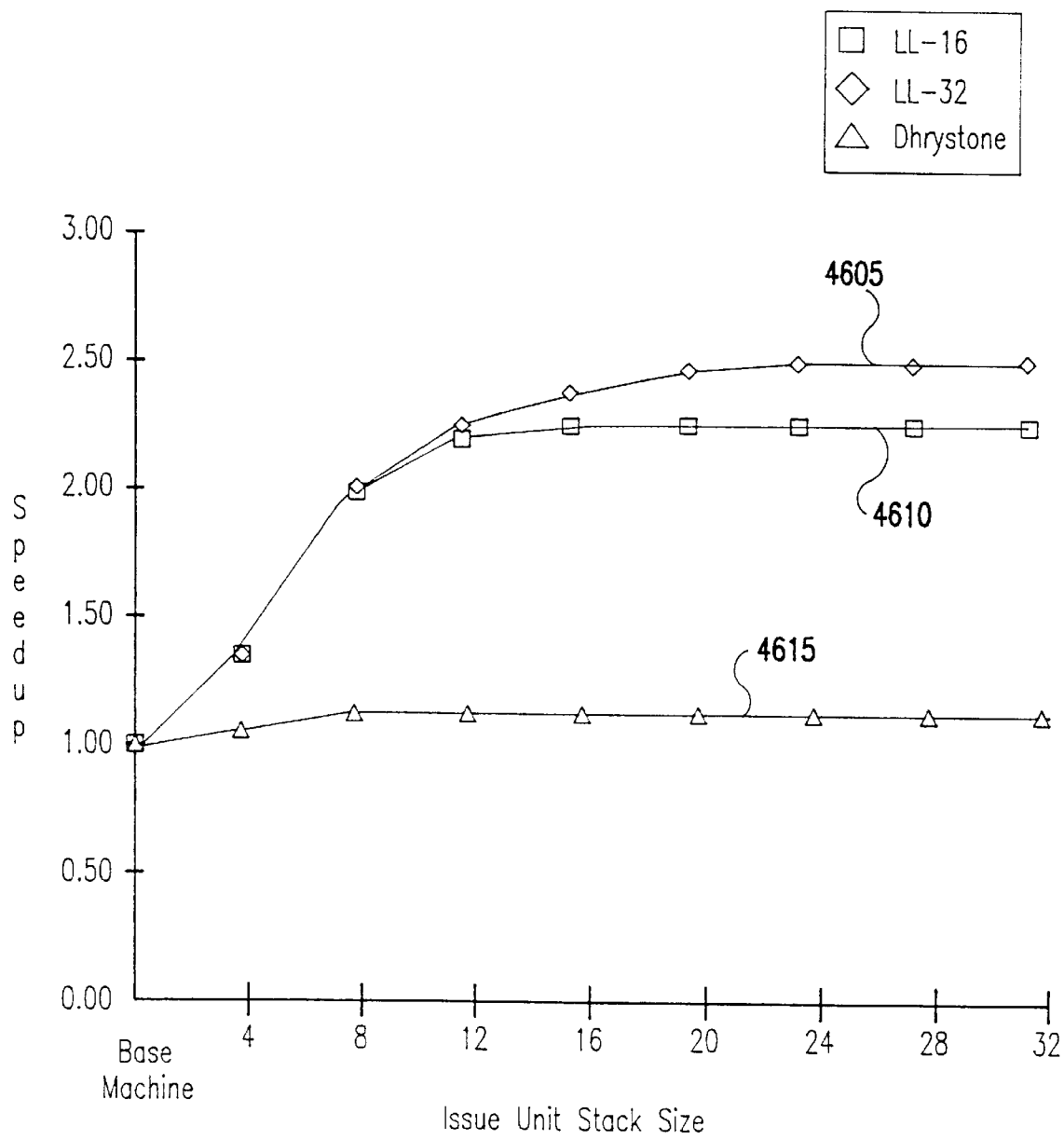
FIG. 46 shows benchmark throughput speedups on FDS systems using total compression.

Results in Table 5.6 are plotted in FIG. 46. The LL__32 Benchmark 4506 achieves a greatest speedup of 2.55 on the BFDS, the LL__16 Benchmark 4610, 2.34, and the Dhrystone Benchmark 4615, 1.16. The speedup of the LL__16 and LL__32 Benchmark throughputs increase only 1% and 4%, respectively, on systems with more than 16 slots. These benchmarks nearly achieve their greatest measured throughputs on a system with 16 slots. The Dhrystone Benchmark achieves nearly its greatest speedup with a Stack of 8 slots. Speedup increases less than 1% on systems with additional slots.

The FDS may issue independent instructions concurrently but it has an increased completion time for load and branch instructions compared to the Base Machine. FIG. 46 clearly shows that the benefits of multiple, out-of-order issue outbalance the increased completion times (Table 5.3) for the Livermore Loops Benchmarks on the BFDS. The Dhrystone Benchmark does not experience as much improvement.

5.4 Condition Code Based Instructions

A Conditional Branch instruction may examine (test) general purpose registers (GPR) for a condition (i.e., the Motorola 88100 [Moto 90]). It may compare the contents of two registers and branch if they are equal, for example. The Conditional Branch instructions of such an architecture are termed GPR-Based. These instructions execute correctly when issued out-of-order by the FDS. The FDS detects and enforces their register dependencies as it issues instructions.

Other architectures deposit selected conditions in a Condition Code Register (CC-Register) after the execution of condition code setting instructions. A condition code is a bit pattern stored in the CC-Register that indicates that selected conditions have occurred. Instruction $q_{CB}$ tests the last condition code placed in the CC Register before its execution. This condition code describes the condition that the compiler intends $q_{CB}$ to test, its intended condition.

The Intel 80386 [CrGe 87] and the IBM S/370 [IBM 87] are examples of architectures that use this scheme. The IBM RS/6000 architecture partitions its CC-Register into functionally equivalent fields [Warr 90]. Instructions optionally set a code in a specified field and execute in-order if they affect the same field. Conditional Branch instructions in these and other architectures using a CC-Register to store conditions are termed CC-Based.

A problem occurs when CC setting instructions execute concurrently or out-of-order. The CC in the CC-Register when a Conditional Branch executes may not represent its intended condition. The question is, can a CC-Based Conditional Branch instruction test its intended condition in the FDS when preceding condition code setting instructions complete execution concurrently and out-of-order.

CC-Based Conditional Branch Instructions

The instructions in an instruction set may be partitioned into those that set a CC, those that read a CC, and those that neither read nor set a CC. Let instruction $q_s$ set a condition code that is tested by a following instruction $q_t$. Assume that the instruction stream contain no CC setting instructions between $q_s$ and $q_t$. The intended condition of $q_t$ is the CC set by $q_s$. The Execution Unit ensures that $q_t$ tests its intended condition when other CC setting and testing instructions execute after $q_s$ executes and before $q_t$ executes. The following approach provides this capability.

Figure 47:
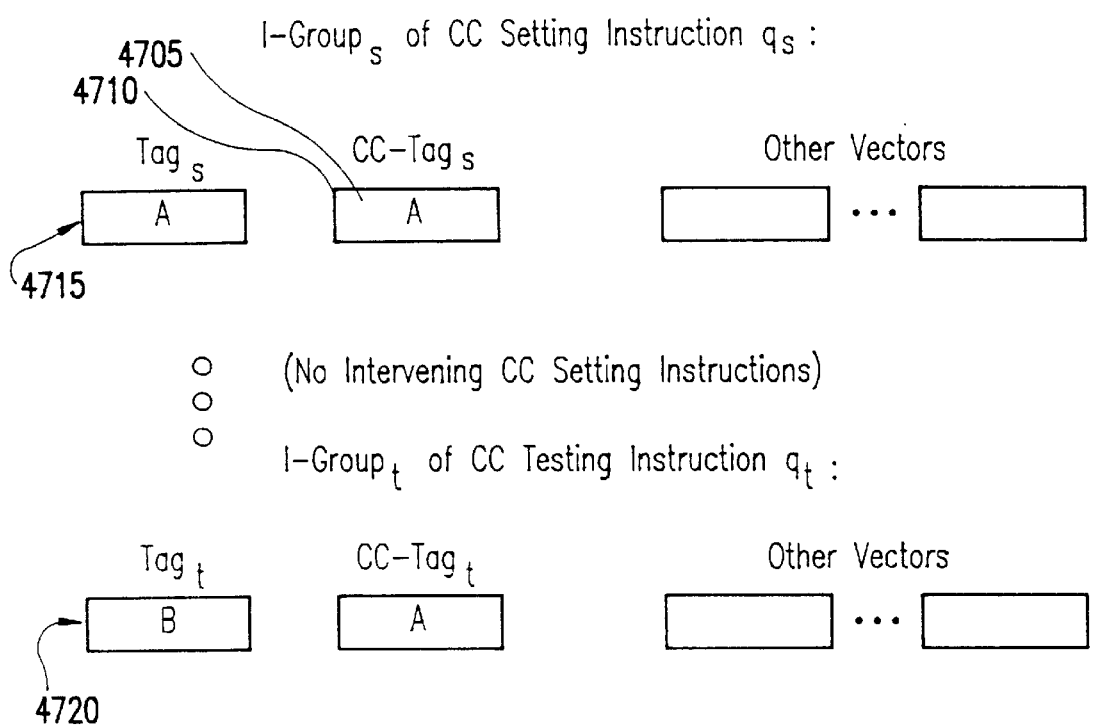
FIG. 47 shows a CC-vector assignment.

I-Groups are augmented by the CC-Tag 4705 which is stored in an additional Slot register(IN THE I.V.), the CC-Tag-Register 4710. A CC setting instruction entering the Buffer Unit is given a CC-Tag identical to its Tag. The CC-Tag is saved in a BU register (the C-Register) (not shown). A CC testing instruction entering the BU is given the last CC-Tag inserted into the C-Register as its CC-Tag. It is therefore given a CC-Tag identical to that of the CC setting instruction that most immediately precedes it in the instruction stream. This is illustrated in FIG. 47.

Let a CC setting instruction, $q_s$ 4715, enter the Buffer Unit. A copy of its CC-Tags is saved in the C-Register. Subsequently, a CC testing instruction, $q_t$ 4720, enters. No CC setting instructions enter after $q_s$ 4715 and before $q_t$. Instruction $q_s$ and $q_t$ are bound by giving a copy of CC-Tags to I-Group$_t$ as CC-Tag$_t$.

Instruction $q_t$ 4720 must not issue before $q_s$ 4715 completes. The issuance of $q_t$ is made dependent on the completion of $q_s$, by enforcing the following rule: An instruction may not issue if its CC-Tag matches that of a preceding instruction. Such a match is a CC-Tag conflict. The intended condition of an instruction with a CC-Tag conflict has not yet been set. CC-Tag conflict detection logic in each Slot is identical to that for register dependency detection. Only a bound CC setting and testing instruction pair is forced to execute in a preset order.

Figure 48:
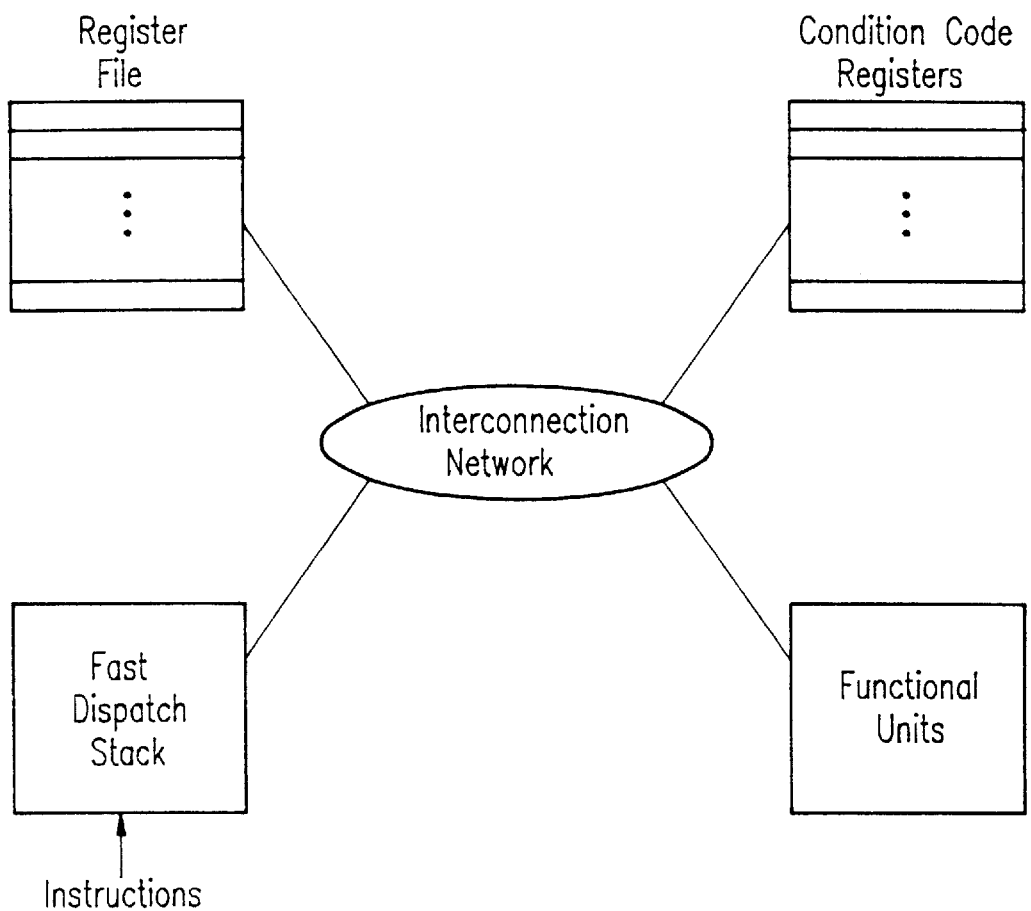
FIG. 48 shows an execution unit with multiple condition code registers.

Let the Execution Unit contain a set of Condition Code Registers (CC-Registers), one for each CC-Tag. FIG. 48 shows a block diagram of an Execution Unit with multiple Condition Code Registers 4805. Instruction $q_s$ writes the CC-Register addressed by CC-Tags. When $q_t$ executes, it uses CC-Tag$_t$ (identical to CC-Tags) to access the same CC-Register. Clearly, the writing of other Condition Code registers in the meantime cannot cause $q_t$ to test an incorrect condition.

A CC testing instruction and a following CC setting instruction may exist in the IU with identical CC-Tags. These instructions are not bound because the CC testing instruction does not read the condition code set by the following CC setting instruction. A conflict between their CC-Tags ensures that the CC setting instruction is not issued until the preceding CC testing instruction completes. Consider the following.

CC setting instruction $q_{s1}$ enters the Buffer Unit. After it, and with no intervening CC setting instructions, CC testing instruction, $q_t$ enters. CC-Tag$_t$ is identical to CC-Tag$_{s1}$. Instruction $q_{s1}$ completes and is removed from the Issue Unit. Instruction $q_t$ is delayed in the IU. Meanwhile CC setting instruction, $q_{s2}$, enters the Buffer Unit and is given the next available tag, CC-Tag$_{s1}$ of just completed $q_{s1}$, as CC-Tags2. If $q_s2$ executes before $q_t$, a CC set by $q_s2$ is tested by $q_t$ because CC-Tag$_t$ and CC-Tag$_{s2}$ are now identical. This is a violation of the logic of the architecture. However, $q_{s2}$ cannot execute until $q_t$ completes because CC-Tag$_{s2}$ conflicts with CC-Tag$_t$; they are identical.

The correct execution of a CC-Based Conditional Branch instruction is supported by the above scheme. All other aspects of its execution are identical to that described above for GPR-Based Conditional Branch Instructions.

SECTION 6

Decreasing Dependencies with Multiple Register Sets

A technique is presented that uses multiple register sets to decrease register dependencies between instructions. It is easily adapted to the structure of the BFDS and supports its fast cycletime operation. Modifications to the BFDS to incorporate the technique are presented. The throughput of the BFDS with multiple register sets, the $FDS_{\{Multi-RS\}}$, is measured with the simulator and compared with that of the BFDS.

6.1 Data Dependencies and Register Dependencies

Instruction $q_j$ has a direct data dependency on preceding instruction $q_i$ if $q_i$ produces a datum read by $q_j$. A RAW register dependency (section 1.1) of $q_j$ on $q_i$ is based on the direct data dependency if $q_i$ writes the datum to a register that $q_j$ reads. A direct data dependency between instructions does not necessarily cause a register dependency between them. Let $q_j$ have a direct data dependency on $q_i$. Instruction $q_j$ does not have a RAW dependency on $q_i$ if the datum written by $q_i$ is moved (i.e., to a register or memory location) by another instruction before $q_j$ accesses it.

A reduction in the number of dependencies between instructions enables the BFDS to issue more instructions concurrently. The technique presented reduces the frequency of occurrence of register dependencies that are not based on a direct data dependency. Clearly a WAW or a WAR register dependency of a register in $q_j$ can not be based on a direct data dependency of $q_i$. A RAW dependency of a register in $q_i$ may not be based on a direct data dependency of $q_i$ (example below). Therefore the frequency of all register dependencies except a RAW dependency based on a direct data dependency are reduced by the technique. Reducing these dependencies increases throughput. Consider the following sequence of instructions.

$q_i$:L 2(R2),R1

$q_i$+1:ADD R1,R3,R4

$q_i$+2:S R4,2(R2)

$q_i$+3:ADD R5,R6,R4

$q_i$+4:ADD R4,R3,R1.

$q_i$+5:S R1,4(R2).                                    (6.1)

Assume that $q_i$ is in Issue Unit Slot 0 and is not complete. Instructions following $q_i$ are in contiguous slots below it. Each instruction following $q_i$ has a register dependency on the instruction preceding it.

Instruction $q_{i+4}$ has a RAW dependency on $q_{i+1}$ (R4) that is not based on a direct data dependency. Instruction $q_{i+4}$ does not read the datum written by $q_{i+1}$ into R4. Instruction $q_{i+3}$ writes a datum to R4 that $q_{i+4}$ reads. Instruction $q_{i+4}$ has a direct data dependency and a RAW (R4) dependency on $q_{i+3}$.

The instructions in sequence 6.1 are issued by the BFDS in order and one at a time (except for Issue A of the store instructions). However, instructions $q_i$, $q_{i+1}$ and $q_{i+2}$ produce no data read by instructions $q_{i+3}$, $q_{i+4}$, and $q_{i+5}$. The two sequences of instructions are data independent. Register assignments in sequence 6.1 cause register dependencies between instructions that do not have direct data dependencies on each other.

6.1.1 Register Renaming

An instruction set architecture includes a set of named registers called architected registers (A-Regs). Instructions use these registers in a manner described by the architecture. An implementation of an instruction set architecture in a processor often includes physical registers (P-Regs) that are permanently assigned the names of the architected registers. A reference to an A-Reg in an instruction is a reference to the P-Reg with its name. Register Renaming is a technique that reduces register dependencies by assigning A-Regs to P-Regs after they enter the processor at execution time. The assignment of an A-Reg to a P-Reg (renaming) can be accomplished by substituting the name of a P-Reg for an A-Reg within an instruction before it is executed. Register dependencies are reduced by giving an A-Reg different assignments, when possible, in different instructions. An A-Reg that participates in a RAW conflict based on a direct data dependency is assigned to the same P-Reg in instructions involved in the conflict. P-Regs may exceed A-Regs in number.

An example illustrates a register renaming process and its benefit to the BFDS. Consider sequence 6.1 again. Instruction $q_{i+3}$ has a WAW dependency on $q_{i+1}$ (R4) and a WAR dependency on $q_{1+2}$ (R4). Instruction $q_{i+4}$ has a WAW dependency on $q_i$ (R1), a WAR dependency on $q_{i30\ 1}$ (R1) and RAW dependency on $q_{1+1}$ (R4). Register renaming can eliminate these dependencies. A write to an A-Reg is a fresh use of that register; the A-Reg may be assigned a P-Reg without regard to its previous assignments. However, an A-Reg that is read by an instruction is assigned to a specific P-Reg, the one that contains (or will contain) the datum the instruction sources. The intended datum of A-Reg $R_i$ relative to instruction $q_k$ is the datum read from $R_i$ by $q_k$ in a sequentially issuing machine. Register $R_i$ in $q_k$ is assigned the P-Reg that is written with its intended datum.

Using the above rules, registers in sequence 6.1 may be renamed. Register R1 is assigned to $r_a$ in $q_i$ and to $r_b$ in $q_{1+4}$. In addition, R4 is assigned to $r_c$ in $q_{i+1}$ and to $r_d$ in $q_i$+3. These assignments are in instructions that write to R1 and R4. Each time an A-Reg is written, it is assigned a P-Reg different from its previous P-Reg assignment to decrease dependencies. An instruction reading R1 or R4 is assigned the P-Reg that is written with the A-Reg's intended datum. After these assignments, Sequence 6.1 becomes:

$q_i$:L 2(R2),:f.$r_{a:ef}$ $q_i$+1:ADD :f.$r_{a:ef}$,R3,:f.$r_{a:ef}$ $q_i$+2:S :f.$r_{c:ef,2}$(R2)

$q_i$+3:ADD R5,R6,:f.$r_{d:ef}$ $q_i$+4:ADD :f.$r_{d:ef,}$ R3,:f.$r_{b:ef}$ $q_i$+5:S :f.$r_{b:ef,}$ 4(R2).                         (6.2)

Clearly instructions $q_{i+3}$, $q_{i+4}$, and $q_{i+5}$ are register independent of instructions $q_i$, $q_{i+1}$, and $q_{i+2}$ and may issue and execute concurrently with them. Throughput is increased by decreasing register dependencies that are not based on data dependencies. Registers R2, R3, R5, and R6 are not renamed in sequence 6.1 since they are not written to. Their renaming occurs in preceding instructions.

Tomasulo's Algorithm and approaches based on it achieve the effect of reducing register dependencies by forwarding tagged data to an instruction holding its tag. This is similar to register renaming. Register names can be thought of as tags given to data. In a system using register renaming, an instruction uses a tag (a physical register name) to read data from the physical register file. An instruction uses a tag to acquire data that is broadcast in Tomasulo's approach.

6.1.2 Issues

Logic to support even less general forms of Register Renaming than illustrated (as in the IBM RISC System/6000 [Groh 90]) is complicated. The assignment of A-Regs to P-Regs, the release of P-Regs from assignment, and maintaining a pool of available P-Regs are functions that must be performed in hardware as instructions enter the processor. A Register Renaming system may require complex logic. The delays incurred by this logic will raise the lower bound of a system's cycle time unless a delay in another function is greater.

Register Renaming increases the throughput of a multiple, out-of-order instruction issuing mechanism. The question is, can this technique be simply and effectively applied to an issuing mechanism based on the Dispatch Stack supporting a short cycle time? This question is answered affirmatively below.

The BFDS fetches and issues multiple instructions concurrently each cycle. Instructions within a block of concurrently fetched instructions, a Fetch Block, may write to the same A-Reg. A machine that fetches and issues instructions in sequence may assign this register to a different P-Reg in each instruction. Each A-Reg assignment in an instruction depends on the A-Reg's previous assignment. Since its previous assignment might have been made in the immediately preceding instruction, the sequentiality of the machine facilitates the assignment process. However, the throughput of the BFDS is dependent on performing operations on multiple instructions concurrently. The question is, can architected registers be assigned to physical registers in a fetch block concurrently, with instructions in the block performing multiple writes and reads of the same architected register? This question is answered affirmatively below.

6.2 A Multiple Register Set Approach

A variation of Register Renaming based on the use of multiple register sets, Multi-RS, is presented. Multi-RS is easily accommodated by the BFDS architecture and substantially reduces register dependencies not based on direct data dependencies. Its implementation is not complex.

A-Regs are assigned to P-Regs in instructions in the Buffer Unit. An A-Reg is assigned to 1 of m P-Regs, where m is the number of register sets in the system. Renaming is accomplished by substituting a P-Regs's name for an A-Reg's name in the instruction.

To decrease register dependencies, the system decreases the probability that two instructions using the same P-Reg will coexist in the Issue Unit when they do not access the same datum. Separation of instructions in the instruction stream that access the same P-Reg but not the same datum is achieved by renaming an A-Reg to each of m P-Regs before repeating an assignment.

6.2.1 Renaming Via Coherent Sequences

A register renaming system must rename A-Regs so instructions access their intended datum. This is done in the Multi-RS system through the detection of sequences of instructions that share a direct data dependency on a datum. If an instruction writes a datum to an A-Reg, the A-Reg is given an assignment in the instruction different from its present one. Instructions with a direct data dependency on the datum are given the same assignment for the A-Reg.

A Coherent Sequence of instructions over A-Reg $R_i$ is composed of the instructions that issue in a sequentially issuing machine during the lifetime of a specific datum in $R_i$. The lifetime of a datum in $R_i$ begins when the datum is placed in $R_i$ and ends when it is overwritten. A coherent sequence therefore begins with an instruction that writes to $R_i$ and ends with the instruction that immediately precedes the next instruction to write to $R_i$. A coherent sequence is specified by its first instruction and the register written by the first instruction. For example, instructions $q_i$, $q_{i+1}$, $q_{i+2}$ and $q_{i+3}$ in sequence 6.1 form a coherent sequence over R1 that is identified as $q_i$ over R1.

Let A-Reg RA written by $q_i$ with datum $D_i$ be assigned to P-Reg $r_a$. Instructions access A-Reg $R_A$ for $D_i$ if they are members of $q_i$ over $R_A$. Therefore, RA is assigned to $r_a$ in members of $q_i$ over $R_A$.

An important property of coherent sequences is that they are easy to detect and represent in hardware.

6.2.2 Architecture and Operation of the Multi-RS

Figure 49:
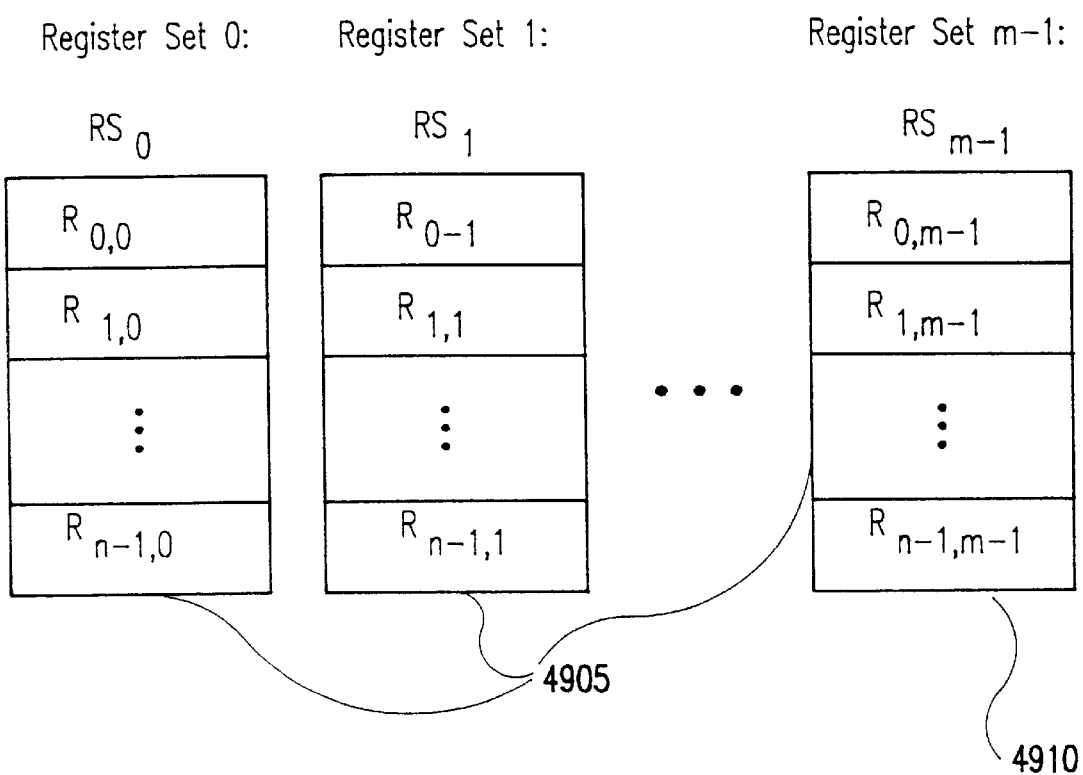
FIG. 49 shows multiple register sets.

Multiple register sets are incorporated into the BFDS. There is a one-to-one correspondence between the architected registers and the registers in each register set. Assume n architected registers. FIG. 49 shows m register sets 4905, each containing a set of n registers 4910. Physical registers in register set j are specified $R_{i,j}$ where i is the name of an architected register. A-Reg $R_k$ is assigned to one of m P-Regs, $R_{k,0}$, $R_{k,1}$, ..., or $R_{k,m-1}$ ... The assignment becomes part of the instruction's I-Group and is issued with the instruction to the Functional Units.

6.2.2.1 Assignment of Architected Registers to Register Sets

Assume a CPU with 16 architected registers and 2 register sets, $RS_0$ and $RS_1$. A-Regs are initially assigned to $RS_0$. A-Reg assignments are represented by a vector of binary elements called the Assignment Vector. Element positions are indexed from the right starting at 0 as shown in FIG. 50. The element in position j is True and False when A-Reg $R_j$ is assigned to $RS_1$ and $RS_0$ respectively. The Assignment Vector is stored in the Assignment Register in the Buffer Unit and is updated at the end of every cycle.

Recall that the BFDS may fetch a group of instructions, a fetch block, each cycle. The Assignment Vector represents A-Reg assignments in effect at the end of the previous machine cycle. Therefore, during cycle n+1 the Assignment Vector represents assignments in effect at the end of cycle n, i.e., after A-Regs in a fetch block processed during cycle n are given assignments. FIG. 50 shows the condition of the Assignment Vector and Assignment Register 5010 A-Reg $R_{12}$ assigned to P-Reg $R_{12,1}$ 5015 and A-Reg $R_7$ assigned to P-Reg $R_{7,1}$ 5020. Other A-Regs are assigned to $RS_0$.

A-Reg $R_A$'s assignment is changed when it is written, i.e., when a coherent sequence over $R_A$ begins. When an A-Reg is read by an instruction, its assignment is not changed. The assignment of an A-Reg alternates between two P-Regs reserved for its use, one in each register set, each time it is written. This separates accesses to the same P-Reg in the instruction stream when a direct data dependency does not exist on the datum in the P-Reg, reducing register dependencies in the Issue Unit.

6.2.2.2 Buffer Unit Modifications

Recall that I-Group Generate Units (I-Units) in the Buffer Unit (FIG. 14) generate I-Groups concurrently for instructions in a fetch block. The precedence of the instructions in a fetch block is maintained in the Buffer Unit. A-Regs accessed by instructions in a fetch block are given assignments based on the Assignment Vector and assignments that are in the process of being made within the fetch block (anticipated assignments).

An I-Unit in the Buffer Unit assigns A-Regs to P-Regs in the instruction it operates on. Assume that I-Unit$_i$ is operating on $q_j$ and is assigning A-Reg $R_A$ accessed by $q_j$ to a P-Reg. I-Unit$_i$ cannot base $R_A$'s assignment on the Assignment Vector. One or more instructions of higher precedence in $q_j$'s fetch block may write to $R_A$, changing $R_A$'s assignment. Apparently a chain of assignments must be made, each I-Unit making its own A-Reg assignments after I-Units operating on instructions of higher precedence have completed theirs. This approach is time consuming and is not necessary.

Figure 51:
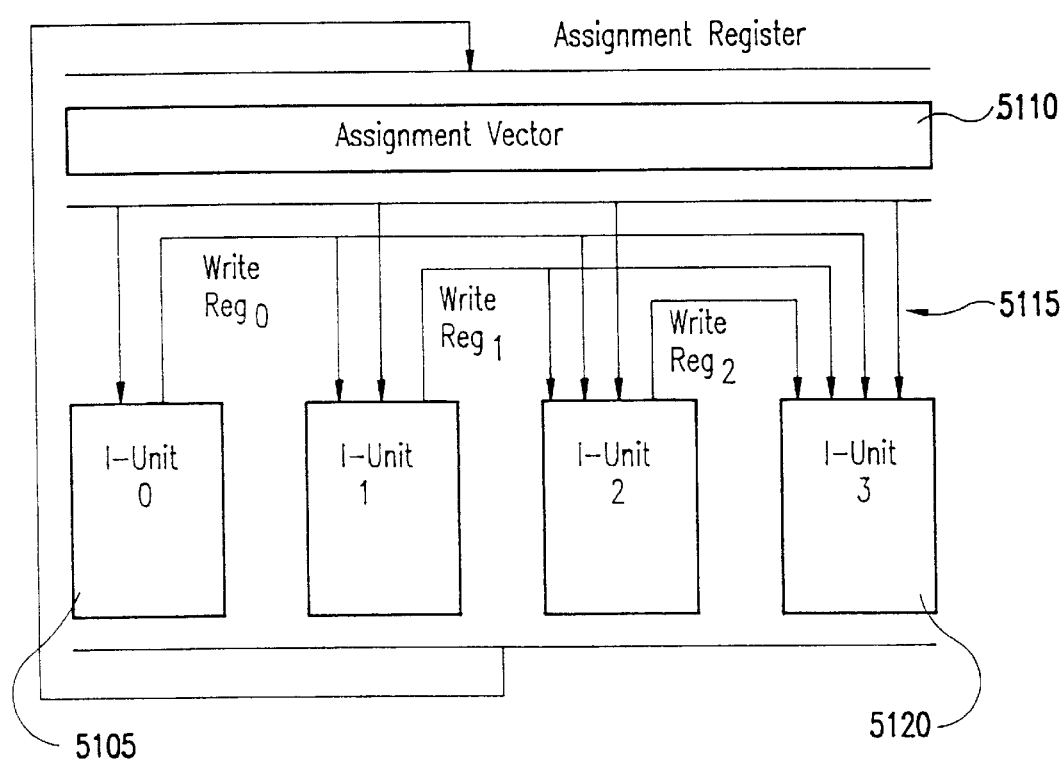
FIG. 51 shows register set assignment system.

I-Units make P-Reg assignments concurrently. Assume a Buffer Unit that fetches a maximum of 4 instructions concurrently. FIG. 51 shows a diagram of 4 I-Units that generate I-Groups and make A-Reg assignments for instructions in a fetch block. The I-Units are ordered according to the precedence of the instruction they operate on with I-Unit 5105 operating on the instruction of highest precedence. An I-Unit bases an A-Reg's assignment on its anticipated assignment after assignments in preceding instructions in the current fetch block are made. This is done by taking an A-Reg's assignment in the Assignment Vector 5110 and modifying it according to the number of times the A-Reg is written by preceding instructions in the current fetch block.

Each I-Unit outputs A-Reg written by its instruction (if any) to I-Units that operate on following instructions via the Write Reg$_0$, Write Reg$_1$, and Write Reg$_2$ buses 5115 shown in FIG. 51. An I-Unit compares the registers accessed by its instruction with those on the buses.

Figure 52:
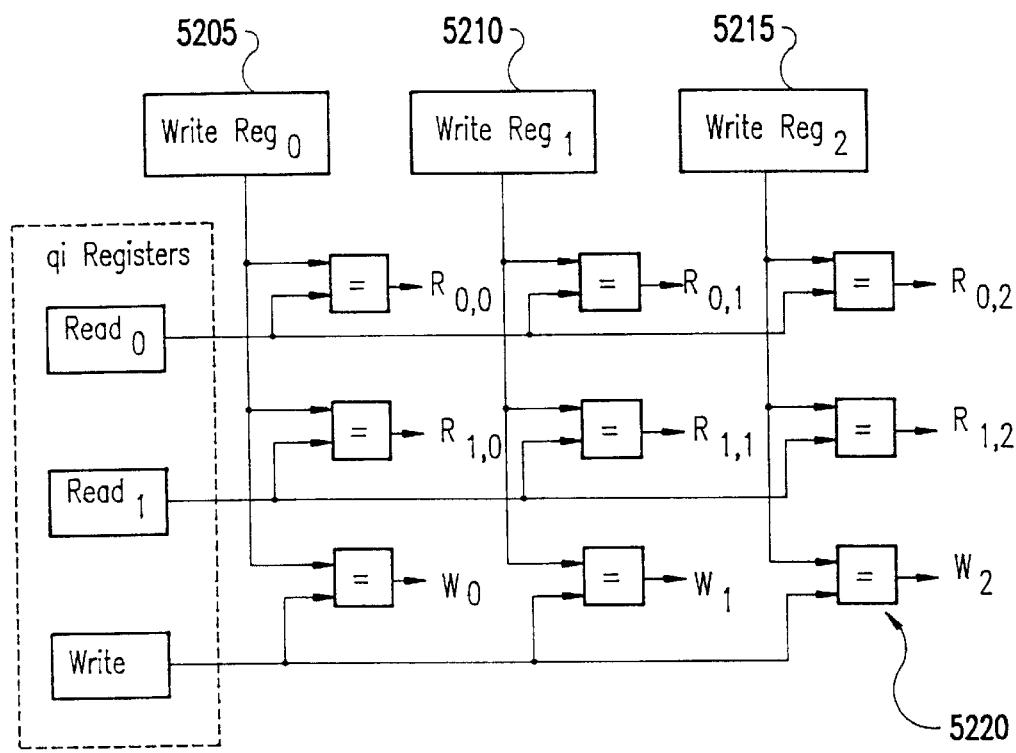
FIG. 52 shows register assignment logic in I-Unit$_3$.

Assume that I-Unit$_3$ 5120 in FIG. 51 is operating on $q_i$. FIG. 6.4 shows some its register assignment logic. I-Unit$_3$ compares each register accessed by $q_i$, Read$_0$, Read$_1$, and Write, with each register written by a preceding instruction, Write-Reg$_0$ 5205, Write-Reg$_1$ 5210, and Write-Reg$_2$ 5215. The output of logic making a comparison, shown as an "=" box 5220, is True when its inputs are equal. For example, $R_{1,1}$ is True if Read$_1$ and Write-Reg$_1$ registers are the same. Binary register set assignment elements (RSA-Elements), Read$_0$-RS$_i$, Read$_1$-RS$_i$, and Write-RS$_i$, generated by the logic described in equations 1 5225, 2 5230, and 3 5235 in FIG. 52, specify the register sets that A-Regs Read$_0$, Read$_1$, and Write in $q_i$ are assigned to respectively. A True RSA-Element specifies RS$_1$ and a False element RS$_0$.

The register set assignments are made part of an instruction's I-Group. The structure of an I-Group is modified to accommodate P-Reg assignments. The logic of the I-Units, shown in FIG. 15 for the BFDS, is augmented to generate a Read Vector for each register read by $q_i$, Read$_0$-Vector$_1$ and Read$_1$-Vector$_i$, as well as Write Vector WRITE-VECTOR$_i$. RSA-Elements Read$_0$-RS$_i$, Read$_1$-RS$_i$, and Write-RS$_i$, discussed above, are appended to Read0-VECTOR$_i$, READ1-VECTOR$_i$, and WRITE-VECTOR$_i$ vectors respectively. A vector representing an A-Reg together with a RSA-Element represents a P-Reg's name. Functional Units use a RSA-Element to select a register set and the A-Reg's name to select a register within it. As an example, assume element k of READ-VECTOR$_i$ is True, indicating that A-Reg $R_k$ is read by instruction $q_i$. A False Read$_0$-RS indicates that P-Reg $R_{k,0}$ (in RS$_0$) is to be read and a True Read$_0$-RS indicates that P-Reg $R_{k,1}$ (in RS$_1$) is to be read.

6.2.2.3 Issue Unit Modifications

Additional Issue Unit slot logic is required in the Issue Unit to hold the 2 READ-VECTORS generated by the Buffer Unit. Section 4.3.2.4.1 discusses the use of 2 READ-VECTORS in the multi-phase issue of store instructions (Alternative 2). The FDS$_{\{Multi-RS\}}$ uses this multi-phase issue approach since it requires 2 READ-VECTORS for renaming purposes.

P-Reg conflicts are detected in the Issue Unit rather that A-Reg conflicts. Logic for this purpose increases the minimum cycle time of the Issue Unit by one gate delay beyond that required to detect A-Reg conflicts.

Figure 53:
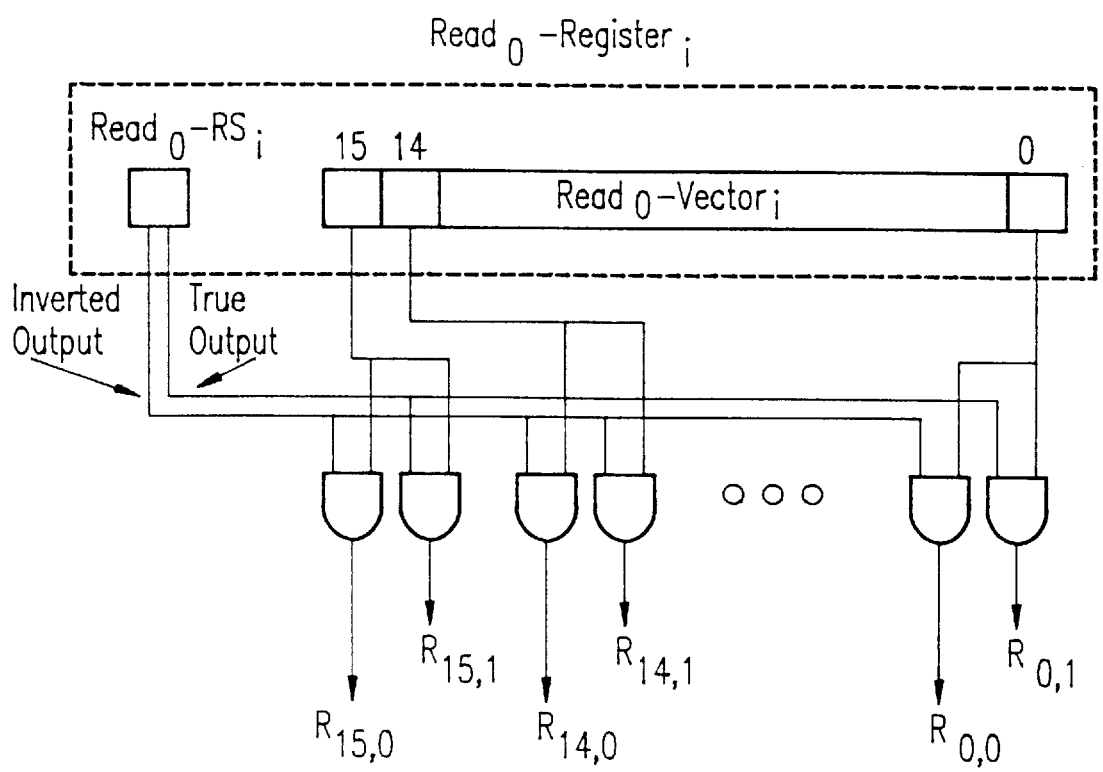
FIG. 53 shows logic in an IU slot that supports the use of multiple register sets.

Recall that vectors Read$_0$-Vector$_i$, READ$_1$-Vector$_i$, and WR$_i$TE-VECTOR$_i$ represent A-Reg accesses performed by $q_i$. A-Reg assignments are represented by RSA-Elements Read$_0$-RS$_i$, Read$_1$-RS$_i$, and Write-RS$_i$. A-Reg $R_i$ is assigned to P-Reg $R_i,0$ or $R_{i,1}$ as specified by a RSA-Element. Signals are developed from a Read or Write Vector and its RSA-Element to represent the access of each P-Reg. A signal is generated for each P-Reg. FIG. 53 shows the generation of these signals from Read0-Vectori and its RSA-Element, Read$_0$-RS$_i$, in Slot$_i$.

P-Reg conflicts are detected in the FDS$_{\{Multi-RS\}}$ the same way A-Reg conflicts are detected in the BFDS. The logic for this is nearly identical to that in FIG. 18 and is not shown.

6.2.2.4 More Than Two Register Sets

More than two register sets may be used. Assume m register sets, RS0 through RS$_{m-1}$. An architected register $R_i$ is first assigned to RS$_0$ after which its assignment is changed each time it is written. If its current assignment is RS$_j$, its next assignment is RS$_{j+1\ modulo\ m}$). Therefore $R_i$ is assigned to every register set before its assignment repeats itself, separating, as much as possible, coherent sequences given the same register set for $R_i$. This decreases the chance of a register conflict between instructions with no direct data dependencies.

6.2.2.5 A Disadvantage of the Multi-RS Approach

An advantage of the Multi-RS approach is its simplicity and therefore its speed. A disadvantage is the possible under utilization of some P-Regs. A P-Reg is reserved for the use of a particular A-Reg. A compiler may not utilize all A-Regs equally. P-Regs reserved for infrequently used A-Regs are under utilized. C$_i$rcuit count (area) is traded for speed in this approach. The increase in throughput derived from Multi-RS (evaluated below) may well be achieved by a more complex system using fewer P-Regs in which any P-Reg is assigned to any A-Reg.

6.3 Throughput Measurements

Figure 54:
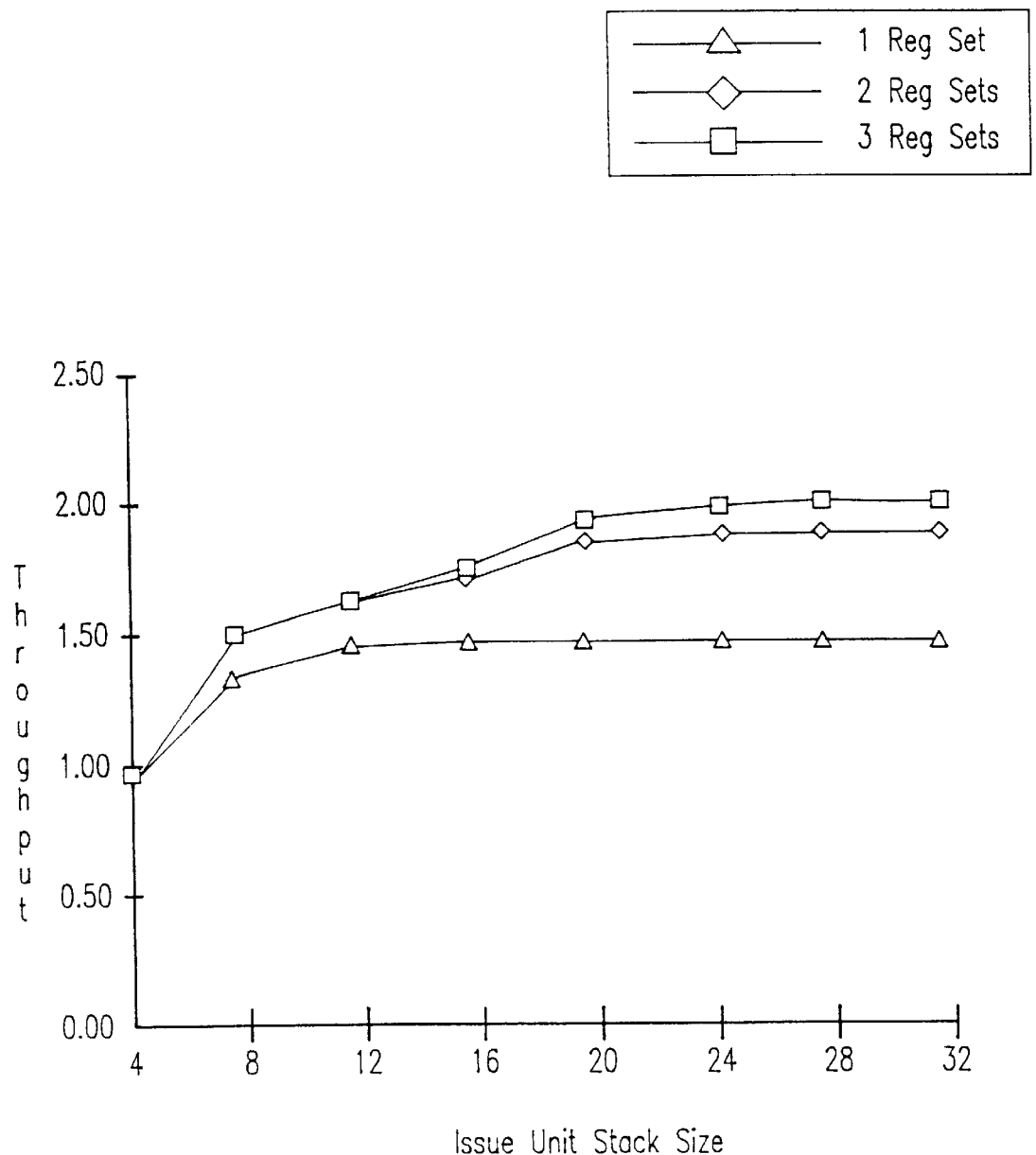
FIG. 54 shows LL_16 benchmark throughputs on FDS$_{\{MULTI-RS\}}$ systems.
Figure 55:
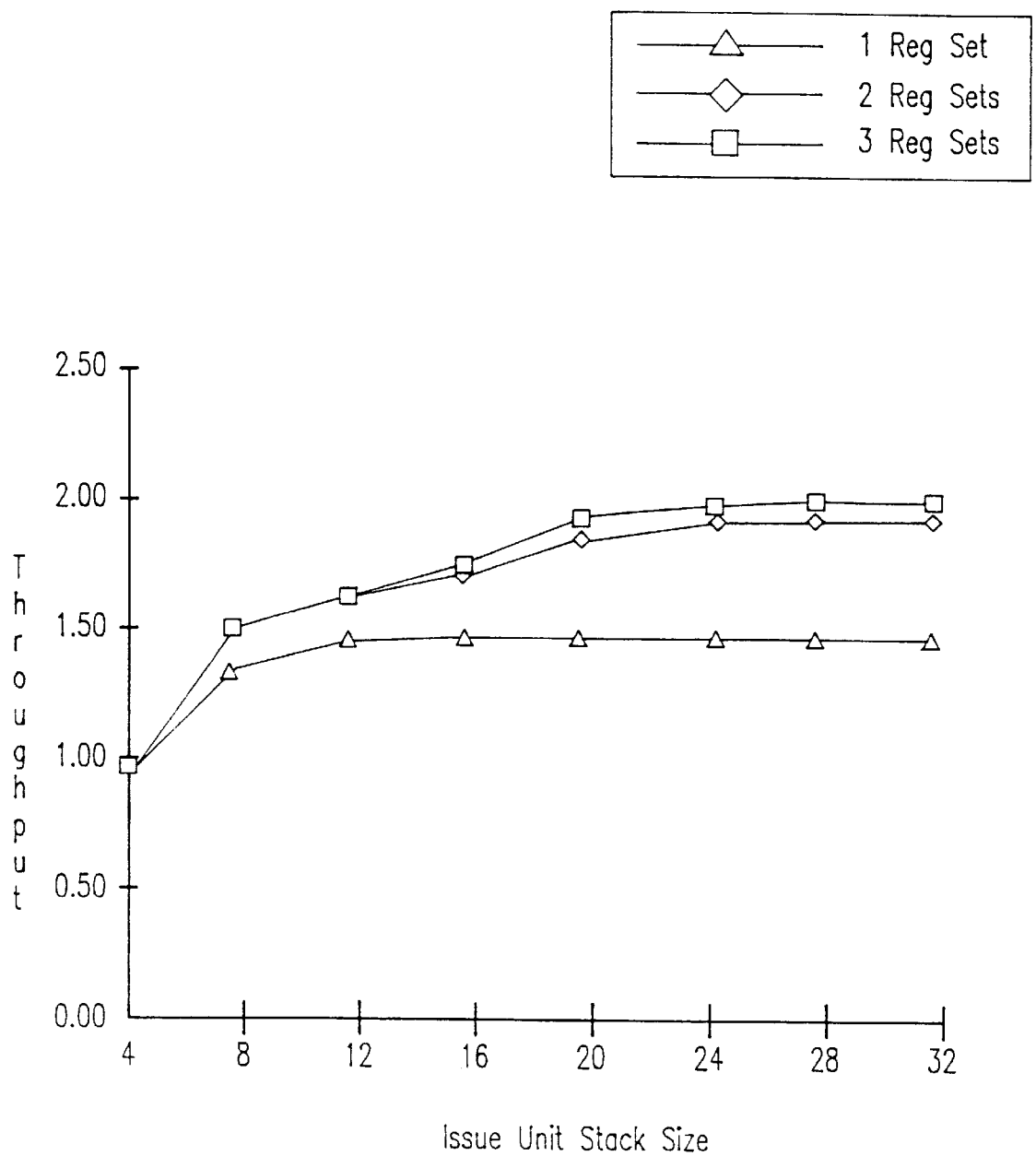
FIG. 55 shows LL_32 benchmark throughputs on FDS$_{\{MULTI-RS\}}$ systems.
Figure 56:
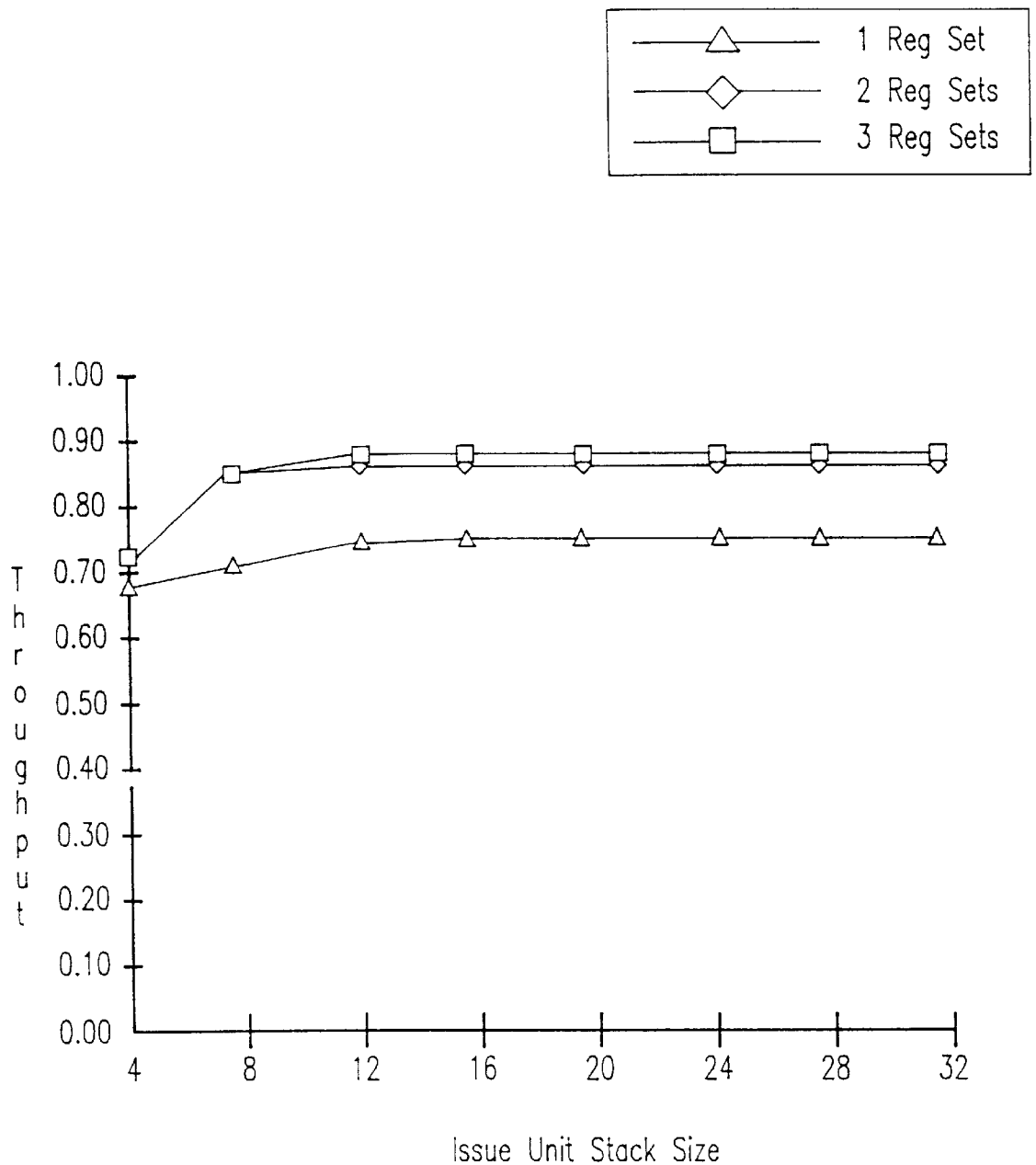
FIG. 56 shows dhrystone benchmark throughputs on FDS$_{\{MULTI-RS\}}$ systems.

The simulator is used to measure the throughput of the benchmarks on the FDS$_{\{Multi-RS\}}$ with 2 and 3 working register sets. Throughput results are given in Table 6.1 and plotted in FIGS. 54, 55, and 56. There are no limits on the numbers of ports, functional units, data Units, and instructions in a fetch block. Total Compression is used.

Figure 57:
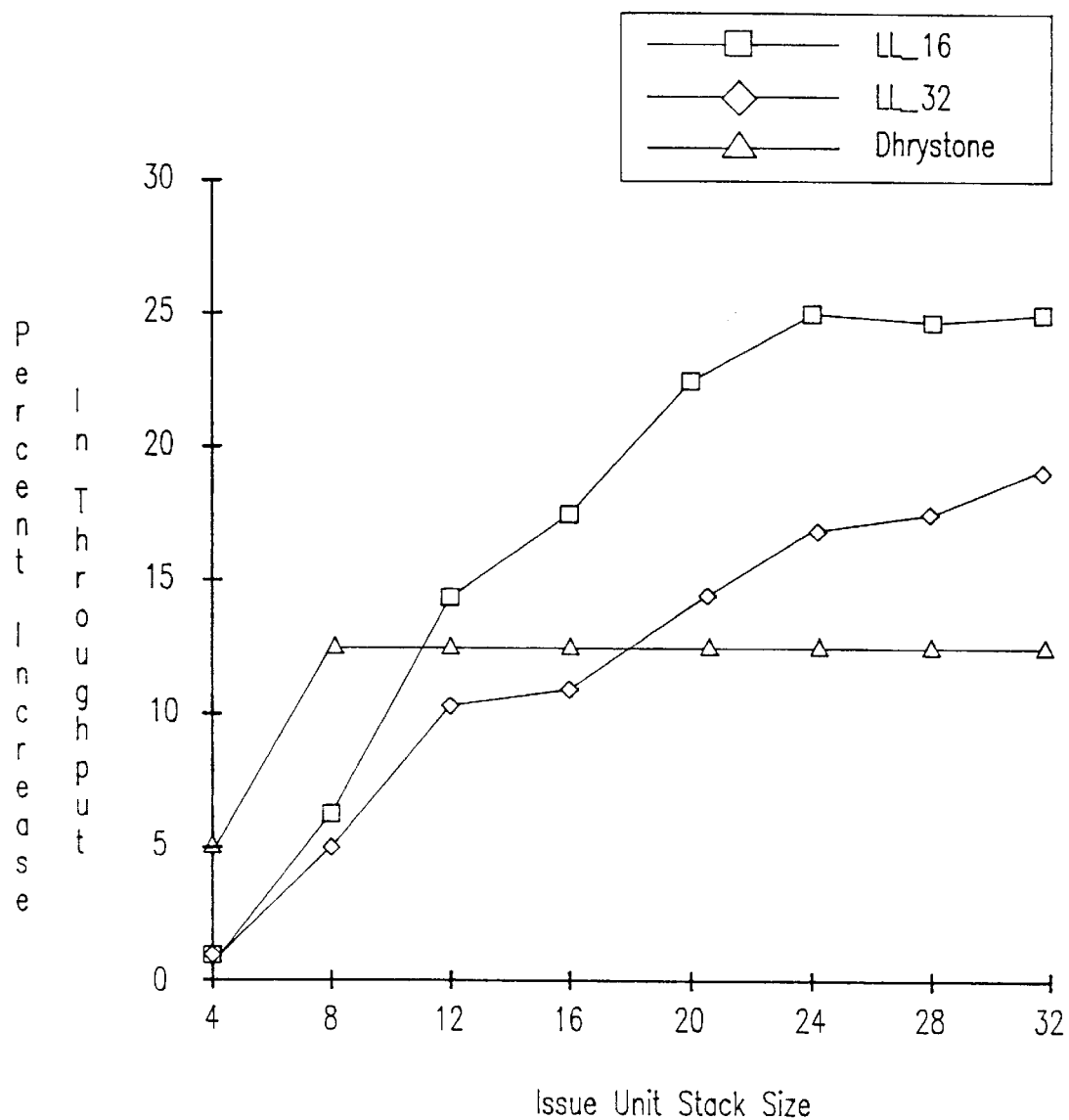
FIG. 57 shows percent increases in benchmark throughputs on FDS$_{\{MULTI-RS\}}$ systems with 2 register sets relative to that on BFDS systems.

The use of two working register sets provides significant increases in throughput over the use of a single register set on the Livermore Loop Benchmarks (Table 6.3 and FIG. 57). The Dhrystone Benchmark experiences smaller increases. The dependencies that are decreased by using this register renaming technique are not as prevalent in the Dhrystone Benchmark due to its smaller average basic block size. Throughputs measured with 3 register sets are marginally higher than those measured with 2 register sets. Therefore, the use of more than 2 register sets in a FDS system does not appear to be justified. Speedups relative to the base machine are given in Table 6.2. The Livermore Loops experience speedups of over 3. A speedup of 2.7 is achieved with 2 register sets and 16 slots. TABLE 6.3 shows the percent that throughput is increased in the $FDS_{\{Multi\text{-}RS\}}$ with 2 register sets compared to the BFDS. The Dhrystone Benchmark experiences small throughput increases as the Stack grows to 8 slots, after which there is little change. Larger stacks do not increase the potential for concurrent instruction issuances much because of the small average basic block size of the Dhrystone Benchmark. The LL_16 Benchmark experiences a larger percent increase in throughput than that of the LL_32 for all Stack sizes measured (FIG. 57). This is because the LL_32 Benchmark with 32 registers has few register dependencies. The 16 registers of the LL_16 Benchmark are more frequently reused than the 32 registers of the LL_32 Benchmark. Therefore, more dependencies in the LL_16 Benchmark are eliminated by register renaming.

SECTION 7

Precise Interrupts

A technique is presented that provides the Fast Dispatch Stack with precise interrupts. The FDS may issue and execute register-to-register and storage instructions in multiples and out-of-order. Architectural registers and main memory experience states that they would have in a machine that executed instructions in sequence. An instruction $q_i$ may cause an interrupt before the completion of preceding instructions and after the completion of one or more following instructions. The FDS quickly assumes the state of a sequential machine that completed execution of instructions preceding $q_i$. The technique accommodates the use of multiple register sets to decrease dependencies. Throughput measurements of the FDS with precise interrupts, the $FDS_{\{PI\}}$, are made with the simulator.

7.1 Precise Interrupts

Often an architecture includes the description of events that cause the processing of an instruction stream to be interrupted. The interruption (interrupt) may be caused by an unusual condition encountered during an instruction's execution, a condition external to the CPU requiring attention, or tasks related to the management of CPU resources that require the execution of instructions. To perform a task required by the interrupt and to resume processing after it, a description of conditions (state) in the CPU when the interrupt occurred is recorded. This state may be examined by an instruction stream to investigate the cause of an interrupt or be used to resume the processing of an instruction stream that has been halted.

Architectures classify interrupts by types according to their cause and the actions they instigate. An interrupt's type often determines the nature and amount of state information that is saved when it occurs. Precision relative to an interrupt describes the degree to which the state of a machine can be reconstructed after the interrupt occurs. Most architectures do not require all interrupt types to have the same precision. Those interrupts that require all or nearly all of a machine's detailed state to be reconstructed are termed precise interrupts. Those that do not are often called imprecise interrupts.

A precise interrupt is often defined relative to a sequential model of execution in which an architectural program counter sequences through instructions one-by-one [SmPI 88]. When an interrupt occurs, a state is saved that includes the contents of the program counter, the registers, and perhaps the contents of some memory locations. The state is that of a machine that executed instructions in sequence up to the instruction indicated by the saved program counter, the sequential process state. Since it may be desirable to execute an instruction set architecture that assumes a sequential model of execution on the FDS, this is the notion of a precise interrupt supported in this investigation. An alternative approach is proposed by Torng [ToDa 90], in which a process state is saved that includes the state that multiple instructions are in when an interrupt occurs.

An interrupt that is associated with a specific instruction $q_i$ and requires the saving of the sequential process state of a sequential machine that has executed instructions preceding $q_i$ is termed an exact interrupt in this investigation. An interrupt that requires a sequential machine state to be saved but by its nature does not associate itself with a specific instruction is termed an inexact interrupt. Both exact and inexact interrupts are precise interrupts because they require the saving of a sequential process state.

A problem is to generate the sequential process state in a machine that may execute instructions in multiples and out-of-order. Assume instruction $q_j$ follows instruction $q_i$ in the instruction stream but executes before it. If the execution of $q_i$ causes an exact interrupt, there is a problem. The state of the machine to be stored must be that of a machine that executed instructions in sequence up to $q_i$. But $q_j$ has executed and may have changed the state of the machine.

Several proposals have been made to support precise interrupts in an out-of-order instruction execution mechanism. A sequential process state is periodically generated and saved during execution in an approach called Checkpoint Repair [HwPa 87]. Upon an exact interrupt, the machine is returned (repairs) to the most recently saved state. Instructions are then re-executed in sequence up to an appropriate instruction. Instructions must issue one-at-a-time and in sequence but may complete out of sequence. It is a complex scheme with a disadvantage that instructions are re-executed in sequence and one-at-a-time after the state of the machine is returned to a checkpoint, hence it may be slow to construct the sequential machine state. In addition, the generation of checkpoints is an overhead that slows the machine during normal operation.

Smith and Pleszkun offer several approaches to implementing exact interrupts in pipelined processors [SmPI 88]. Their model of execution is the one assumed in Checkpoint Repair; instructions issue one-at-a-time and in sequence but may complete out of sequence and one-at-a-time. Instruction execution times are constant for each instruction type. One proposal, the Future File, is discussed here. A technique presented below for the FDS has roots in the Future File approach.

Figure 58:
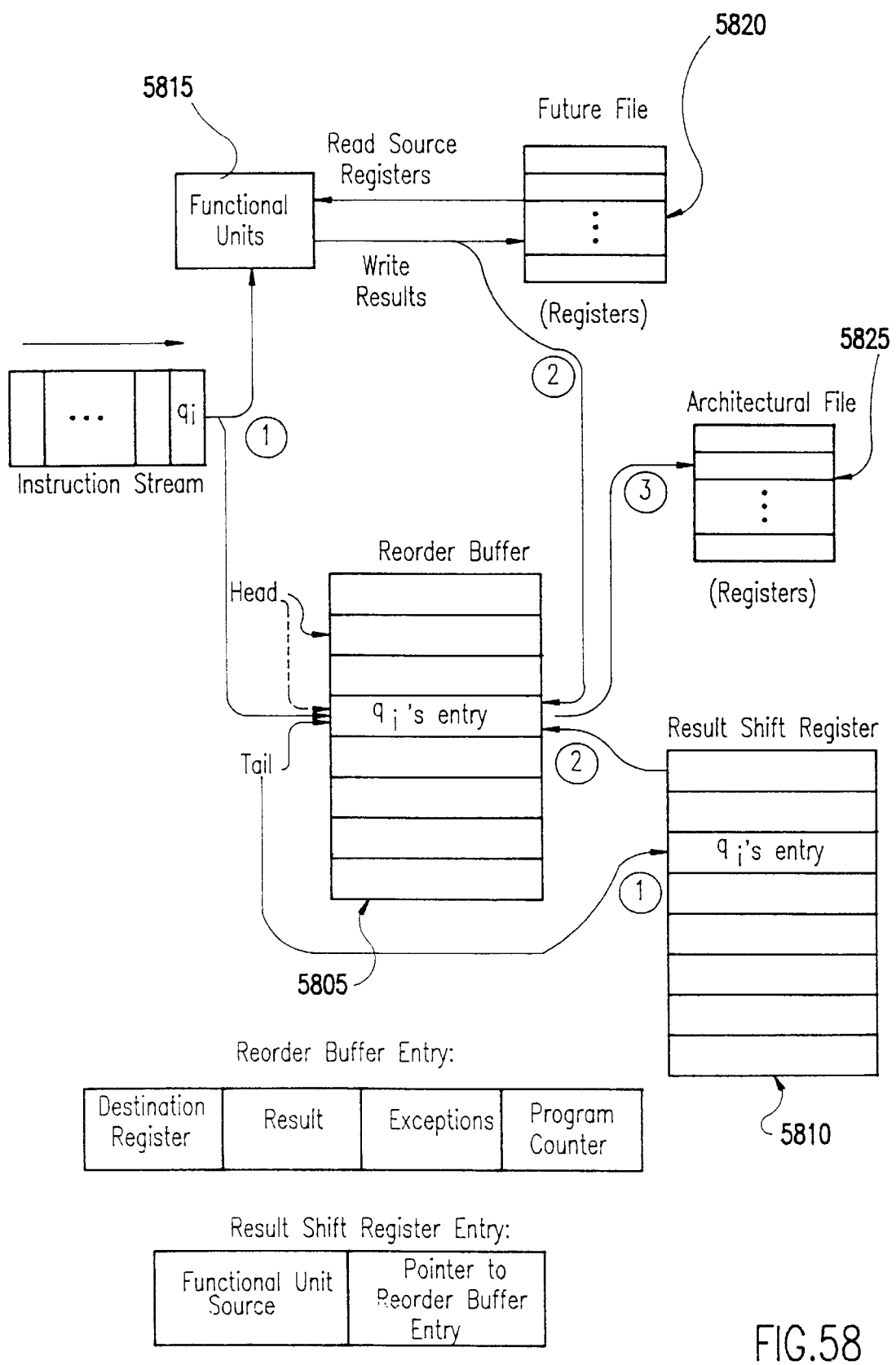
FIG. 58 shows the future file system.

The Future File system is shown in FIG. 58. Instructions are issued one-at-a-time and in-order to functional units. As an instruction is issued, information is placed in a queue called the Reorder Buffer 5805 and a stack called the Result Shift Register 5810. An instruction is issued if its operand registers are conflict free and it completes during a cycle in which no previous instruction completes. Functional units 5815 read operands from a set of working registers called the Future File 5820. When an instruction completes, a functional unit writes the result to the Future File and to the Reorder Buffer. The Reorder Buffer forwards the result to the architectural registers when preceding instructions have completed. Results are written to the architected registers 5825 in instruction stream order.

The steps shown in FIG. 58 demonstrate the operation of the Future File. In step 1, instruction $q_i$ is issued to a functional unit and information associated with the issuance is written to the Reorder Buffer and Result Shift Register. The program counter and $q_i$'s destination register are recorded in the Reorder Buffer slot pointed to by a tail pointer. The present value of the tail pointer. Pq, and the name of the functional unit assigned to $q_i$ are recorded in a Shift Result Register slot specified by $q_i$'s execution time. For example, the third slot from the top is specified if an instruction requires 3 cycles to execute. If the slot is occupied, the issuance of $q_i$ is delayed. In this case, another instruction is scheduled to complete during the cycle that $q_i$ would have completed in.

Entries in the Shift Result Register shift one position toward its top position every cycle. Its top position, if not empty, contains a pointer to the Reorder Buffer slot with information about an instruction that just completed in a functional unit. The pointer associated with $q_i$, $P_q$, reaches the top position in the Result Shift Register as the functional unit executing $q_i$ produces a result. The result is transferred to the Future File and to the Reorder Buffer slot pointed to by $P_q$, $q_i$'s entry (step 3). If an interrupt occurred during $q_i$'s execution, it is noted in $q_i$'s entry at this time.

The entry pointed to by the head pointer of the Reorder Buffer is examined every cycle. If the entry contains a result and no exceptions are noted, the result is transferred to the Architectural File (step 4). If an exception is noted, the destination registers recorded in the Reorder Buffer are used to restore the Future File to the state it would have in a sequential machine just prior to the exception.

There are disadvantages to this approach relative to its application to multiple out-of-order instruction execution. Instructions issue and complete one-at-a-time. Instructions issue in-order and must have constant execution times. The functional unit assigned an instruction must be known and recorded. Most important, restoration of state from recorded destination registers is a lengthy process. The proposal does not present structures to handle storage instructions.

Previous proposals do not support precise interrupts in machines that issue and execute register-to-register and storage instructions in multiples and out-of-order. The question is, can fast precise interrupts be supported by a machine that may issue and execute register-to-register and storage instructions in multiples and out-of-order. This question is answered affirmatively in this disclosure.

7.2 Precise Interrupts and the FDS

A precise interrupt capability is incorporated into the FDS in a way that is naturally supported by the structure of the FDS. Fast cycle time operation and multiple, out-of-order, instruction executions are supported. A decrease in throughput is incurred however.

Main memory and the architectural registers in the FDS{PI} system are maintained in a sequential machine state at all times. Functional units and data units read operands from and write results to a set of working registers. The contents of selected working registers may be transferred to the architectural registers every cycle. A copy-back data cache is used [Smit 82]. A datum that is stored into a copy-back cache may be transferred to main memory at a later time. Out-of-order load and store accesses of the data cache are supported. When an interrupt occurs, selected data in the cache are stored in main memory. The state of main memory is that of a sequential machine that executed instructions preceding a specified instruction.

7.2.1 Inexact Interrupts

An inexact interrupt is handled quickly. Such an interrupt may be caused by a condition requiring immediate action, as in real time control for example. The saved state need not reflect sequential execution to an instruction specified by the interrupt. The architected registers and memory are saved immediately since they reflect a sequential process state.

7.2.2 Exact Interrupts

An exact interrupt may be associated with instruction $q_j$ that is executing out-of-order, i.e., not all instructions preceding $q_j$ have completed. Such an interrupt may be caused by an unusual condition detected during the execution of $q_j$ or a page fault caused by $q_j$ in a demand paged virtual memory system, for example. In order to achieve a sequential process state that reflects the execution of instructions up to $q_j$, instructions that precede $q_j$ complete execution. They may complete in multiples and out-of-order. The time to complete these instructions is not lost; they are not re-executed after the interrupt is serviced. The saved sequential process state is that of a sequential machine that executed instructions up to $q_j$. If an instruction that precedes $q_j$, $q_i$, causes an interrupt while the sequential process state for $q_j$ is being generated, the saved sequential process state is that of a sequential machine that executed instructions up to $q_i$.

7.3 Precise Interrupts and the Architectural Registers

Figure 59:
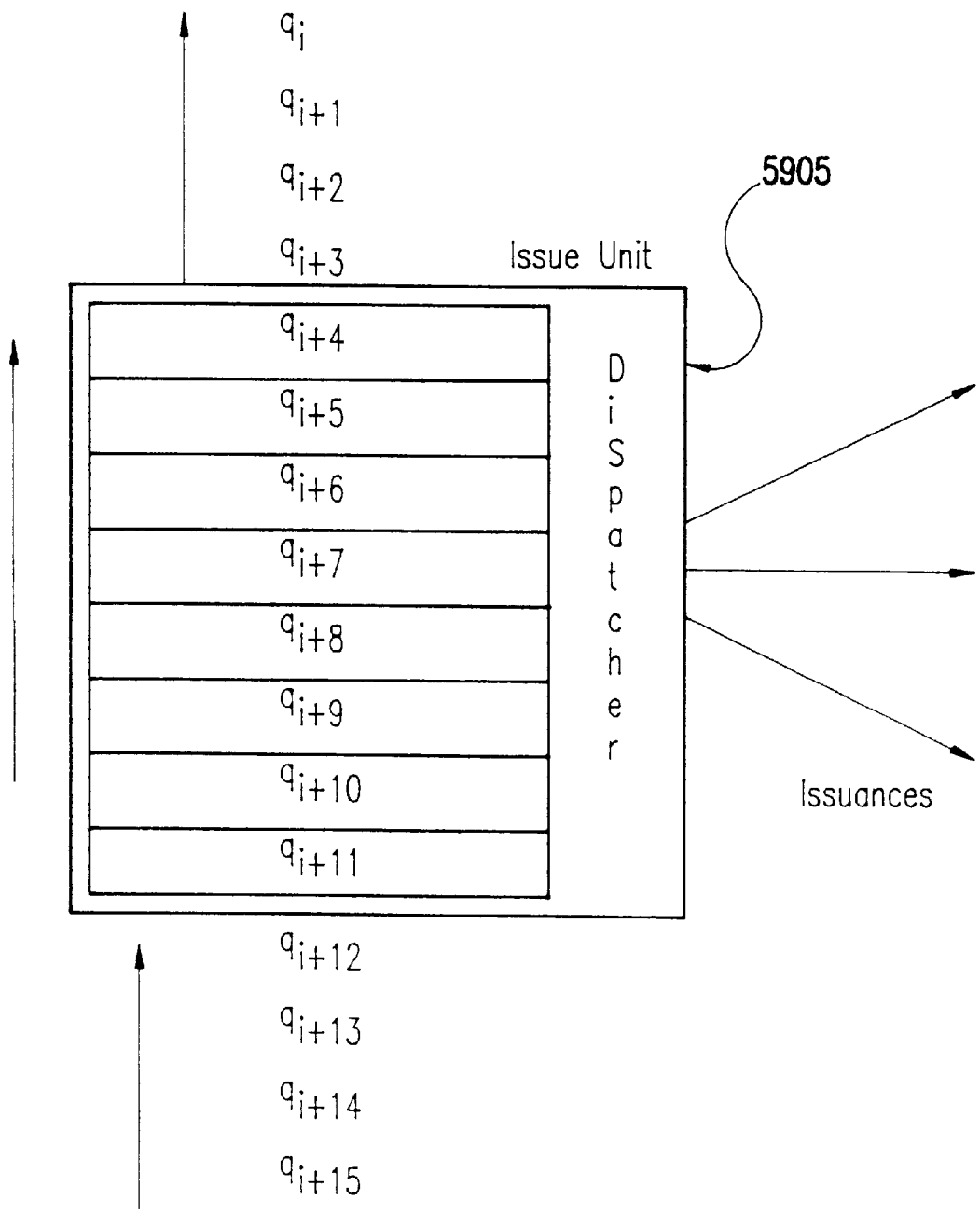
FIG. 59 shows the instruction stream and a issue unit with top compression.

An approach to achieving a sequential process state in the architectural registers is presented. The Issue Unit uses Top Compression (section 3.3.5). Recall that Top Compression removes a contiguous sequence of I-Groups whose instructions are complete from the top of the Stack. An I-Group is not compressed out if there is an incomplete I-Group above it in the Stack. Top Compression has an important property. Instructions are removed from the Issue Unit in the order they entered, i.e., in instruction stream order. FIG. 59 illustrates this process. Instructions enter the Issue Unit 5905 in groups of one or more contiguous sequential instructions. While in the Issue Unit, they may be issued and complete in multiples and out-of-order. With Top Compression, they are removed from the Issue Unit in groups of one or more contiguous sequential instructions in instruction stream order.

Figure 60:
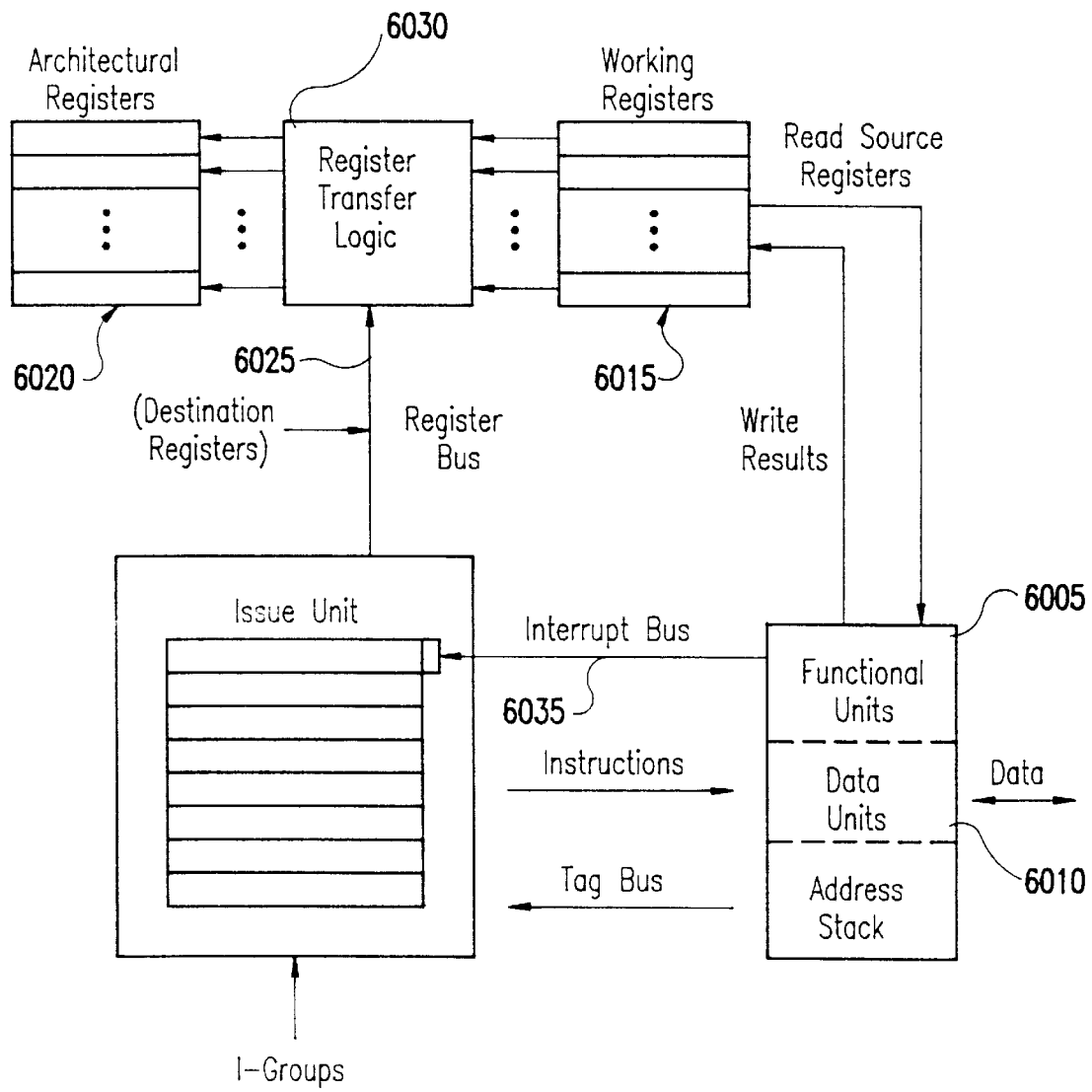
FIG. 60 shows the working registers in an FDS system.

Functional units 6005 and data units 6010 read operands from and write results to a set of working registers 6015, the Working Registers (see FIG. 60). The Working Registers (W-Regs) have a one-to-one correspondence to the architectural registers (A-Regs) 6020. Results in W-Reg$_i$ are periodically transferred to A-Reg$_i$. Recall that the WRITE-VECTOR in an instruction's I-Group represents its destination register. The WRITE-VECTORs in I-Groups compressed out of the Issue Unit specify the W-Regs to be transferred to the A-Regs.

7.3.1 States Assumed by the Architectural Registers

Figure 61:
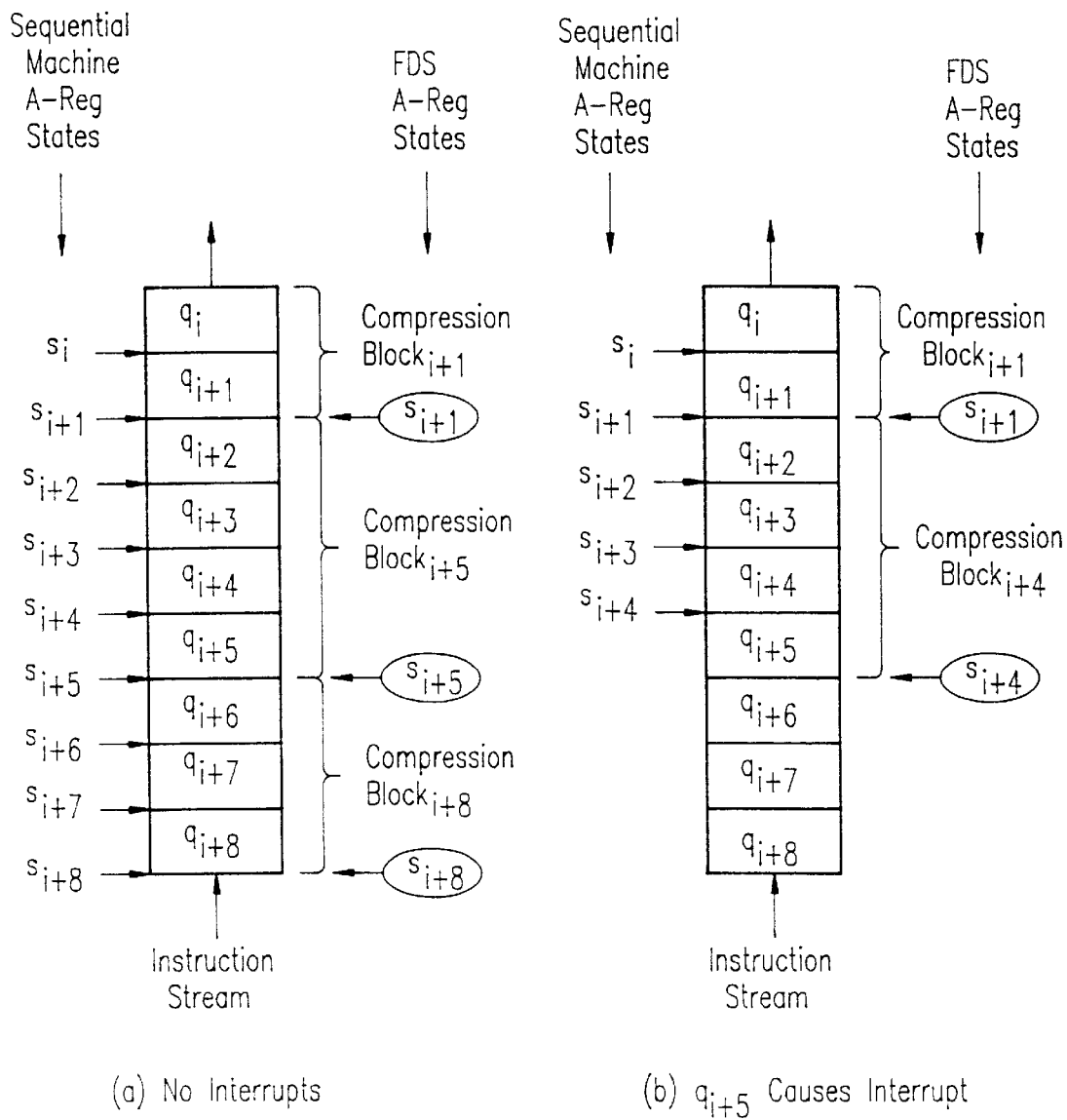
FIG. 61 shows comparison of A-Reg states in a FDS system and in a sequential machine.

During interrupt-free operation, the A-Regs do not experience every state experienced by A-Regs in a sequentially executing machine. The A-Regs change state only after compression operations. The A-Regs are in the state they would have in a sequential machine after it executed the instruction of lowest precedence in the most recently compressed out group of instructions. A compression-block is a group of I-Groups that are concurrently compressed out and is identified by its instruction of lowest precedence. Instruction $q_a$ is the instruction of lowest precedence in compression-block$_a$. FIG. 61 illustrates how the A-Regs in the FDS change states in two situations. An instruction stream is processed twice by the same FDS, once with no interrupts (FIG. 61(a)), and once with an interrupt (FIG. 61(b)). The state of A-Regs in a sequential machine processing the instruction stream is $s_b$ following the completion of $q_b$. When no interrupts occur, the A-Regs in the FDS experience states $s_{i+1}$, $s_{i+5}$ and $s_{i+8}$, assuming the compression blocks shown. The instruction stream is again processed by the FDS in FIG. 61(b), but this time $q_{i+5}$ causes an exact interrupt. Since $q_{i+5}$ does not complete, it is not compressed out and preceding instructions are. When instruction $q_{i+4}$ is compressed out, the A-Regs in the FDS are left in the process state of a sequential machine that completed $q_{i+4}$, $s_{i+4}$.

7.3.2 Transfers From Working Registers to Architectural Registers

Figure 62:
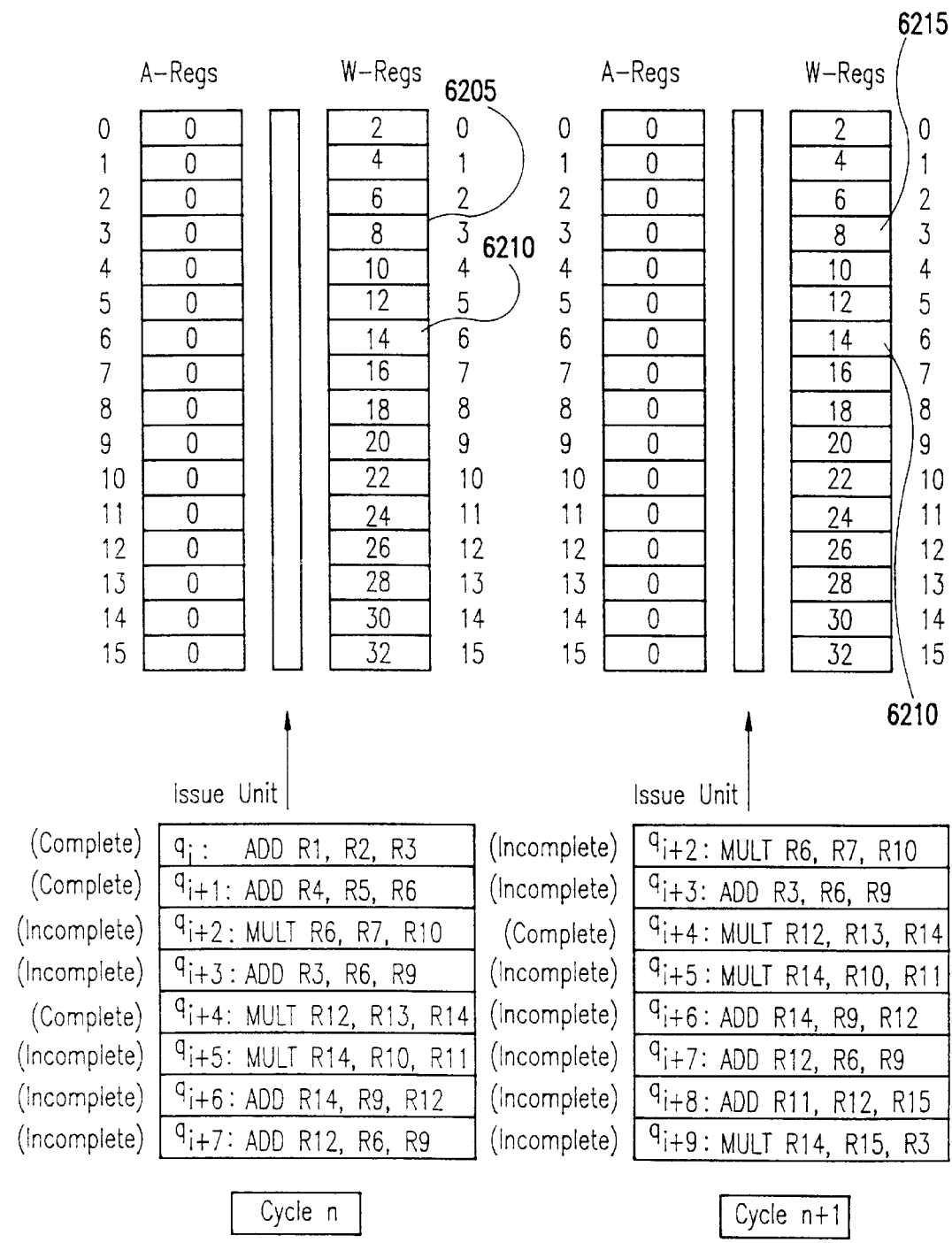
FIG. 62 shows illustrative W-Reg to A-Reg transfer.
Figure 63:
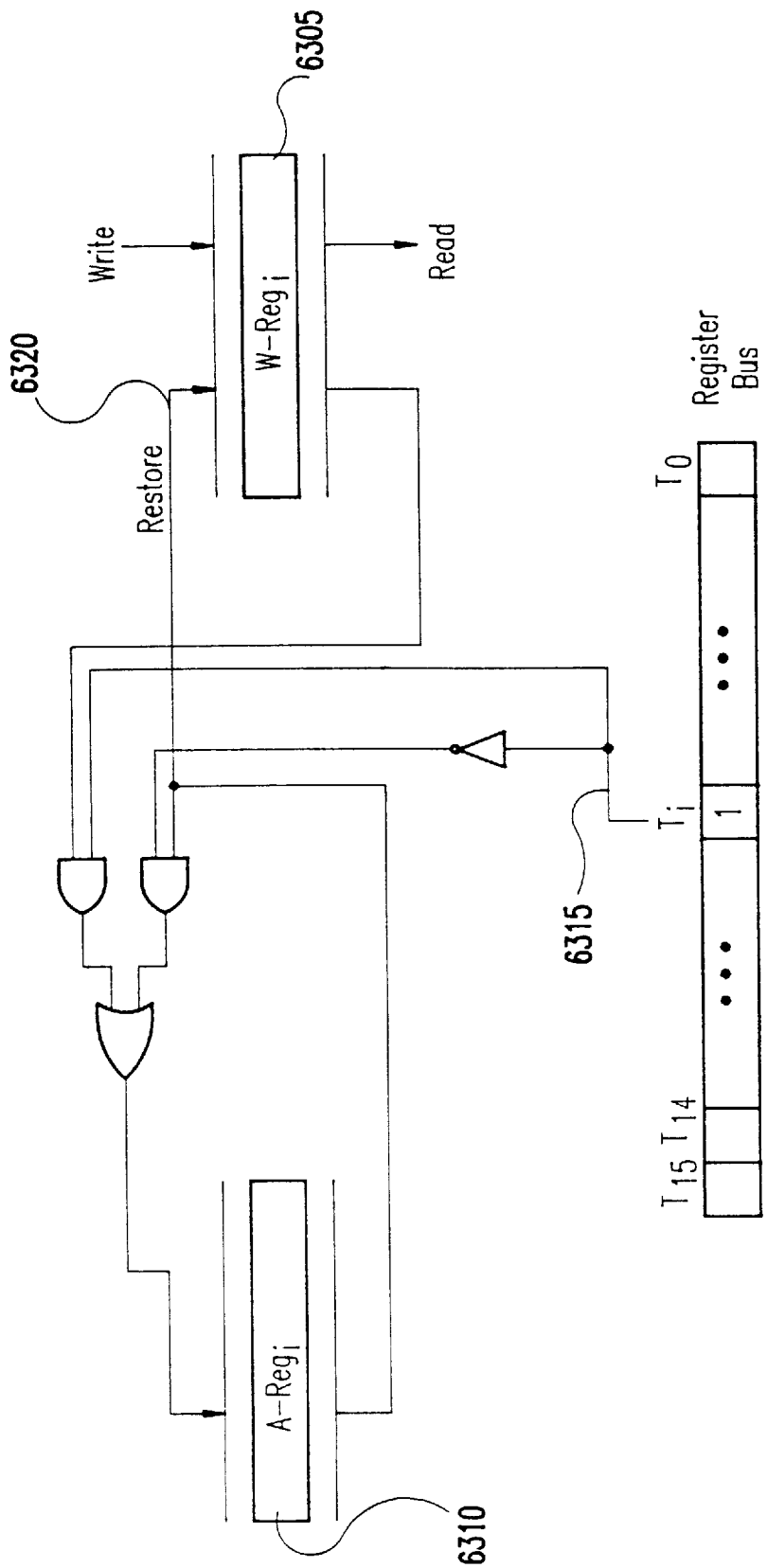
FIG. 63 shows register transfer logic.

As discussed above, one or more I-Groups may be removed from the Issue Unit concurrently. The WRITE-VECTORs of these I-Groups are placed on the Register Bus 6025. The Register Bus consists of bit positions with a one-to-one correspondence to WRITE-VECTOR elements. WRITE-VECTOR elements on the bus control the transfer of data from the W-Regs to the A-Regs via Register Transfer Logic 6030 (FIG. 60). The assertion of a WRITE-VECTOR element representing destination register $R_i$ on the Register Bus transfers a datum in W-Reg$_i$ to A-Reg$_i$. Since each WRITE-VECTOR contains at most one True element, the destination registers of multiple I-Groups may be represented concurrently on the Register Bus and multiple transfers are performed concurrently. FIG. 62 shows the transfer of the contents of W-Regs $R_3$ 6205 and $R_6$ 6210 to corresponding A-Regs due to the completion of $q_i$ and $q_{i+1}$ in a FDS with 16 architectural registers and a Stack size of 8. The Register Transfer Logic is not complex because W-Reg$_i$ is transferred to A-Reg$_i$ only. FIG. 63 shows logic for the transfer of W-Reg$_i$ 6305 to A-Reg$_i$ 6310. Bit position i of the Register Bus 6315 is True (as shown) when a WRITE-VECTOR representing register $R_i$ is asserted. The datum in W-Reg$_i$ is transferred to A-Reg$_i$. When bit position i is False, A-Reg$_i$ is written with its own contents. A-Reg$_i$ is transferred to W-Reg$_i$ via a Restore path 6320, shown in FIG. 63, when the Working Registers are placed in a sequential process state. When an interrupt occurs, the contents of the A-Regs are transferred to the W-Regs concurrently.

7.3.3 The Initiation of Interrupt Processing

It is necessary for the FDS to determine when to place the W-Regs in a sequential state. Logic is incorporated into Slot 0 in Stack to detect the presence of an interrupted instruction. Assume $q_{i+5}$ is associated with an exact interrupt. Its tag is placed on the Interrupt Bus 6035 (see FIG. 60). The interrupt bus connects units that detect interrupt causing conditions to Slot 0 in the Issue Unit. Instruction $q_{i+5}$ does not complete and so will occupy Slot 0 when preceding instructions have completed. This is the necessary condition for the transfer of A-Regs to W-Regs. The tag in the I-Group in Slot 0 is compared with tags on the Interrupt Bus. A match causes the W-Regs to be placed in a sequential process state. If more than one tag is asserted on the Interrupt Bus, the interrupt taken is the one associated with the instruction of highest precedence. It will reach Slot 0 before other instructions that may have caused an interrupt.

7.3.4 A Dependency Imposed Between Instructions

Figure 64:
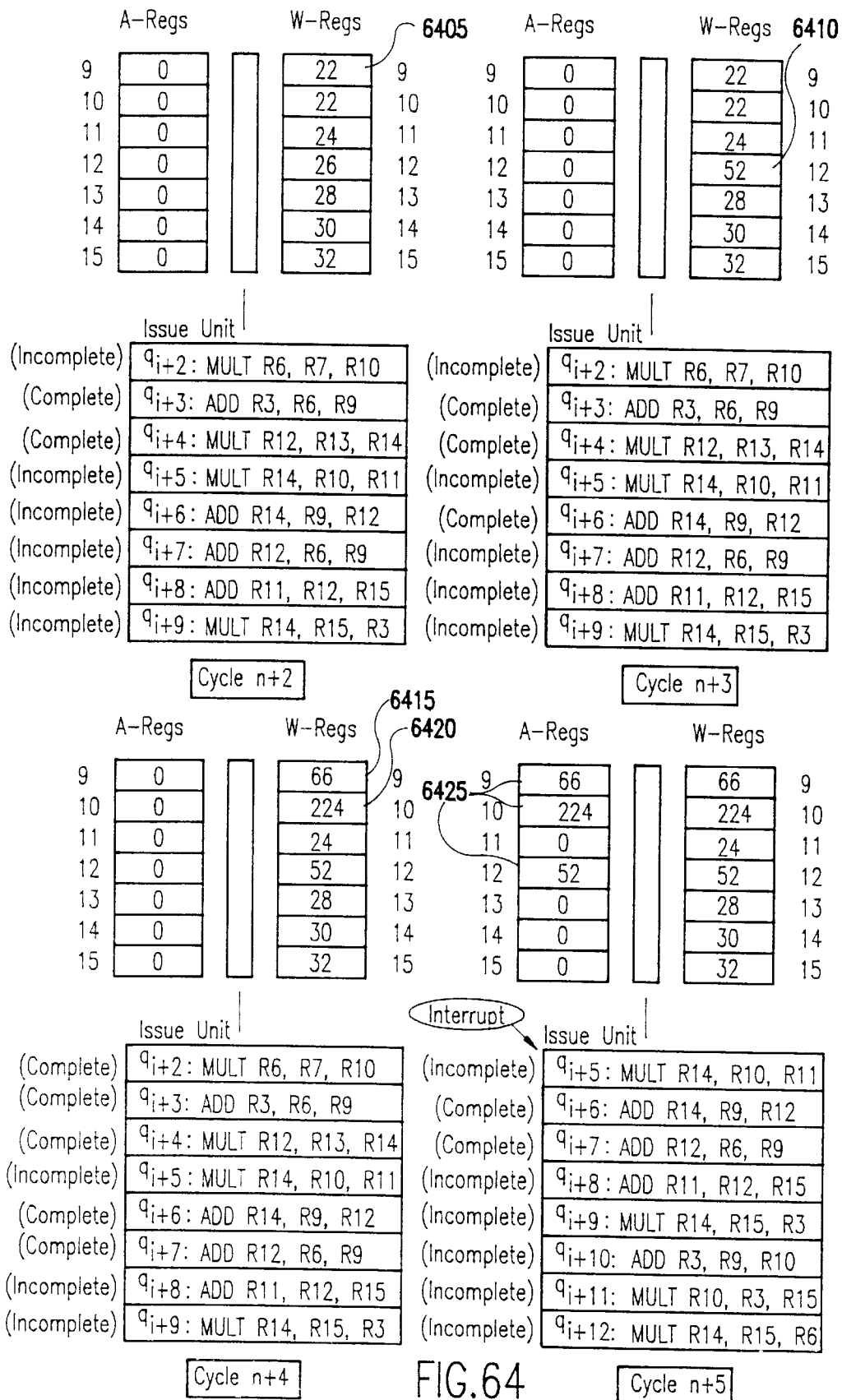
FIG. 64 shows an example overwriting of data.

There is a problem with the system as developed so far. A datum in a W-Reg may be overwritten before it is transferred to an A-Reg. This may cause the A-Regs to assume a state that is not a sequential process state. The problem is illustrated in FIG. 64. Instructions shown in the Issue Unit during cycle$_{n+1}$ in FIG. 62 continue to be processed in FIG. 64. During cycle$_{n+2}$, $q_{i+3}$ writes the value 22 into W-Reg$_9$ and completes 6405. It is not compressed out because the Issue Unit is using Top Compression and $q_{i+2}$ is not complete. During cycle$_{n+3}$, $q_{i+6}$ writes the value 52 to W-Reg12 6410 and completes. During cycle$_{n+4}$ $q_{i+7}$ writes the value 66 to W-Reg$_{10}$ 6415 and completes. The previous value in W-Reg$_{9,22}$ has been overwritten. Also during cycle$_{n+4}$, $q_{i+2}$ writes the value 224 to W-Reg$_{10}$ 6420 and completes. A compression operation is performed because there are contiguous completed instructions at the top of the stack. Instructions $q_{i+2}$, $q_{i+3}$, and $q_{i+4}$ are compressed out. This action transfers the contents of W-Reg$_9$, W-Reg$_{10}$, W-Reg$_{12}$ to corresponding A-Regs 6425. Instruction $q_i$+5 causes an exact interrupt during cycle$_{n+5}$. The A-Regs are not in a sequential process state. The value in A-Reg$_9$ is 66. A-Reg$_9$ would contain 22 in a machine that executed instructions in sequence to $q_{i+5}$. A problem is caused when an instruction overwrites the data generated by a previous instruction before it is transferred to the A-Regs. Therefore, instructions in the Issue Unit are prevented from overwriting data generated by a preceding instruction that has not been compressed out. An instruction has an address or WAW dependency on a preceding completed instruction in the Issue Unit if they write to the same address or register respectively. This solves the problem. However, a decrease in throughput results from generating this precise interrupt dependency (PI-dependency) between instructions. It is seen below that the decrease in throughput may not be so great as to justify a more complex approach.

7.3.5 Condition Code Registers

Figure 65:
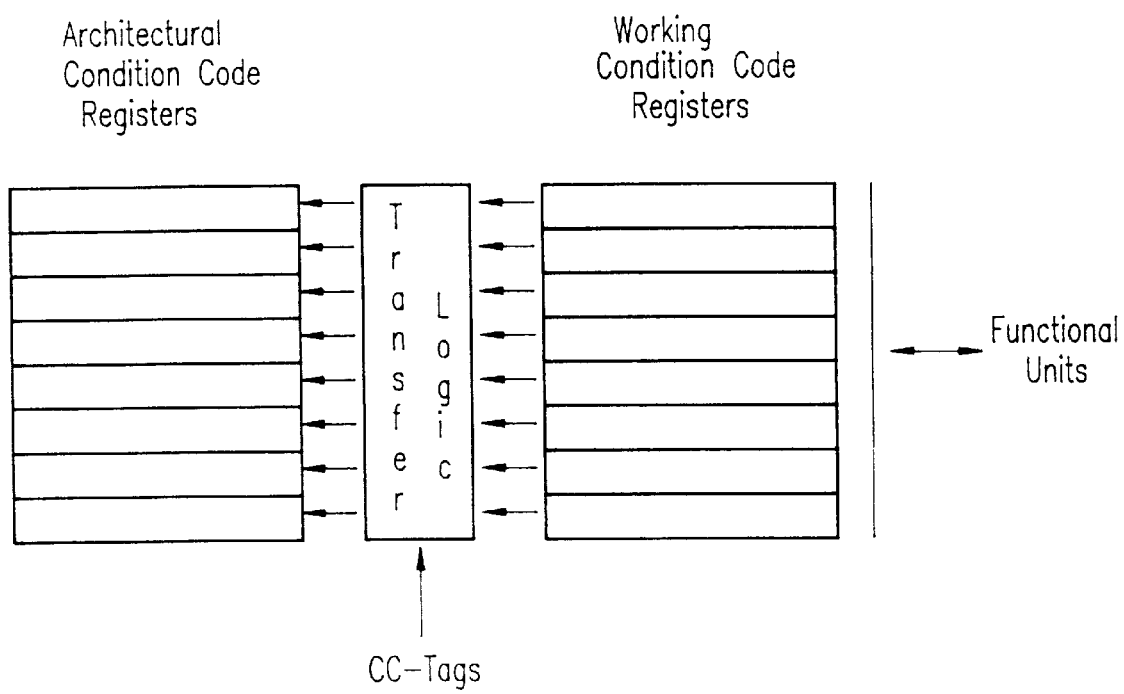
FIG. 65 shows condition code register sets.

An instruction set architecture may have condition code based branch instructions. When such an architecture is executed in a FDS system, a set of CC-Regs enables CC setting instructions to execute out-of-order (Section 5.4). To support the execution of such an architecture on a FDS with precise interrupts, an Architected Register (AC-Reg) 6505 is incorporated into the system (FIG. 65). The contents of one CC-Reg may be transferred into the AC-Reg each cycle. Recall that a CC-Tag is incorporated into the I-Group of an instruction that accesses a condition code register. The CC-Tag specifies a condition code register (CC-Reg) for the instruction to use.

The AC-Reg changes state only after a compression operation. The CC-Tag of the last I-Group in a compression block specifies a CC-Reg whoe contents are transferred to the AC-Reg. The AC-Reg is in the state the condition code register would have in a conventional machine after it executed the last instruction in the most recently compressed out group since transfers in to the A-Regs and the AC-Regs occur simultaneously, their contents always reflect the state of a conventional machine. The logic that controls the transfer of a CC-Reg to the AC-Reg is similar to the logic presented in section 7.3.2 when an interrupt occurs, the content of the AC-Reg is transferred into the CC-Regs. To prevent the overwriting of a CC-Reg before it is transferred to the AC-Reg, an instruction is not issued if its CC-Tag matches that of a preceding completed instruction that has not been compressed out.

7.4 Multiple Sets of Working Registers

Figure 66:
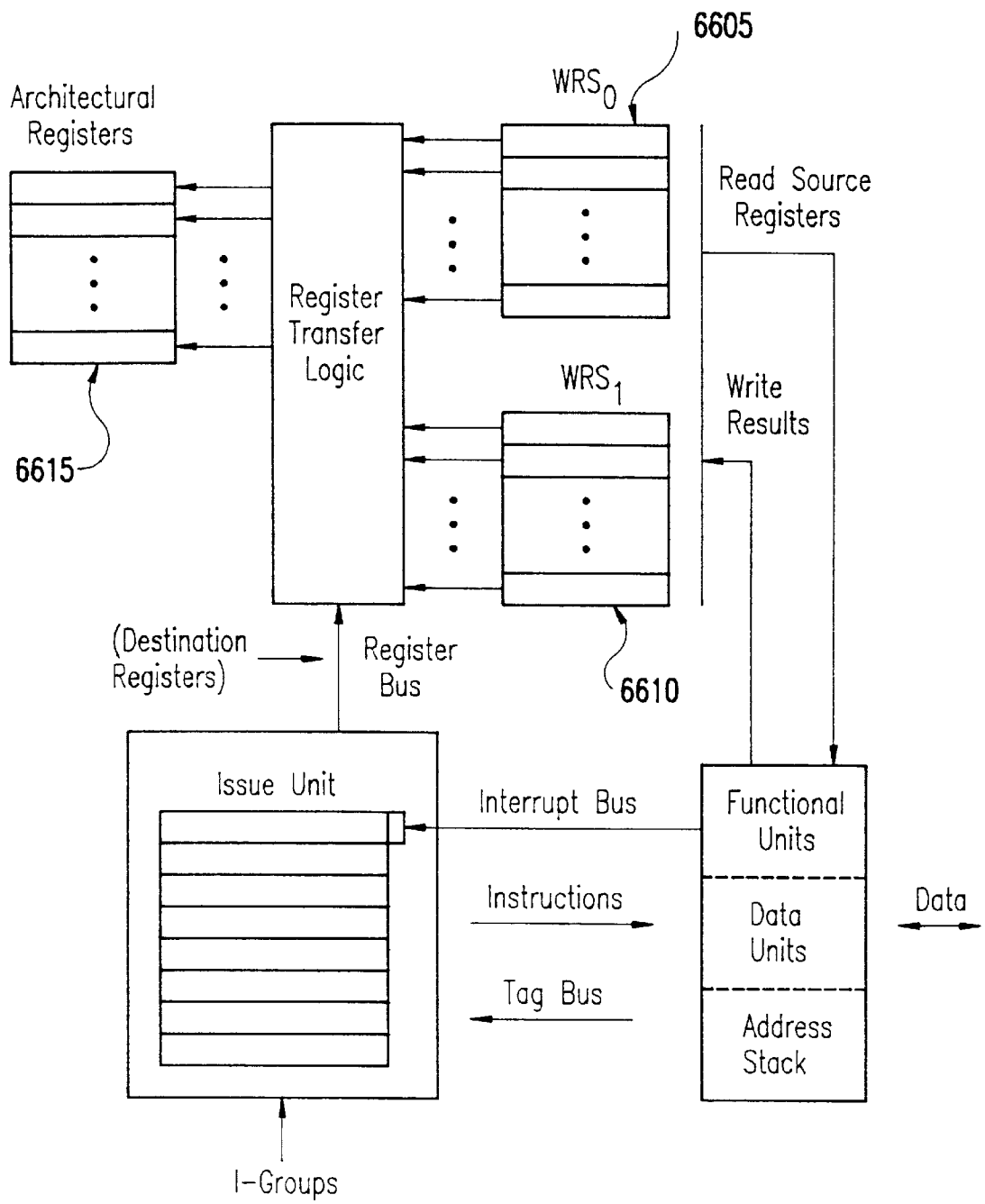
FIG. 66 shows the FDS with A-Regs and 2 working register sets.

Multiple sets of working registers may be incorporated into the FDS to decrease register dependencies using the technique presented in Section 6. Assume a FDS with two working register sets, $WRS_0$ 6605 and $WRS_1$, 6610 and a set of architectural registers 6615, the A-Regs as shown in FIG. 66. W-Regs correspond to the P-Regs of Section 6 and $WRS_0$ and $WRS_1$ correspond to $RS_0$ and $RS_1$. W-$Reg_i$ in $WRS_j$ is designated W-$Reg_{i,j}$. Its contents are transferred to A-$Reg_i$ when it is represented in an I-Group that is being compressed out of the Issue Unit.

7.4.1 The Selection of a W-Reg for Transfer to an A-Reg

Both W-$Reg_{i,0}$ and W-$Reg_{i,1}$ may be represented in I-Groups in the same compression block, i.e., two W-Regs may be eligible to transfer their contents to the same A-Reg. Assume that W-$Reg_{i,0}$ is represented in I-$Group_j$ and W-$Reg_{i,0}$ is represented in I-$Group_k$ and that both I-Groups are members of the same compression block. Clearly, the contents of only one W-Reg can be transferred to A-$Reg_i$. The W-Reg that is transferred is the one that produces a sequential process state in the A-Regs. This is the register that would have been written last by a machine executing the instructions in the compression group in sequence. Therefore, W-$Reg_i$,1 of I-$Group_k$ is transferred to A-$Reg_i$ if $q_k$ follows $q_j$, otherwise W-$Reg_{i,0}$ is transferred. Instruction $q_k$ follows $q_j$. when I-$Group_k$ is in a slot below I-$Group_j$.

Figure 67:
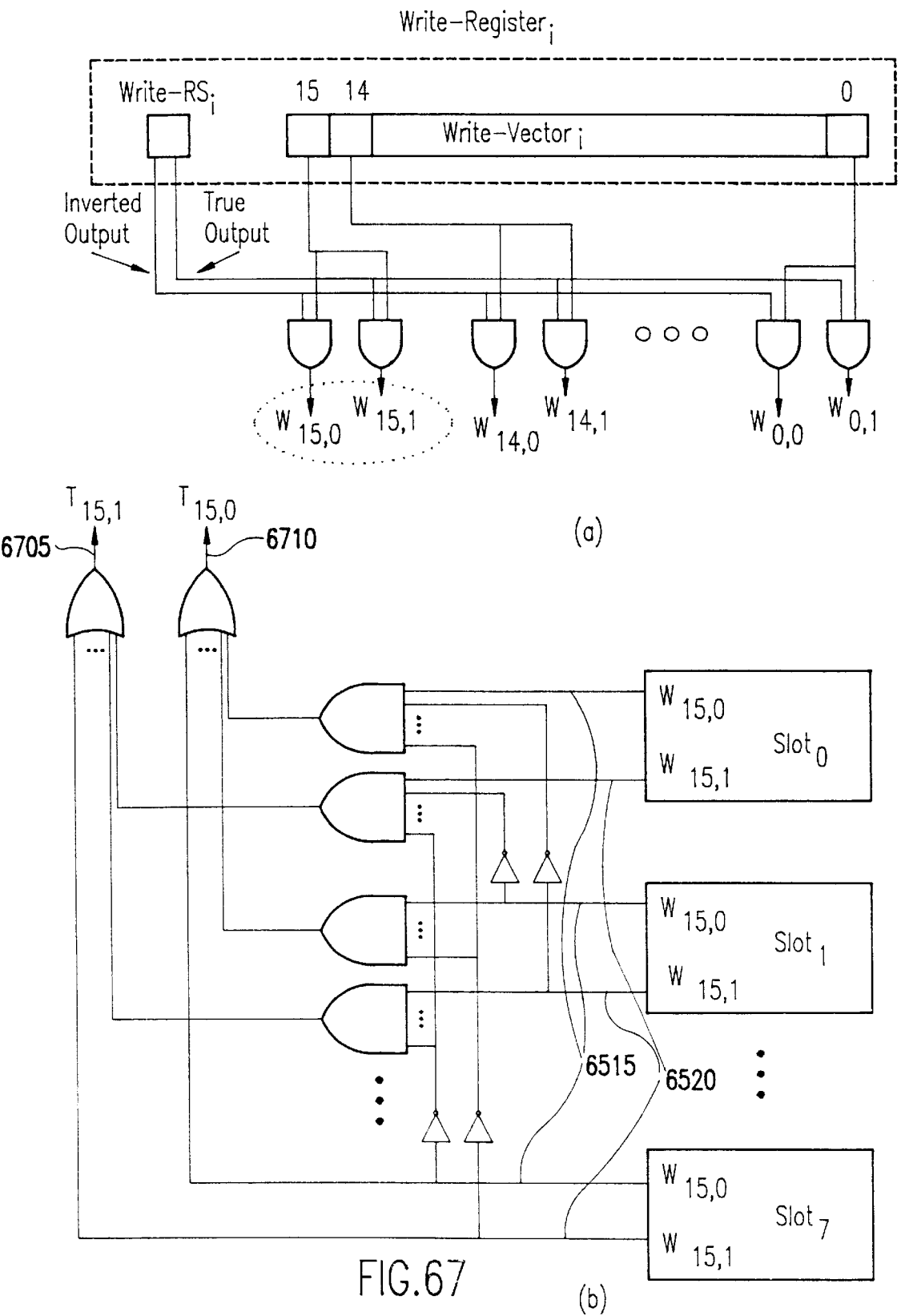
FIG. 67 shows transfer selection logic.

The logic controlling the transfer of the contents of either W-$Reg_{i,0}$ or W-$Reg_{i,1}$ to A-$Reg_i$ is shown in FIG. 67. Assume there are 16 A-Regs and 2 sets of working registers with 16 registers each. FIG. 67(*a*) shows logic associated with WRITE-$VECTOR_i$ that generates a W-Reg assignment from a resister set assignment and an A-Reg. This logic is similar to FIG. 53 in Section 6, and is discussed in section 6.2.2.3. The Register Bus is composed of 32 transfer bits, one for each W-Reg. W-$Reg_{i,j}$ is transferred to A-$Reg_i$, when transfer bit $T_{i,j}$ is true. FIG. 67(*b*) shows logic to generate $T_{15,1}$ 6705 and $T_{15,0}$ 6710 from the $W_{15,0}$ 6715 and $W_{15,1}$ 6520 output of each Issue Unit slot. A True $W_{15,0}$ output, for example, prevents preceding I-Groups in the Stack from causing the transfer of W-$Reg_{15,1}$ to A-$Reg_{15}$. The W-$Reg_{15,1}$ outputs operate in the same fashion to prevent a transfer of W-$Reg_{15,0}$ to A-$Reg_{15}$. The transfer indicated by I-Group of lowest precedence in the compression group will therefore dominate.

7.4.2 Sequential State and Multiple Working Register Sets

When an interrupt occurs, the contents of the A-Regs are transferred to $WRS_0$ and $WRS_1$, placing them both in the same sequential process state. This is necessary if the execution of instructions stores the state of the A-Regs. Registers in the instructions performing the stores are renamed upon entering the Buffer Unit. The register set assignment given an A-Reg in an instruction is difficult to know in advance, therefore both working register sets are placed in the same state. If special hardware stores the sequential process state, it is necessary for only one of the working register sets to be placed in a sequential process state. The hardware then stores its contents.

If special hardware restores the sequential process state, both $WRS_0$ and $WRS_1$ are both returned to the saved state. When the instruction stream restarts, the registers it contains are renamed as they are processed by the Buffer Unit. Registers may be given names different from the ones they had when the interrupt occurred. Since the state of both sets of W-Regs are identical, instructions will access their intended data.

If the execution of instructions restores the sequential process state, the situation is that of an instruction stream entering the FDS for the first time. The register renaming logic ensures that instructions access their intended data.

7.4.3 Condition Code Registers and Multiple Working Register Sets

An instruction set architecture that uses condition code based branch instructions can execute on a FDS with precise interrupts using multiple working register sets. The technique presented in section 7.3.5 above for use in a FDS with one set of working registers is used without modification. One set of W-CC-Regs is used. Multiple sets of W-CC-Regs are not necessary to decrease dependencies between instructions setting the architected condition code register. This is done by the assignment of CC-Tags to instructions and the use of multiple condition code registers.

7.5 Precise Interrupts and Memory

Main memory maintains a sequential process state. If an instruction $q_i$ causes an exact interrupt, memory is left as it would be in a machine that executed instructions up to $q_i$ in sequence.

7.5.1 The Memory System

Figure 68:
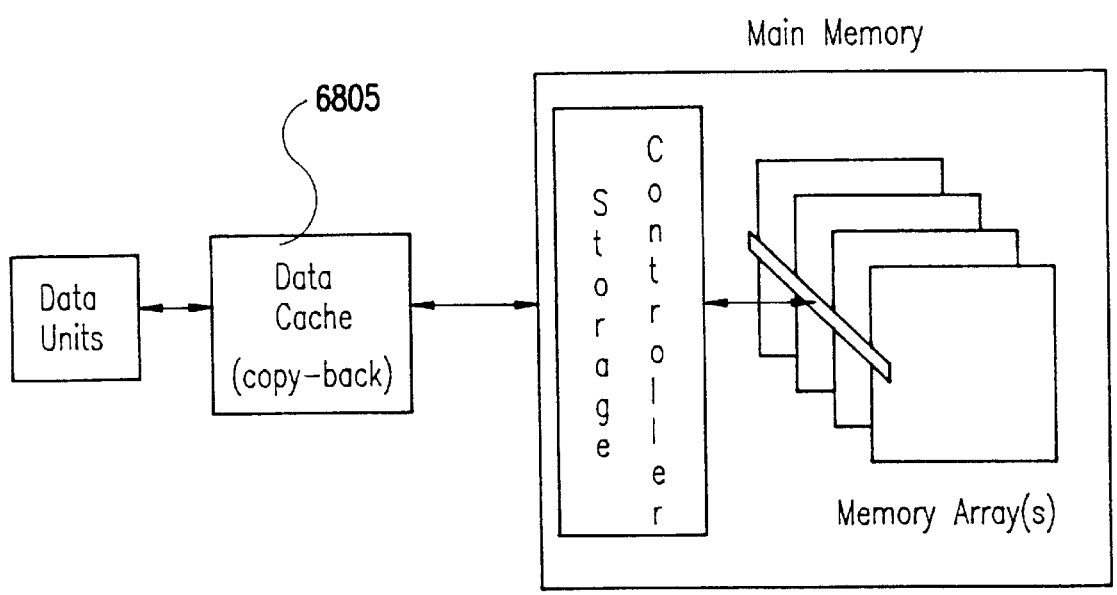
FIG. 68 shows data units, data cache, and main memory.

The FDS performs out-of-order loads and stores to the Data Cache. The data units, the cache and main memory are shown in FIG. 68. Since stores alter the state of the cache, they require special consideration. As stated above, the Data Cache 6805 is a copy-back cache. Load and store instructions access data in its cache lines. A cache line contains the data of one or more contiguous main memory locations. It is the minimum amount of main memory data that the cache can read or write to main memory. How the cache lines are organized and referenced is part of a cache architecture. A cache architecture for a multiple, out-of-order instruction issue machine is not investigated here. An approach that may be incorporated into such an architecture is presented. It maintains main memory in a sequential process state and allows out-of-order stores to the data cache.

The approach is similar to the one proposed above to maintain the A-Regs in a sequential process state. In the following proposal, the data cache performs a function for main memory similar to the one performed by the W-Regs for the A-Regs.

7.5.2 Data Cache Operation

A store to the cache is allowed if its address does not conflict with that of a preceding instruction (complete or incomplete) in the Issue Unit. The Address Stack enforces this condition. A datum stored into the cache is marked dirty and locked. The dirty status signifies that the datum has been written since it was brought into the cache. The locked status signifies that the instruction that wrote the datum may have executed out-of-order. A locked datum is not copied to main memory. When the instruction that wrote a datum is compressed out of the Issue Unit, the datum is unlocked. A datum marked dirty and unlocked is copied to the main memory. Since instructions are compressed out of the Issue Unit in instruction stream order, main memory is maintained in a sequential process state.

Let instruction $q_i$ cause exact interrupt. Preceding instructions complete and are compressed out of the Issue Unit. When a store instruction is compressed out, data it wrote to the cache is unlocked. When $q_i$ reaches Slot 0 in the Issue Unit, dirty but unlocked data in the cache are copied to main memory. This data was written by instructions preceding $q_i$. A locked datum that remains was written by an instruction following $q_i$ and is thrown away. Main memory (and cache) is now in the state that it would have in a sequential machine that executed instructions preceding $q_i$.

7.5.3 Cache Line Structure

Figure 69:
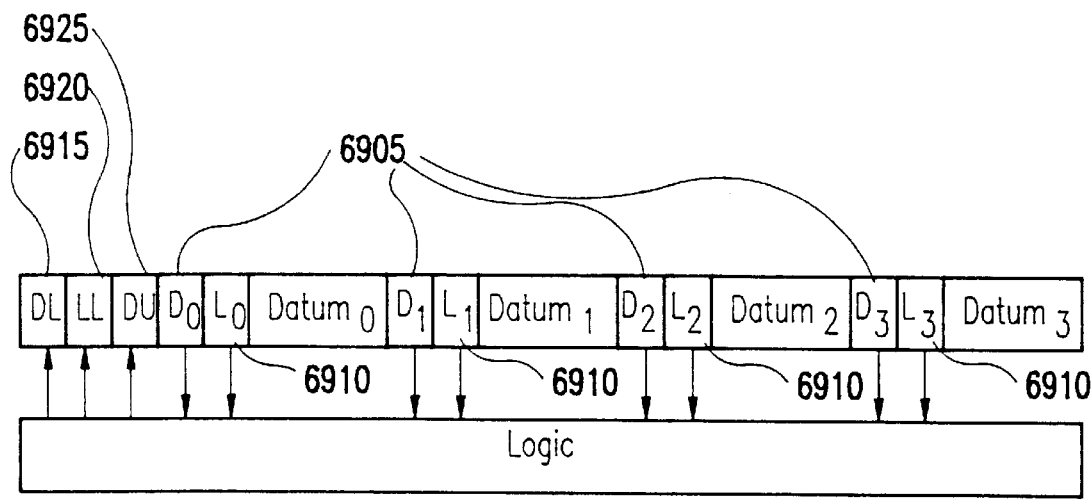
FIG. 69 shows a cache line.

This approach is examined in more detail. FIG. 69(*a*) shows an illustrative cache line that contains 4 datums. Two status bits, $D_i$ 6905 and $L_i$, 6910 are associated with Datum$_1$. Dirty bit $D_i$ is True if Datum$_i$ has been written since its cache line entered the cache. Lock bit $L_i$ is True while the instruction that wrote Datum$_i$ is in the Issue Unit. Three status bits, Dirty Line (DL) 6915, Line Lock (LL) 6920, and Dirty and Unlocked (DU) 6925 indicate the status of a cache line. These status bits may be encoded into 2 status bits in an actual implementation. Dirty Line is True if the line has been written to. Line Lock is True if a datum in the line is locked. Dirty and Unlocked is True if the line contains a dirty but unlocked datum. FIG. 69(*b*) shows the logic equations for these status bits.

7.5.4 A Cache Line With Locked Data and Unlocked Dirty Data

Assume that an instruction $q_i$ has caused an exact interrupt, preceding instructions have completed, and $q_i$ is now in Slot 0. All datums written by preceding instructions have been unlocked. The unlocking system is presented below. All datums with a dirty status are copied to the main memory. An entire cache line may be unlocked, i.e., DL is True, LL is False and DU is True, in which case the entire line is copied to main memory. However, a cache line may contain both locked and unlocked data when an interrupt causing instruction is in Slot 0. FIG. 70 shows how this can happen. Assume the cache line 7005 in FIG. 70(*a*) has not been stored to and that the Issue Unit contains the instructions shown. Let $q_{i+1}$ and $q_{i+3}$ write to the cache line as shown in FIG. 70(*b*). Assume $q_{i+2}$ causes an exact interrupt at this time. FIG. 70(*c*) depicts the state of the cache line after $q_i$ and $q_{i+1}$ have compressed out of the Issue Unit. The datum written by $q_{i+1}$ 7010 has been unlocked. The problem is that while a cache line is the minimum amount of data the cache can access, Datum$_1$ must be copied to main memory. The cache cannot store the entire cache line because Datum$_2$ 7015 is locked. The cache performs a read-modify-write operation on the original cache line in main memory. The cache line is fetched from main memory, dirty and unlocked data are merged with it, and it is written back to main memory. Alternatively, the entire cache line is sent to the storage controller with the dirty and unlocked data specified. The storage controller fetches the cache line from main memory, merges the specified data with it, and writes the line back to main memory. These read-modify-write operations may be interleaved with other memory activity. The effect that these operations have on throughput is dependent on the frequency of exact interrupts and the detailed structure of the memory system.

7.5.5 Data Unlocking

Figure 71:
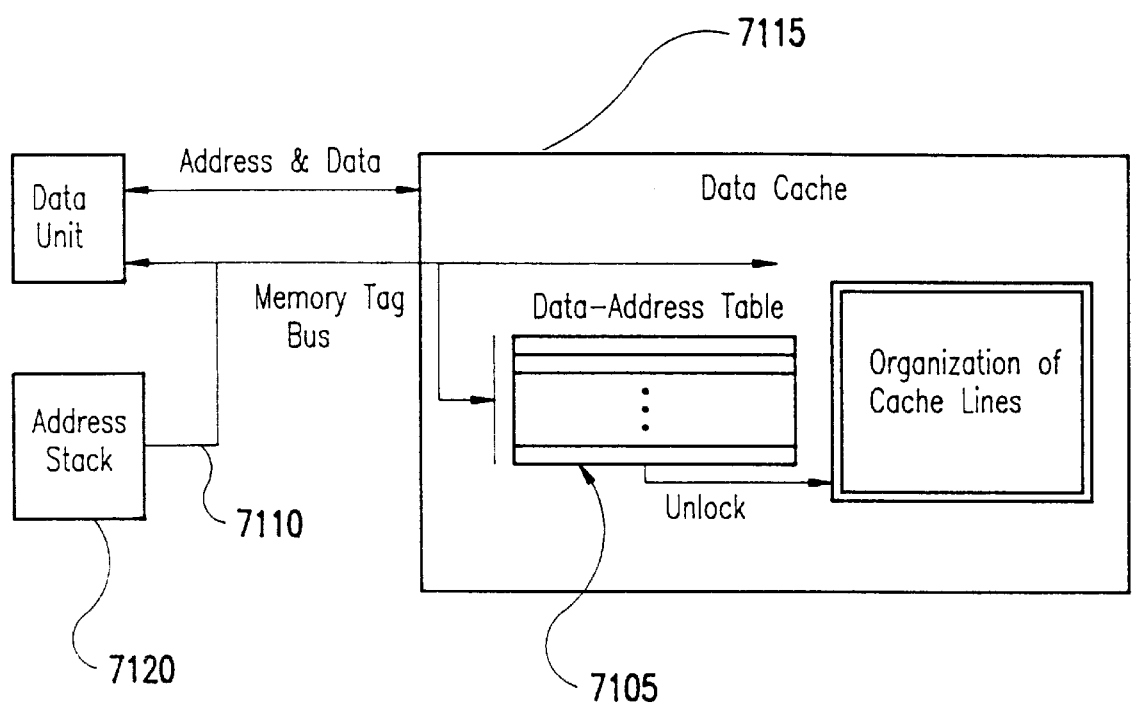
FIG. 71 shows the data-address table in the data cache

Recall that as part of store instruction execution, the Data Cache returns the store instruction's tag to the Data Unit. At this time, the data cache enters a Data-Address that describes the location of the datum in the cache in the cache Data-Address Table 7105 (FIG. 71). This table has an entry for each tag in the FDS system. An entry in this table is addressed by a instruction's tag. Recall that the Address Stack and the Issue Unit Stack concurrently compress out identical instructions. When a store instruction's A-Group (section 4.3.2.5) is compressed out of the Address Stack, 4020 its tag is sent to the Data Cache on the Memory Tag Bus 4025 and 7110 (FIG. 40). The Data Cache 7115 asserts the tags of completed storage instructions on the Memory Tag Bus 7110. The Memory Tag Bus is multiplexed during a machine cycle to carry tags to the Data Cache from the Address Stack 7120. Tags concurrently asserted by the Address Stack on the Memory Tag Bus access multiple entries in the Data-Address Table 7105. The Data-Address entries are used to unlock datums in cache lines.

7.5.6 Cache-Related Issues

The above discussion of the Data Cache addresses some of the elements of a cache design that supports precise interrupts in a machine that may execute multiple out-of-order instructions. There are other issues related to the cache architecture.

The Data Cache cannot allow too many cache lines to become locked. On a cache miss, a locked line cannot be copied back to main memory to make room for a new cache line. The maximum number of cache lines that can become concurrently locked is one less than the size of the Stack. This number may not be significant relative to the total number of lines in a cache but poor performance or deadlock may result in a set associative cache [Smit 82] if many locked lines are in the same set. Assume instructions following instruction $q_i$ cause all the cache lines in a set s to become locked. If $q_i$ then experiences a cache miss on a cache line that maps to set s, deadlock results. One way to prevent this is for at least one cache line in a set to be unlocked at all times. The best way to do this and maintain high cache performance is not investigated here.

A store instruction may not overwrite a datum marked dirty in a cache line. For assume a store overwrites a dirty datum and let a preceding instruction cause an interrupt. The datum that the store overwrites is lost. Since the datum was dirty, main memory does not have a copy of it. A sequential process state cannot be generated. Therefore, when such a store is attempted, dirty and unlocked data in the line are copied to main memory before the data is written into the cache line. This is cache line cleaning. Cache line cleaning is an overhead to cache and main memory operations. The frequency and effects of this procedure are not investigated here. It should be noted that a store can not attempt to overwrite a dirty and locked datum. Since the datum is locked, the store instruction that wrote it has not been compressed out. Recall that the Address Stack prevents a store to the address a preceding store instruction that has not been compressed out.

7.6 Throughput Measurements

Figure 72:
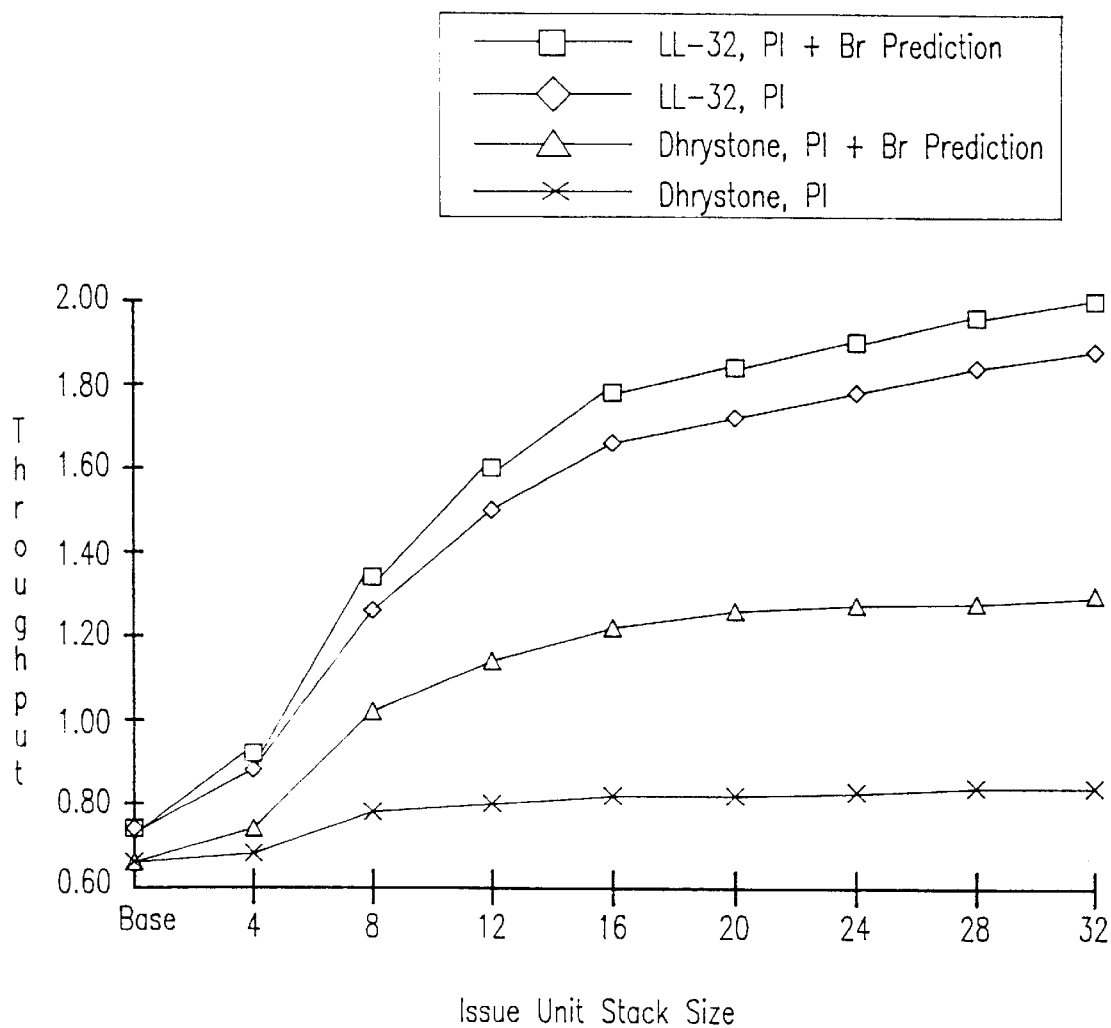
FIG. 72 shows throughout including effects of branch prediction as a function of stack size.

The throughput of the FDS with precise interrupts is measured with the simulator and as illustrated in FIG. 72. Benchmark throughputs on FDS$_{\{PI\}}$ systems with 1 and 2 sets of working registers are given in Table 7.1. Speedups relative to the Base Machine are given in Table 7.2.

SECTION 8

Instruction Squashing for Branch Prediction

The effectiveness of multiple, out-of-order issue to functional units may decrease if instructions following an undecided branch can not be executed. Branches comprise about 15% to 30% of executed instructions in many applications [McHe 86]. They comprise about 4% of the Livermore Loops and 19% of the Dhrystone Benchmark. As an uncompleted branch instruction is compressed upward in the IU, the window of instructions from which issuances can occur becomes smaller. Throughput decreases and functional units may idle.

The targets of branch instructions may be predicted with techniques presented by others [LeSm 82] [McHe 86] [$L_i$lj 88]. These techniques achieve a prediction accuracy of about 80% to 98% depending on the nature of the computation and the technique employed. They are not investigated here. A key issue associated with using branch prediction in a processor that may issue multiple, out-of-order instructions is the nullification of the effects of instructions executed on incorrectly predicted paths (squashing). This is more difficult than in a sequential machine because instructions preceding and following a predicted branch may execute concurrently and out-of-order before its outcome is known. A net throughput increase results from branch prediction if gains on correctly predicted paths outbalance the losses incurred from squashing. Thus fast squashing is important. Previous proposals (RUU, HPSm, SIMP, and Dispatch Stack) do not describe a squashing function and its speed. The question is, can fast instruction squashing be incorporated into a multiple, out-of-order instruction issuing mechanism. This question is answered affirmatively in this disclosure.

A squashing technique is presented that is incorporated into the FDS structure. The simulator is used to measure the throughput of the benchmarks on a FDS with branch prediction using the squashing technique.

8.1 Branch Instruction Penalties

A branch instruction, $q_B$, transfers control to $q_{B+1}$ or to an out-of-sequence branch target instruction. The branch target is not known until $q_B$ executes. Since $q_{B+1}$ is often fetched before $q_B$ executes, a transfer of control to $q_{B+1}$ usually causes little or no processing delay. Processing is delayed if control is transferred to an out-of-sequence branch target that is fetched after $q_B$ executes. The delay (branch latency penalty) is a result of system latency in the fetching and execution of an instruction. A multiple, out-of-order instruction issuing machine incurs an additional penalty, a branch shadow penalty. Instructions following an unexecuted branch can not execute even if functional units are available and they have no dependencies on unexecuted instructions. The branch shadow penalty is the lost opportunity for instructions following a branch instruction to execute (possibly in multiples and out-of-order) before the branch is executed.

Branch prediction schemes attempt to reduce branch penalties by predicting and fetching the target of a branch instruction before the branch is executed. A branch prediction algorithm may be simple (e.g., always predict a taken branch) or more complex, with the past behavior of a branch considered. Correct predictions decrease or eliminate branch penalties. When a prediction is incorrect, the effects of any initial processing on the incorrect path are squashed and the correct branch target is fetched.

8.2 Instruction Squashing

A technique is presented that performs fast squashing in a FDS with precise interrupts, enabling a branch prediction scheme to be incorporated. The technique can be applied to a FDS system that uses multiple register sets to decrease dependencies. In order to support fast squashing, the following dependencies are imposed on instructions: A store instruction following a uncompleted branch instruction is not issued and an instruction that has a WAW dependency on a preceding completed instruction in the IU is not issued. These dependencies are discussed below in Section 8.2.3. Dependency-free instructions preceding and following one or more predicted conditional branches may issue in multiples and out-of-order. The squashing function eliminates the effects of instructions executed following an incorrectly predicted branch in one machine cycle.

8.2.1 The Squashing Operation in the FDS

A FDS system with squashing incorporates the precise interrupt system previously presented. It is augmented to support squashing in addition to precise interrupts. We assume that a branch prediction mechanism is incorporated into the Buffer Unit. Prediction mechanisms are not discussed in depth here as they have been presented elsewhere by others.

When the Buffer Unit detects a branch instruction, $q_B$, in a fetch block, a prediction algorithm guesses the outcome of the branch. For example, the lower order bits of $q_B$'s address may be used to access a table entry that contains bits that represent the taken/not taken history of its last few executions [LeSm 84]. These bits are used to predict $q_B$'s outcome. If $q_B$ is predicted to be taken, the target instruction and instructions following it are fetched and transferred to the Issue Unit. If $q_B$ is predicted to be not taken, the fetching of instructions on the present path continues. The Buffer Unit saves $q_B$'s predicted outcome.

When dependencies allow, $q_B$ is issued to the Buffer Unit for execution. The Buffer Unit compares $q_B$'s outcome with its predicted outcome. If the predicted outcome is correct, the Buffer Unit places $q_B$'s tag the IU on the Tag Bus, signifying a successful execution. The branch instruction is then marked complete in the IU. If $q_B$'s predicted outcome is incorrect, its tag is placed on the Interrupt Bus.

Assume that $q_B$ has executed and is found to be incorrectly predicted. Since $q_B$ does not complete, it eventually occupies Slot 0. Recall that the tag of an instruction in Slot 0 is compared with tags on the interrupt bus in a FDS system with precise interrupts. A match causes the contents of the A-Regs to be transferred to the W-Regs. After the transfer, the A-Regs and the W-Regs are then in the state that they would have in a sequential machine that executed instructions up to $q_B$.

Since store instructions that follow an uncompleted branch instruction are not executed (discussed in Section 8.2.3), memory has not changed by the execution of instructions following $q_B$. The effects of the execution of instructions that followed $q_B$ are thus eliminated in one cycle. Cycles taken to move $q_B$ into Slot 0 are not counted because instructions preceding $q_B$ are being issued and executed during this time.

A branch instruction may issue and complete out-of-order relative to instructions in the IU (including branch instructions). An incorrectly predicted branch causes the effects of the execution of following instructions to be nullified. These instructions may include correctly and incorrectly predicted branch instructions.

8.2.2 Instruction Transfers to the IU After an Incorrect Prediction

The question is asked, given that branch instructions may execute out-of-order, should a correct instruction stream be fetched and transferred to the IU as soon as possible after a branch prediction is found to be incorrect. Assume instruction fetching on the correct path starts immediately after the prediction of a branch instruction, $q_B$, is found to be incorrect.

The instructions on $q_B$'s correct path replace instructions in the IU that follow $q_B$. Instruction $q_B$ moves upward in the IU as compression operations take place and may be in any slot when instructions on the correct path are ready for transfer to the IU. Therefore, the control of this transfer is difficult and adds complexity to the IU.

The instructions on $q_B$'s correct path can not issue until $q_B$ reaches Slot 0 and the contents of the A-Regs are transferred to the W-Regs. Otherwise they may access W-Regs that have been written by instructions executed on $q_B$'s incorrect path.

Assume that a branch instruction that precedes $q_B$ completes execution after $q_B$ and is found to have been incorrectly predicted. Memory activity caused by the fetching of instructions on $q_B$'s correct path does no useful work because $q_B$ itself is on the wrong path. The resumption of execution on a correct path may be significantly hindered if a memory access caused by fetching on $q_B$'s correct path causes a page fault.

For the above reasons, the Buffer Unit does not fetch instructions on the correct path of an incorrectly predicted branch instruction $q_B$ until f:.$q_B$ reaches Slot 0 and a transfer of A-Regs to W-Regs takes place. Instructions on the correct path then fill the entire IU, starting at Slot 0.

8.2.3 Dependencies Imposed Between Instructions

Two dependencies between instructions are mentioned above: A store instruction following an uncompleted branch instruction is not issued and an instruction that has a WAW dependency on a preceding completed instruction in the IU is not issued.

The second dependency is a part of the precise interrupt scheme adopted and is discussed in Section 7.3.4. It is imposed in a FDS system with precise interrupts and prevents the overwriting of a W-Reg before its contents are transferred to its corresponding A-Reg.

The first dependency is imposed in a FDS system with branch prediction so that unlocked data in the data cache does not have to be copied back to the main memory when a branch that is predicted incorrectly occupies Slot 0. Recall that unlocked and locked data in the Data Cache has been written by instructions preceding and following, respectively, the instruction in Slot 0 (section 7.5.2). Consider for the moment the following instruction squashing approach that does not impose this dependency.

Assume that store instructions following branch instruction $q_B$ issue and complete before $q_B$ is executed. Let branch instruction $q_B$ be incorrectly predicted. When $q_B$ transfers into Slot 0, the contents of the A-Regs are transferred to the W-Regs and dirty and unlocked data in the Data Cache are transferred to main memory (memory reconciliation). If memory reconciliation is not performed, the Data Cache becomes filled with locked data that is never unlocked because it is invalid. It is invalid because it was written by an instruction on an incorrect path. The filling of the Data Cache with locked and invalid data decreases its hit ratio. After memory reconciliation, the W-Regs and the main memory are in the state they would have in a sequential machine that executed instructions up to the incorrectly predicted branch.

The problem with this approach is that the time taken by memory reconciliation decreases or eliminates the benefit of the branch prediction mechanism. To eliminate the need for memory reconciliation when a branch instruction is predicted incorrectly, a store instruction following an unexecuted branch instruction is not issued. The Data Cache contains no locked data written by an instruction on an incorrect path because store instructions on a predicted path are not issued.

8.3 Measurements

The simulator is used to measure the throughput of the benchmarks on FDS systems incorporating branch prediction with the squashing technique presented above. The FDS systems also necessarily supports precise interrupts. Assume that a branch prediction scheme with an average prediction accuracy of 85% can be incorporated into the FDS. This accuracy is achieved by a simple prediction algorithm based on a branch instruction's last 2 outcomes [LeSm 84]. Measurements on FDS systems with other branch prediction accuracies are made for comparison.

Benchmark throughputs on a FDS with 1 register set, precise interrupts, and branch prediction (85% accuracy) are given in Table 8.1. These are increases over that on a FDS with precise interrupts without branch prediction (Table 7.1). The Dhrystone Benchmark throughput is significantly increased by branch prediction. A throughput of 1 instruction per cycle is achieved on a FDS with 16 slots, 1 register set, precise interrupts, and branch prediction (85% prediction accuracy). The Livermore Loops, with a smaller percentage of branch instructions, experiences less of a throughput increase than the Dhrystone Benchmark.

The speedups of the benchmark throughputs relative to the Base machine and the Base+BP machine (with a prediction accuracy of 100%) are presented in Table 8.3.

While we have described our preferred embodiments of our inventions, it will be understood that those skilled in the art, both now and in the future, upon the understanding of these discussions will make various improvements and enhancements thereto which fall within the scope of the claims which follow. These claims should be construed to maintain the proper protection for the inventions first disclosed.

TABLE 2.1

A comparison of dynamic scheduling approaches.

| Algorithm | First Issuance of an Instruction | | Second Issuance of an Instruction | | Precise Interrupts | Branch Prediction | Fine Grain Parallelism Exploited | Cycle Time |
| --- | --- | --- | --- | --- | --- | --- | --- | --- |
| | Description | Destination | Description | Destination | | | | |
| Thornton's | Single, In-Order | Functional Units | N/A | N/A | No | No | Low | Fast |

TABLE 2.1-continued

A comparison of dynamic scheduling approaches.

| Algorithm | First Issuance of an Instruction Description | First Issuance of an Instruction Destination | Second Issuance of an Instruction Description | Second Issuance of an Instruction Destination | Precise Interrupts | Branch Prediction | Fine Grain Parallelism Exploited | Cycle Time |
|---|---|---|---|---|---|---|---|---|
| Tomasulo's | Single, In-Order | Rservation Stations | Multiple Out-of-Order | Functional Units | No | No | Low | Fast |
| HPSm | Single, In-Order | Node Tables | Multiple, Out-of-Order | Functional Units | Yes | Yes | Low | Fast |
| Sohi's RUU | Single, in-Order | RUU | Single, Out-of-Order | Functional Units | Yes | In Research | Low | Fast |
| SIMP | Multiple, In-Order | Pipelines (4) | Multiple, Out-of-Order | Functional Units | Yes | Yes | Medium | Slow |
| Torng's DS | Multiple, Out-of-Order | Functional Units | N/A | N/A | No | No | High | Slow |

TABLE 4.1

Data Unit actions in Phase A and in Phase B.

| | Phase A | Phase B |
|---|---|---|
| LOAD | • Read Address Registers<br>Generate Effective Address<br>• Insert Address in Address Stack<br>• Access Memory when Address Conflict Free<br>• Receive Data From Memory<br>• Buffer Data if Required | • Write Data Register when Memory Access is Complete |
| STORE | • Read Address Registers<br>• Generate Address in Data Unit<br>• Insert Address in Address Stack | • Read Data Register<br>• Buffer Data if Required<br>• Access Memory when Address Conflict Free<br>• Receive Tag from Memory |

TABLE 5.1

Statistics gathered by the Simulator.

| Counts | Histograms |
|---|---|
| • Machines cycles<br>• Instruction types<br>• Issuances per slot | • Instruction lifetimes<br>• Issued but incomplete instructions per cycle<br>• Issuances per cycle
• Issuances denied due to FU non-availability per cycle<br>• Basic block sizes |

TABLE 5.2

Simulator input parameters.

- • IU Stack Size
- • Number of Functional Units
- • Number of Data Units
- • Data Unit Buffer Size TABLE 5.2-continued Simulator input parameters.

- • Top or Total Compression
- • Number of IU Ports
- • Fetch Block Size
- • Number of Register Sets
- • Maximum Number of Data Cache Access Requests
- • Multiple Phase or Single Phase Storage Instruction Issue
- • Sequential Instruction Issue Mode
- • Precise Interrupt Mode
- • Branch Prediction Mode
- • Branch Prediction Accuracy

TABLE 5.3

Benchmark trace characteristics.

| Benchmark | No. Insts | % Loads | % Stores | % Branches |
|---|---|---|---|---|
| LL1 | 6803 | 35 | 6 | 6 |
| LL2 | 6572 | 33 | 3 | 3 |
| LL3 | 9005 | 33 | 11 | 11 |
| LL4 | 5069 | 33 | 13 | 7 |
| LL5 | 9631 | 31 | 10 | 3 |
| LL6 | 14948 | 47 | 9 | 2 |
| LL7 | 5163 | 40 | 2 | 2 |
| LL8 | 9465 | 27 | 3 | 1 |
| LL9 | 7303 | 25 | 1 | 1 |
| LL10 | 12803 | 22 | 15 | 1 |
| LL11 | 7007 | 29 | 14 | 14 |
| LL12 | 7995 | 25 | 12 | 12 |
| LL13 | 16899 | 25 | 10 | 1 |
| LL14 | 7811 | 46 | 18 | 2 |
| LL TOTAL | 126469 | 32 | 10 | 4 |
| Dhrystone | 1183 | 22 | 16 | 19 |

TABLE 5.4

Average basic block sizes.

| Benchmark | Average Basic Block Size |
|---|---|
| 14 Livermore Loops | 23.3 instructions |
| Dhrystone | 4.2 instructions |

TABLE 5.5

Instruction completion times.

| Instruction Type | Base Machine | FDS |
| --- | --- | --- |
| Store | 1 Cycle | 1 Cycle |
| Load | 2 Cycles | 4 Cycles |
| Branch | 2 Cycles | 3 Cycles |
| Integer | 1 Cycle | 1 Cycle |
| Floating Point | 1 Cycle | 1 Cycle |

TABLE 5.6

Benchmark throughputs.

| Configuration Fast Dispatch Stack | | Throughput | | |
| --- | --- | --- | --- | --- |
| Stack Size | Compression | LL_16 | LL_32 | Dhry |
| 4 | Top | 0.88 | 0.89 | 0.67 |
|  | Total | 0.98 | 0.98 | 0.68 |
| 8 | Top | 1.26 | 1.26 | 0.74 |
|  | Total | 1.44 | 1.46 | 0.75 |
| 12 | Top | 1.49 | 1.52 | 0.75 |
|  | Total | 1.59 | 1.65 | 0.75 |
| 16 | Top | 1.58 | 1.61 | 0.75 |
|  | Total | 1.66 | 1.76 | 0.76 |
| 20 | Top | 1.64 | 1.70 | 0.76 |
|  | Total | 1.68 | 1.80 | 0.76 |
| 24 | Top | 1.66 | 1.75 | 0.76 |
|  | Total | 1.68 | 1.82 | 0.76 |
| 28 | Top | 1.67 | 1.78 | 0.76 |
|  | Total | 1.68 | 1.83 | 0.76 |
| 32 | Top | 1.67 | 1.81 | 0.76 |
|  | Total | 1.68 | 1.83 | 0.76 |
| Base Machine |  | 0.72 | 0.72 | 0.65 |

$$\sum_{i=1}^{n} \frac{1}{\text{Throughput}_i}$$

TABLE 5.7

Benchmark throughput speedups on FDS systems.

| Configuration Fast Dispatch Stack | | Speedup Relative to Base Machine | | |
| --- | --- | --- | --- | --- |
| Stack Size | Compression | LL_16 | LL_32 | Dhry |
| 4 | Top | 1.23 | 1.23 | 1.03 |
|  | Total | 1.36 | 1.37 | 1.04 |
| 8 | Top | 1.75 | 1.76 | 1.13 |
|  | Total | 2.01 | 2.03 | 1.15 |
| 12 | Top | 2.08 | 2.11 | 1.15 |
|  | Total | 2.22 | 2.29 | 1.16 |
| 16 | Top | 2.20 | 2.24 | 1.15 |
|  | Total | 2.31 | 2.45 | 1.16 |
| 20 | Top | 2.28 | 2.37 | 1.16 |
|  | Total | 2.34 | 2.51 | 1.16 |
| 24 | Top | 2.31 | 2.43 | 1.16 |
|  | Total | 2.34 | 2.53 | 1.16 |
| 28 | Top | 2.32 | 2.47 | 1.16 |
|  | Total | 2.34 | 2.55 | 1.16 |
| 32 | Top | 2.33 | 2.51 | 1.16 |
|  | Total | 2.34 | 2.55 | 1.16 |

TABLE 6.1

Benchmark throughputs on FDS systems with multiple register sets.

| | Issue Unit Stack Size | | | | | | | |
| --- | --- | --- | --- | --- | --- | --- | --- | --- |
| | Base | 4 | 8 | 12 | 16 | 20 | 24 | 28 | 32 |
| Total Compression, One Register Set | | | | | | | | | |
| LL-16 | 0.72 | 0.98 | 1.44 | 1.59 | 1.66 | 1.88 | 1.68 | 1.68 | 1.68 |
| LL32 | 0.72 | 0.98 | 1.46 | 1.65 | 1.76 | 1.80 | 1.82 | 1.83 | 1.83 |
| Dhry | 0.65 | 0.68 | 0.75 | 0.75 | 0.76 | 0.76 | 0.76 | 0.76 | 0.76 |
| Total Compression, Two Register Sets | | | | | | | | | |
| LL-16 | 0.72 | 0.98 | 1.54 | 1.81 | 1.95 | 2.05 | 2.11 | 2.11 | 2.11 |
| LL-32 | 0.72 | 0.99 | 1.54 | 1.82 | 1.95 | 2.07 | 2.15 | 2.18 | 2.21 |
| Dhry | 0.65 | 0.71 | 0.84 | 0.85 | 0.85 | 0.86 | 0.86 | 0.86 | 0.86 |
| Total Compression, Three Register Sets | | | | | | | | | |
| LL-16 | 0.72 | 0.98 | 1.54 | 1.82 | 1.97 | 2.10 | 2.18 | 2.19 | 2.21 |
| LL-32 | 0.72 | 0.99 | 1.54 | 1.82 | 1.97 | 2.11 | 2.20 | 2.24 | 2.26 |
| Dhry | 0.65 | 0.71 | 0.85 | 0.86 | 0.87 | 0.87 | 0.87 | 0.87 | 0.87 |

TABLE 6.2

Throughput speedups on FDS systems using Total Compression with 2 register sets relative to the Base Machine.

| | Issue Unit Stack Size | | | | | | | |
| --- | --- | --- | --- | --- | --- | --- | --- |
| | 4 | 8 | 12 | 16 | 20 | 24 | 28 | 32 |
| LL_16 | 1.36 | 2.14 | 2.51 | 2.71 | 2.85 | 2.93 | 2.93 | 2.93 |
| LL_32 | 1.37 | 2.14 | 2.53 | 2.71 | 2.87 | 2.99 | 3.03 | 3.07 |
| Dhry | 1.09 | 1.29 | 1.31 | 1.31 | 1.32 | 1.32 | 1.32 | 1.32 |

TABLE 6.3

Percent increases in throughput on a FDS with 2 register sets relative to that on a FDS with 1 register set.

| | Issue Unit Stack Size | | | | | | | |
| --- | --- | --- | --- | --- | --- | --- | --- |
| | 4 | 8 | 12 | 16 | 20 | 24 | 28 | 32 |
| LL_16 | 0.0 | 6.9 | 13.8 | 17.5 | 22.0 | 25.6 | 25.6 | 25.6 |
| LL_32 | 1.0 | 5.5 | 10.3 | 10.8 | 15.0 | 18.1 | 19.1 | 20.8 |
| Dhry | 4.4 | 12.0 | 13.3 | 11.8 | 13.2 | 13.2 | 13.2 | 13.2 |

TABLE 7.1

Benchmark throughputs on FDS systems with precise interrupts.

| | Issue Unit Stack Size | | | | | | | |
| --- | --- | --- | --- | --- | --- | --- | --- | --- |
| | Base | 4 | 8 | 12 | 16 | 20 | 24 | 28 | 32 |
| Precise Interrupts, One Register Set | | | | | | | | | |
| LL-16 | 0.72 | 0.88 | 1.22 | 1.38 | 1.43 | 1.44 | 1.44 | 1.44 | 1.44 |
| LL-32 | 0.72 | 0.89 | 1.22 | 1.40 | 1.46 | 1.50 | 1.51 | 1.52 | 1.53 |
| Dhry | 0.65 | 0.67 | 0.74 | 0.75 | 0.75 | 0.75 | 0.75 | 0.75 | 0.75 |
| Precise Interrupts, Two Register Sets | | | | | | | | | |
| L-16 | 0.72 | 0.89 | 1.27 | 1.55 | 1.67 | 1.75 | 1.81 | 1.83 | 1.85 |
| L-32 | 0.72 | 0.89 | 1.27 | 1.55 | 1.67 | 1.75 | 1.81 | 1.84 | 1.87 |
| Dhry | 0.65 | 0.67 | 0.80 | 0.84 | 0.85 | 0.85 | 0.85 | 0.85 | 0.85 |

TABLE 7.2

Speedups relative to the Base Machine.

| | Base | 4 | 8 | 12 | 16 | 20 | 24 | 28 | 32 |
|---|---|---|---|---|---|---|---|---|---|
| Precise Interrupts, 1 Register Set | | | | | | | | | |
| L-16 | 1.00 | 1.23 | 1.69 | 1.92 | 1.98 | 2.01 | 2.01 | 2.01 | 2.01 |
| L-32 | 1.00 | 1.23 | 1.70 | 1.95 | 2.04 | 2.08 | 2.10 | 2.11 | 2.14 |
| Dhry | 1.00 | 1.03 | 1.13 | 1.14 | 1.15 | 1.15 | 1.15 | 1.15 | 1.15 |
| Precise Interrupts, 2 Register Sets | | | | | | | | | |
| L-16 | 1.00 | 1.24 | 1.77 | 2.16 | 2.33 | 2.44 | 2.51 | 2.55 | 2.57 |
| L-32 | 1.00 | 1.24 | 1.77 | 2.16 | 2.33 | 2.44 | 2.52 | 2.56 | 2.61 |
| Dhry | 1.00 | 1.03 | 1.23 | 1.29 | 1.30 | 1.31 | 1.31 | 1.31 | 1.31 |

TABLE 8.1

Benchmark throughputs on a FDS with 1 register set, precise interrupts, and branch prediction with an accuracy of 85%.

| | Base | 4 | 8 | 12 | 16 | 20 | 24 | 28 | 32 |
|---|---|---|---|---|---|---|---|---|---|
| L-16 | 0.72 | 0.91 | 1.29 | 1.45 | 1.49 | 1.51 | 1.51 | 1.51 | 1.51 |
| LL-32 | 0.72 | 0.91 | 1.30 | 1.47 | 1.54 | 1.57 | 1.59 | 1.60 | 1.61 |
| Dhry | 0.65 | 0.71 | 0.90 | 1.03 | 1.00 | 1.05 | 1.05 | 1.05 | 1.05 |

TABLE 8.2

Speedups of benchmark throughputs on FDS systems with 2 register sets relative to the Base Machine and the Base + BP Machine.

| Machines Compared | 4 | 8 | 12 | 16 | 20 | 24 | 28 | 32 |
|---|---|---|---|---|---|---|---|---|
| LL_32 Benchmark | | | | | | | | |
| BP(85%)/Base | 1.28 | 1.90 | 2.26 | 2.47 | 2.57 | 2.65 | 2.71 | 2.76 |
| BP(85%)/Base + BP (100%) | 1.16 | 1.72 | 2.05 | 2.24 | 2.33 | 2.40 | 2.46 | 2.50 |
| No BP,PI/Base | 1.37 | 2.14 | 2.53 | 2.71 | 2.87 | 2.99 | 3.03 | 3.07 |
| No BP,PI/Base + BP (100%) | 1.24 | 1.94 | 2.29 | 2.46 | 2.60 | 2.71 | 2.75 | 2.78 |
| Dhrystone Benchmark | | | | | | | | |
| BP(85%)/Base | 1.09 | 1.60 | 1.77 | 1.82 | 1.83 | 1.85 | 1.85 | 1.85 |
| BP(85%)/Base + BP (100%) | 0.92 | 1.34 | 1.48 | 1.53 | 1.54 | 1.55 | 1.56 | 1.56 |
| No BP,PI/Base | 1.09 | 1.29 | 1.31 | 1.31 | 1.32 | 1.32 | 1.32 | 1.32 |
| No BP,PI/Base + BP (100%) | 0.92 | 1.09 | 1.10 | 1.10 | 1.10 | 1.10 | 1.10 | 1.10 |

What is claimed is:

1. A computer system comprising:

multiple functional units for executing instructions;

issuing means for issuing instructions for processing by said functional units and including an instruction issue unit;

a buffer;

one or more register files;

a cache store coupled between main memory and said functional units;

an interconnection network coupling said functional units, said register files, and said instruction issue unit;

means for concurrently executing multiple out-of-order instructions;

means for attaching an I-Group comprising an instruction and a tag, a read-vector, a write vector, and a type vector as control bits for instructional use by the system for permitting the hardware of the system to schedule concurrently and on a short cycle time basis multiple, possibly out-of-order, instruction issuances to multiple functional units for execution and to transfer I-Groups to the buffer or for scheduling by said issue unit;

an instruction scheduling mechanism and in which the issue unit includes assigning means for concurrently assigning and issuing independent, multiple, out-of-order instructions contained in the instruction scheduling mechanism provided by said issue unit to the multiple functional units for execution; and ports connecting the issue unit to the multiple functional units, wherein said assigning means includes prioritization means for prioritizing eligible instructions by the assignment to each port of a port-type through which an instruction of a matching instruction type, as specified in its I-Group, may be issued to a functional unit that is able to execute it so that independent instructions eligible for transfer may outnumber available functional units for paths via a port through which instructions may be transferred.

2. A computer system according to claim 1 further comprising:

a memory; and means for ordering the execution process including:

a. means for fetching multiple instructions from the memory at once and generating an I-Group for each instruction;

b. means for concurrently decoding multiple fields of information in an instruction as part of the I-Group generation; and c. means for transferring the resulting I-Groups to said issue unit, but if the issue unit is full, to the buffer.

3. A computer system according to claim 1 wherein the assigning means include permanent assignment means for making the assignment of a port-type permanent.

4. A computer system according to claim 3 wherein said permanent assignment means include a type vector applicable to a particular kind of multiple functional units.

5. A computer system according to claim 1 wherein the assigning means include dynamic port assignment means for making the assignment of a port-type dynamic.

6. A computer system according to claim 5 further comprising means to determine the availability of functional units and wherein dynamic port assignment means include means to provide a match for each machine cycle which is dependent upon an availability determination and which include means for assigning a port type and for then selecting an instruction which can be assigned to an available functional unit.

7. A computer system according to claim 1 wherein assigning means include matching means for transferring independent instructions to OPEN ports of matching types for prioritizing eligible instructions in order that independent instructions eligible for transfer may outnumber available functional units or paths via a port through which instructions may be transferred.

8. A computer system according to claim 7 wherein matching means include means for connecting an OPEN port to an available functional unit of the correct type for executing the eligible instruction.

9. A computer system according to claim 1 wherein said functional units include a plurality of functional units of the same type to provide multiple copy execution units of the same type for concurrently executing instructions requiring execution of the same type of function.

10. A computer system comprising:

multiple functional units for executing instructions;

issuing means including an issue unit for issuing instructions for processing by said functional units;

one or more register files;

a main memory store;

a cache store coupled between main memory and said functional units;

an interconnection network coupling said functional units, said 11 register files, and said instruction issue unit;

means for currently executing multiple out-of-order instructions; and instruction scheduling means for concurrently assigning and transferring independent, multiple, out-of-order instructions to multiple functional units for execution and wherein the number of independent instructions eligible for transfer may outnumber available functional units or paths through which instructions may be transferred, and including, assigning means for prioritizing eligible instructions in hardware by the assignment to each port of a port-type through which an instruction of a matching instruction type, as specified in its I-Group, may be issued to a functional unit that is able to execute it.

11. A computer system according to claim 10 wherein means for prioritizing eligible instructions include means for permanently assigning a port-type.

12. A computer system according to claim 11 wherein said permanent assignment means include a type vector applicable to a particular kind of multiple functional units.

13. A computer system according to claim 10 wherein the assignment means include dynamic port assignment means for making the assignment of a port-type dynamic.

14. A computer system according to claim 13 further including means to check the availability of functional units for each machine cycle and wherein dynamic port assignment means include means to provide a match for each machine cycle which is dependent upon an availability check of available function units which are not busy, to assign a port type and then to select an instruction which can be assigned to an available functional unit.

15. A computer system according to claim 10 wherein assigning means include matching means to transfer independent instructions to OPEN ports of matching types for prioritizing eligible instructions.

16. A computer system according to claim 15 wherein matching means include means for connecting an OPEN port to an available functional unit of the correct type for executing the eligible instruction.

17. A computer system according to claim 10 wherein said functional units include a plurality of functional units of the same type to provide multiple copy execution units of the same type for concurrently executing instructions requiring executing the same type of function.

* * * * *

UNITED STATES PATENT AND TRADEMARK OFFICE
CERTIFICATE OF CORRECTION

PATENT NO. : 5,983,335
DATED : November 9, 1999
INVENTOR(S) : Harry Dwyer, III

It is certified that error appears in the above-identified patent and that said Letters Patent is hereby corrected as shown below:

At column 15, line 27, after "$R_i$" insert --=--;
  line 35, after "$W_i$" insert --≠--;
  line 37, after "$R_i$" insert --≠--; and
  line 39, after "$W_i$" insert --≠--.

At column 18, line 36, delete "∩" and insert --∧--.

At column 24, line 11, delete "WRITE-VECTOR$_i$" and insert --WRITE-VECTOR$_i$--;
  line 57, delete "Q" and insert --0--.

At column 26, line 66, after "$W_i$" insert --≠--; and
  line 68, after "$R_i$" insert --≠--.
  Column 27, lines 1 – 11 should add the symbol "≠" before --ϕ--.
At column 33, line 50, delete "$q_i + 2$" and insert --$q_i = 2$--.

Signed and Sealed this

Ninth Day of January, 2001

*Attest:*

Q. TODD DICKINSON

*Attesting Officer*     *Commissioner of Patents and Trademarks*